US008578329B1

(12) United States Patent
Chiluvuri

(10) Patent No.: US 8,578,329 B1
(45) Date of Patent: *Nov. 5, 2013

(54) SYSTEM AND METHOD OF APPLICATION DEVELOPMENT USING EASIER TO REDESIGN REPLACEABLE COMPONENTS

(76) Inventor: Raju V. Chiluvuri, Hyderabad (IN)

( * ) Notice: Subject to any disclaimer, the term of this patent is extended or adjusted under 35 U.S.C. 154(b) by 250 days.

This patent is subject to a terminal disclaimer.

(21) Appl. No.: 13/225,139

(22) Filed: Sep. 2, 2011

Related U.S. Application Data

(60) Continuation-in-part of application No. 12/819,231, filed on Jun. 21, 2010, now Pat. No. 8,392,877, which is a continuation-in-part of application No. 12/493,135, filed on Jun. 26, 2009, which is a continuation-in-part of application No. 11/465,511, filed on Aug. 18, 2006, now Pat. No. 7,840,937, which is a division of application No. 10/951,066, filed on Sep. 27, 2004, now Pat. No. 7,827,527.

(60) Provisional application No. 60/544,212, filed on Feb. 12, 2004, provisional application No. 61/082,477, filed on Jul. 21, 2008.

(51) Int. Cl.
*G06F 9/44* (2006.01)
(52) U.S. Cl.
USPC .......................................... 717/107; 717/106
(58) Field of Classification Search
USPC .......................................... 717/100, 106–109
See application file for complete search history.

(56) References Cited

U.S. PATENT DOCUMENTS

| 6,237,135 B1* | 5/2001 | Timbol | 717/107 |
| 6,490,719 B1* | 12/2002 | Thomas | 717/107 |
| 2002/0108099 A1* | 8/2002 | Paclat | 717/102 |

OTHER PUBLICATIONS

Szyperski et al., "Component Software, Beyond Object-Oriented Programming, Second Edition," 2002, Addison-Wesley, p. 1-589.*

* cited by examiner

*Primary Examiner* — Qing Chen

(57) ABSTRACT

A method and system for creating a software application code for building an application comprising multiple Replaceable Self-Contained Components (RSCCs) is disclosed. The method includes creating each RSCC by instantiating and initializing an object instance of a Replaceable Component Class (RCC) that substantially encapsulates construction code of a Self-Contained Component (SCC). A method for creating communication code for allowing necessary collaboration between the RSCCs uses a Service Registration Object (SRO), implements necessary coupling code within the RSCCs that provide services for registering its services with the SRO and implements necessary coupling code within the RSCCs that require services for finding and getting the required services from the SRO. Another method for creating necessary communication code between any two RSCCs includes implementing appropriate coupling interfaces in each of the two RSCCs and implementing necessary communication code in the software application code using the coupling interfaces of the two RSCCs.

40 Claims, 36 Drawing Sheets

❖ An example replaceable component class 466 implemented for presenting weather report component 468 for a given zip code.

❖ An object instance 467 initialized with a zip code (e.g. 95116 of San Jose) can build self-contained component for presenting the weather report 468 for the given zip code (e.g. 95116).

* An example for a custom replaceable component class 345 implemented for presenting pie chart SCC for an investment portfolio component 349 for a given account number.

* At line 1, an object instance 347 initialized by passing an account number (e.g. 40021729) for building SCC the portfolio pie chart 349 for the given investment account. Line 2 adds the SCC to a parent to present the SCC.

It is possible to create RCCs for 3-month & 6-months, as illustrated by
following RCC for stock movement & volumes charts for one year The following figure shows an application containing 3 self-contained components: A stock quote Table, a line chart for intraday stock movement and a line chart for one year stock movement.

➢ A component is self-contained if it is also possible to implement its construction code in order to operate the component independently (if it doesn't need any services) outside of its container application.

➢ It is possible to implement construction code of each of the 3 components in order to operate it as an independent application, so each of the 3 components is self-contained.

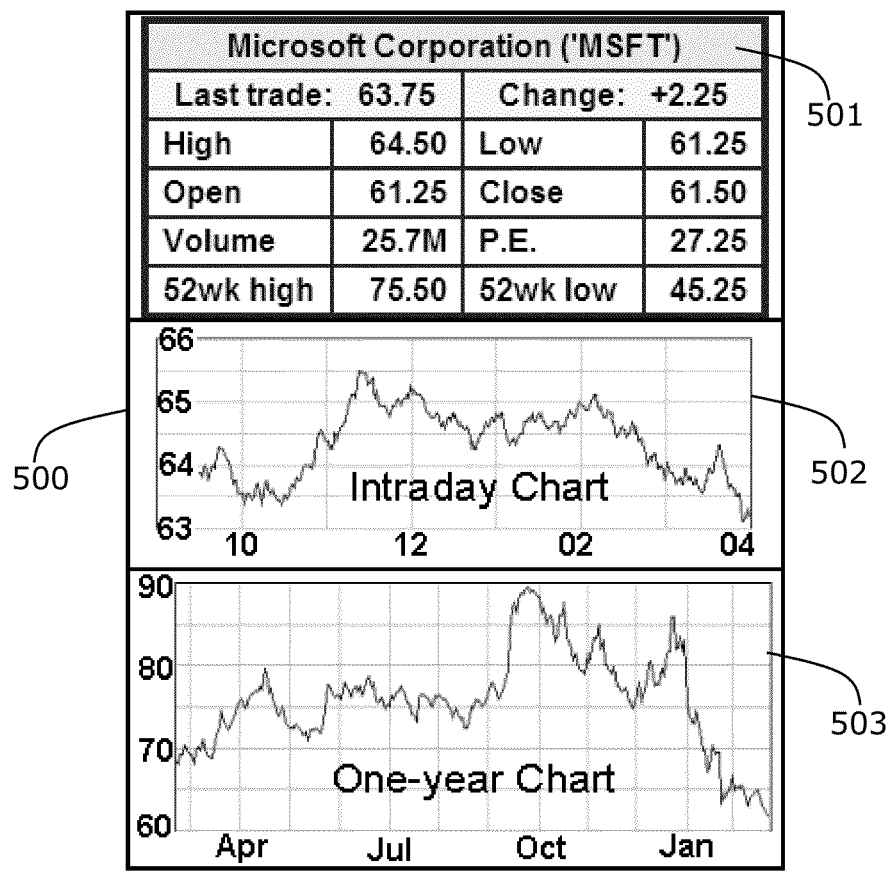

FIG. 5a

| A sample pseudo code for including and coupling two RSCC in an application (or in container-RCC of a container-SCC) |
|---|
| 1. // Code for instantiating and including an object for RCC1  — 900 |
| 2. RepComp RSCC1 = new RCC_Buy_Tickets (ACi, "94089");
3. ApplicationWindow.AddChild (RSCC1, x_loc1, y_loc1, null);  — 901 |
| 1. // Part-1 of communication code created by container application
2. function Method_for_RSCC2_to_get_service (eve, Theater_ID) {
3.     RSCC1.DisplayAvailableTheaterSeats (Theater_id);
4. } // Callback function for registering as service function  — 902 |
| 1. // Code for instantiating and including an object for RCC1
2. RepComp RSCC2 = new RCC_Diapley_Theaters (ACi, "94089");
3. ApplicationWindow.AddChild (RSCC2, x_loc2, y_loc2, null);
4. // Part-2 for allowing communication between RSCC1 & RSCC2
5. RSCC2.BuyTickets (Method_for_RSCC2_to_get_service)  — 903 |

FIG. 9a

| A sample pseudo code for including and coupling two RSCC in an application (or in container-RCC of a container-SCC) |
|---|
| 1. // Code for instantiating and including an object for RCC1  — 910 |
| 2. RepComp RSCC3 = new RCC_For_BookingRooms (ACi, "94089");
3. ApplicationWindow.AddChild (RSCC3, x_loc3, y_loc3, null);
4. // Code for instantiating and including an object for RCC1
5. RepComp RSCC4 = new RCC_Display_Hotels (ACi, "94089");
6. ApplicationWindow.AddChild (RSCC4, x_loc4, y_loc4, null);
7. // Code for allowing communication between RSCC3 & RSCC4
8. RSCC4.ReserveHotelRooms (RSCC3.ShowAvilableRooms);  — 912 |

FIG. 9b

Each SCC code comprises of a function that implements code for registering each of the services it provides with the global SRO.
An example, if the SCC offers three services:

1. public int register_all_services_provided (SRO_Class SRO)
2. { // If this SCC offers 3-services, it registers each of the 3-services using a pre-defined Lookup-name
3.     SRO.RegisterService (SCC_ID,Interface1a,ServiceName1, ServiceMethod1);
4.     SRO.RegisterService (SCC_ID,Interface2a,ServiceName2, ServiceMethod2);
5.     SRO.RegisterService (SCC_ID,Interface3a,ServiceName3, ServiceMethod3);
6. } // "Interface1a" may be a version object/string (e.g. 02.07.09) of the interface of ServiceMethod1

1470

Each SCC code comprises of a function that implements code for lookup with SRO object for each of the services it requires by using respective lookup-name.
An example, if the SCC requires two services:

1. public int lookup_all_services_required (SRO_Class SRO)
2. { // If SCC needs 2-services, it looks-up for the 2-service-fucntions and saves them in local variables.
3.     Reference1=SRO.Service_LookUp (SCC_ID,Interface1, NameOfRequiredService1);
4.     Reference2=SRO.Service_LookUp (SCC_ID,Interface2, NameOfRequiredService2);
5. } //SCC is designed to use pre-defined/agreed and published interfaces of other SCCs.

Total application files used by RCC1 of SCC1

This set is a union of Set-X1 (exclusive-files) & Subset-Y1 (non-exclusive files) used for building RCC1. All the files in this union-set use or depend on the resources from the eco-system for the software development (which is not shown in the figure below)

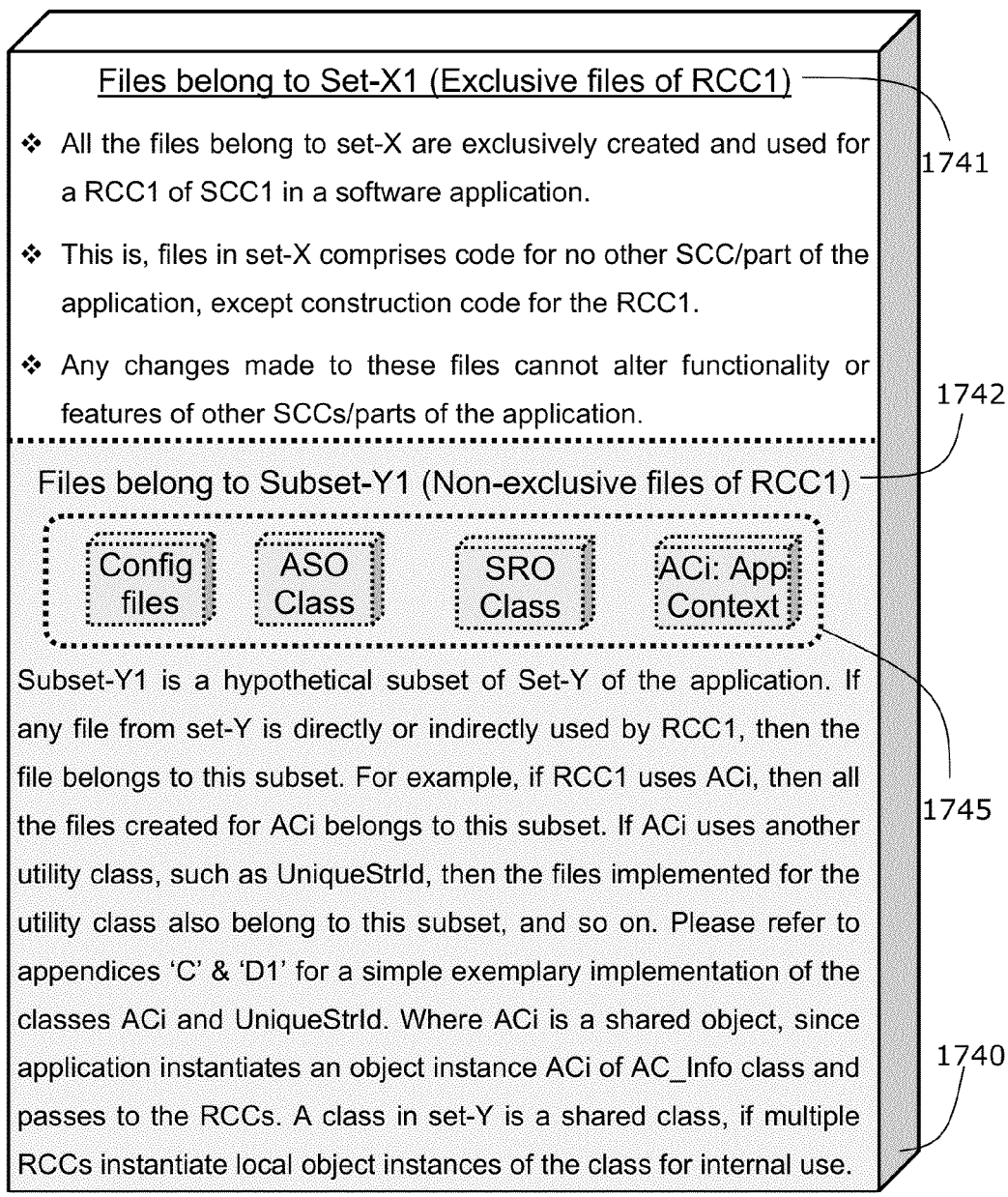

Files belong to Set-X1 (Exclusive files of RCC1)

- All the files belong to set-X are exclusively created and used for a RCC1 of SCC1 in a software application.
- This is, files in set-X comprises code for no other SCC/part of the application, except construction code for the RCC1.
- Any changes made to these files cannot alter functionality or features of other SCCs/parts of the application.

Files belong to Subset-Y1 (Non-exclusive files of RCC1)

- Config files
- ASO Class
- SRO Class
- ACi: App Context

Subset-Y1 is a hypothetical subset of Set-Y of the application. If any file from set-Y is directly or indirectly used by RCC1, then the file belongs to this subset. For example, if RCC1 uses ACi, then all the files created for ACi belongs to this subset. If ACi uses another utility class, such as UniqueStrId, then the files implemented for the utility class also belong to this subset, and so on. Please refer to appendices 'C' & 'D1' for a simple exemplary implementation of the classes ACi and UniqueStrId. Where ACi is a shared object, since application instantiates an object instance ACi of AC_Info class and passes to the RCCs. A class in set-Y is a shared class, if multiple RCCs instantiate local object instances of the class for internal use.

FIG. 17b

SYSTEM AND METHOD OF APPLICATION DEVELOPMENT USING EASIER TO REDESIGN REPLACEABLE COMPONENTS

CROSS-REFERENCE TO RELATED APPLICATIONS

This application is a continuation-in-part application of patent application Ser. No. 12/819,231, filed Jun. 21, 2010, now U.S. Pat. No. 8,392,877, which is a continuation-in-part application of patent application Ser. No. 12/493,135, filed Jun. 26, 2009, now pending, which claims priority from Provisional Patent Application Ser. No. 61/082,477, filed Jul. 21, 2008, to which the instant application also claims priority. The patent application Ser. No. 12/493,135, filed Jun. 26, 2009, now pending, which is a continuation-in-part application of patent application Ser. No. 11/465,511, filed Aug. 18, 2006, now U.S. Pat. No. 7,840,937, which is a divisional application of patent application Ser. No. 10/951,066, filed Sep. 27, 2004, now U.S. Pat. No. 7,827,527, which claims priority from Provisional Patent Application Ser. No. 60/544,212, filed Feb. 12, 2004; the entire contents of all of which are hereby incorporated herein by reference in their entireties.

COPYRIGHT NOTICE AND USE PERMISSION

A portion of the disclosure of this patent document contains material that is subject to copyright protection. The copyright owner has no objection to the facsimile reproduction of the patent document or the patent disclosure by anyone as it appears in the U.S. Patent and Trademark Office patent file or records, but otherwise reserves all copyright rights whatsoever. The following notice applies to the software and data as described below and in the drawings hereto: Copyright 2010, Raju Chiluvuri, All Rights Reserved.

COMPACT-DISC APPENDIX

Two (2) identical Compact Disc-Recordables (Copy 1 and Copy 2), containing computer program listings, pursuant to 37 C.F.R. 1.77 and 1.96, constitute a part of the specification of this invention and is incorporated by reference herein for all purposes. The CD discs were created on 27$^{th}$ day of Jul., 2011, with ASCII Carriage-Return/Line-Feed as line terminators, conform to the ISO 9660 standard, include two identical files: Patent5_Appendices1.txt and Patent5_Appendices2.txt, each of which is of 159,252 bytes, and contains the code for the following programs.

A1. Application sample code of code for testing/using the SRO in JavaScript;
A2. Application code of Registration Class for SRO in JavaScript (.js);
B. Source code of AgileTemplate class in Java;
C. Source code of AC_Info class in Java;
D1. Source code of UniqStrId class in Java;
D2. Source code of AppConfig Info class in Java;
E. Source code of Rotate_banner in Java;
F. Source code of subcomponents in JSP;
G. Source code of ShowLayer in Java;
H. Source code of RB_DDL_IntTemp in Java
I. Source code of rb_ddl_it_stocks for Stock-info in JSP
J. Source code of rb_ddl_it_weather for Weather-info in JSP
K. Source code of RadioButtons class definition in Java;
L. Source code of CheckBoxes class definition in Java;
M. Source code of RB_RB_IntTemp in Java;
N. Source code of SL_CB_IntTemp in Java;
O. Source code of rb_rb_example.jsp in JSP;
P1. Source code of Airplane.svg in SVG;
P2. Source code of Airplane_class.js in Java Script;
P3. Source code of Airplane class definition in Java;
P4. Source code of AirlinerCF class definition in Java;
Q1. Source code of flight_example.jsp in JSP;
Q2. Source code of flight2_example.jsp in JSP;
Q3. Source code of ATC_CF replaceable component class in Java;
Q4. Source code of atc_example.jsp in JSP;
R1. Source code of DrawingArea class definition in Java;
R2. Source code of canvas_test.jsp in JSP;
S1. Source code of get_info.jsp in JSP;
S2. Source code of get_loc.jsp in JSP;
S3. Source code of get_info_table.jsp in JSP;
T. Source code of Webservices_class.js in JavaScript;
U1. Source code of SRO_CallBacks sample pseudo code in text;
U2. Source code of ReplaceableComponent abstract class in Java; and
V. Read me text provides instructions for using the above files for either for practicing or testing some of the application code of GUI components, GUI CCG classes and RCC for ATC (Air Traffic Control).

FIELD OF THE INVENTION

This invention relates to software development, and particularly to development process for designing, developing software applications by identifying, building and using new kind of software component classes called "Replaceable Component Classes" (or RCCs). The RCCs are used for assembling new kind of software components called 'Replaceable Self-Contained Components' (or RSCC). The application design and development process comprises (a) identifying 'Self-Contained Components (or SCCs) of an application and (b) building a RCC for each SCC, where the SCC is a new kind of software sub-system innately having higher degree of autonomy. The RSCCs are designed to be easily adoptable (by redesigning it) to evolving requirements, so make it simpler and more efficient for managing and evolving any application containing many RSCCs. This invention relates to development processes for creating, using, managing and evolving RSCCs and coupling-interfaces, where the coupling-interfaces allow collaboration between the RSCCs, between RSCCs and other parts of the application.

BACKGROUND OF THE INVENTION

Dr. Douglas McIlroy's speech in '1968 NATO software engineering conference' on "Mass produced software components" is widely credited for launching today's 'software engineering' and Component-based software engineering (or 'CBSE'). Since then most of the software engineering research has been focused on reusable components and increasing reuse of code or modules. Ultimate dream is to build new/custom applications by assembling pre-build COTS (Commercially Of The Shelf) components. The main focus of the research is to invent components having desirable properties such as non-context-specific, standardized, generic, highly flexible or configurable, for example (i) to be reusable in more applications and/or (ii) to make the component easy to reuse by being flexible to configure for each application etc.

The primary purpose or essential benefits of the reusable parts is 'reuse'. But it is also possible to invent new kind of parts having other useful benefits other than 'reuse'. In other words, other new kind of parts can be invented, which can be used for not only creating a large application but also maintaining the applications at lower cost and/or complexity. The parts belong to the new kind can be designed to serve different but useful purpose or offer useful benefit. So the new kind of components addresses problems that are not addressed by any other known kind of components.

The physical CBE-products (e.g. automobiles, cell-phones or computers) are built using various kinds of parts such as (i) component-parts such as CPU, DRAM-card, car-engine, gearbox and CD-player etc., and (ii) ingredient-parts such as silicon, steel, cement, plastic, metals and alloys etc. Where the CBE-products imply products that are created by assembling the component-parts. The parts belong to each of the kinds has different set of unique characteristics and primary purpose for serving different but useful benefits. Some parts (e.g. most of the 'ingredient-parts') are ideally suited for 'reuse', while other parts are designed for serving other useful purposes.

For example, although desirable it is not necessary for the physical component-parts to be reusable, but some of the useful benefits for component-parts include, for example, it is easy to replace any time in the future and (ii) it is possible to dissemble even large a component (e.g. jet-engine) having many sub-components as a unit and fix any problems and possible to reassemble the large component. In other words, the physical components are offering useful benefits (other than reuse), such as each component can be easily assembled for building the CBE-product. Also the component can be easily disassembled as a unit for maintenance (e.g. redesigning or fixing any short comings) or to replace by a better component. This ability to easily replace a part (e.g. CPU, DRAM or Hard Drive) is useful to extend the life of a product at lower cost.

For example, if one of a kind experimental spacecraft or jet fighter is built by assembling custom designed components, it is likely that most of the core large components and coupling interfaces of the components are custom designed. Even if the large core components are not reusable, each component is assembled such that they are simpler pre-defined custom loosely coupled interfaces, so that the component can be replaceable (i.e. easy to disassemble or reassemble as a unit). This property of the physical components is desirable, because each component can be disassembled for redesigning and testing outside of the product, at any time in the future (e.g. to repair or to improve). But if a large component, having many tightly coupled devices and subcomponents, is assembled by tightly coupling each of its devices and subcomponents separately into a product, it then requires removing each of the tightly coupled devices and subcomponents to remove the large component. Encapsulating all the devices and subcomponents of the component in a loosely coupled replaceable container minimizes this complexity, since the component can be replaced as a unit (e.g. as long as its interfaces are loosely coupled to make the component replaceable, even if the component is not reusable and interfaces are custom designed).

It is desirable to invent software components, which can offer comparable benefits such as components that are easier to replace or easier to maintain (e.g. to fix problems or add new features). For example, today almost no large GUI component having a dozen or more large GUI subcomponents (e.g. Charts, graphs, maps or trees) is encapsulated in a loosely couple replaceable component, where each subcomponent is included using an object instance of a reusable GUI class and by using custom application data for initializing the object instance. Each of the object instance of a reusable GUI class is often tightly coupled by implementing many lines of application code for getting, processing application data and using the data for initializing or constructing a subcomponent, where all this associated application code makes the subcomponent tightly coupled. Hence to include the large GUI component, it is required to include many tightly coupled object instances and associated application code for including respective subcomponents. To remove the large GUI component, it then needs removing all the tightly coupled subcomponents and associated application code.

This invention discloses new kind of software components called self-contained components (SCC) and replaceable self-contained components (RSCC). The earlier U.S. Pat. Nos. 7,827,527 and 7,840,937 (in this chain of continuation-in-parts) disclosed methods for creating reusable GUI classes for a GUI API, which is capable of encapsulating such large GUI components (that is using many reusable GUI classes for including GUI subcomponents) in a replaceable class. It is possible to invent new kind of software components, which are not necessarily 'reusable' but can serve other useful purposes or offer benefits (that are not offered by no known kind of software components). One of the essential benefits of the physical component-parts is: either directly increasing or indirectly allow increasing the degree of useful factors (i) division-of-labor, (ii) specialization and (iii) mechanization (i.e. automation in case of software development). These factors hereafter referred to the 3-CBE-factors.

According to some software research papers, up to 80% of the software engineering effort is to deal with maintaining/changing the existing software, for example, to build a better/newer version or support new requirements, such as, changing business needs or government regulations. This is especially true in case of successful software and need to be maintained or updated to use for many years. So many software experts feel large software components that can be easily adaptable to changing or evolving requirements (e.g. business needs) is as useful as the reusable components. So it is desirable to invent new kind of components, which can be easily adaptable by redesigning its source code to satisfy evolving needs of its application.

It is also desirable for the components to reduce the cost of building similar components, if a similar component is needed in a new application. For example, by making it easier to take a copy of a component's source code (e.g. which can be conceptually/logically equivalent to a blueprint of a physical component) and redesigning the copy to create a new version/model of the component to satisfy unique needs of the new application. This kind of reuse is code reuse (e.g. analogues to reuse of blueprint, or reuse of design and know-how) but not component reuse.

The software engineering and design of software application can benefit from experiences gained in the mature field of industrial engineering. For example, many automobile designers are concerned with giving easy service-access to the parts that need more frequent servicing or maintenance, to minimize the overall cost of ownership and maximize satisfaction. For example, in case of automobiles it is desirable to easily replace parts that are prone to wear-and-tear. Likewise, in case of computers, parts (e.g. DRAM, CPU or Hard drive etc) that can be upgraded to extend the usefulness or life of the computer. If a component requires little or no effort to detach (or disassemble) or re-attach (or re-assemble), such component is said to be having highest degree of service-access. It is desirable to have high degree of 'service access' (or 'replaceability') to each part that requires frequent maintenance, or likely to be upgraded (e.g. DRAM, HardDrive, CD-player or CPU) to satisfy owner's evolving or expanding needs.

Today software engineering and CBSE have many gaps compared to the CBE (Component Based Engineering) of physical products. So it is required to invent new kind of software components and process to fill some or all the gaps (e.g. the S-CBE-factors). The CBSE and CBE have many similarities, which must be analyzed to find and comprehend the gaps for inventing solutions to fill the gaps. Also CBE and CBSE have many differences, especially in mass production and product-lines (or product-families). For example, automobile engineer deals with just one automobile product-family. An airplane engineer deals with airplane product family. But software engineers deal with many product families such as compilers, ERP, video games, OS, banking/finance and many others. Although each of them is a software product, each product family requires different domain specific components and domain expertise.

For example, it is also desirable to analyze evolution of ecosystems for reusable components (e.g. third-party component vendors) since introduction of early product models for various product families/lines (e.g. automobiles, computers or Airplanes). More percent of components can be reused across product models within (i) a mature crowded product-line (e.g. automobiles evolved for over a century) or (ii) a product-line (or product-family) whose components are more conducive for standardization. For example, components for cell-phones or computers conducive for standardization, because software can be used for differentiation, variations or customization. Likewise, each year hundreds of new models of cars introduced in just one automobile product-line, so such crowded product-line creates an ecosystem for third-party component vendors to build non-core components such as auto-battery, CD-player or ACs etc. Many of the core components (e.g. engine or gearbox) are custom designed for a product model and may not be readily reusable (i.e. without redesigning the couplings) across product-models (e.g. Toyota Camry, Corolla or Honda Accord). Also each component is evolved for each new model-upgrade every few years.

But software engineering is dealing with many product lines, such as, OS, compilers, browsers, Word-processing, Spreadsheet, banking, games, medical-records or manufacturing etc. And more new software product-lines are emerging each year, such as online-games (e.g. Zynga), search engines for social networks or applications for iPad/Iphone/Android etc. So it is harder to invent large reusable components for using across such diverse product lines. Also most of the components are less conducive for standardization. However, the physical components and CBE for physical products offer useful benefits other than reuse, so it is desirable to invent software components that can offer benefits comparable to the other useful benefits (e.g. 3-CBE-factors throughout the life of a component for future maintenance or enhancements).

So it is desirable to find similarities with CBE to locate any gaps and invent components to fill the gaps. It is possible to invent components that not only can offer high degree of replaceability but also have high degree of autonomy, for example, to redesign the component either to improve or to satisfy evolving or changing requirements. Such a replaceable autonomous component can be disassembled from the product as a unit and refined and tested with high degree of autonomy. For example, a replaceable autonomous GUI component can be easily disassembled and refined. Its GUI features and coupling-interfaces may be tested autonomously 'outside of the application' by implementing simple test application. Once satisfied with the features, performance and/or quality, the autonomous GUI component can be re-assembled in to the application.

The components having high degree of autonomy offer certain benefits, which are proven to be very useful in design, development and long-term maintenance from the experiences of the industrial engineering. The benefits are: Increasing the degree of autonomy of a part increases (or indirectly allow increasing) degree of (i) division-of-labor, (ii) specialization and (iii) mechanization or automation.

The autonomous components can be more conducive for automation or specialization. So they can also indirectly allow increasing automation or specialization. For example, introduction of the interchangeable components in early $18^{th}$ century not only increased degree of specialization but also increased mechanization in mass-producing the interchangeable components, for example, by using tools such as jigs, casting, dies or forging. Another example, the increased degree of autonomy due to standardized interfaces of interchangeable components allowed Ford Motor Company to automate mass-production of the cars by inventing moving assembly line. But, such improvements in mass-production are not applicable to the software development.

However, for example, directly increasing useful factors such as increasing division-of-labor for software components might lead to indirectly increasing automation, by opening up possibilities for inventing new tools or processes. For example, the direct benefits for the 'interchangeable parts' is increased division-of-labor and allow specialization, while automation such as Ford's moving assembly line is indirect benefit, where the moving assembly line is not very useful or practical without the interchangeable parts introduced a century earlier (between years 1809 and 1818).

The components having high degree of autonomy is also very useful for building and maintaining the software applications, since each of the (sub)-components can be refined more autonomously for satisfying evolving needs, new technologies or know-how (e.g. expertise wisdom gained during/from previous versions and use-cases in field). For example, engineering historian Petroski suggested in 1992 book "The Evolution of Useful Things" (i) Continual refinement is the usual rule and (ii) Engineers constantly find shortcomings in their designs & fix them "little-by-little".

Today's state of the art design of each large physical product (e.g. car or PC) is result of many decades of evolution by improving each of its components 'little by little' autonomously. For example, designer of most of the physical components (e.g. car-engine, Hard Drive, CPU or DRAM) have been refining them little by little for decades autonomously from respective physical products.

It is desirable to identify each of the large autonomous-parts (i.e. components innately having high degree of autonomy) in an application and make them replaceable (i.e. easy to disassemble and reassemble). Each of the large software applications contains multiple large sub-systems innately having high degree of autonomy, but today such large autonomous sub-systems are not identified and designed as replaceable adoptable components. Any sub-system that is innately having high degree of autonomy is an autonomous component. If such autonomous components are identified and each autonomous component is designed as a replaceable (e.g. by having loosely coupled interfaces) adoptable component, it reduces the cost of evolving the component, for example by reducing the cost and complexity of refining "little-by-little".

The CBE steps for building the physical products can be broadly divided into three main stages (or steps), which are briefly summarized below:

Step or Stage 1—Design & Development:

(1a) Cost or complexity of CBE design mainly comprises: Designing a product by partitioning it into component/sub-components, where each large (sub)-component may be further partitioned into sub (sub)-components, and so on. This successive partition creates a hierarchy of components and subcomponents. The main activity of the CBE design comprises (i) creating the hierarchy of components/subcomponents and (ii) designing the loosely coupled interfaces for each component/subcomponent in the hierarchy. (1b) Cost or complexity of designing and building all the components mainly comprises: Independently design and build each of the prototype components and test each of the components independently. (1c) Assemble the components to build a set of working prototype product(s) and test the product. Fix any problems (e.g. functional or design) by refining/replacing each of the components and test. Repeat the 'fix-and-test' cycle until satisfactory components and product is created, which is the final 'golden' reference model or version for manufacturing (i.e. mass production). Total complexity or cost for designing and building of a CBE-product comprises costs for 1a, 1b and 1.

Stage or Step 2—Mass Production:

Using the 'golden' as a reference to define engineering tolerances for each of the components and its coupling interfaces (e.g. for assembling and to permit proper collaboration between the components) to mass-produce 'interchangeable parts'. Then set up an assembly line to assemble the components for mass-producing products. Although coupling interfaces of components are often changed in stage-one, often discouraged in stage-two.

Stage or Step 3—Maintenance or Evolution:

Every few years, each of the successful product-model (e.g. Camry or Accord) must be substantially redesigned for upgrading to a new model/version. A physical CBE-product is often evolved by evolving each of its components. The new model often needs redesigning many of the large core components/sub-components for improving them based on factors such as new-innovations, expertise and wisdom gained from previous designs or customer-feedbacks and fixing any shortcomings etc. Fix any problems (e.g. functional or design) by refining/replacing each of the components and test the components. Repeat the 'fix-and-test' cycle until a satisfactory components and product is created, which is the 'golden' reference model for manufacturing (i.e. mass-production in step 2).

In case of software products, mass production is nothing but making copies on CDs or host the software on a server for the world to use or download the software product. Hence obviously stage-two (i.e. mass-production) don't apply to the software applications. But it is possible to apply stage-1 and 3 for designing and building the software applications (if one wish to design and built using such CBSE, and when comparable replaceable autonomous components invented). The increased degree of autonomy of various components used in building/assembling the product (i.e. software application) is useful in each iterative 'fix-and-test cycle' of the components not only during the initial development but also in the future maintenance and evolution.

It is not necessary that component-parts are reusable for the CBE. For example, if prototype for one-of-a-kind spacecraft or experimental nuclear powered rail-engine were to be built in the future, it likely will be built by employing CBE design steps and assembling component-parts. Where most of the large component-parts likely are custom designed and it is not necessary that the large component-parts are reusable for design and development of the one-of-a-kind CBE-product. However it is desirable to have the ability to 'fix-and-test' each of the large new custom component-parts used for building the CBE-product during the step-1 and step-3. Likewise, it is desirable to invent comparable software replaceable-components having high degree of autonomy, which can make it simpler to apply frequent "fix-and-test" cycles during step-1 and step-3. For example, to apply 'fix-and-test' cycle for each component-part, it is desirable to easily disassemble the component-part for redesigning and testing and also desirable to easily reassemble the component-part. A replaceable component having higher degree of autonomy makes it simpler to test it independently outside of its container product. Once a satisfactory prototype is created then step-2 may be employed only for the physical products, if it is required to mass-produce the physical CBE-product.

This background of the invention is forced to use example from the experiences of industrial engineering and design methods of the physical CBE-products (i.e. products created by assembling physical components), because no comparable research effort is found in the research of the software components and CBSE for using as reference or for using as prior-art. Comparing today's CBSE with CBE and researching differences expose many gaps in the CBSE. Comprehending and analyzing the missing capabilities lead to inventions 'specific to software' for filling the gaps. Although software components and applications are different from physical components and CBE-products respectively, discovering the hidden benefits and characteristics or nature of the physical components/CBE help invent software components having necessary equivalent characteristics for offering comparable benefits.

It is desirable to have high degree of autonomy (or replaceability) for the software modules or parts in an application, if the modules or parts need to be evolved by redesigning or refining over the time for maintenance or for releasing upgraded versions/models of the application. It is desirable for many custom parts to be easily adaptable to changing needs of the application. Where examples for custom parts include software modules or classes custom designed for an application or family of applications in a given domain (e.g. Nokia created family of Operating-Systems for wide range of Nokia cell-phone models). Any large part having high degree of autonomy (also designed to be easily replaceable) and conducive to preserving the autonomy (or replaceability) reduces the cost and complexity of evolving the part over the life of the container product or application (e.g. during its maintenance cycles in future).

Hence it is desirable to invent new software components along with tools and methods that not only can offer high degree of replaceability but also conducive to preserve the high degree of replaceability throughout the life of application. The new software components are only conducive for preserving the replaceability, but for example, any unplanned, unstructured or quick fixes (e.g. patches between two major releases) by employing a bad design could erode or dilute the higher degree of replaceability over time. When that happens it is desirable to periodically redesign (e.g. refactoring of its code) the coupling interfaces of the components for restoring optimal degree of replaceability for the replaceable components, where the coupling interfaces are useful for allowing the component to communicate or collaborate with other components/parts of the application.

The following are two kinds of physical parts just as an analogy or examples to illustrate two kinds of parts belonging to the opposite sides of the replaceability scale. Here some parts are ideal for designing as replaceable, while it is not possible to design the other parts as replaceable. For example, the physical products are created by using different kinds of parts, such as: (i) component-parts (i.e. components) such as CPU, DRAM-card, car-engine, gearbox and CD-player etc., and (ii) ingredient-parts such as silicon, steel, plastic, metals and alloys etc., which are often used for building the components or products.

Certain parts such as ingredient-parts can only offer 3-CBE-factors up to certain point. For example, even ingredient parts can be manufactured and tested autonomously, so offer the three benefits up to making them. But an ingredient-part cannot offer the benefits (e.g. autonomy or replaceability) after using it for making its container-part/product. For example, it is not practical to remove 'silicon' in an IC-chip to refine/replace the silicon after making the IC-chip (for maintenance of 'silicon' outside the IC-chip in the future). Often such parts require lot more effort for composing (e.g. tight coupling the parts). But for maintenance at any time in the future, any component such as an engine or CD-player of a car can be disassembled, refined/tested ('outside' of the car), and reassembled. Only intended purpose of this analogy is, to illustrate that it is desirable to preserve the autonomy (i.e. higher degree of replaceability) of the parts that need to be changed during future maintenance.

Only purpose of these analogies and examples of physical parts is to just give laymen an example to illustrate the gaps in the CBSE and advantages of parts that can be designed to have high degree autonomy and replaceability, if the parts need to be replaced are 'fix-and-test' during long-term maintenance of the product. So these analogies and example of physical parts must not be used for any other purpose, except for understanding the gaps and general contextual meaning of 'replaceability' and to comprehend various methods presented in this disclosure for 'preserving the replaceability and autonomy' for redesigning the part to satisfy evolving needs.

The software modules need not necessarily be comparable to the physical components or parts. For example, there are no software parts comparable to ingredient-parts such as silicon. Almost all the software parts (even very large sub-systems) offer certain degree of replaceability and autonomy, although they offer very low degree of replaceability and autonomy. But it is possible to invent new kind of software components that can substantially increase replaceability and autonomy, even for large sub-systems.

For example, if 900 lines of application-code is implemented for building a part (e.g. part-X) and including into an application, then part-X is considered having low degree of replaceability, if it requires changing 400 lines in one or more non-exclusive application files to properly remove part-X. Where the non-exclusive files contain application code for other parts of the application, so it requires finding and properly removing only the code sections of part-X. But it is desirable to increase the degree of replaceability and/or autonomy of part-X. For example, if part-X can be implemented and tested independently as an autonomous module such as a class definition and part-X can be assembled into an application by implementing 9 lines in an application file (e.g. where 2 lines is for instantiating and initializing an object instance of class for part-X and 7 lines for creating necessary communication code for part-X).

Also it is desirable to effectively remove the part-X as a unit by removing or changing the 9 lines implemented for assembling the part-X. In this example, the object instance of part-X's class decreased required code from 400 lines to 9 lines for disassembling/assembling part-X, resulting in substantially increasing the degree of replaceability. Furthermore, it is desirable to make the source code for the class definition for part-X has high degree of autonomy to redesign part-X (e.g. to satisfy evolving needs), and to test part-X autonomously, for example, by making it simpler to create test application that assembles object instance of part-X.

Hence although such a large component innately have high degree of autonomy, the total construction code of the component end up broken into multiple code-sections and included in one or more non-exclusive files of the application. So the component end up having very low degree of autonomy (making it harder to redesign) and also very harder to replace. Where non-exclusive file for an autonomous component implies, that the file contain code sections for other autonomous components and/or other parts of the application (in addition to containing code sections for the autonomous component). An exclusive file for an autonomous component implies, a file containing code for no other component or part of the application, except the code sections for the autonomous component.

Today the CBSE have many unknown gaps and/or shortcomings that must be exposed. Also it is desirable to invent new kind of software components for filling some of the gaps. This invention discloses a new kind of software parts that innately have high degree of autonomy, so more conducive to design as replaceable components (i.e. new kind of components having very high degree of replaceability and autonomy) and allow preserving the replaceability during the future evolution of the software. It is desirable to have high degree of autonomy not only during building a large software component but also to preserve the high degree of autonomy of the large software component for redesigning to satisfy evolving needs in the future.

In addition to having higher degree of (i) replaceability and (ii) autonomy for design, development and maintenance/evolution of each of the components, it is desirable to increase degree of automation by inventing tools, utilities and mechanisms, for example, (i) to create or reduce communication code required when assembling the components in to an application and (ii) managing the communication code during maintenance. For example, it is desirable to detect any missing services for a component or incompatible coupling interfaces between any two collaborating components in an application.

SUMMARY OF THE INVENTION

The present invention discloses processes for a new kind of Component based software engineering ('CBSE') or development system, which is based on new kind of software components. Also present invention discloses processes for developing and using the new kind of software components for building software applications. The present invention describes the new kind of software components, which are referred to as "Replaceable Self-contained Components" (or RSCC). The new kind of software components is also referred to as 'Replaceable components' in short.

This invention also discloses another new kind of software modules referred to as 'self-contained components' (or SCCs), where most of the SCCs and especially even large or very large SCC innately have high degree of autonomy. The adjective term 'self-contained' has a very unique incommensurable intended meaning. This disclosure provides many examples for defining and describing the unique intended meaning of the term 'self-contained'. Each large software application contains multiple SCCs. So it is essential to comprehend the unique intended meaning of the term 'self-contained' for identifying the SCCs in each of the applications.

One of the preferred embodiments identifies one or more suitable large SCCs having high degree of autonomy in an application. Then a special kind of component class referred to as 'replaceable component class' (or RCC) is implemented for each SCC. Where each RCC along with its associated files comprise or encapsulate substantial portion of the application code and other resources implemented for constructing the SCC. That is, a set of files exclusively containing application code and other resources required for the RCC are created. In addition to exclusive files the RCC also uses shared objects, classes and resources created for the application.

Furthermore, the RCC (i) implements parts of the communication code for the SCC and/or (ii) implements coupling interfaces for the SCC, where the coupling interfaces are useful for creating necessary communication code. Where the communication code allow the SCC to communicate or collaborate with other parts/SCCs in the application.

With the context of this CBSE and subject matter, it is possible to identify many large SCCs in most of the large software applications (e.g. executable such as MS-Word, Adobe's-PDF, Browser or OS), where most of the SCCs are innately have high degree of autonomy and possible to design a RCC for each SCC.

Each RSCC instance is an instantiated and initialized object-instance of a new kind of replaceable component-class (or RCC), where the RCC can be redesigned and tested with high degree of autonomy to form the container application. In the context of the CBSE (Component-based software engineering) disclosed in this patent, the RCCs of the object-components must poses certain innate properties and are designed to satisfy certain unique requirements and objectives (which are unknown today). So such component-classes are not yet invented. The object-components in an application (i.e. in a single compiled executable) collaborate with other objects in the application by requesting each other's services at run-time.

A RSCC is a SCC included into an application by using its RCC. The primary purposes and objectives of the RCCs are to increase the degree of autonomy of the SCC. The increased degree of autonomy of a SCC either directly increases or allows three factors (i) division-of-labor, (ii) specialization and/or (iii) automation. These three factors hereafter referred to as 3-CBE factors. Also increasing the 3-CBE-factors imply either increasing the degree or allow increasing the degree of the 3-CBE factors.

The properties/characteristics of the RSCC are 'replaceability' and 'self-contained', where 'self-contained' is not a feature that can be implemented for any software part or module, but an innate or intrinsic property or character of certain parts (i.e. sub-systems). The property 'replaceability' is a feature that can be implemented for the self-contained components in an application. A software part/module must be innately 'self-contained' for designing the part/module as Replaceable-SCC.

Multiple suitable SCC can be identified in a large software application. In the preferred embodiment, a replaceable component class (RCC) is implemented for each suitable SCC identified in the application. The RCC is designed in the context of the application and other SCCs collaborating with the RSCC of the RCC. Here 'replaceable' or 'replaceability' is a feature that can be implemented for each such SCC for making it a RSCC. Most of the SCCs (even very large custom self-contained components) innately need fewer/simpler couplings, so conducive for designing as RSCC.

In one of the preferred embodiments, to increase (or maximize) the degree of replaceability of a SCC, the RCC for the SCC are designed to decrease (or minimize) code or effort required to include an instance of RCC as a sub-SCC and to properly couple the service interface of the SCC in order to properly collaborate with other parts in the application. The coupling interfaces of a RSCC are designed to be loosely coupled in the context of its target application and other SCCs/parts that collaborate with the RSCC. It is desirable to encapsulate substantial portion of the construction code of a RSCC (including parts of the communication code and/or coupling interfaces) in a RCC and in associated exclusive set of files for the RCC. Increasing the exclusive code base of the RCC increase degree of autonomy of RCC/RSCC, where increasing autonomy decreases the cost and complexity of redesigning the RCC/RSCC.

Properly assembling each RSCC in an application (or container component) mainly comprises two parts (1) Instantiating and initializing an object instance of RCC for including respective SCC in the application (or container component), where the initialized RCC-object is the SCC, and (2) properly coupling the SCC with other parts of the application in order for the SCC to perform its operations, such as (i) if the SCC offers any services required by the other parts and/or (ii) if the SCC requires any services offered by the other parts to properly perform its operations.

Each coupling of a SCC for communicating with other parts of the application is accomplished by employing methods such as: (i) After including an object instance of RCC for the SCC, the application (or container component) implements necessary communication code for allowing communication. (ii) Alternatively the SCC comprises of necessary communication code (a) to register each of the services offered by the SCC with a global directory-of-services (DoS) referred to as services-registration object (or SRO) and/or (b) to look up each service required by the SCC in the SRO. It is possible to make the SRO more intelligent, for example, to detect any missing interfaces or incompatible interfaces between two collaborating SCCs. This kind of tools and mechanisms increase degree of automation for assembling and managing the SCCs.

Any large software application contains special kind of conceptual or logical components, referred to as 'Self-contained components' (or SCCs). The SCCs are different from other kinds of components known today, such as reusable components or other components such as EJB. A large application contain many large SCCs, where each large SCC is constructed to satisfy unique requirements of the application and the SCCs also communicate/collaborate with each other SCCs/parts of the application. The construction code for each large SCC comprises of application specific code, data and code for using dozens of reusable components.

For example, assume a large and comprehensive GIS (Geographical Information System) application 'CityGIS' for a city comprises dozens of large SCCs, such as a city map of streets (e.g. like Google maps), a CityLandmarks component for showing landmarks on the city map, a City_ER component for showing emergency response vehicles such as Ambulances, fire-trucks and their latest locations/movements in real-time on the map, a component for displaying weather, a CityTraffic component for showing traffic conditions and congestion and a CityATC component for showing air traffic over the city etc. Where each SCC may comprise of several hundred or thousands of lines of application logic (e.g. code accessing application data and processing the data) and use dozens or even hundreds of classes, objects and reusable components, such as reusable GUI classes for Tables, Charts, Dials and maps etc.

For another example, assume an application for stock analysis comprises many large SCCs, such as, an SCC Full_SQ_info for providing comprehensive stock quote and information for a given company (or ticker symbol). Full_SQ_info displays multiple tables of information about the company, multiple line charts for movement of stock price and bar charts for stock volumes traded during various periods (e.g. a day, a week, a month, a quarter and a year etc.). Assume Full_SQ_info is just one SCC among many other such SCCs in the comprehensive application for stock analysis.

It is desirable to easily disassemble each such large SCC of an application as a unit, for example to replace by a better SCC or refine the SCC autonomously from other SCCs to satisfy new or evolving requirements (or to incorporate new innovations). Furthermore, it is desirable to test the SCC alone away from its application to assure its quality independently by creating a simple test application, for example, after redesigns the SCC and before reassembling back into the application.

Assume if a large SCC is not identified in an application and/or no design effort is made to leverage the innate autonomy of the SCC, some parts of the construction code of the SCC are implemented in one or more exclusive files, but still the application implements many code-sections of the construction code and communication code in non-exclusive application files for properly including and for creating communication code for the SCC. Where exclusive application files of a SCC are the files that only contain construction code of the SCC and contain code for no other parts of the application, and non-exclusive application files are the files that contain application code for multiple parts and SCCs of the application.

For example, assume a SCC innately having high degree of autonomy is not identified, and also assume it requires 900 lines of construction and communication code for the SCC. If in the 900 lines about 500 lines are implemented in exclusive files for the SCC and 400 lines in non-exclusive application files, then it requires carefully locating the code sections of the SCC for removing the 400 lines by updating or redesigning remaining code in the non-exclusive files for properly removing the SCC.

Assume it is possible to encapsulate substantial portion of the 900 lines of construction code of the SCC in a module, such as a RCC having exclusive files for constructing the SCC and other resources required by the SCC. For example, other resources required by each SCC might include files such as images, configuration, style-sheets, include/header files or scripts etc. The application can use the RCC for instantiating and initializing on object instance for including an SCC-instance and create necessary communication code using coupling-interfaces of the RCC to properly assemble the SCC. For example, if the RCC requires 9 lines of application code for properly assembling its SCC-instance in an application, then the SCC-instance requires updating/removing the 9 lines of code to properly replace or remove as a unit.

The objective of a RCC is to replace many sections of construction code of a SCC that otherwise spread across one or more non-exclusive files of an application by just few lines of code for assembling an object instance of a RCC. Like the SCC, the RCC is also designed in the context of the application and other SCCs that are collaborating with the SCC, according to one embodiment.

To give a layman example or analogy, the physical products (e.g. automobiles or computers) contain many physical components. Likewise, a large application (e.g. CityGIS) can be designed to assemble many RSCCs having equivalent or comparable characteristics (e.g. high degree of replaceability and self-contained) of the physical components (e.g. car-battery, AC, dials in dashboard, auto-engine, gearbox, CD-player, Hard drive and network card etc.), according to an embodiment. Each such physical component in such physical products can be disassembled as a unit to replace by a better component or to repair outside of the product independently. Such physical component can also be tested outside to assure quality by using appropriate test equipment/setup. It is rarely practical to test a large SCC autonomously 'outside' of its application, if the SCC (e.g. Full_SQ_info or CityATC) is not encapsulated in a RCC.

Another useful aspect is that, large physical CBE products are evolved by evolving each of the components. For example, the computers have been evolving in past few decades by evolving each of its components autonomously where each component (e.g. Hard Drive, Mouse, DRAM, CPU or CD Drive etc.) is evolved by a group of engineers specialized in respective component. Likewise, automobiles were also evolved to current state by improving components such as engine or gearbox autonomously by respective engineering groups (where each group is specialized in each SCC and working with high degree of autonomy).

The software products are different and unique, but it is desirable to increase the degree of specialization to whatever degree is practical. It is possible to increase the degree of specialization for each large RSCC, since each large RSCC (e.g. CityATC or Full_SQ_info) can be autonomously redesigned and tested. For example, the autonomous components make it simpler to the designers of each RCC for leveraging domain expertise, know-how and user feed backs for the future upgrades.

Likewise, it is also desirable to evolve each large software application by evolving each of the SCCs autonomously, throughout the life of the application, for example, to release new versions or upgrades for many years after release of first version. The SCCs are different from other known kind of software components. For example, although third party reusable components such as GUI class for a line chart can be refined and tested autonomously, in general they are much smaller in scope and have many limitations. Some limitations include, non-context specific, generic and highly configurable, but more hard to redesign, since any changes could effect multiple applications that use the reusable component. Such widespread reuse discourages changes, as the changes could effect many applications. Also the reuse requires lot of data and configuration code for using the reusable component (as the reusable component is non-context-specific to address unique requirements for many diverse applications), which makes it tightly coupled and harder to replace.

An example for another limitation for reusable components is it is not practical to design reusable components (e.g. City_ER or Full_SQ_Info) that can use data from application specific data sources. For example, two emergency response systems for two cities may have been using different data formats and databases to collect application data, so each City_ER must be implemented to read custom data formats and from custom data sources respectively. Likewise each brokerage company need to design each Full_SQ_info to use their own legacy databases for historical data and unique real-time data sources, for real-time updates. Many such issues make it impractical to create reusable components for most of the large SCCs.

To name another limitation for third party reusable component is: Since being third party component, the developers of an application using the reusable component have no control over the redesign of the reusable component for satisfying future unique requirement, so the application is on the mercy of the vendor. The component vendors work on their own schedule and must consider all the other applications using the component to make any changes, when a request comes from one of the customers for an unavailable feature. An application can only choose appropriate vendor/component and configure it to satisfy its current unique needs, but there is no guarantee the reusable component can be configured to often-unpredictable future emerge needs.

In general, the reusable components and replaceable-SCC address two different aspects of software development. The objective of the reusable components is to reduce the custom code required for building a large application, by using pre-built reusable components. On the other hand, the objective of the replaceable-SCCs is to reduce the complexity of software development and maintenance/evolution of the custom code that must be developed for any large applications. Most of the large software applications/systems not only use many reusable components but also implement tens or hundreds of thousands of lines of custom application specific code.

Therefore it is desirable to invent methods and tools for not only developing but also maintaining the application specific code more efficiently/effectively.

The RSCCs are desirable since they address problems that are not addressed by other known kind of component, according to one embodiment. For example, the RSCCs partition the application specific code in to easily replaceable modules having very high degree of autonomy. Since each RCC can be developed and tested autonomously from each other, they offer higher degree of division-of-labor and specialization. Furthermore, the RSCC allow inventing and using tools to automate tasks such as creating communication code between RSCCs and managing the compatibility of coupling interfaces used for allowing communication between the SCCs.

In another embodiment, it is also desirable to implement configurable (or reusable) replaceable-SCCs for certain SCCs, when it is practical to be reusable across multiple applications and such reuse can offer net savings. For example, it is possible to create a RCC for city-map by a vendor who has already built comprehensive database of street and other information for creating the maps, where the RCC includes a city map in the application for a given zip code. But the RCC likely requires some configuration code to configure its RSCC to satisfy each application's unique needs.

For another example, if accurate and real-time data for AirTraffic for whole of the USA is available from highly reliable data sources such as FAA, then a reusable CityATC may be acceptable for many customers/applications for reuse. For example, a vendor can design application code for data accessing and processing within a RSCC knowing the data sources and format. Although there are some such exceptions, most of the RSCCs are too unique for an application and also need to redesign frequently to satisfy its evolving unique needs or to differentiate from competition, so often it is neither useful nor practical to make most RCCs readily reusable without any redesign.

It is also desirable for the RSCC to reduce the cost of building similar RSCCs, if a similar RSCC is needed in a new application. In one of the embodiments, a new version of the RCC is implemented for the new application by taking a copy of the source code in exclusive files of the RCC. It is very hard or not practical to locate and collect all the construction code of a large SCC for such code reuse, if it is not implemented as a RSCC. In another example, if the RCC is redesigned to be configurable, each application could instantiate an object instance of the RCC and configures the object to satisfy unique needs for respective applications.

Additional features and advantages of the invention will be apparent by reading the following detailed description of the invention and the accompanying drawings.

BRIEF DESCRIPTION OF THE DRAWINGS

Various embodiments are described herein with reference to the drawings, wherein:

FIGS. 5a and 5b shows a container full stock quote GUI component containing three subcomponents that are a stock-quote table, an intraday line chart and one-year line chart, according to one embodiment;

FIGS. 9a and 9b shows two exemplary pseudo code implementations of container-RCC, which uses two objects of two RCCs for including two RSCCs and implements inter-component communication code for the RSCCs, according to one embodiment;

FIG. 14b shows a pseudo code for implementation of functions for registering all the services of a SCC and looking up for the reference of functions to call for required services of the SCC, according to one embodiment;

FIG. 17b shows all the application files and resourced used for building a RCC that can be partitioned into 2 sets (i) exclusive files for the RCC, (ii) non-exclusive files for the RCC, according to one embodiment;

Figure 1:
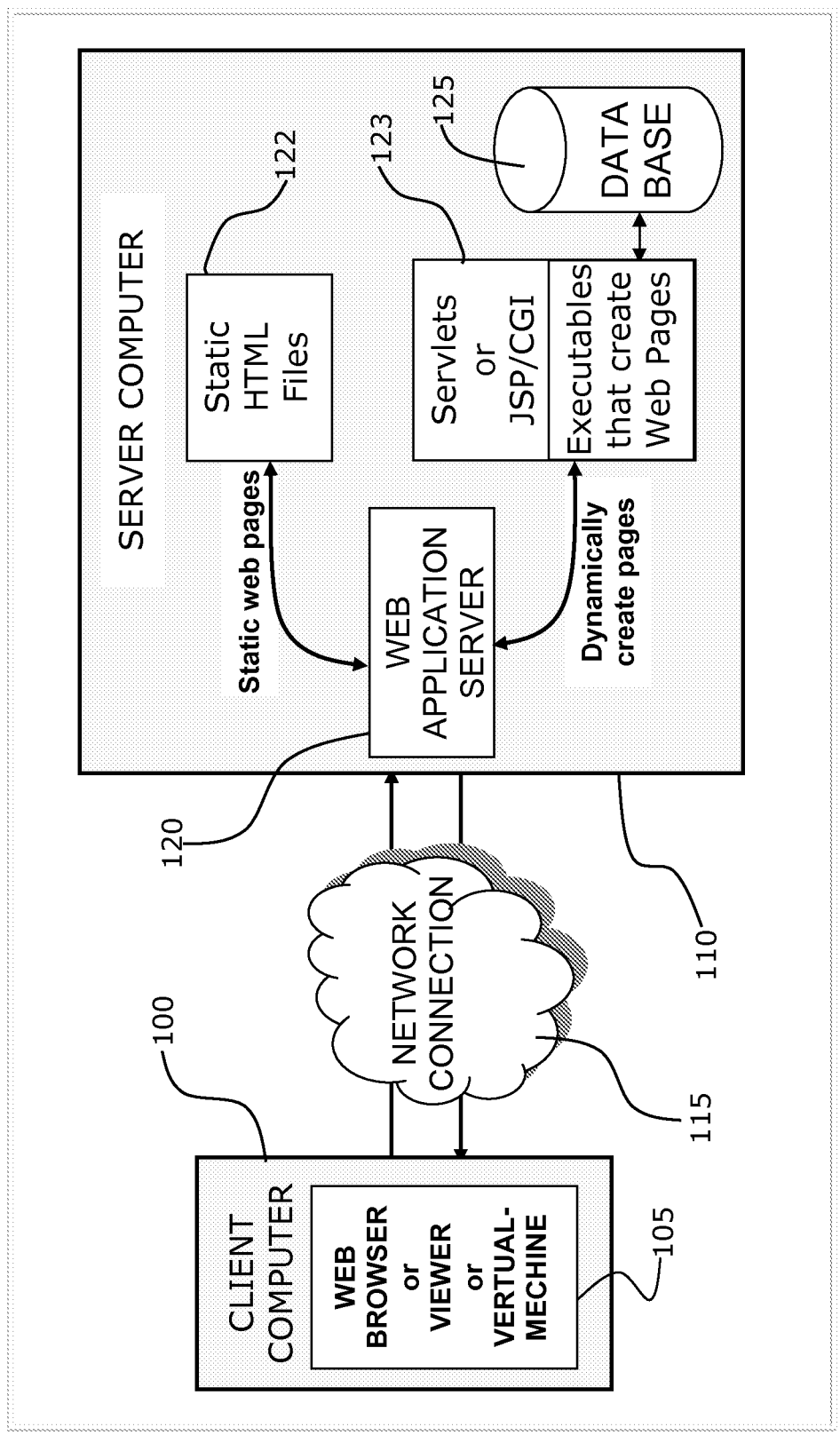
FIG. 1 shows an exemplary system for implementing the method of the software development of web-applications according to the present invention, according to one embodiment.

The drawings described herein are for illustration purposes only and are not intended to limit the scope of the present disclosure in any way.

DETAILED DESCRIPTION OF THE INVENTION

Section-A

Definitions

Following definitions are applied in the construction of the disclosure and attendant claims.

An "application" is a program or set of cooperating programs that enable a user of a computer system to accomplish some task or set of tasks. It includes applications run on a platform such as computer, browser, activeX viewer, Adobe's Flash-player or virtual machine (e.g., Java Virtual Machine). It means the entire document and referenced files are sent to the platform, where the application is executed.

"Application component" ("also referred as component") is an instance that contains all the business intelligence to support a specific function or feature of the application. Many applications use graphical components to simulate or model real system and interactions of real objects. An example of application component is a temperature-reading meter, which contains the code to present current temperature, handling user events, and supporting service methods, which might be used by external code or other application components in order to read and/or update the temperature. A component may have subcomponents, e.g., a copier may have a sorter and a feeder attached to it. Because component and subcomponent are relative concepts, a component becomes a subcomponent when it is used by another component. Therefore, component may mean subcomponent when its relative relationship changes in a context. A container component is a target component to be built.

"eXtensible Markup Language" (XML) is a specification for designing formats for text data that allows for text objects to be organized into hierarchies (i.e., XML documents). XML allows web developers to create customized tags that offer flexibility in organizing and presenting information.

A "browser" means any HTML-rendering application. It means part of computer operating system if it is integrated with the operating system (OS). A "viewer" means a platform that runs applications written in appropriate language such as scalable vector graphics, XAML or Flash. Viewer can be part of the browser if it is integrated with the browser. It can be part of computer OS if it is integrated with the OS.

A "network connection" means any kind of IP network or equivalents, including Internet, Intranet, private network, LAN, WAN, and wireless network and any combinations thereof that allow two connected computers or computing devices (e.g., cellular phones or palm-tops) to exchange data according to an IP protocol or equivalent. It also includes the loopback of a computer when a server and a client reside in the same computer.

"Presentation code" is a block or several lines of code to render a component in an application running in a computer, or an application running in a web browser or a viewer (or equivalent) at a client computer. This code can contain any combination of the programming languages and technologies. The presentation code may also include external files such as GIF images and JavaScript files included by reference. Furthermore, presentation code includes the application code, which is used to interface with other computer devices or to represent the state of machine.

"Component Code Generator" (CCG) is a computer program built for a component in any suitable language. It contains the code-generating method (CGM). Upon execution, the CGM of the CCG generates presentation code to present the component on a suitable platform. The CCG can also implement special coupling-methods for the component of CCG, where these coupling-methods are used to create code for inter-component communication. A server application runs on a web server and generates a client application (e.g. runs in a browser or viewer), where the server application uses one or more CCGs to generate code for one or more components in the client application. The server application also uses the coupling-methods of CCGs for generating communication to allow collaboration between the components in the client application.

"Component Code Generators for GUI components" (GUI CCG) is a CCG, which contains code that, upon execution, generates platform-specific presentation code to render a GUI component. Normally, a reusable GUI CCG class is implemented for generating a correspondent GUI component. For example, a GUI CCG class is for generating a pie chart, while another GUI CCG class is designed to generate a bar chart. A server application instantiates an object instance of a GUI CCG class and inputs necessary and appropriate application data and calls its CGM to generate code for presenting the GUI component.

"Self-contained component (SCC)" in this disclosure is defined as follows. A component, module or object is said to be "self-containing" if it requires a little or no construction code and data to assemble into an application and ready to perform its operation which include providing its functionality or features (e.g. user interface features), providing services or collaborating with other parts of the application. A component is said to be self-contained even though it requires external services for performing its operations, such as provide features (e.g. UI features, data-process, analysis, simulation or collection etc.) or provide services to other components. Any component in an application is an SCC, if it can be operated independently requiring little or no implementation of construction code, except implementation of communication code for providing services required by the SCC for performing its intended operations. More detailed description and examples are provided for the SCC later in the description. In this disclosure, the term 'self-contained' (when used as an adjective in 'self-contained component') has a unique intended meaning, which is described in detail later using many examples.

"Communication code" is a few lines of application code to allow for collaboration or data exchange between two modules, such as objects or components. Usually one of the modules in the application initiates the communication upon an event such as mouse clicks, keyboard or touch screen events, arrival of data, function call from another module, timer trigger, and change of state or data. The responsive actions include change of state, display or data, send back response or initiate a communication with another module. The lists of events and responsive actions are not exhaustive. While the communication may pass data from one module to another module, passing data is not required. Communication code includes, but not limited to, all sample code provided in this disclosure. Communication code includes any code in an application by which an event in one module causes a response from a second module.

One special type of communication code for a self-contained component (SCC) is upon an event such as refresh or at a pre-set time interval, the SCC (running on a client computer) gets latest data for updating or redrawing its component presentation by calling an external program (e.g. a CGI, JSP or Servlet) running on a remote server that containing the data. Where the server program accesses latest data from local data sources and sends the data to the self-contained component. Protocols such as SoA, WS or CORBA may be used to exchange data between client-program and server program. If required data can be directly accessed from local data sources (e.g. in case of non-web applications), the self-contained component can comprise of code for directly accessing latest data from data sources, for example, directly implementing JDBC instructions for getting data from local RDBMS.

"Replaceable Component Class (RCC)" is a class-implementation that encapsulates substantial portion of implementation or construction code of a self-contained component (SCC) and can be used to assemble the SCC into an application as a unit or disassemble the SCC as a unit. Also, the replaceable component class (RCC) is designed to accommodate the following. It needs little or no additional construction code for assembling the SCC into an application and also implements loosely coupled or simpler communication/coupling-interfaces for coupling the SCC, if the SCC needs to collaborate or communicate with other components in the application. The SCCs in an application collaborate or communicate with each other by depending on or requesting each other's services.

"Replaceable Self-Contained Component (RSCC)" is a self-contained component (SCC), where the SCC is included into an application by using an object instance of a replaceable component class (RCC). If substantial portion of the code required for constructing an SCC is encapsulated in a class definition called RCC, where an object instance of the RCC still requires remaining construction or configuration code to become a SCC. So instantiated and fully initialized/configures object instance of a RCC is RSCC. In case of web applications, the fully initialized/configures object instance of a RCC generates a SCC. So the object instance of the RCC/SCC together is conceptually referred to as RSCC. For example, if large portion of the construction code of an SCC is not encapsulated in an RCC, and object instance of the RCC requires implementing lot of initialization (e.g. construction or configuration) code for including its SCC, then the SCC is not RSCC. A RSCC is also referred to as a "replaceable component" in short.

"Container Replaceable Component Class" (Container RCC) is a RCC, which uses one or more RCCs for building code of sub-SCCs and incorporates the sub-SCCs to build the code of its container-SCC. The container-RCC contains several lines of communication code, where the communication code allows subcomponents and component to communicate with each other in the resultant application. A container-RCC is also a RCC, so may be used by another container-RCC for creating one of its sub-SCCs, and so on.

In this disclosure, the term 'replaceable' has a unique limited meaning, which is: "The component is designed to be easily disassemble and reassemble as a unit at any time in the future" and nothing more should be inferred for the term 'replaceable' in the context, when used as an adjective in 'replaceable component' or 'replaceable SCC'.

"Exclusive files" of a RCC/SCC of an application: A file is considered exclusive file of a RCC/SCC, if the file contains only the construction code for the RCC/SCC. An exclusive file of a RCC/SCC must not contain any other code, for example, for any other SCC or part of the application. If one or more files are implemented for a utility class/module and the utility class/module is created and used exclusively by the RCC/SCC, then all the files are also exclusive files of the RCC/SCC. Likewise, files containing other resources (e.g. image, scripts, style-sheets or configuration files) are also 'exclusive files' of the RCC/SCC, if the resources are exclusively used by the RCC/SCC (i.e. no other SCC/part of application is using the resource). The set of files comprising 'exclusive file' of the RCC/SCC is considered 'exclusive code base' (or 'code base') of the RCC/SCC.

"Non-exclusive files" of a RCC/SCC of an application: A file is considered non-exclusive file of a RCC/SCC, if the file contains code for the RCC/SCC and also other code, for example, for any other SCC or part of the application. If one or more files are implemented for a utility class/module and the utility class/module is used non-exclusively by the RCC/SCC, then all the files are also non-exclusive files of the RCC/SCC. Likewise, files containing other resources (e.g. image, scripts, style-sheets or configuration files) are also 'non-exclusive file' of the RCC/SCC, if the resources are non-exclusively used by the RCC/SCC (i.e. Other SCC/part of application are also using the utility class/module or resources). Each RCC is constructed by using both 'exclusive files' and 'non-exclusive files', so total application files used for implementing the RCC is union of both the 'exclusive files' and 'non-exclusive files' of the RCC.

"Integration logic" (only for RCCs and container-RCCs created for web applications and generate code for SCCs) is few lines of code in the RCC of a container component or RCCs for the subcomponents of the container component, which generates application code called "communication code", which allows for data exchange or collaboration between the subcomponents or between the container component and one or more subcomponents in the client application. A server application such as JSP/Servlet that uses RCCs for generating subcomponents is a special type container RCC.

"Replaceability-factor" of a SCC is defined as the ratio of total application specific code implemented for the class definition of the RCC for the SCC (i.e. application specific construction code encapsulated in RCC) and total application code implemented in the container application for both including and coupling a SCC instance of the RCC. For example, if a RCC implements 1000 lines of application specific code and object instance of RCC requires implementing 40 lines of code in the application for fully initialize RCC object (i.e. it's SCC) instance and also to implement communication code for coupling the SCC instance to properly collaborate with other parts and perform its operations, then the replaceability-factor is 25 (i.e. 1000/40=25). Another example, if the SCC is included into an application without using a RCC and to remove the SCC requires removing SCC's exclusive files comprising 600 lines of construction code of SCC and also removing remaining 400 lines of construction code spread across non-exclusive files of the RCC in the code base of the application, then replaceability factor of the SCC is only 2.5 (i.e. $400/1000$).

"Test application" of a RCC or RSCC is an application created to test RCC or a given RSCC embodiment of the RCC autonomously (e.g. outside of the application for which the RCC is created and said application contains other SCCs). If the RSCC requires external services, the test application implements code either for providing the services or to include other RSCCs for providing the service. Likewise, if RSCC provides any services, the test application also implements code to test the service.

Section-B

Object-Oriented Programming

Object-Oriented Programming (OOP) languages (e.g. Java, C# or C++ etc.), support a concept called classes. A class is a module of code that generally contains (1) a set of data variables to store data and references to other objects, (2) a set of methods or functions to operate on the data, (3) methods for providing access to the services defined in classes, (4) methods for setting and changing the objects' data (popularly known as set methods), and (5) methods for reading objects' data (popularly known as get methods).

Object-oriented programming techniques involve the definition, creation, use and destruction of "objects". These objects are entities comprising data elements or attributes, and methods or functions, which manipulate the data elements. Objects can be created, used and deleted as if they were a single item. The attributes and methods enable objects to model virtually any real-world entity in terms of its characteristics, which can be represented by the data elements, and its behavior, which can be represented by its data manipulation functions. Objects are defined by "classes", which act as templates that instruct the compiler how to construct the actual objects. A class may, for example, specify the number and type of data variables and the way of manipulating the data. When an object-oriented program is compiled, the class code is compiled into the program, but no objects exist. An object instance is created by the program at runtime by calling a special function, constructor, which uses the corresponding class definition and additional information, such as arguments provided during object creation, to construct the object. Object creation is also referred to as object instantiation. When an object is created at runtime, memory is allotted and data structures are created. The objects may be used by using their data and invoking their functions and are destroyed by calling a special function called destructor.

Class may support a rich set of methods to initialize the data variables and also to read the variables. Also, it supports methods, which can be used to request (or access) the services of the object, which is an instance of the class. For example, a sample drawing-class for a pie chart, which draws a pie chart, may contain variables: an array of floats, an array of strings, and a title string. The class may support methods to initialize these variables and a service method that draws the pie chart using the data. Users can instantiate a pie chart object and initialize the data using the supported methods; and then use the service method to draw the pie chart. Also, the class may support other methods such as service methods to register callbacks. If any external component interested in the user selection/clicks on the chart, they could use appropriate service method to register a callback to be notified on the event.

The major benefits of object-oriented programming techniques arise out of three basic principles; encapsulation, polymorphism and inheritance. More specifically, objects can be designed to hide, or encapsulate, all, or a portion of, the internal data structure and the internal functions. A program developer can define objects in which all or some of the attributes and all or some of the related functions are considered "private" or for use only by the object itself. Other data or functions can be declared "public" or available for use by other objects. Access to private variables inside an object by other objects can be controlled by defining its public functions for accessing the object's private data. The public functions form a controlled and consistent interface between the private data and the "outside" world. Any attempt to write program code that directly accesses the private variables causes the compiler to generate an error during program compilation, which error stops the compilation process and prevents the program from being run.

Inheritance allows software developers to easily reuse pre-existing program source code and to avoid creating software from scratch. It allows a software developer to declare classes and their instantiated objects as related to each other. When a class is designated as a subclass of the base class, the subclass "inherits" and has access to all of the public functions of its base class just as if the functions were declared in the subclass. Alternatively, a subclass can override some or all of its inherited functions or modify some or all of its inherited functions merely by defining a new function with the same form. Overriding or modification of a function in the subclass does not alter the function in the base class. The creation of a new class by selectively modifying the functions of another class allows the software developers to easily customize existing code to meet their particular needs.

Moreover, many components are essentially objects that conform to an object model such as Microsoft's Component Object Model. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most of the object-oriented languages, including the C++ programming language, do not specify true object modules, but merely specify syntax and semantics of a basic object implementation without specifying the rules that unify object systems.

One of the important features of the present invention is the use of an abstract code-generating method for generating browser-compatible component code. A super class supports, among others, the code-generating method. The subclasses derived from the super class inherit the behaviors and characters (i.e. parameters) of the method, and subclass implements the body of the abstract function to perform actions appropriate for the subclass.

Section-C

The System for Application Development

The system (FIG. 1) for web application development in accordance with the present invention comprises a client computer 100 running an operating system (not shown) and a web browser 105, a server computer 110, and a network connection 115 between the client computer 100 and the server computer 110 so that the client computer 100 and the server computer 110 can exchange data according to an Internet communication protocol such as Hypertext Transfer Protocol (HTTP) or File Transfer Protocol (FTP). The server computer 110 hosts a web application server 120, which runs Servlet or JSP and/or has a Common Getaway Interface (CGI) 123. The server computer 110 may optionally run a database server 125 or similar data base application. The web browser 105 uses a URL (the virtual address of the server) to locate the web application server 120 and to request a web page. If the URL points to a static web page, the server computer 110 returns the page in appropriate code. If the URL points to an executable such as CGI or JSP/ASP program, the request will cause the server computer 110 to run the executable, which creates a web page dynamically.

The client computer 100 includes a central processing unit (CPU), a random access memory (RAM) for temporary storage of information, and a read only memory (ROM) for permanent storage of information. A bus, which is controlled by a bus controller, interconnects the components of the computer system. Secondary storage may be provided by diskette, CD ROM, hard drive, flash memory cards (by serial or USB or other connections), and tape drive. The diskette drive, CD ROM, and hard disk are connected to the bus by respective controllers; and the RAM is controlled by a memory controller. An interrupt controller is used for receiving and processing various interruption signals from any of the system components.

The client computer 100 also includes a communication adapter that allows the system to be interconnected to a local area network (LAN) or a wide area network (WAN) schematically illustrated by the bus and network connection.

Operation of both the client computer 100 and the server computer 110 is generally controlled and coordinated by operating system software, such as the Microsoft Windows 95, 98, 2000, ME, XP and NT from Microsoft Corp., Redmond, Wash., Sun OS/2, and Apple OS 10 from Apple Computer Systems, Inc. Cupertino, Calif., and Linux from RedHat Inc, Durham, N.C. The operating system controls allocation of system resources and performs tasks of processing scheduling, memory management, networking, and input and output services. The operating system resident in system memory and running on CPU coordinates the operation of the other elements of the computer. The present invention can be implemented with any of the commercially available operating systems including OS/2, UNIX, Windows 95, 98, 2000, ME, XP, Vista, NT, and DOS.

A platform such as viewer, virtual machine, browser, and any HTML-rendering application on the client computer 100 is necessary for use of the present invention. Commercial browsers include Internet Explorer from Microsoft Corporation and Netscape from Netscape Communication Corporation. Other browsers such as America Online browser are also available. Because graphic presentation code produced by the method disclosed in the present invention is displayed under an SVG viewer, it is therefore necessary to load an SVG viewer as a plug-in component of the browser. While all well-known browsers are not part of any of the commercially available operating systems, they can be merged into operating systems. For example, SVG viewer is analogous to Windows-OS to run enterprise applications; and SVG/JavaScript is analogous to programming languages such as Visual Basic or Java. Next generation Microsoft-OS Vista and IE-browser support Silverlight plug-in and XAML. The XAML is Microsoft's version of XML based graphics technology similar to SVG and the name of the viewer is Silverlight. Silverlight is an underline graphical platform which is much more powerful than SVG viewer. Therefore, the present invention is useful not only in web application development but also in general software application development. Also, Adobe has announced a new platform called Apollo, which runs MXML/ActionScript, where MXML is an XML-based graphics declaration language, and ActionScript is a programming language conforms to ECMAScript Specifications.

The server computer 110, as is well known in the art, is a computer that is connected to the client computer 100 through Intranet, local network, WAN or wireless in accordance to an Internet Protocol (IP). The server computer 110 generally has similar components of the client computer 100 even though some of the components such as floppy disk, CD ROM drive and display may be dispensed with. The server computer 110 is capable of sending web pages to the client computer 100 in HTML format. HTML is a markup system used to create web pages that are portable from platform to platform. To send a web page, the two computers use the Internet HTTP, which specifies how information is exchanged between the client and the server. HTTP is an application that is designed to conform to International Standard ISO 8879—Standard Generalized Markup Language. HTML and HTTP standards are maintained by an Industry Consortium; the World Wide Web Consortium (W3C) jointly hosted by the Massachusetts Institute of Technology Laboratory for Computer Science (MIT/LCS) in the United States, the Institut National de Recherche en Informatique (INRIA) in Europe, and the Keio University Shonan Fujisawa Campus in Asia.

In one of the preferred embodiments, the server computer 110 supports the Common Gateway Interface (CGI) 123 for running CGI programs. CGI is a publicly available method, which is used by web servers and web clients to mediate interaction between them. In practicing this invention for creating web applications, it is often desirable to use the network connection 115 which may include Internet and the WWW infrastructure in whole or in part. The WWW is a collection of servers on an IP (Internet Protocol) network, such as the Internet, an Intranet, or an Extranet. The web servers on WWW utilize the HTTP for changing information. However, the invention may be practiced in private networks rendered by serial cable connection, leased phone line, and wireless networks without using the WWW.

The system described above is just one exemplary embodiment of a suitable software development environment and is not intended to suggest any limitation as to the scope of use or functionality of the invention. Neither should the client computer 100 and the server computer 110 be interpreted as having any dependency or requirement relating to any one or combination of components used in the present invention. The invention may be practiced on cell phones and palm devices that run browser-like application such as SVG viewer or Adobe's flash players. Since the platform supports Application Peripherals Interface (API), the invention can be used to control other hardware devices.

In software development environment, the server computer 110 and the client computer 100 may reside in the same computer unit. This is especially straightforward in system running operating system such as Windows NT, Windows XP, Unix and Linux. In such a system, a web server application can be launched for hosting web sites. At the same time, a web client can also be launched so that the client can access the web server through loopback. In this situation, the ordinary network connection is unnecessary. This system is ideal for software development using the technique of the present invention.

Moreover, if the web browser 105 is merged into the operating system, the system might be reduced to one single standalone computer even though the details in operating such a system depend on how the system is implemented. Therefore, the system for application development is intended to cover both a single computer with a browser and a single computer without independent browser. In this situation, the client computer 100 should be construed as a logical computer. In the system where a browser is merged into the operating system, browser shall mean the part of the component of the operating system that performs browser's functions.

Section-D

The Basic Idea for SCC, RCC and RSCC

Any large software application consists of multiple self-contained components (or SCCs). Where many of the SCCs collaborate or communicate with each other. The SCCs collaborate with each other by depending on or by requesting each other's services. Common simple self-contained components for GUI applications include data-collecting forms, weather maps and charts for stock quote. A larger GUI self-contained component may use multiple reusable GUI classes for GUI components (e.g. charts, maps, tables or trees). For example, a 'GIS' (Geographical Information Systems) application 'CityGIS' for a city may have many self contained components, such as a SCC for displaying 'air-traffic' over the map of the city and a SCC for displaying tourist landmarks over the map of the city and, so on. Also, each SCC may depend on remote data source for accessing real-time data to display on the city map.

A non-GUI application such as for banking or for insurance contains large SCC for performing complex calculations for provides services for other components in the application. For example, a mortgage application calculates monthly payments based on many factors such as duration (e.g. 15 years or 30 years), locations, variable or fixed interest rates. An SCC for risk monitoring and forecast can observe various market factors to alarm potential emerging risk factors. For example, it is possible to implement a SCC for collision avoidance systems in an application of a regional railway network that use GPS (Global positioning systems) installed in the trains and railway-track-IDs for warning potential collision.

Figure 3A:
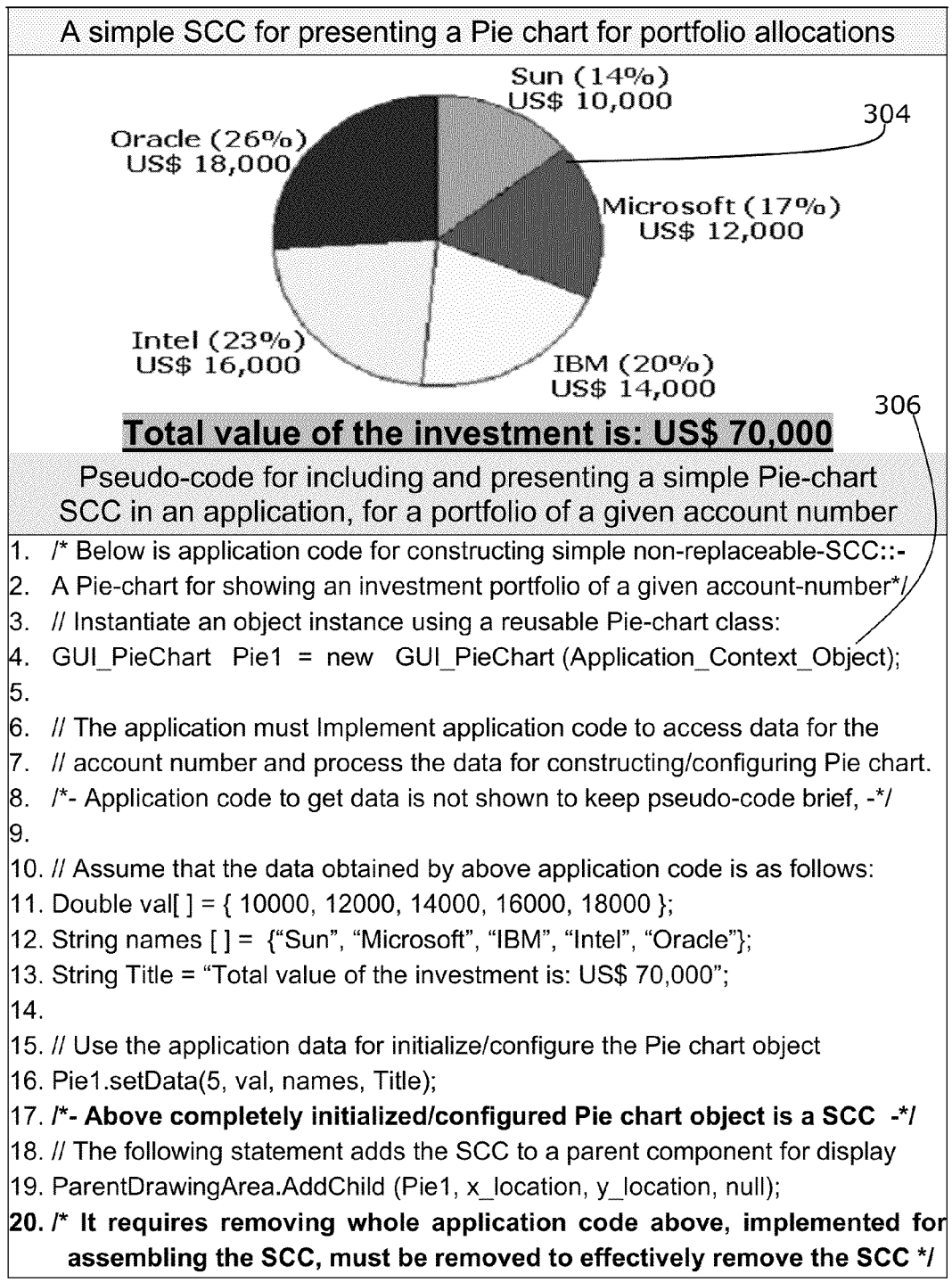
FIG. 3a, shows a SCC for presenting portfolio allocation of an investment account and also shows construction code for the SCC as pseudo code, according to one embodiment.
Figure 3B:
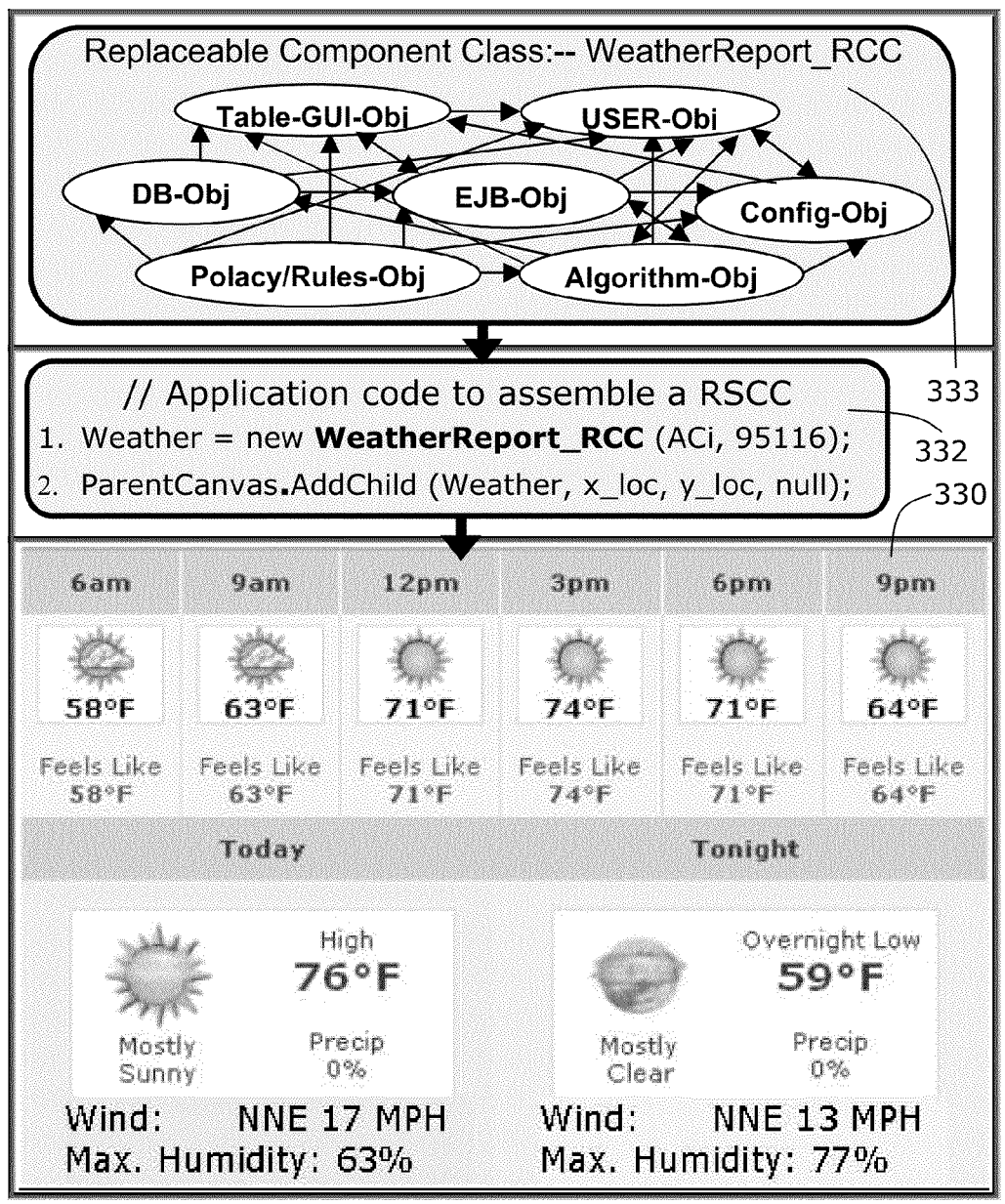
FIG. 3b shows a SCC of a weather map, objects used and dependencies between the objects in the application code of a RCC for the SCC and also shows code for using the RCC for including its SCC in an application, according to one embodiment.

Two examples for simple self-contained components, a pie chart for stock portfolio and a weather information chart, are shown in FIG. 3a and FIG. 3b.

FIG. 3a shows a simple self-contained component ('SCC') 304 for presenting an investment portfolio for a given account number and pseudo code 306 for constructing the SCC 304. The pseudo code 306 uses a reusable GUI class 'GUI_PieChart' for presenting a pie chart for the SCC at line number 4. The line number 4 uses the GUI class for instantiates an object instance for a pie chart. The construction code 306 for SCC 304 implements application logic, such as code to access necessary application data from application data sources and processes the data for constructing and configuring the pie chart object. This kind of application code for getting data can be implemented and inserted between line numbers 5 and 9, but code for getting data is not shown in this example pseudo code 306 to make it brief. The code between lines 10 and 14 uses a sample data for initializing necessary variables for inputting the data into the object instance of pie chart. The sample data is used for initializing the object instance of the pie chart at line 16. If the pie chart needs to be configured (e.g. size, fonts or colors etc.), the necessary configuration code can be implemented after line 16. At line 19, the pie chart is added as a subcomponent to a parent drawing area at location, whose location is given by parameter x_location and x_location. To include the SCC 304 in an application, it is required implementing this kind of construction code 306 in the files for the application. It requires removing all this construction code from the application files for effectively removing the SCC 304 from the application.

FIG. 3b shows a weather map SCC 330 for a city and a block diagram of a 'replaceable component class' (RCC) 333 for presenting the SCC for any given zip code. The RCC's construction code 333 comprises code for application logic and for using many objects for building a custom weather map for a city. The RCC 333 is used for instantiating and initializing an object instance by inputting zip code (e.g. 95116) of a city at line 1 of 332 and uses the object to display a weather map RSCC as a sub-component by attaching it to a container-canvas as shown at line 2. Where the weather map is a replaceable-SCC (or RSCC), because it is a SCC 330 included into an application by using a RCC 333. The RCC 333 is designed to encapsulate substantial portion of the construction and configuration code for building a custom weather map for a target application in order to minimize the necessary application and configuration code 332 for including an instance of the RSCC in the target application. Also the RSCC can be removed from the application by removing the code 332 implemented for including the RSCC. The construction code 333 of RCC using many objects (e.g. user-obj, Polacy/Rules-Obj, Algorithm-Obj, EJB-Obj and Config-obj etc.) for custom building a weather map for a target application based on many unique requirements and factors such as user-preferences/profile or time-of-the-day etc. Furthermore the RCC 333 can be redesigned and tested outside of its application with high degree of autonomy for satisfying unique evolving requirements. The RCC 333 also uses many resources such as files for images of the Sun and Moon. Also may implement other modules, configuration-files or classes to exclusively use for constructing the SCC 330. All such files and resources implemented for exclusive use in a RCC 333 constitutes the exclusively code base for the RCC 333.

Figure 3C:
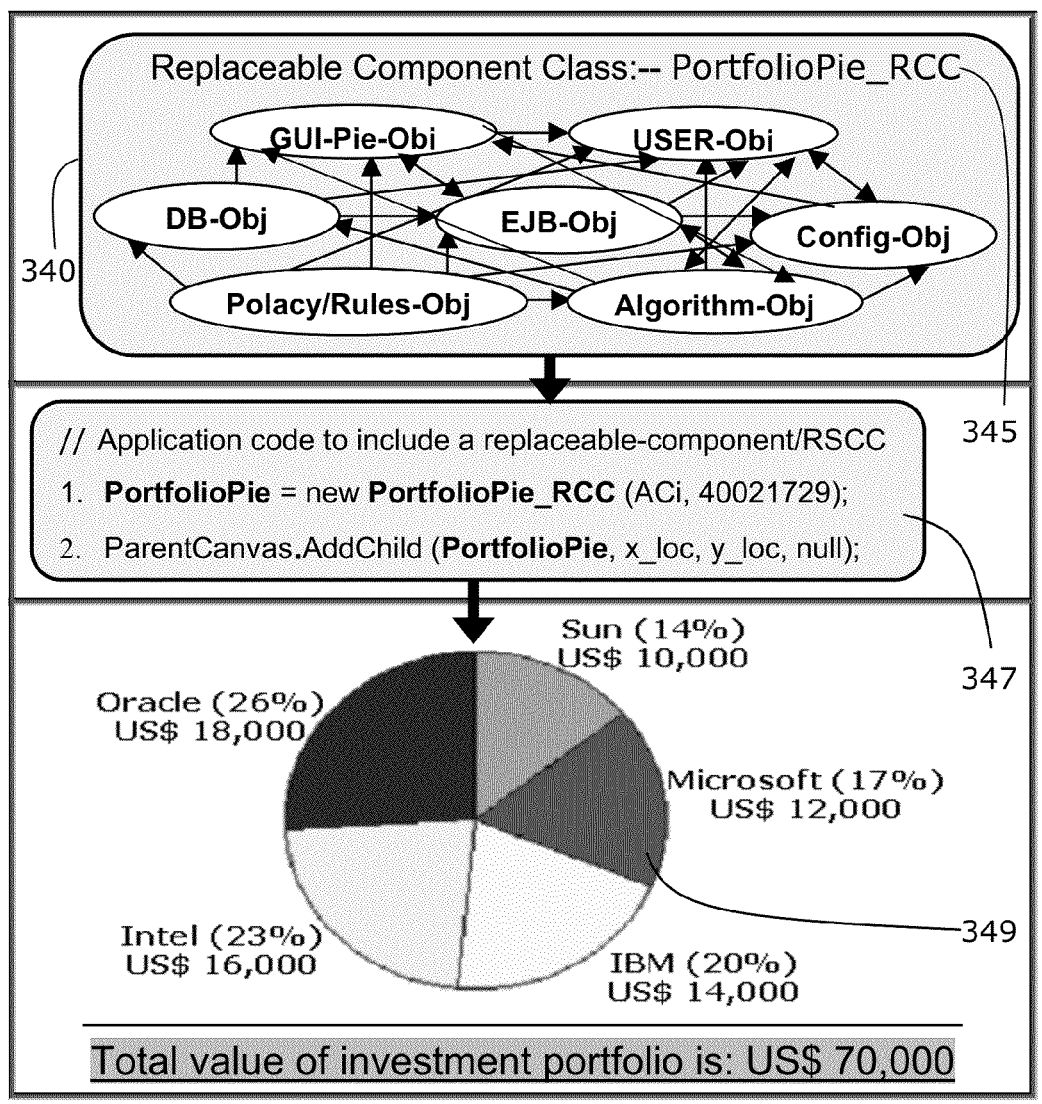
FIG. 3c shows a SCC of a pie chart for an investment portfolio, objects used and dependencies between the objects in the application code of a RCC for the SCC and also shows code for using the RCC for including its SCC in an application, according to one embodiment.

FIG. 3c shows a portfolio pie chart SCC 349 for an investment account and a 'replaceable component class' (RCC) 345 for presenting the SCC for any given account number. The RCC 345 is used for instantiating and initializing an object instance by inputting account number (e.g. 40021729) at line 1 of 347 and use the object for display the pie chart RSCC as sub-component as shown at line 2of 347. Where the pie chart for portfolio is RSCC, because it is a SCC included into an application by using a RCC 345. The similar pie chart 304 in FIG. 3a is a SCC but not RSCC, since it is not included into to the application by using a RCC.

The RCC is designed to encapsulate substantial portion of construction and configuration code for building a custom SCC for a target application in order to minimize the remaining application and configuration code/data/complexity (e.g. 332 or 347) for including an instance of respective RSCC, which also allow removing the RSCC by removing the application and configuration code (e.g. 332 or 347). The construction code of each RCC (e.g. as shown in the block diagrams 333 or 345) is using many objects (e.g. user-obj, Polacy/Rules-Obj, Algorithm-Obj, EJB-Obj and Config-obj etc.) for custom building each SCC instance for satisfying unique requirements such as user-preferences/profile or time-of-the-day etc. Furthermore, if an application contains many such SCCs (e.g. 330 or 349), it is possible to redesign each RCC (e.g. 333 or 345) to satisfy evolving needs. Also possible to test each RCC by implementing a simple test application for including and testing each SCC (e.g. 333 or 345) with high degree of autonomy outside of the application. In comparison, the code 306 for SCC 304 in FIG. 3a not only requires removing many lines of construction code to property remove the SCC from container application but also harder to refine and test the SCC's code outside of the container application autonomously.

Figure 4A:
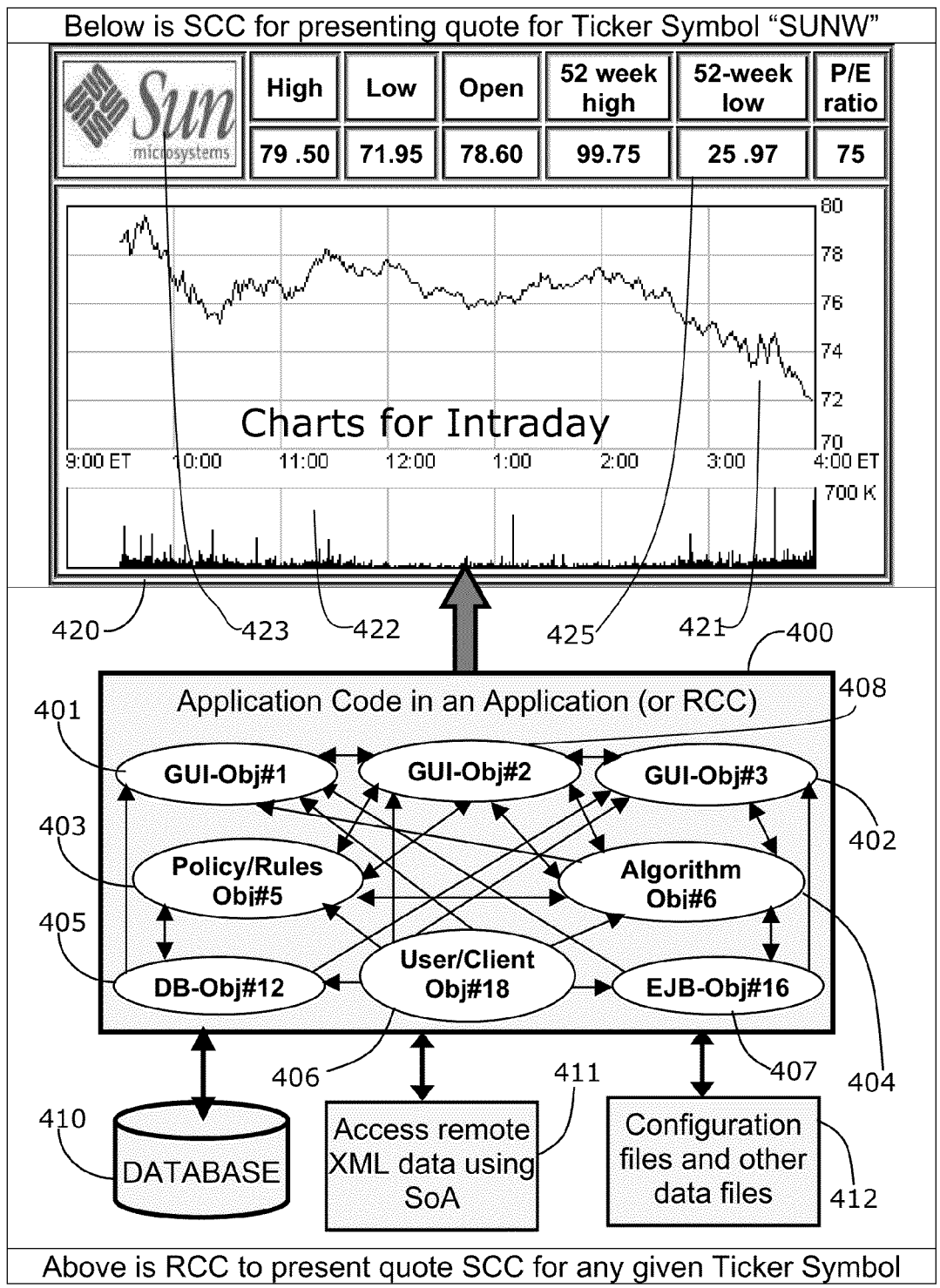
FIG. 4a shows a SCC for comprising three GUI components (i) a table, (ii) a line chart and (iii) a bar chart and also shows a construction code for presenting the RCC, according to one embodiment.

FIG. 4a shows application code 420 in an application APP1 that only contains SCC 420 for daily stock quote of a company, where the SCC 420 comprises three GUI components (i) a table 425 for presenting stock quote of a day, (ii) a line chart 421 for showing the price movements during the day, and (iii) a bar chart 422 for showing volume of shares traded in certain intervals during the day. The table also displays an image/logo 423 of the company (e.g. Sun). In an example embodiment, assume that the application code (or construction code) 400 for building the SCC 420 in APP1, where APP1 contains no other SCCs except the SCC 420 (i.e. outside of the SCC, except, of course, its sub-SCCs the table 425 and the two charts 421 and 422). The construction code for SCC 400, which comprises of code for application logic, code for using many objects (e.g. 401 to 408), objects for GUI components and code for access external resource or files (e.g. 410 to 412) for implementing the application APP1.

The database object 405 contains application data from database sources; the user/client object 406 contains user's profile, preference information, client IP address and browser information; EJB object 407 contains business data/logic, the policy/rules object 403 contains rules related to access security; and the algorithm object 404 contains computation methods for processing application data. The RCC 400 may contain application code for accessing and processing application data obtained from data sources 410 to 412. In general, the application code implemented in RCC 400 can be similar to the application code in APP1, if APP1 is implemented without using the RCC (e.g. APP1 directly implements SCC's application code as in 306 of FIG. 3a).

Alternatively, it is possible to encapsulate substantial portion of the application code or construction code for building the same SCC 420 in a RCC 400 (e.g. Daily_SQ_RCC), where the SCC 420 implemented in the form of the RCC 400 and also designed to satisfy the same custom unique requirements (e.g. functionality/features) as the SCC 420 implemented directly in APP1. When the RCC 400 is properly implemented, it is possible to create another application APP2 from APP1 by properly removing all the construction code associated with the SCC 420 and by replacing the construction code by the following two lines:
1. Rep_SCC SQ_RSCC1=new Daily_SQ_RCC (ACi, "SUNW");
2. ApplicationWindow.AddChild (SQ_RSCC1, x_loc, y_loc, null);

Where the line 1 instantiates and initializes an object instance and line 2 assembles the SCC 420 as a subcomponent to the main window or drawing area of the application APP2. Also it is required to properly include necessary files (e.g.

header files such as "*.h" files) and link the complied library comprising the RCC 400 and other libraries used by the RCC 400. The construction-code in RCC 400 and the code for constructing SCC in APP1 420 use the same libraries. In effect, the result is replacing the construction-code for the SCC in APP1 420 by an object instance of the RCC 400. If it is required to change the SCC 420 for satisfying evolving unique needs in the future, it requires nearly same effort to redesign and test APP1 and APP2 (as long as no other SCCs are added to APP1/APP2). But, the SCC 420 starts to lose its degree of autonomy in APP1, when each new SCC is implemented in APP1 without using a RCC for including the new SCC. For example, if construction code of each large SCC is directly implemented in an application, the construction code of each SCC could spread across many non-exclusive application files, where the non-exclusive application files contain construction for other SCCs.

Figure 4B:
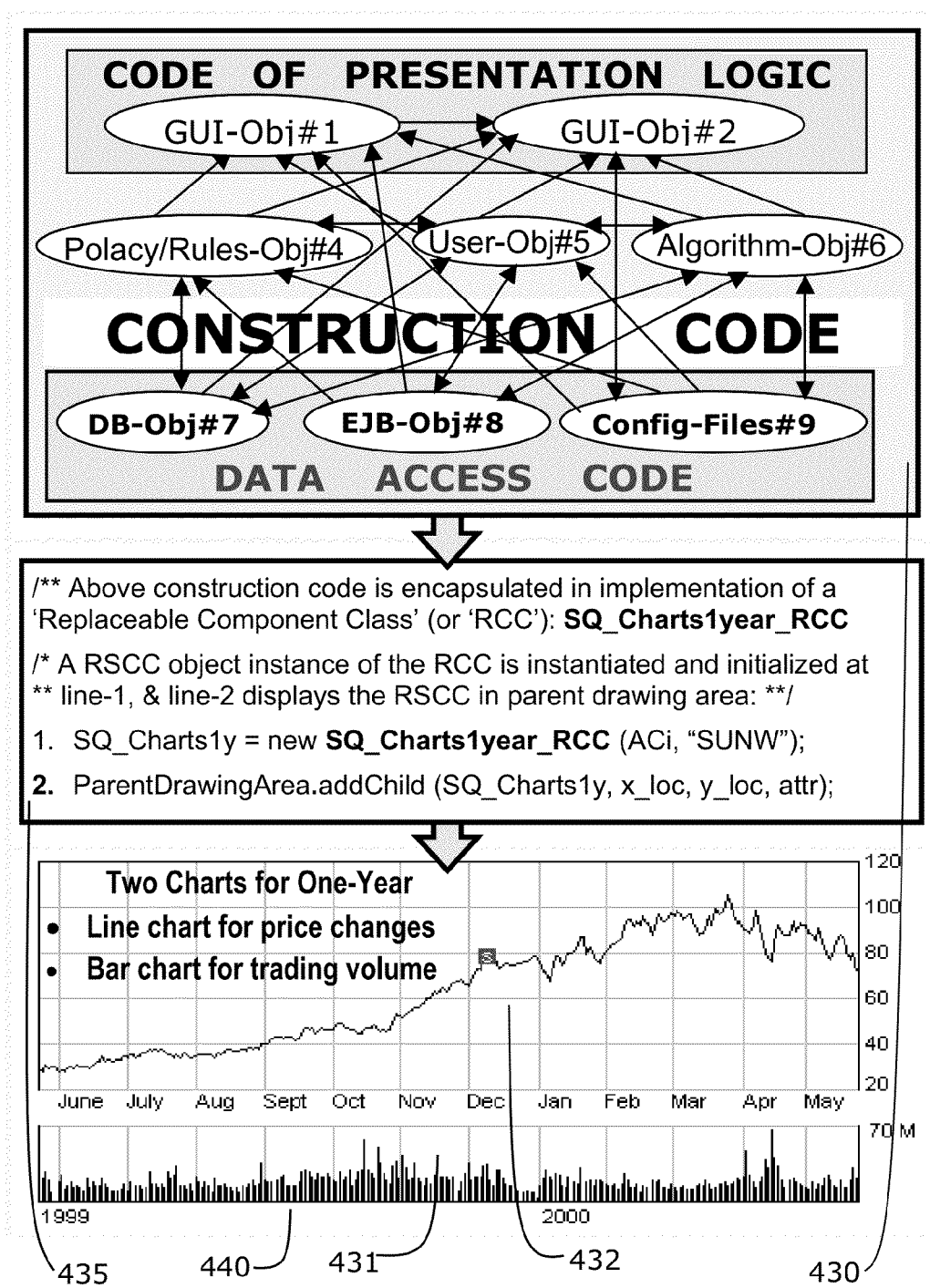
FIG. 4b shows a block diagram for encapsulating the code of business logic and the code of presentation logic (e.g., GUI classes for a line chart and a bar chart) in an RCC for presenting movement stock price of a company for a year, according to one embodiment.

An application may instantiate multiple object instances of a RCC for including multiple RSCCs. For example:
1. Rep_SCC SQ_SCC1=new Daily_SQ_RCC (ACi, "ORCL");
2. Rep_SCC SQ_SCC2=new Daily_SQ_RCC (ACi, "MSFT");

FIG. 4b shows a RCC 430 encapsulates whole application code for constructing a custom SCC 440 of a given company by its stock ticker symbol. The SCC 440 comprising two charts, a line chart 432 for displaying price movements of stock of the company during a year and a bar chart 431 for displaying volumes traded during a year. Of course, it is possible to implement the construction code directly in to an application, without even using the RCC 430 abstraction for replaceability. So implementing a RCC 430 and including the RCC's SCC 440 in a bare application is not much different from implementing an application that contains no other SCCs except the SCC 440 of the RCC 430. Of course, a bare-application that is using a RCC 430 for including a SCC 440 need to depend on all the resources (e.g. libraries and include files etc.) as the application that is implementing the SCC 440 without a RCC 430.

Any person skilled in the art of software development can understand process of building an RCC 430 for a SCC 440 is not much different than from building an application that just implements the SCC 440, without the RCC 430 abstraction for making the SCC 440 replaceable. However a large application can contain many SCCs and the SCCs need to collaborate with each other. Furthermore, the SCCs need to share many common resources, such as class definitions, images, style-sheets or DB-connections etc. In that case, the shared resources belong to the application and not to any RCC 430. How the exclusive construction code of each of the RCCs and non-exclusive shared application code can be logically partitioned is disclosed later.

Likewise, (as described for FIG. 4b above) it is possible to implement two RCCs for presenting two kinds of SCCs for 6 months or 3 months respectively, where SCC 440 for each kind comprising a line chart 432 and bar chart 431 for respective periods. If the RCCs are implemented, it is possible to selectively include appropriate SCC 440 into an application based on factors such as user preferences/profile. For example:
1. Rep_SCC SQ_Charts=null;
2. if (user_prefers_three_months)
3. SQ_Charts=new SQ_Charts3months_RCC (ACi, "SUNW");
4. else If (user_prefers_six_months)
5. SQ_Charts=new SQ_Charts6months_RCC (ACi, "SUNW");
6. else
7. SQ_Charts=new SQ_Charts1year_RCC (ACi, "SUNW");
8.
9. ParentDrawingArea.addChild (SQ_Charts, x_loc, y_loc, null);

Line 2 to 7 selects appropriate kind of SCC 440 based on user preferences and at line 9 it assembles the selected SCC 440 as a subcomponent to the application. By implementing each SCC 440 as a RCC 430, it is possible to redesign the code base of each RCC 430 and test the updated RCC 430 with higher degree of autonomy from the code base of the rest of the application and code base of other RCCs in the application.

Figure 5B:
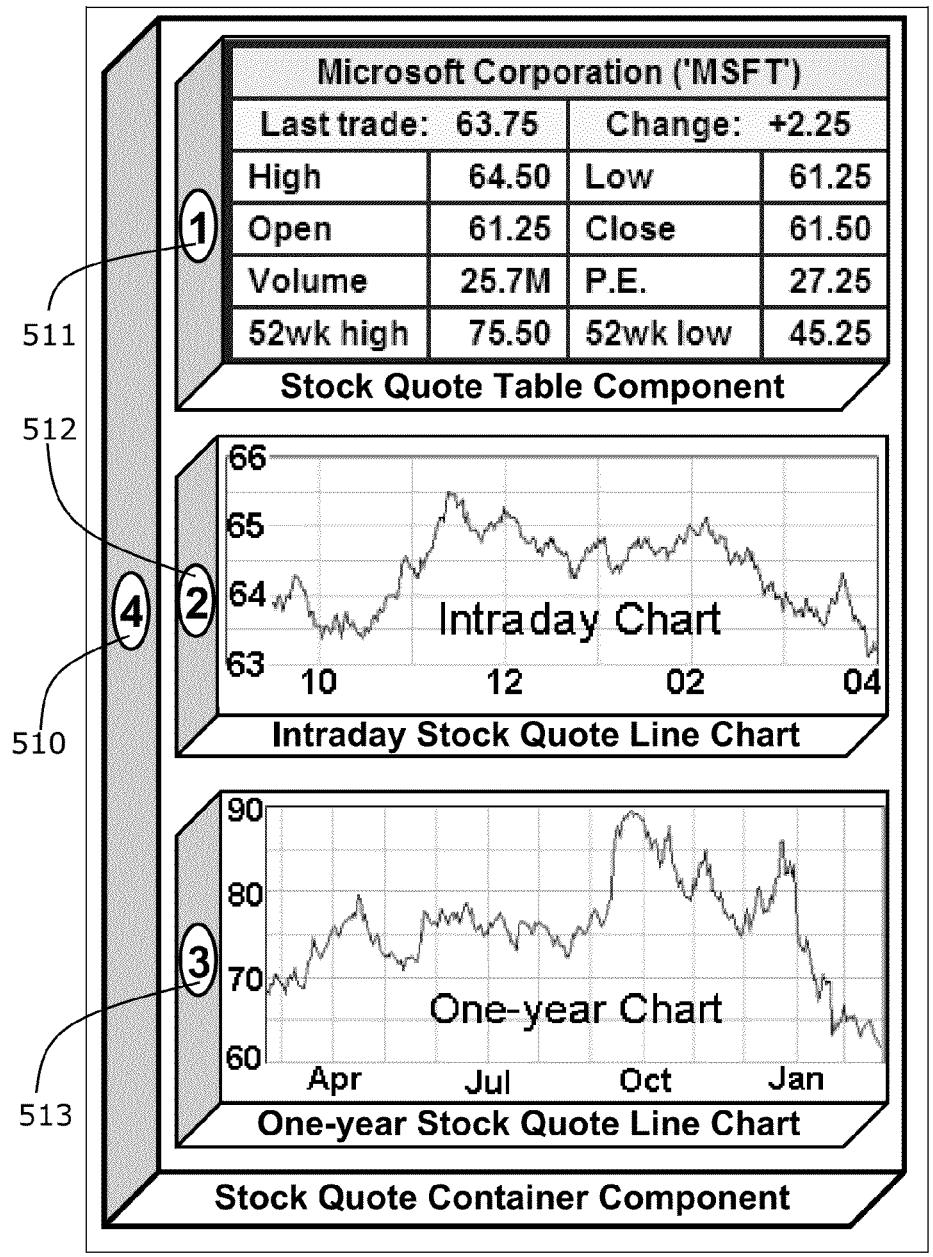
Figure 5C:
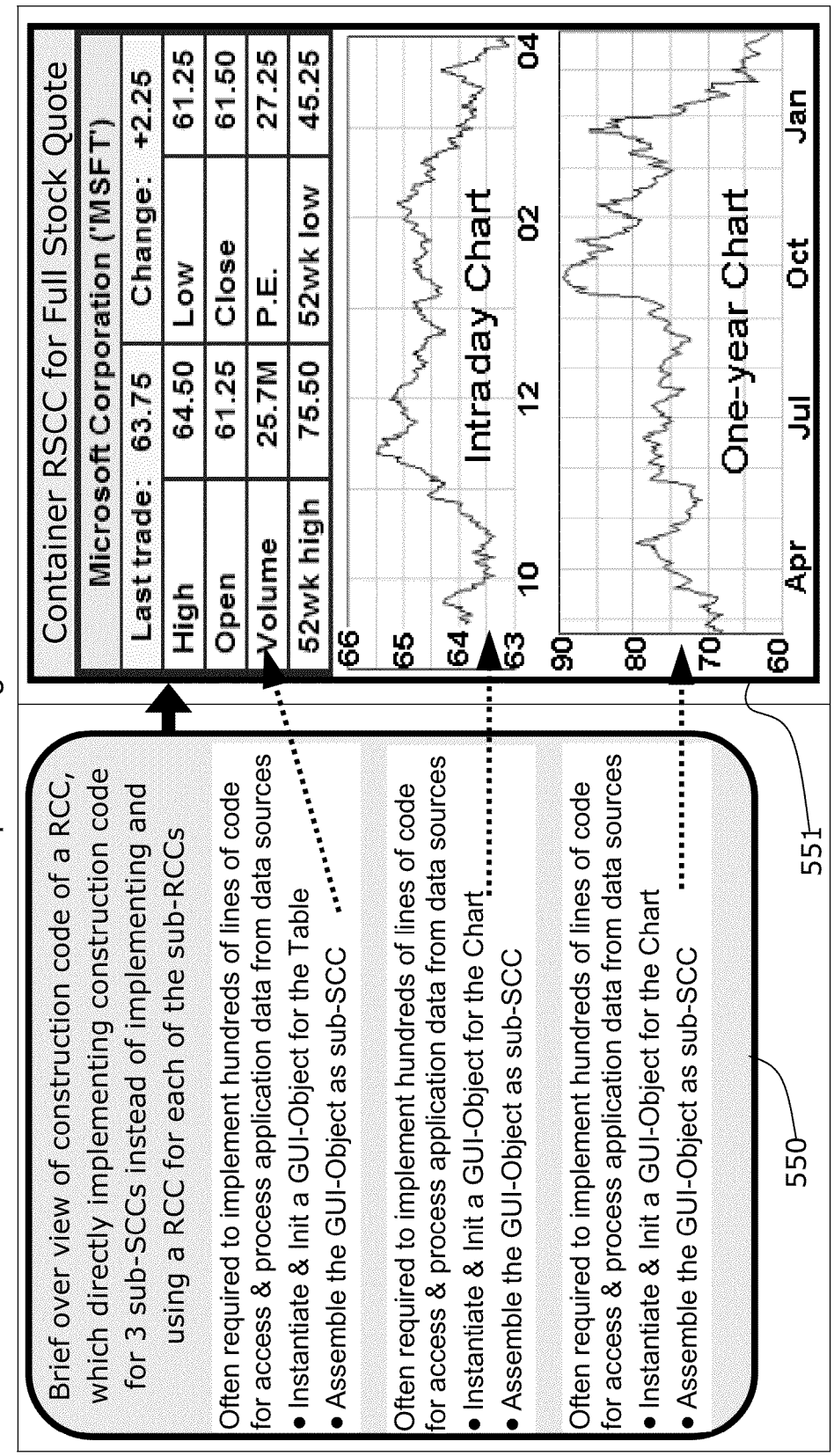
FIG. 5c shows a process of building a container application containing three subcomponents, according to one embodiment.

FIG. 5a shows an application or container SCC 500 comprising three self-contained components they are (i) Stock quote table 501, (ii) A line chart to show stock movement for a day 502, and (iii) A line chart to show stock movement for a year 503. FIG. 5b shows the container SCC 510 and its three SCCs (511 to 513) in 3D to highlight each of the SCCs. FIG. 5c shows the code of a Java-servlet 550 that implements construction code for presenting all the three self-contained components 501, 502 and 503 in FIG. 5a for container component/application 551.

Figure 6A:
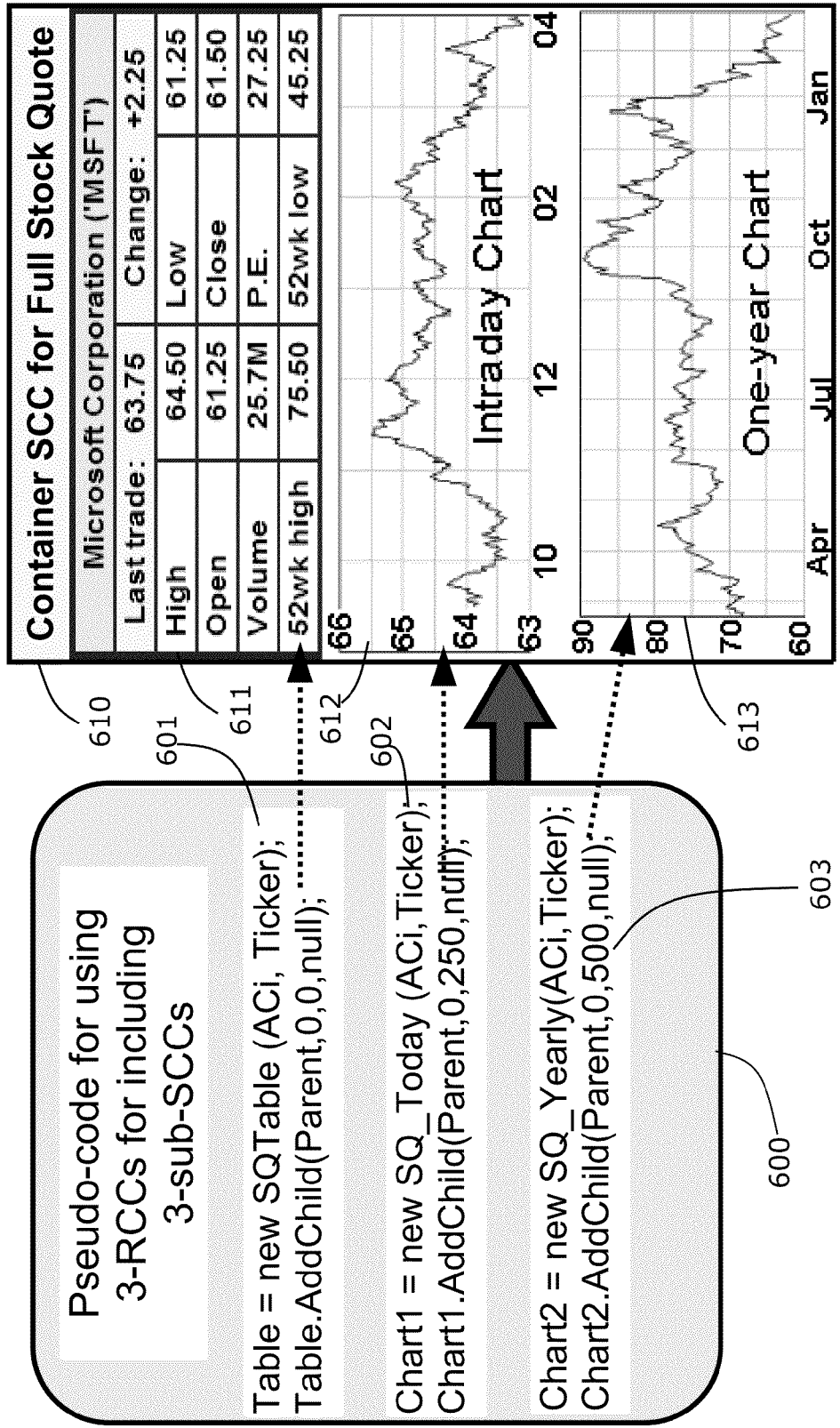
FIG. 6a shows the process of building a container component containing three subcomponents, where each subcomponent is created by using a RCC, according to one embodiment.

FIG. 6a/FIG. 5a shows alternative method that implements and uses 3-RCCs (i.e. 601 to 603) for building the 3 SCCs 611/501, 612/502 and 613/503, where each RCC encapsulates construction code of each SCC. Although both server programs shown in FIG. 5c and FIG. 6a respectively constructs same application to satisfy same requirements, which is to present a full stock quote of a company comprising three SCCs 611, 612 and 613, each used a different method. In FIG. 5c, the RCC of container-RSCC implements construction code of each of the three sub-SCCs, while in FIG. 6a the RCC of container-RSCC uses RCC for respective sub-SCCs.

Figure 6B:
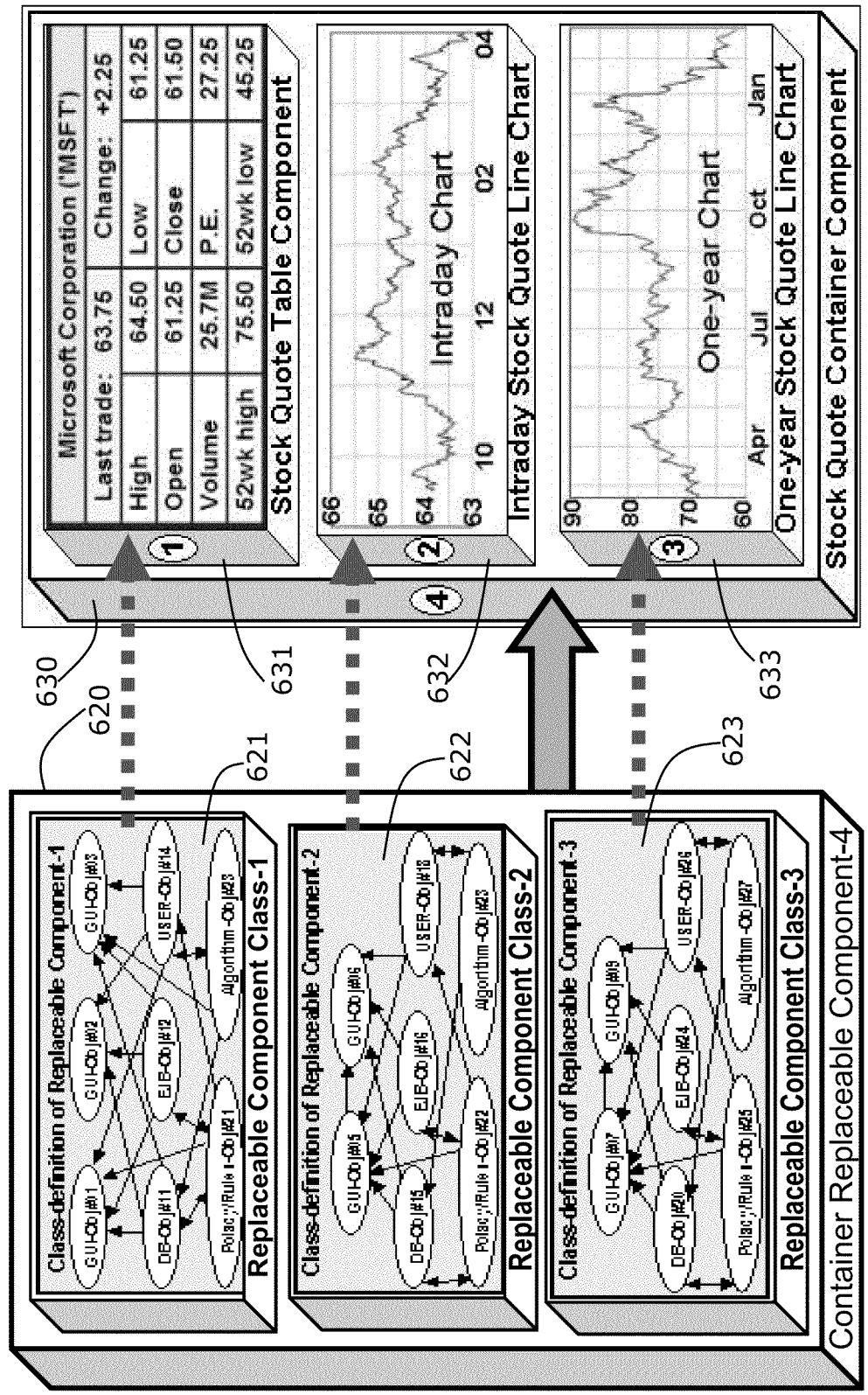
FIG. 6b shows block diagram (containing objects used and dependencies between the objects) of construction code of each of the RCCs for each of the subcomponents in FIG. 6a, according to one embodiment.

FIG. 6b shows container-SCC 630 comprising sub-SCCs 631, 632 and 633, where the container-SCC 630 created by using a container-RCC 620. The container-RCC 620 uses three RCCs (i.e. 621, 622 and 623 shows the block diagrams of objects used in the RCCs) for creating three sub-SCCs (i.e. 631, 632 and 633) of its container-SCC 630. It is also possible to create the container-SCC 630 without using any RCCs (e.g. 621, 622 and 623) by directly implementing construction code for each sub-SCC in container-RCC as illustrated in FIG. 5c.

Section-E

Examples and Analogies for Describing Incommensurable Unique Intended Meaning of the Term 'Self-Contained'

This invention disclosure is using the term 'self-contained' with a unique intended meaning, where the intended meaning appear to be incommensurable. It is harder to accurately describe or explain the intended incommensurable meaning of the term 'self-contained' without examples and analogies. Hence, the indented meaning of the term 'self-contained' is illustrated (i) by using examples of software 'self-contained' components (which are a new kind of software components disclosed in this patent) and (ii) also by using familiar physical self-contained components as examples and by using simpler familiar analogies.

The main purpose for using familiar physical 'self-contained' components of well known physical products as examples is to describe the intended meaning for the term 'self-contained' in simpler laymen terms. The analogies and examples of familiar physical components meant for no other purpose in the context of this disclosure. So they must not be construed or applied for any other purpose, except for comprehending the intended meaning of the term 'self-contained' more clearly and accurately. For example, it is not necessarily applicable to the scope of any software components or to the processes/methods of this invention in any other manner. Hence these analogies and examples must be limited to comprehend the intended meaning of the term 'self-contained', but must not construed to limit the scope of this invention in any other way.

It is desirable to pick familiar physical 'self-contained' components as examples for more accurately describing and/or clearly comprehending the meaning of the term 'self-contained'. Furthermore, using familiar physical 'self-contained' components found to be more effective as references for analyzing and/or inquiring the intended meaning of the term 'self-contained'. For example, such examples are useful as reference for ascertaining, weather a given software module is self-contained or not self-contained. For example, physical 'self-contained' components (e.g. auto-battery, DVD-player, memory-card or hard-drive) may be used as reference to resolve or clarify certain aspects.

When familiar examples and simpler analogies are used to describe or illustrate meaning of a term, it is not only easier to understand and remember but also easier to use as references in the future to get better clarity to resolve doubts more accurately (e.g. if one encounters a sticky issue, which appear to be subjective). In an example embodiments, the physical 'self-contained' components are better reference, for example, if more clarity is required to accurately resolve certain critical aspects, such as, (i) what is internal construction for performing operations of a SCC and (ii) for identifying services of the SCC and for designing service-interfaces for coupling the SCC with other SCCs, if the SCC provides any services for the other SCCs.

The software replaceable self-contained components (or RSCC) are new kind of software components, which are introduces in this disclosure. This disclosure uses familiar physical 'self-contained' components as examples or reference, since they are simpler for illustrating or enquiring the intended meaning of the term 'self-contained', than using unfamiliar software self-contained components as examples/references. This invention disclosure uses the described or defined meaning of the term 'self-contained' to disclose the new kind of software components, which are replaceable self-contained components (or RSCC).

Many of the familiar physical components, such as CPU, memory-card, network-card, auto-battery or CD-player etc., are good suitable examples for self-contained components. Each physical self-contained component requires little or no construction or configuration work before assembling into a physical product (e.g. computer, cell phone or automobile) and coupling the self-contained component to properly collaborate with other parts of the physical product.

However some physical components require some configuration or alteration before assembling into its product. Once a component is properly assembled into its container product and properly functioning or performing its operations, then it is a self-contained component. In other words, each of the functioning physical components, such as hard-drive, network-card, auto-battery or CD-player etc., found in any functioning physical product is a self-contained component. No one can use a product or each of its components until the product and its components are properly constructed to perform respective operations. So any properly functioning component in any properly functioning product is a SCC, since a partially constructed SCC cannot function properly. In other words, no component that requires more configuration/construction to perform its operations can be a self-contained component, until it is fully constructed for properly performing its desired operations.

Each physical self-contained component is designed to perform certain operations, such as (a brief list of operations of the self-contained components):

1. Operation of a SCC includes provide features or functionality, for example, to the user of the product. For example, self-contained components such as dials or meters in the dashboard of an automobile provide various features such as displaying speed, level of gas in the gas-tank, RPM-gage or meter for showing engine temperature etc. To provide the features and functionality the components may depend on the services of other parts, such as auto-battery for power.
2. Operation of a SCC includes offer services for other parts of the product. For example, many self-contained components such as CD-player, speakers, auto-fan, starter/ignition depend on the power provided by the auto-batter, where providing power is the one of the operation of the auto-battery. The features and functionality of the components such as CD-player or auto-fan is well known, and
3. Another operation of the auto-battery includes, depending on the services of charging-motor (called alternator) to recharge itself when engine is running, where the battery is properly connected to an alternator. The operation of alternator is to generate power, which contains a generator-assembly for generating power when the generator-assembly is rotated. An alternator in a car is another example for self-contained component, which depends on the car-engine and coupled to the car-engine by using a belt for rotating its generator-assembly. The output voltage of the alternator is connected to the auto-batter for recharging the auto-battery, when engine is running and rotating the generator-assembly.

Any physical loosely coupled component that provides one or more desired features or functionality of the container product and/or offers one or more services to other parts in the container product is more suitable example for understanding the term 'self-contained'. Such physical SCCs are useful for enquiring or analyzing to comprehend the intended meaning of the term 'self-contained' (e.g. if more clarity is required about the structure, functioning or nature of the 'self-contained').

In another perspective, each 'self-contained' component is assembled into its product for providing certain features/functionality or for offering certain services to other parts in the product. For example, self-contained components such as CD-player or speedometer in the dashboard of an automobile provide features/functionality such as playing music or displaying speed respectively.

On the other hand, for example, self-contained components such as an auto-battery offers 12V DC power as service to various electric devices (e.g. CD-player or speedometer etc.), while the auto-battery depends on the service of another self-contained component known as alternator for charging itself, which in turn coupled to auto-engine and depends on its services to generate the power for charging the battery.

It is desirable to select a good example such as a larger component that offers one or more desired features or services for other parts for comprehending the intended meaning of term 'self-contained'. Not all physical components are good examples for using as an analogy/example to analyze and comprehend the intended meaning of the term 'self-contained'. For example, simple components such as bolts or nuts used to assemble a component to its container component are not good example for the 'self-contained' components. Likewise, wires used for connecting any two electric components (e.g. auto-battery, CD-player, alternator or speakers) are not good example for the 'self-contained' components. For example, easily replaceable upgradeable components (e.g. CPU, DRAM, hard-drive, Network-card, CD-player or auto-battery) are good examples for self-contained components to understand the intended meaning.

In general, operations of the physical self-contained components include providing certain features, functionality (e.g. for the user of the physical product) or offering certain services to other parts in the container component or product. Also each physical self-contained component may consume and/or use services of other parts of the product to perform its operations. In general, the 'self-contained' components encapsulate whole construction and configuration within a replaceable container and designed to have loosely coupled interfaces to assemble and to couple the component to properly collaborate with other parts.

Many of the physical SCCs are designed to have loosely coupled interfaces for coupling, so they can be easily replaceable. That is, the SCC such as CD-player can be easily disassembled by plugging-out and resembled by plugging-in as a unit. However, some physical components may be tightly coupled into its container component, so very hard to disassemble. Such tightly coupled physical component offers very low degree of replaceability. Certain physical components are intentionally designed as a tightly coupled part (e.g. by welding the component) for certain reasons, for example such as it is not desirable to replace the part alone without replacing its container component.

It is useful to select familiar physical RSCC (e.g. auto-battery, music-player, CPU or hard-drive) as examples for inquiring and comprehending the intended meaning of the term 'self contained'. In one of the example embodiments, enquiring or analyzing an application for identifying SCCs includes finding answers to questions such as "what is the purpose or operations of the RSCC?", "what could happen if the SCC is removed?", "if the operation of the SCC including offering any features, what are those features?", "if the SCC is removed, what features can no longer be served?" or "if the operations of the SCC including offering services for other SCCs, what are those services and what are the other SCCs fail to function without the services?".

In an alternative perspective: Each ideal example for physical SCC (e.g. CD-player, alternator, Hard Drive, CPU, DRAM or dial/meter etc.) is included into a product to perform certain useful operations such as (i) to provide functionality, features and/or (ii) to provide services for other components/parts. Also in the process of performing its operations, the SCC may depend on services of other components/parts. Hence to properly assemble a self-contained component into a product, it is also required to properly couple the service providers and service consumers for allowing the component to properly collaborate for performing its operations. Hence a physical component can still be self-contained even if it depends on external services for performing its operations. In fact, the examples above illustrates that many SCCs in a product collaborate with each other by depending on or getting each other's services.

It may be harder or not practical to make certain physical 'self-contained' components easily replaceable, which may be due to their nature, physical constraints such as weight, size, shape, optimal-performance/precise-interfaces and/or due to overall design of the product and arrangement of other components. Any increase in the effort required to disassemble or reassemble a component decreases the degree of replaceability of the component. So such 'self-contained' components end up with lower degree of replaceability. If it requires more and more effort to disassemble or reassemble a component, it is replaceable by lesser and lesser degree.

Some of the limitations or constraints faced by physical components and products (e.g. physical weight or dimensions) might not be applicable to software self-contained components. So the physical replaceable 'self-contained' components and software replaceable 'self-contained' components cannot be governed by same replaceability dynamics. For example, it may be much harder or not practical to make certain large physical self-contained components reconfigurable to reuse across different product models, where each product model requires slightly different operations and interfaces. On the other hand, it may be simpler to make certain software self-contained components reconfigurable to reuse across different software products. But the configuration code required to configure such configurable component increases application code required in each of the applications for using the configurable component, making it replaceable by a lesser degree. So the analogy of the physical self-contained components might not be applicable to other aspects of the software replaceable self-contained components. So the analogies or examples of physical SCCs are provided only for describing the unique intended meaning of the term 'self-contained', but don't impose any other limitation on scope of the software RSCC.

The self-contained components are special kind of parts, each of which (i) offers one or more features and/or (ii) offers one or more services for external parts. Each self-contained component can depend on services of external parts for providing its features or services. It is possible to implement loosely coupled interfaces for collaborating or exchanging the services between the component and external parts. It is possible to design most of the self-contained parts as replaceable components, since each self-container part likely to have higher degree autonomy and require fewer or simpler coupling interfaces.

For example, this may be illustrated by giving an example of a physical self-contained component: A FM-radio/CD-player in a car is a good example for a Self-Contained Component (or RSCC). It encapsulates all its construction and all its sub-components, hence require little or no configuration work for assembling into a car. It is designed to have loosely coupled interfaces not only to plug-in/assemble but also to plug-out/disassemble, for example, to replace by a better component or to fix any problems and test outside of the car with high degree of autonomy. The FM-radio/CD-player can be self-contained, yet depend on battery for 12 VDC power, depend on external speakers to play music and depend on either a CD or FM signal for getting music.

Although FM-radio/CD-player contains many sub-devices, it can be easily removed from the car as a unit, if it is broken. It can be repaired autonomously outside of the car, and operated or tested outside by loosely coupling with service providers (e.g. 12 VDC power supply) and service consumers (e.g. speakers). The interfaces of each component are designed to be loosely coupled, in order to assemble/couple easily and decouple/disassemble the component easily (i.e. for making the component replaceable).

A SCC designed for a one-of-a-kind prototype product can have custom coupling interfaces. It is not necessary that the coupling interfaces must be standardized, like standardized coupling interfaces of reusable components for mass-produced product models of a crowded product family (e.g. cars). A SCC can have unique custom interfaces to plug-in and plug-out into a product, even if the coupling interfaces between the SCC and the product are unique and custom designed. For example, it is possible for a SCC such as an experimental CD/DVD-player to have loosely coupled interfaces to easily plug-in and plug-out into an experimental spacecraft that is providing unconventional AC-33V/100 Hz power source, even if the coupling interfaces are unique and custom designed. The main requirement is that pins in the plug of the CD/DVD-player's and socket in the product can be designed for each other to precisely compliment, in order to easily plug-in, plug-out and to properly collaborate for achieving desired operations. Many of the software self-contained components are unique and likely designed for newly invented one of a kind software product. Even such unique custom coupling interfaces of a software-SCC alone can't prevent the software designers from making the software-SCC replaceable.

A hint for further enquiring the intended meaning of term 'self-contained' in the context of a software SCC is, the RCC of a RSCC must encapsulate all the construction and configuration code. It is important to comprehend the difference between (i) construction or configuration code of a SCC and (ii) code for including a SCC in an application and properly coupling its services interfaces for allowing the SCC to collaborate with other SCCs/parts in the application. This disclosure also provides many examples for software RSCC to illustrate (i) what is construction code of a RSCC and (ii) what is code for including and assembling a RSCC.

The preceding discussions and examples illustrate that a component can still be self-contained component even if it depends on services of other components/parts for properly performing its operations. Only condition for a 'self-contained component' is that, it must be fully constructed and configured before it can be operated properly. In one of the preferred embodiments, a replaceable component-class for a SCC must encapsulate most of the construction and configuration code of the SCC, in order to minimize the code for instantiating and initializing (e.g. to construct or configure) an object instance (e.g. RSCC) of the RCC, for including the SCC in the application. An object instance of a RCC can't become a SCC until it is properly instantiated and fully initialized (e.g. by implementing necessary remaining construction and configuration code). That is, the object instance of a RCC is not a SCC until properly constructed by implementing any required construction and configuration code. The object instance might not be able to properly perform its operations until it becomes a SCC. For example, the object instance of a RCC can be coupled to another part that depends on a service of its SCC, but the SCC might fail to provide the service, if the service is requested even before properly constructing the SCC.

Section-F

Using a SRO for Allowing Collaboration Between any Two SCCs

The figures (FIGS. 8a and 8b) illustrate how a global 'Service Registration Object' (or 'SRO') is used for allowing collaboration between any two SCCs in an application. The application includes a SRO as a global object, where the names of the object and service-functions are defined and published in advance for using in SCCs. Each of the RCCs/SCCs (or RSCC) are designed and implemented to use the SRO to allow communication with other SCCs. Any part or SCC may access the SRO in the application either (i) for registering a service along with the name assigned or pre-defined to the service to lookup and request the service, or (ii) for looking up a required service by using the pre-defined name of the service.

Figure 8A:
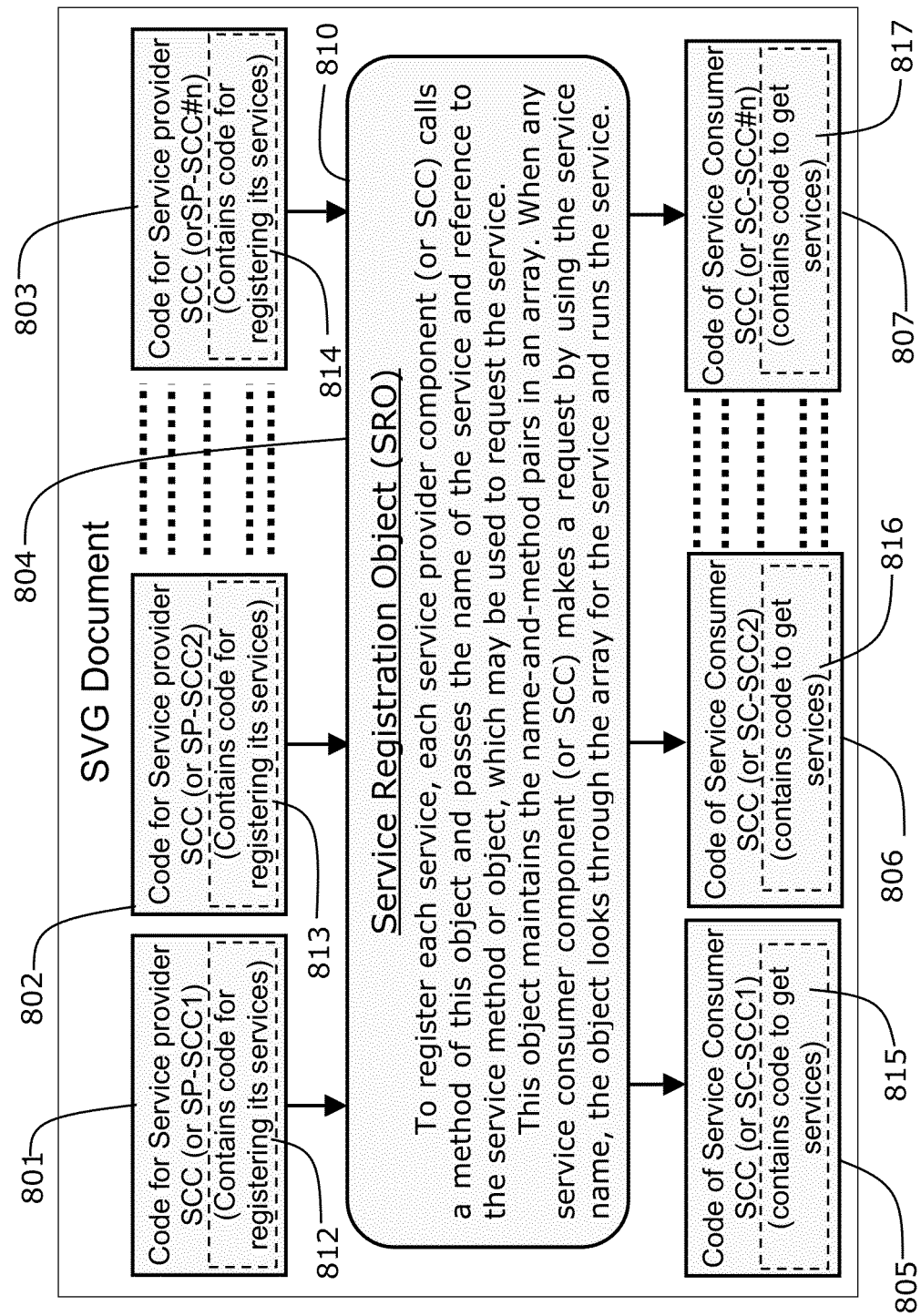
FIG. 8a shows a sample depiction of components in an application for registering service names and service with a global Service Registration Object ('SRO') or Directory of Services ('DoS') in an application; and service-consuming components lookup for the services from the registration object and accesses the services, according to one embodiment.
Figure 8B:
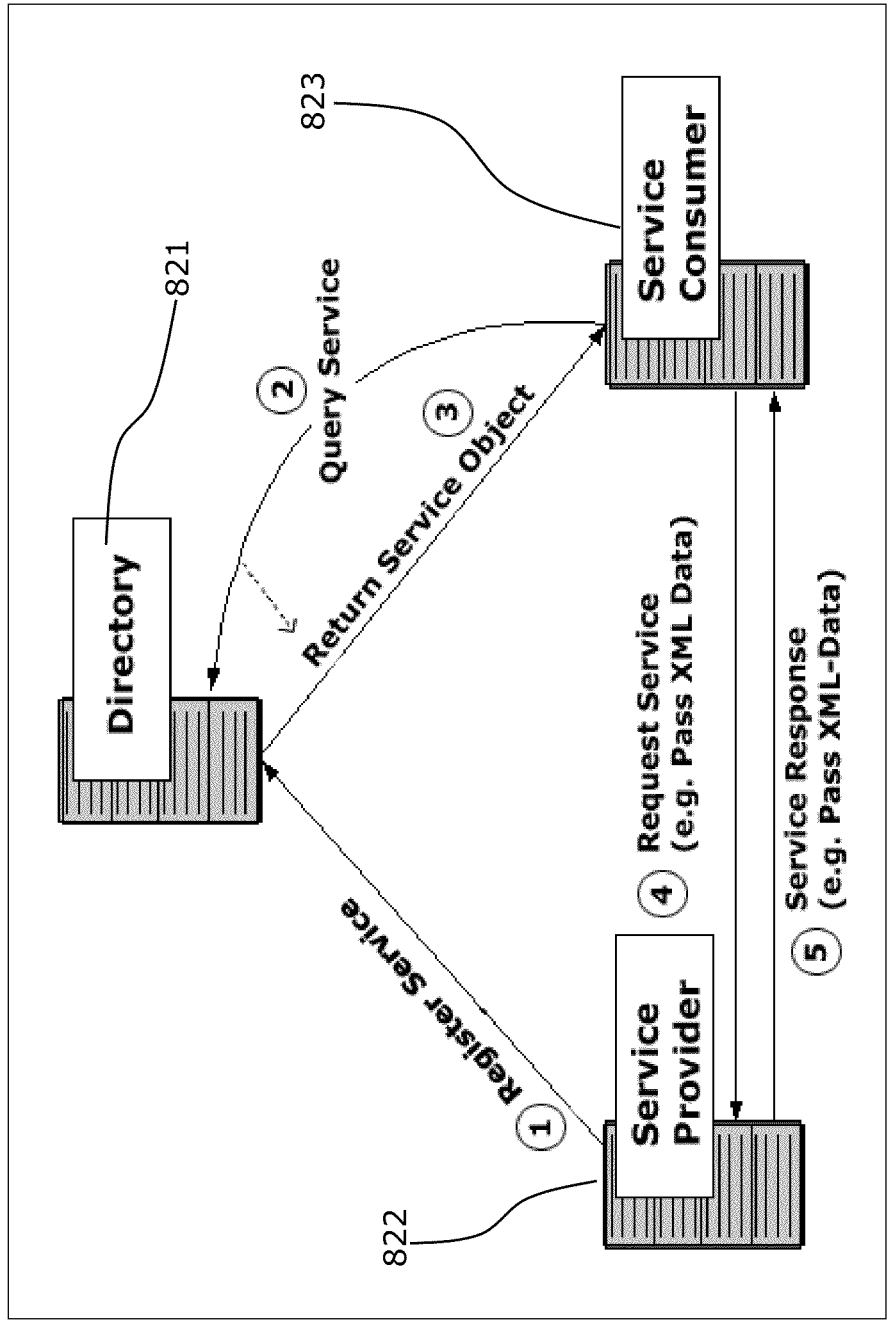
FIG. 8b shows steps for registering a service with a directory-of-services object (or Service Registration Object) and for looking up a service from the directory-of-services object (or 'DoS') and access the service, according to one embodiment.

The names of variables and services/functions in the class definition are published in advance. In one of the embodiments, each application instantiates and initializes a shared global object of SRO and make it available globally, so that each of the SCCs in the application can access the SRO (i) for registering its services and/or (ii) to lookup services it requires. The method illustrated in FIGS. 8a and 8b is a publish-and-subscribe method. A code listing in Appendix-A1 contains a few representative functions to demonstrate a simple SRO. If the code is loaded into Adobe's SVG viewer, it displays a series of popup messages. Appendix-A2 has a primitive trivial implementation of a JavaScript class for SRO.

FIG. 8a shows the code structure of an application where plural SCCs 801-803 and 805-807 are coupled through a global service registration object 804 or 'SRO'. Each of the service-providing SCCs 801, 802 and 803 comprises the code for registering each of its services by calling SRO's function and passing a pre-assigned name of the service and a reference to the service method (e.g. name-of-service & service-function/method pair). The SRO's function saves the pair in a list (e.g. an array) in the registration object 804. Each of the service-consuming SCCs 805, 806, and 807 comprises the code for looking up each of the registered services from the service registration object 804 by calling function of the SRO 804 and necessary code for invoking the service. After a service of a service-providing-SCC is registered with the service registration object 804, any service-consuming-SCC can use the service by calling the registration object 804 using respective pre-assigned service name.

FIG. 8b is a block diagram for the publishing-and-subscribing method to couple any two SCCs in an application. The service-provider SCC 822 registers or publishes a service name and a reference of the service function (or object) with the service registration object, which acts as directory component 821. The service-consumer SCC 823 queries the directory of services 821 for the service using the service name. The directory of services 821 returns a reference to the service function/object. The service-consumer SCC 823 uses the reference to the service-function/object to request the service of service-provider SCC 822, which processes the service request and sends a response. In this example embodiment, the service request carry data in an XML string and the response also include data in an XML string.

The 'service_register_class' (e.g. Appendix A2 has a trivial implementation) is implemented so that it supports methods to register services with a service-ID (e.g. a pre-assigned name or key for finding associated service). In this case, services are accessed by methods using the service-ID. Using this technique, any component can register its service with a unique service-ID. If any other component needs the associated service, the component can look up the service using the service-ID.

This name of the service registration object can be agreed upon at the beginning of the designing of the application and reserved so that the component code of plural subcomponents are implemented to register their services. At the beginning of the SVG document, the service registration object is instantiated.

var SRO=new service_register_class( )

Alternatively, the SRO may be stored in another global object such as ACi, where ACi is another global object that is passed to each RCC. This ACi object is used to share data related to the application context and various global resources such as global objects, resource-files or DB-connections etc. For example:

ACi.SRO=new service_register_class( )

The SCC contains required communication code for registering each service with the 'SRO' with the pre-assigned service-ID of the service. For example, the following statement is used to register a service:

SRO.add_service ("ShoppingCart", shopping_cart_service);

"ShoppingCart" is a service-ID and shopping_cart_service is a reference to a shopping cart service function. Any SCC that needs this service must know the service-ID (e.g. ShoppingCart), and implement the following to find or request the service:

SRO.get_service ("ShoppingCart", xml_data, callback_name);

By looking through the directory (e.g., for service-ID "ShoppingCart"), the registration object finds the reference to the service: shopping_cart_service and calls the function by passing the xml_data and callback_name as parameters to the function. The service-providing component uses data in the xml_data to process the request (i.e., add the item to the cart). The shopping cart component saves the reference to the function "callback_name" and notifies the service requester (i.e., the subcomponent for shopping item) by calling the function if the shopping item is deleted from shopping cart later.

In one of the example embodiments, developers of both service-provider SCC and service-consumer SCC agree to a service-ID (e.g., "ShoppingCart") for each service in advance. To accomplish more complex and multi-faceted inter-component communication, the application code of service-provider SCC, can register an object containing plural methods and variables. In response to a request, the lookup service returns the object, which contains service methods (or callback functions) and variables. The requesting component then gets the service methods or callback functions, the values in the variables, and invokes appropriate actions of the services of the servicing component.

The source code listing in Appendix-A1 a simple JavaScript example, which contains four sections. Sections One and Two contain code to include class definition JavaScript file for the registration object and the code for instantiating a global registration object "service_register_obj". Section Three contains a service method to be used by the application code of each of the components to register its service methods with "service_register_obj". Section Four contains a method for the application code of other components to access the services by calling the methods of the registration object "service_register_obj".

Section One contains the class definition code of the Service Registration object. This class supports three methods. The first method is add_service(name, func), which is used to register a service (e.g., target service) function or object, where the service's name is given in the parameter 'name'. The parameter 'func' contains the reference to the target service method or object to be called. The second method, find_service (ser_str) is called to find the target service method or object, whose service name is given in the parameter 'ser_str'. The third method, get_service (ser_str, par1, par2, par3) is called to run the target service method, whose service name is given in the parameter 'ser_str'.

Section Two contains the code to instantiate a service_register_class object. The name of the instantiated object may be predefined for the application at the beginning of the application design and published its functions and their interfaces. The global object "service_register_obj" can be referred from anywhere in the SVG document. Any component that offers a service can be designed to include application code (e.g., service_register_obj.add_service(name, func)) to publish its service by registering the service function and giving a unique name for lookup. In an example embodiment, chief designer or architect of an application can determine lookup name during early design and share with the developers of RCCs of the application.

If any other component requires a published service, it includes application code (e.g., service_register_obj. find_service(lookup_name)) for getting the reference to the service function from the global service registration object by using the pre-determined lookup name of the service.

Section Three contains code that defines three service functions. The section also contains code that uses three unique names to register each of the functions with the global "service_register_obj". The first function is 'test_service1 (par1, par2, par3)', which accepts an XML string in the first parameter, and displays two popup message windows. This example also shows a method for using an XML data variable as a function parameter to pass data between two components. Second and third functions just display a popup message each. Section Four contains an XML string and code that defines a test function "services_use_demo(e)". The code in the test function uses the names or the services to look up the services functions and shows how to request the services.

This publish-and-subscribe method may be used to allow collaboration or exchange data between any two components (e.g. SCCs) in the application. One component contains code for registering one or more services as shown in the section three. Other components are designed to access the services as shown in the section four if the names of the services are known at the time of development for the other components.

Section-G

Creating Communication Between SCCs and Other Parts of an Application

In the preferred embodiment of this invention, many SCCs in an application are implemented as RCC. Preferred process or steps include, identifying each of the self-contained components in an application. Once a suitable self-contained component (or SCC) is identified for implementing as a RCC, the next step is to identify (i) any services required by the SCC, where the required services need to be provided to the SCC by other parts in the application and (ii) any services provided by the SCC, where the services provided by the SCC may be consumed by other parts in the application.

Other factors may be considered for making determination whether an SCC is appropriate for implementing as RCC. For example, various factors such as the number of coupling service-interfaces, possible reuse, necessary communication code for coupling the SCC, features, operations of the SCC, potential size (e.g. estimated number of lines of application specific code) of the RCC, and role/purpose of the SCC in the application. For example, a RCC may be more useful as configurable reusable class, if multiple applications need similar RCC and have high confidence that the RCC less likely to change during future maintenance. Another example, if a container-SCC (e.g. 440 in FIG. 4*b*) has smaller sub-SCCs (e.g. 431 and 432), where some cases it may not be preferable to implement separate RCC for some of the smaller sub-SCCs (e.g. 431 and 432).

Even a large SCC most likely requires fewer and simpler coupling interfaces by nature (i.e. for being self-contained), so a RCC can be designed for most of the large SCCs, Each RCC can be used to include as SCC into an application by instantiating and fully initializing and/or configuring object instance of the RCC. Degree of replaceability and/or autonomy can be increased by reducing the application code required (i) for including an SCC instance by using a RCC and (ii) for creating necessary communication code for loosely coupling the SCC.

Many of the SCCs in an application need to communicate or collaborate with other SCCs/parts in the application. In one of the preferred embodiments, each RCC for a SCC is designed not only to encapsulating substantial portion of the construction code of the SCC but also to provide one of the following mechanisms to allow collaboration or to allow container application to implement communication code between its SCC instance and external parts in the application (if the SCC needs to collaborate with other SCCs in the applications).

Method or mechanism-1: Each RCC is designed to use a 'Service Registration Object' or SRO (e.g. See section-F) to allow communication between the SCC and external parts or other SCCs in the application. In this mechanism, the RCC (i) implements coupling code within its SCC to registers a service-method and name of the service to lookup for the service with SRO for each of the services offered by the SCC and (ii) implements coupling code within the SCC to lookup using a service name and request each of the external services required by the SCC.

In the above method-1 (or mechanism) for coupling SCCs, an application or container component instantiates and initializes object instances of multiple RCCs for including multiple SCCs. However, it is not necessary for the application or container component to implement any more communication code for the SCCs, since each SCC already contain code to publish or lookup services with SRO. However, in the following method-2 the application or container component is also responsible for implementing necessary communication code for allowing collaboration between any two SCCs.

Method or mechanism-2: The RCC implements a service-interface for accessing or requesting each of the services provided by its SCC, where the service-interface can be a service-function or service-object. To access or request a given service of a SCC, it requires calling respective service-function implemented in the SCC by passing proper data and parameters to the service-function. If a service-object is used for the service-interface in the SCC, it requires properly using the service-object for requesting the service.

The RCC also implements a service-interface for providing each of the external services required by its SCC (e.g. inputting a reference of a service-function or service-object for each required service into the SCC from external source, wherein the SCC uses the reference for getting the service when required). The RCC implements a method to allow registering a callback or service-method with the SCC and the SCC calls the callback or service-method with proper parameters to access required service, when the SCC needs the service. If a callback is registered, the callback is implemented to properly request necessary service of another SCC or components in the application. Alternatively if the RCC implements a method to allow registering a service-object with its SCC, its SCC comprises code to use the service-object for getting the service.

In this method of mechanism, a container application or container-SCC that instantiates and initializes object instances of one or more RCCs for including one or more SCCs also implements necessary coupling code for allowing communication or collaboration, for example, between any two SCCs in the application or between a SCC and external part in the application. The following sample communication code shows, an example embodiment for coupling any two SCCs in an application, such as SP_SCC and SC_SCC, where SC_SCC needs a service that is provided by SP_SCC:

1. void callback_for_sc_scc (interface_version, par1, par2, par3) {
2. SP_SCC.service_function1 (interface_version, par1, par2, par3, null);
3. }
4. SC_SCC.set_service_provider1 (callback_for_sc_scc, null);

If the SCCs are already included in the application, the above pseudo-code creates a communication coupling between two SC_SCC and SP_SCC. The line numbers 1 to 3 implements a callback function (i.e. callback_for_sc_scc), which invokes appropriate service-function of SP_SCC. The code at line 4 is included at proper location to register the callback with SC_SCC as a service function for requesting a service. SC_SCC can save a reference of the service-function in a local variable for calling the service-function for requesting the service whenever the service is required.

1. SC_SCC.set_service_provider1 (SP_SCC.service_function1, null);

When two RSCCs (e.g. SP_SCC and SC_SCC) are custom-designed for a target application and need to communicate with each other, it is possible to design coupling interface for the communication in each RSCC (e.g. SC_SCC) to complement the coupling interface implemented in the other RSCC (e.g. SP_RCC) in the context of the target application. If the coupling interface (e.g. number of parameters, type, content of parameters and order etc.) is defined and agreed at the time of design before implementing each of the RCCs for SP_SCC and SC_SCC, the above line establishes communication between the two SCCs. Here the service function 'SP_SCC.service_function1' of SP_SCC is registered with SC_SCC (at line-1 above) as the service-function to be called by passing proper parameters.

If a RCC is custom designed for a given application (i.e. in the context of other collaborating parts or SCCs), it is possible to design each coupling interface of its SCC to be compatible (e.g. number of parameters, type, content of parameters and order of parameters) with the coupling interface of the other collaborating SCC communicating using the coupling interface. For example, assume a shopping cart GUI application includes a SCC for showing shopping-cart/invoice-table component and multiple SCCs for multiple shopping-items (i.e. one SCC for showing each shopping-item). When user selects a shopping-item by double clicking on the shopping-item's GUI component, it need to call service function of the shopping-cart by passing various pieces of information (e.g. price, bar code, item name, model or quantity etc.) as parameters. If the interface of the service-function (e.g. add_to_invoice) of the shopping cart is defined and published, then each shopping-item can be designed to use the pre-defined interface to pass appropriate parameters.

1. Shopping_item1.register_invoice_service (Shopping_cart.add_to_invoice, null);

As a result of the above call, Shopping_item1 saves reference for service-function 'Shopping_cart.add_to_invoice' and calls the service-function, when double clicked on Shopping_item1 to add to shopping-cart/invoice. The communication code in the container application calls appropriate function (e.g. register_invoice_service) of each shopping-item to register the service function of the shopping-cart/invoice (e.g. add_to_invoice). The SCC for the shopping item saves a reference to function Shopping_cart.add_to_invoice in a local variable. When user double clicks on the GUI-SCC of the shopping-item, the shopping-item calls the service-function of the shopping-cart for adding the shopping-item to the invoice-table of the shopping-cart.

This disclosure also considers implementing this kind of communication between any two SCCs as loose coupling of the SCCs. The coupling interfaces in each of the two collaborating SCCs are pre-defined and designed to reduce necessary communication code for coupling the SCCs to few lines. In general, the RCC for the service-provider-SCC defines and publishes service-interface. Here an example for the service-interface includes name of a service-function, number of parameters, content type of each of the parameters and order of parameter etc. Another example for the service-interface includes name of a service-object and type or class definition of the service-object. It is also possible to have version numbers for the interfaces, for example, to detect interface mismatches.

In the context of this patent disclosure, the second method for creating communication code between any two SCCs is also treated as loose coupling of the two SCCs, where the coupling interface is pre-defined by one of the collaborating RCCs/SCCs (or agreed in advance for both collaborating SCCs) and at least one RCC/SCC is designed to minimize the communication code for coupling by using the pre-defined coupling interface.

Main tasks for properly using one or more RCCs for creating one or more RSCCs and assembling the RSCCs in an application, are described in two subsections (i) subsection-1 illustrates building non-web applications (e.g. for desktop) using RCCs and (ii) subsection-2 illustrates building web-applications using special type of RCCs, where each RCC is designed to generate application code for a SCC.

Subsection-1

Assembling a RSCC in a Non-Web Application

Properly assembling each RSCC in an application (or container component) mainly comprises two parts (1) Instantiating and initializing an object instance of RCC for including respective SCC in the application (or container component), where the initialized RCC-object is the SCC, and (2) properly coupling the SCC with other parts of the application in order for the SCC to perform its operations, such as (i) if the SCC offers any services required by the other parts and/or (ii) if the SCC requires any services offered by the other parts to properly perform its operations.

Each coupling of a SCC with other parts of the application is accomplished in one of two ways (1) After instantiating an object instance of RCC for the SCC, the application (or container component) uses appropriate coupling interface of the object instance for implementing necessary communication code for allowing communication. (2) Alternatively, to establish each of the coupling links the SCC comprises of necessary communication code (a) to register each of the services offered by the SCC with a global services-registration object (or SRO) and/or (b) to look up for each service in the SRO required by the SCC.

FIG. 9a shows an example listing of a pseudo code 900 for including two RSCCs and creates necessary communication code for the RSCCs. In the listing 900, code section 901 instantiates and initializes a service component RSCC1, where the RSCC1 offers a service-function to open a new window and displays ticket reservation system for a given theater-ID. Next code section 902 implements a callback function that calls a service method of RSCC1 by passing a theater-ID. The third code section 903, instantiates and initializes RSCC2, which is a GUI component displays theaters in a city (e.g. given by zip code 94089) on a map. At line number 5 in section 903, the callback implemented in section 902 is registered as a service function. If user double clicks on a theater, it calls the service function by passing respective theater-ID.

FIG. 9b shows listing of a pseudo code 910 for including two RSCCs and create necessary communication code for the RSCCs. In the listing 910, lines 1 to 3 instantiates and initializes a service component RSCC3, which opens a new window and displays available rooms and prices for a given hotel-ID. Lines 4 to 6, instantiates and initializes RSCC3, which is a GUI component displays hotels in a city (e.g. given by zip code 94089) on a map. At line number 8, service method of RSCC3 (i.e. RSCC3.ShowAvailableRooms) is registered as a service function for RSCC4. If user double clicks on a hotel, it calls the service function by passing respective hotel-ID. When two RSCCs (e.g. RSCC3 and RSCC4) are custom-designed for a target application and need to communicate with each other, it is possible to design coupling interface for the communication in each RSCC (i.e. RSCC3) to precisely complement the coupling interface implemented in the other RSCC (i.e. RSCC4) in the context of the target application.

Figure 9C:
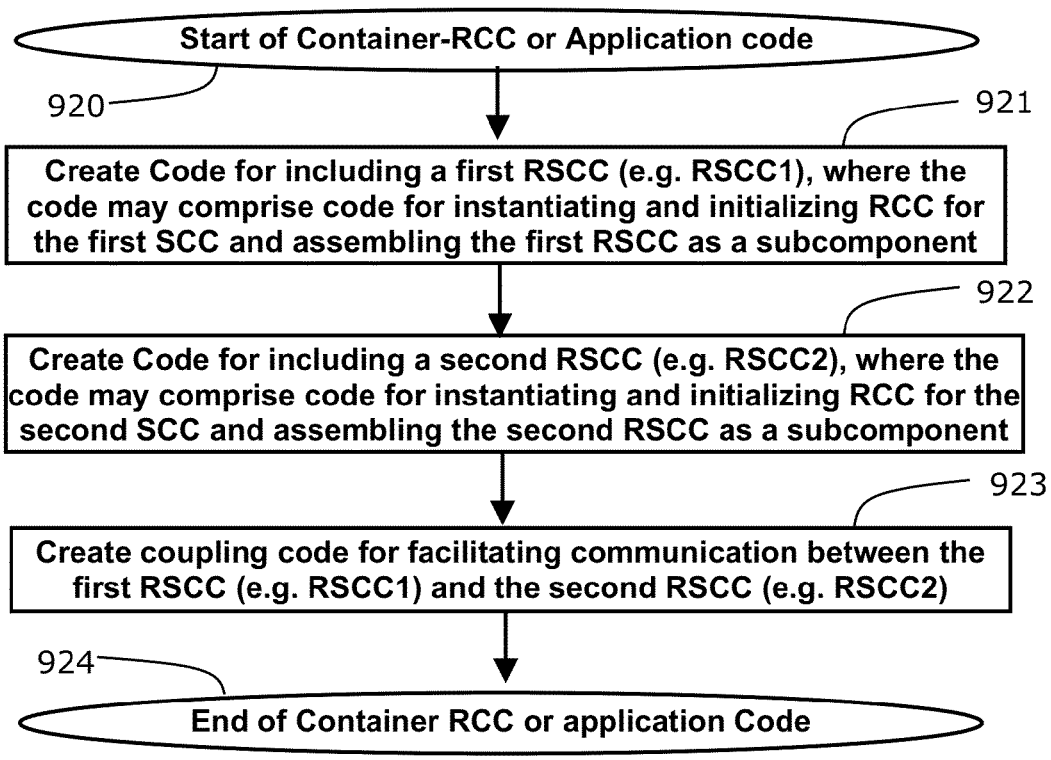
FIG. 9c illustrates an exemplary implementation steps of a container RCC that uses two RCC for including two RSCCs in an application as a flow chart, according to one embodiment.
Figure 9D:
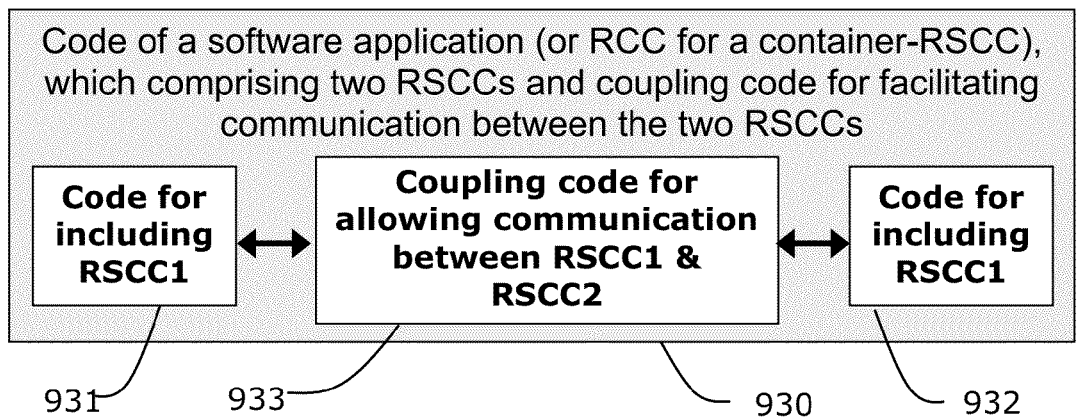
FIG. 9d illustrates an exemplary conceptual view of an application (or container-RCC of a container RSCC) comprising two RSCCs and coupling code for facilitating communication between the two RSCCs, according to one embodiment.

FIG. 9c shows general steps as a flow chart for implementing a simple application (e.g. ref FIG. 9b) or container-component that uses two RCCs for including two SCCs. Also creates necessary communication code for the SCC to collaborate with each other. The application starts by implementing necessary application code 920 and files for the application. This step creates necessary files for an application and includes all the libraries to properly compile a bare or empty application. Step 921 instantiates and initializes a first RCC for including first RSCC and if necessary attaches the first RSCC to proper parent component. Step 922 instantiates and initializes a second RCC for including second RSCC and if necessary attaches the second RSCC to proper parent component. Step 923 uses object instances of the first RCC and second RCC for implementing communication code for allowing collaboration between the two RSCCs. FIG. 9d shows a block diagram for two RSCCs 931 and 932 and communication code 933 in a sample application 930.

Figure 12A:
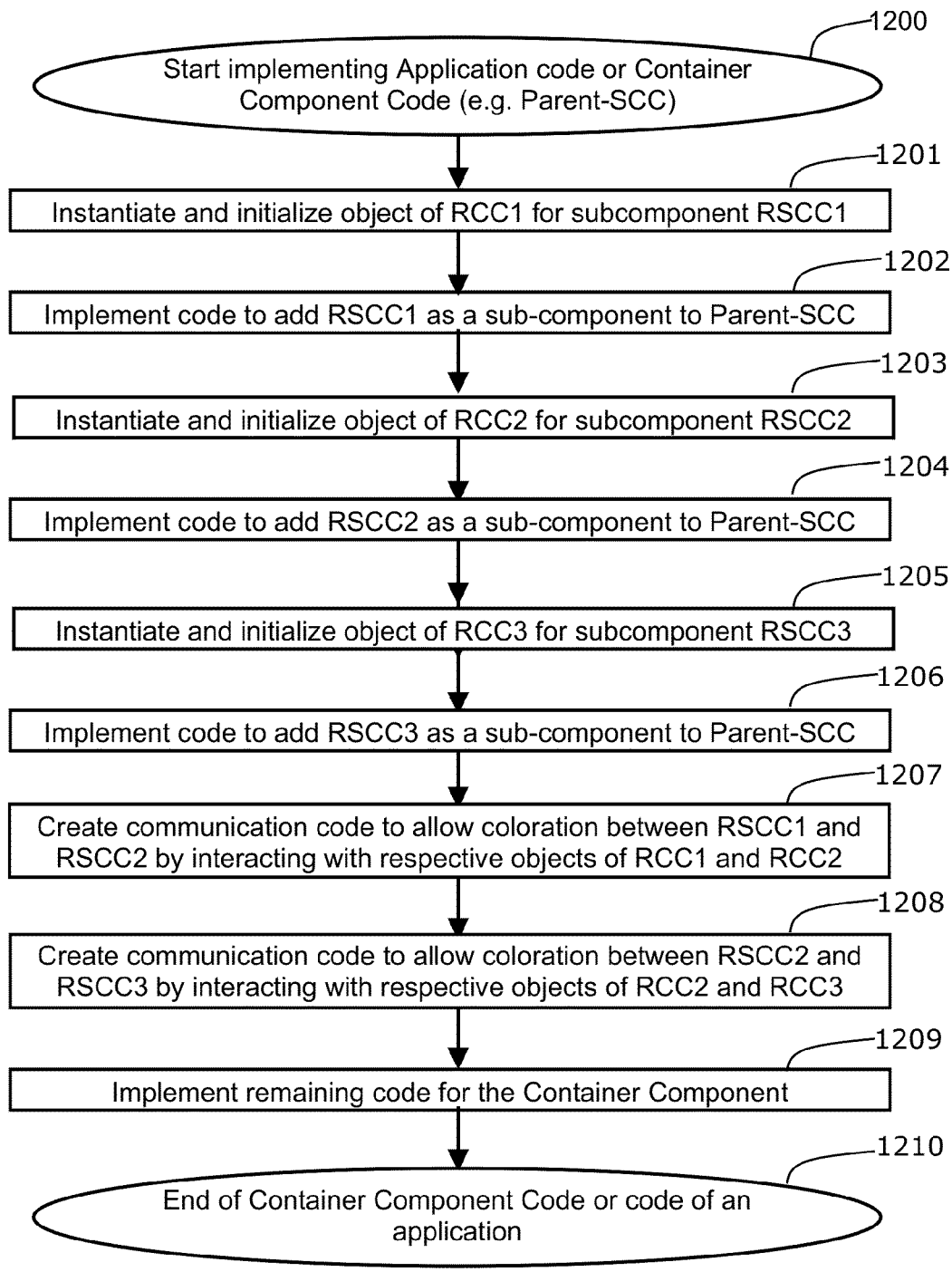
FIG. 12a illustrates a flowchart for creating a software application code for including three RSCCs by using three objects of RCCs, and facilitating communication between the RSCCs, according to one embodiment.

FIG. 12a shows steps for implementing an application or container-RCC for constructing a container-SCC comprising 3 SCCs as a flow chart, where each SCC is included using a RCC. The container RCC also implements communication code for the SCC to collaborate with each other.

In step 1200, starts implementing initial parts of the code for the container SCC. In step 1201, uses a RCC (e.g. RCC1) to instantiate and initialize an object RSCC1. In step 1202, adds RSCC1 to its container component as a subcomponent. In step 1203, uses a RCC (e.g. RCC2) to instantiate and initialize an object RSCC2. In step 1204, adds RSCC2 to its container component as a subcomponent. In step 1205, uses a RCC (e.g. RCC3) to instantiate and initialize an object RSCC3. In step 1206, adds RSCC3 to its container component as a subcomponent In step 1207, construction code of container-RCC implements communication code for allowing collaboration between RSCC1 and RSCC2, where the construction code of container-RCC uses the objects of RCC1 and RCC2 for implementing the communication code for RSCC1 and RSCC2. In step 1208, construction code of container-RCC implements communication code for allowing collaboration between RSCC2 and RSCC3, where the construction code of container-RCC uses the objects instances of RCC2 and RCC3 for implementing the communication code for RSCC1 and RSCC2. In step 1209, remaining code for the container component is implemented. In step 1210, the process ends container component code or code of an application.

Likewise, it is possible to allow collaboration among the RSCCs and other modules in the application. That is, it is possible to implement necessary communication code to allow collaboration not only between any two RSCCs but also between a RSCC and a module, where the module is not a RSCC but may be one or more code-sections of a SCC, parts of the application, or an object in the application. For example, it is possible to implement coupling code to allow collaboration between (a) RSCCs that provide or consume services and (b) modules that consume or provide the services. For example, if a RSCC provides a service required by a module in the application, it is possible to implement communication code in the application to allow collaboration between the RSCC and the module, for example, where the communication code comprises instructions to get an appropriate service function/object of the RSCC and module to request the service. Alternatively, it is also possible to allow collaboration between a RSCC and a module using SRO, where the RSCC contains code to register a service with the SRO and the module contains code to find from the SRO for consuming the service.

Subsection-2

Assembling a RSCC in a Web Application (e.g. In a Webpage)

In case of web applications, each web application comprises of two parts (i) a server-application (e.g. JSP or Servlet), which runs on a web server 110 and generates a client-application (e.g. webpage) for running on the client 100 (e.g. 105 in FIG. 1, by a browser, viewer such as Adobe's SVG or Flash-player).

Properly assembling each RSCC in a client-application (or container component) comprises two parts (1) Instantiating and initializing an object instance of a RCC in the server-application for including respective SCC in the client-application (or container component), where the initialized RCC-object is used by server-application for generating and including code for the SCC in the client-application (e.g. webpage), and (2) properly coupling the SCC with other parts of the client-application in order for the SCC (e.g. a webpage runs at a client computer) to perform its operations, such as (i) if the SCC offers any services required by the other parts and/or (ii) if the SCC requires any services offered by the other parts to properly perform its operations.

Each coupling of the SCC with other parts of the client-application is accomplished in one of two ways (i) After including respective RCC, the server-application (or a RCC for generating the container component on client) generates necessary communication code for allowing communication or (ii) the SCC comprises of necessary communication code either (a) to register each service offered by the SCC with a global services-registration object (or SRO) or (b) to look up each service required by the SCC in the SRO.

Figure 10A:
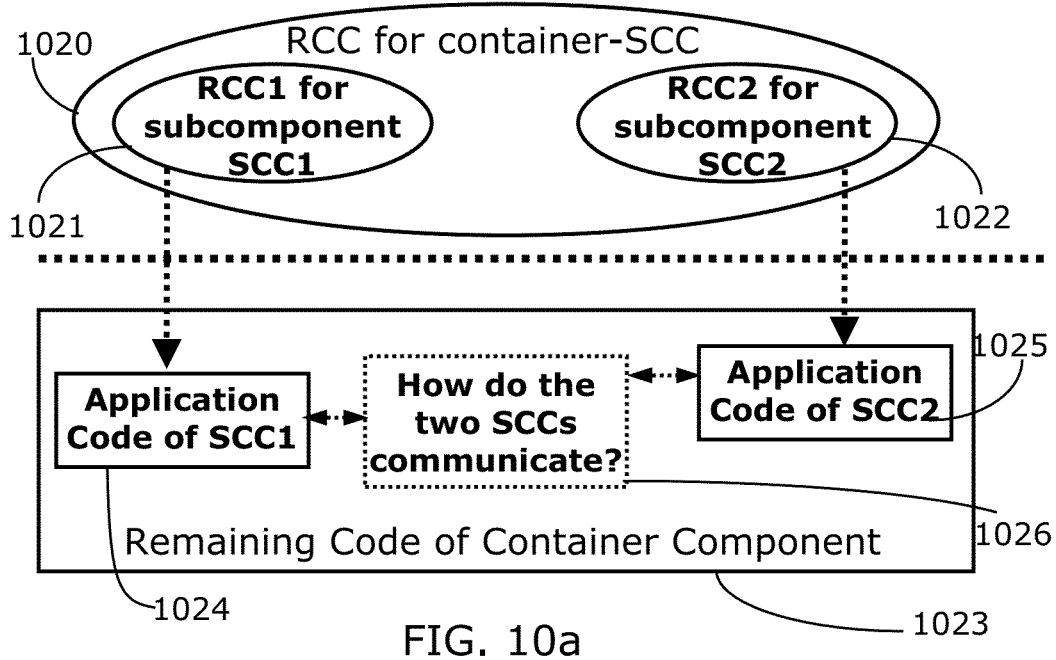
FIG. 10a shows two subcomponents in a web-application generated by two RCCs without inter-component communication code, according to one embodiment.

FIG. 10a shows a container-RCC 1020 for generating application code for container component 1023. The RCC for container-SCC 1020 comprises server code for instantiating and initializing two RCCs 1021 and 1022. The container component also comprises code for calling each of the CGM (Code Generation Method) of each RCCs 1021 and 1022 to generate application code for sub-SCCs 1024 and 1025 respectively. In this case the sub-SCCs 1024 and 1025 cannot communicate or exchange data with each other.

Figure 10B:
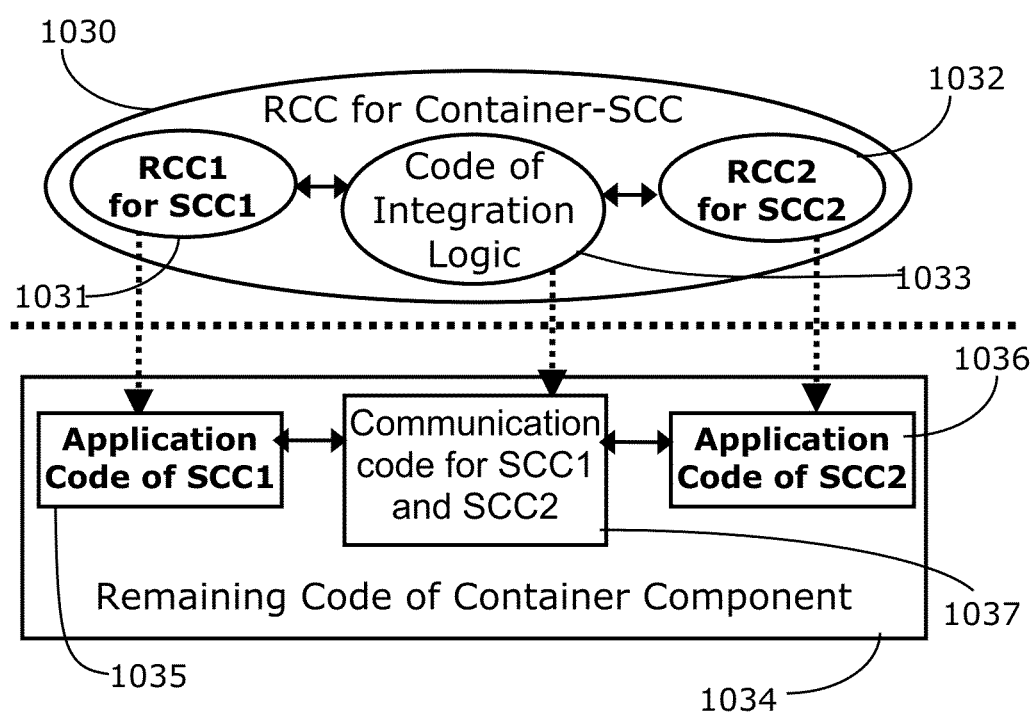
FIG. 10b shows two subcomponents in a web-application generated by two RCCs along with inter-component communication code to allow collaboration between the subcomponents, according to one embodiment.

In comparison, FIG. 10b shows how communication code is generated for two subcomponents. The RCC for container-SCC 1030 comprises server code for instantiating and initializing two RCCs 1031 and 1032. The container RCC also comprises code to call each of the CGM of the RCCs 1031 and 1032 to generate application code for subcomponents 1035 and 1036, respectively. In addition, the container RCC 1030 comprises server "code of integration logic" 1033, which calls coupling-methods of RCCs 1031 and 1032 to set or get integration data for generating necessary application code 1037 for allowing the communication between the sub-SCCs 1035, 1036 and the container component 1034.

Figure 10C:
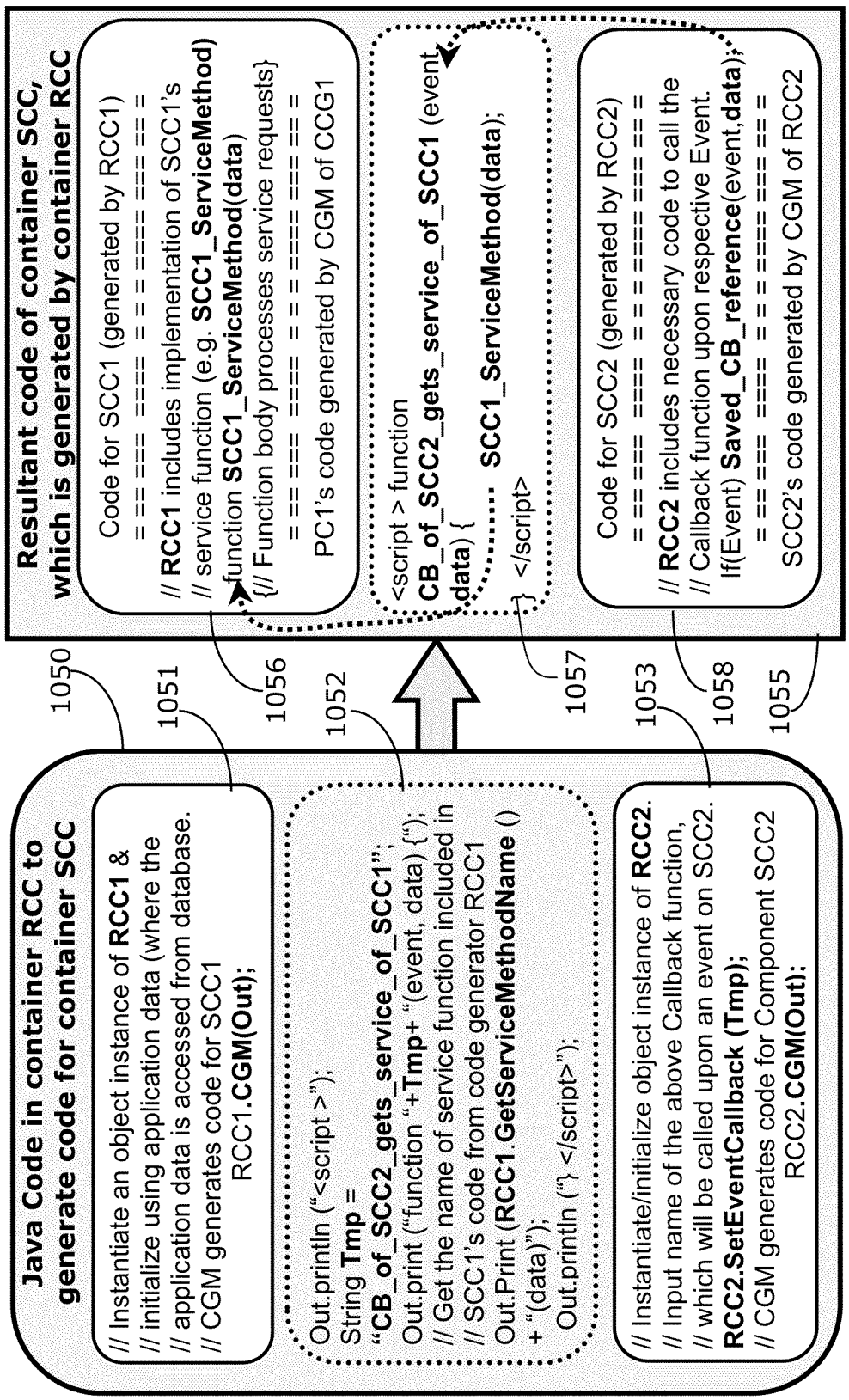
FIG. 10c shows an exemplary pseudo code implementation of server code in a container RCC (or application) for generating communication code for two sub-SCCs created by two RCCs, according to one embodiment.

FIG. 10c shows sample code structure of server code of a container-RCC 1050 and code structure of application code of the container SCC 1055 generated by the container RCC 1050. The server code comprises code to instantiate and initialize RCC1 object 1051, and also calls RCC1's CGM to generate the application code 1056 for a subcomponent SCC1. The server code comprises code to instantiate and initialize RCC2 object 1053, which generates the application code 1058 for a subcomponent SCC2. The server code comprises code 1052 to generate application code for a Callback function ("CB_of SCC2_gets_service_of SCC1") 1057 in the application code of the container component 1055.

The server code section 1052 comprises a call to a coupling-method of RCC1 (i.e., RCC1.GetServiceMethodName ( )) for getting the name of a service function implemented in the application code of SCC1. The server code section 1053 comprises a call to a coupling-method (i.e., RCC2.SetEventCallback ("CB_of SCC2_gets_service_of SCC1")) requesting SCC2 to set a callback in the application code of SCC2. Calling the coupling-method for setting a callback causes the RCC2 to include necessary communication code in the application code of SCC2, in order for SCC2 to call the callback function 1057 for requesting the service upon a given event. The callback (i.e. "CB_of SCC2_gets_service_of SCC1") 1057 calls the service function implemented in the component code of SCC1.

Figure 12B:
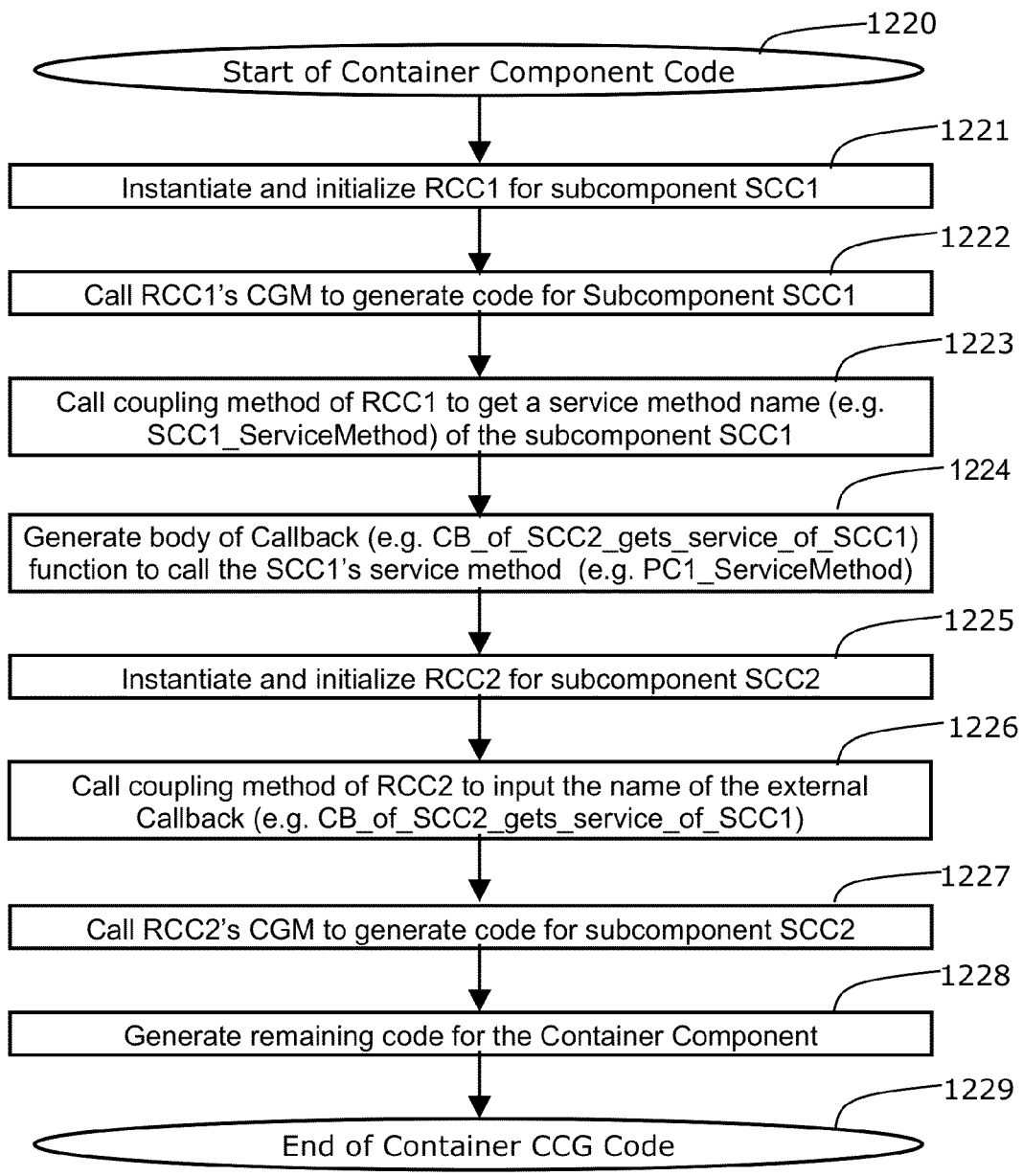
FIG. 12b shows flow chart of a CGM in a container RCC that uses two RCCs to include two sub-SCCs and also creates communication code for the sub-SCCs, according to one embodiment.

FIG. 12b is a flow chart that shows the steps or equivalent code sections of the CGM (i.e. 'Code Generation Method' of each RCC for web applications) of a container SCC 1030 for generating a container component 1034 having two subcomponents 1035 and 1036 in FIG. 10b. Also FIG. 10c sows a sample pseudo code for the container-RCC 1050 and resultant container-SCC 1055. The code of 1050 comprises the following main code sections or process steps:

1. Step 1220 or code section 1220 is server code for start generating code for the container component 1034.
2. Code section 1221 is server code for instantiating and initializing an object instance of RCC1 1031 for the first subcomponent SCC1.
3. Code section 1222 is server code for calling the CGM of the RCC1 to generate and include the code of the SCC1 1035 in the code of the container component 1034.
4. Code section 1223 is server code for requesting the object of RCC1 1031 to get the name of a service method (e.g. SCC1_ServiceMethod) of the SCC1.
5. Code section 1224 is server code for generating a callback function to call the service method of the SCC1 1035. Here selected name of the callback function (e.g. CB_of SCC2_gets_service_of SCC1) must be unique to avoid variable name collision with other variable names in the container component 1034, and also in an application that contains many other components, if the container component required to be used as a component of the application.

6. Code section 1225 is server code for instantiating and initializing an object of the RCC2 1032 for the second subcomponent SCC2.
7. Code section 1226 is server code for requesting the RCC2 1032 to register a callback function name CB_of SCC2_gets_service_of SCC1 as a callback to the SCC2.
8. Code section 1227 is server code for calling the CGM of the RCC2 to generate and include the code for the SCC2 1036 in the code of the container component 1034.
9. Code section 1228 is code for generating remaining code of the container component 1034.

Section-H

Replaceable Component Based Software Development

One of the preferred embodiment of component-based programming for building an application using plural replaceable components (or RSCC) comprises following steps: (1) including or incorporating each RSCC into the application, and (2) if the RSCC required to collaborate with other parts (e.g. other SCCs or modules) in the applications, then properly coupling the RSCC in order to allow the RSCC to communicate or collaborate with other parts of the application.

This process of incorporating and coupling each RSCC should also be reversible. That is, it also allows disassembling RSCC from the application, or replaced by another component.

In one of the embodiments of the present invention, it is required to implement a RCC for each suitable SCC identified in the application. In an example embodiment, assume RCC is a Java class, which is designed to custom build code for an application component. Each RCC is designed to encapsulate all the necessary construction code such as application logic, presentation logic and business logic as shown in FIG. 4b for building a custom component based on each user's preferences and profiles.

Each RCC instance is used to include a component in the application code of the container component (or in the code of the application, if SCC is a component of the application and not a sub-SCC of another SCC). The RCC also comprise coupling-methods, which are used to create necessary communication code for its SCC. The communication code is necessary for the SCC, if the SCC needs to collaborate or exchange data with other parts in the application.

The following pseudo code shows a simple method for incorporating components into an online GUI application or a web page. If the following three RCC Java classes are already created: (1) An RCC StockInfoTable that takes ticker symbol of a company and generates code for stock quote table, (2) An RCC IntraDayChart to generate code for one day's stock movement chart for given ticker symbol, and (3) An RCC AnnualChart to generate code for one year's stock movement chart for a given ticker symbol.

The following example code for a CGM of a container component (FullStockQuote in FIG. 6) is incorporating each component as a subcomponent by including two line of code. Since each component is incorporated by including two lines of code in the CGM of the container component, the components can be removed or replaced by changing only two lines of code.

```
10. void CGM(Out){//Code in container component to assemble sub-SCCs
20. Out.println("<g>");
30. RCC RSCC1_Table=new StockInfoTable(aci,Ticker);
40. RSCC1_Table. AddChild (Out, 0, 0, null);
50. RCC RSCC2_Chart1=new IntraDayChart(aci,Ticker);
60. RSCC2_Chart1. AddChild (Out, 0, 250, null);
70. RCC RSCC3_Chart2=new AnnualChart(aci,Ticker);
80. RSCC3_Chart2. AddChild (Out, 0, 500, null);
90. Out.println("</g>");
100. }
```

The container RCC starts calling the CGM of the container component in line 10. It first prints a canvas start-tag for the component in line 20. It then instantiates and initializes a RCC1_table object at line 30 and calls the AddChild of RSCC1_table in line 40 to generate a stock table (with location coordinates X=0, Y=0). It then instantiates and initializes a RSCC2_chart object in line 50 and calls the AddChild of RSCC2_chart object in line 60 to generate a intra-day chart (with location X=0, Y=250). Finally, it instantiates and initializes a RSCC3_chart2 object in line 70 and calls the AddChild of the RSCC3_chart2 object in line 80 to generate an annual chart (with X=0, Y=500). It closes the canvas for the component in line 90. The 3 GUI SCC (i.e. a table and two charts) are placed vertically on a canvas of parent (e.g. see 500 in FIG. 5a).

If one of the components needs to collaborate with another component in the application, the RCC for the component is designed with mechanisms for creating necessary communication code as discussed above. For example, one method for properly coupling a RSCC is: each RCC implements necessary coupling interfaces (e.g. coupling-functions or objects) and the container component or application implements necessary communication code for its SCC using the coupling interfaces. Another method for properly coupling a RSCC is, using an SRO as illustrated in section-F.

Section-I

A Mechanism for Managing and Validating Dependencies Between the RSCCs

Figure 14A:
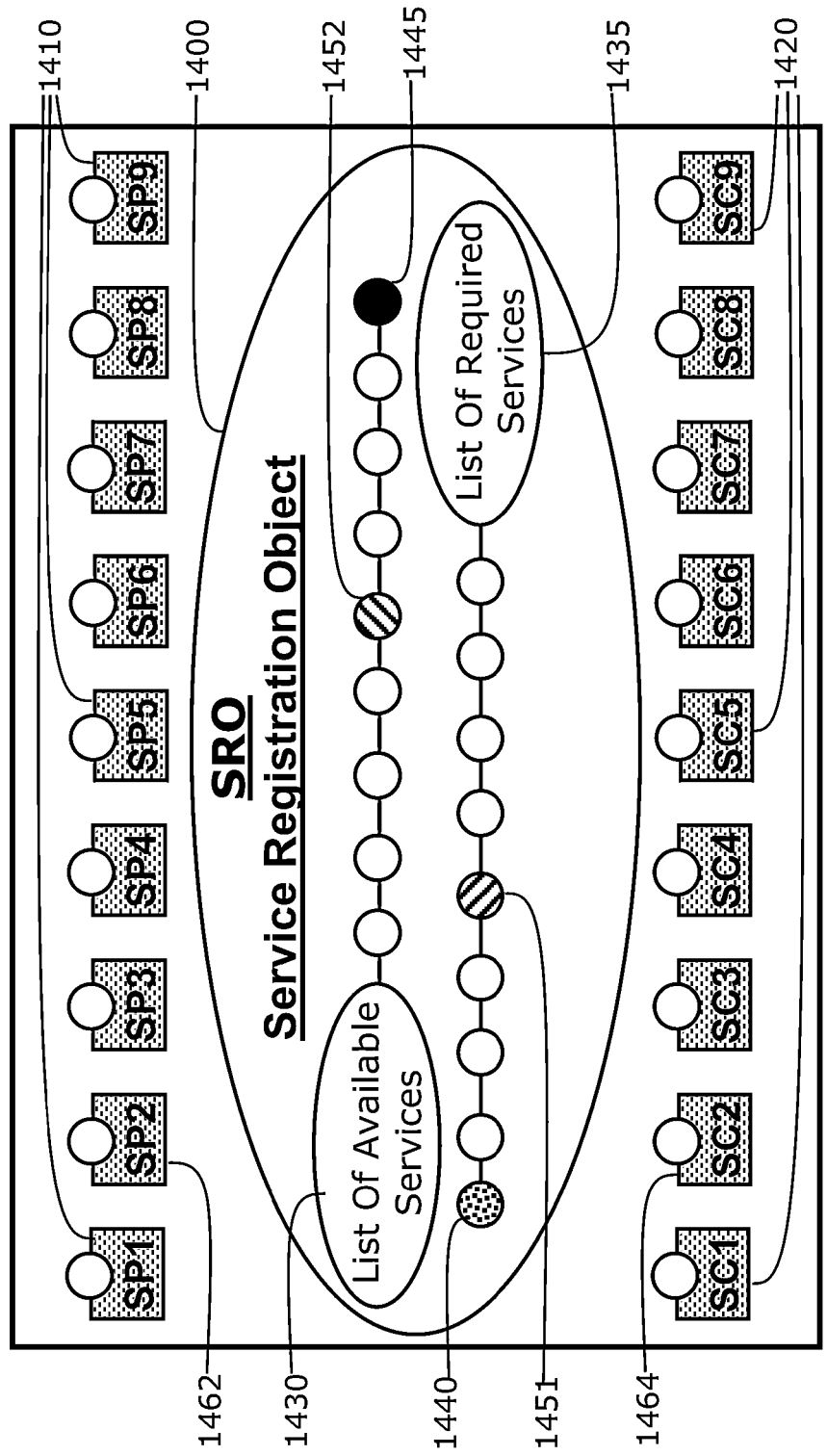
FIG. 14a shows the mechanism for managing dependencies and validating communication interfaces of RSSCs in an application, according to one embodiment.

An application can be created by assembling many RSCCs as shown in FIG. 14a. Plural RSCC 1410 offer one or more services for other components. Likewise, plural RSCC 1420 depend on one or more services offered by other components. It is thus desirable to have a tool for automatically detecting broken dependencies or incompatible interfaces between any two RSCCs. During the initialization of the application, each of the RSCCs registers each of its services with the Service Registration Object ("SRO") 1400. Likewise, each of the RSCCs registers each of the services that the RSCC requires (or depends on) with the SRO 1400.

FIG. 14b shows pseudo code for example embodiment of a SCC, where code section 1470 comprises implementation of a function 'register_all_services_provided' and code section 1480 comprises implementation of another function 'lookup_all_services_required'. These two functions are implemented in the construction code of each SCC. Where function 'register_all_services_provided' registers each of the services provided by the SCC with SRO 1400 and function 'lookup_all_services_required' looks up for all the services required by the SCC. More details are providing in Appendices-U2 and U1. In one example embodiment, each RSCC in an application registers itself with SRO (e.g. 1400). The SRO 1400 goes through the list of registered RSCCs and calls its abstract function 'register_all_services_provided' and builds a list of all the available services. Then the SRO 1400 goes through the list of registered RSCCs again and calls its abstract function 'lookup_all_services_required' and builds a list of all required services. Each SCC saves reference for each external service function in a local variable as shown at line 3 and 4 in listing 1480, and calls the service function whenever it needs the service.

The SRO 1400 builds a list of all available services 1430 and a list of all required services 1435. After the initialization of the application, the SRO 1400 compares the two lists, match the available services 1430 with the required services 1435, and create a diagnostic report showing all mismatches. The SRO 1400 also detects that (i) a required service 1440 for a RSCC is not available, (ii) an available service 1445 is not used, and (iii) a required service 1451 and an available service 1452 are incompatible. Missing services and incompatible services are also known as dependency or interface problems. Those problems may arise after one of the service-providing RSCCs is updated while one of the dependent RSCCs is not updated properly. The unused services are removed during the cleaning up (e.g. refactoring) the application code, according to one embodiment.

The SRO 1400 is used to facilitate communication between two components, for example a service providing component 1462 and service consuming component 1464. Service providing component (1462) registers a service function using a predefined service name (e.g. "Shopping Cart Type3") with the SRO 1400. Service consuming component 1464 calls the SRO's lookup method for finding the service function by using the predefined service name (i.e. "Shopping Cart Type3"). The name of the service and interface of the service function must be defined in advance of designing the two components (1462, 1464) so that the components are implemented to communicate with each other properly. The interface of a service function comprises service version, type of the object returned by the service function, number of parameters and content type of each parameter of the service function. The service-providing component 1462 is designed to include information about the interface 1452 and a unique id for the component (e.g. its Class name) when registering service function with SRO 1400. The service-consuming component 1464 is designed to include information about the interface 1451 and a unique id for the component when it calls SRO's method for looking up or at the time of initialization. SRO 1400 is designed to use the information 1451 and 1452 to detect incompatible communication interface if one of the two components is redesigned and the other component is not updated accordingly.

This method of using the SRO 1400 to manage component dependencies or detecting incompatible interfaces is not limited to web applications, and can be used in any software application comprising SCCs or RSCCs. Each SCC may offer one or more services and also consume one or more services of other components. The services listed in the SRO 1400, the available services 1430 and the required services 1435, can be used for building tools or utilities such as (a) a utility for finding all the other components that depend on a given component or service; or (b) a utility for graphically displaying each component as a node in a network map and connection lines between the components as dependencies (the image is referred to as component dependency map). Each of the components or nodes on the map may be a hot link for opening a new window that displays services the component provides or consumes and a list of components that consume or provide each of the services. The SRO 1400 may create a file containing the lists 1400 and 1430 upon exiting the application or on a given event such as clicking on a designated button. A tool is build to read the lists from the file to display the component dependency map.

An application may implement two service registration objects, SRO1 and SRO2. Here SRO1 (FIGS. 8a, 8b) is for facilitating communication between each of the service-consuming components and each of the service-providing components in the application like the method discussed above while SRO2 is for managing dependencies between service-consuming components and service-providing components. To allow for managing dependency, each of the SCCs in the application also separately registers (i) each of the services it offers along with information about the communication interface and (ii) each of the services it needs along with information about the communication interface with the SRO2 (FIG. 14a). The SRO2 uses the information about the communication interfaces for managing dependencies by (i) detecting incompatible communication interface between any two components or (ii) finding all the communication interfaces of a component. This second SRO is different in that it has storage space for accepting information about communication interfaces for each service entry and a method for adding service with interface information. In addition, this second SRO also has the code necessary for finding all communication interfaces for a component, the code for comparing whether a required service is missing from the available service list, and the code for comparing whether the communication interface of a requested service is same as the communication interface of an available service.

If it is required to increase performance by eliminating overhead costs of service registrations and service lookups needed for using SRO, it is possible to design the lists 1430 and 1435 for getting information for the service interfaces from service providing RSCCs and service consuming RSCCs in an application. Then it is possible to design the SRO to create dependency maps or communication code, according to one embodiment. The dependency maps may be used for creating necessary communication code between some of the RSCCs. In one exemplary embodiment the communication code comprises instructions for registering necessary services with each service consuming RSCC. For example, code for creating communication between any 2 RSCCs comprise registering a service function or service object of a first service providing RSCC with a second RSCC that depends on the service. The created communication code can be properly included in the application code for building the application. In one embodiment, the SRO is used during development and testing cycles. But before final testing and release, use of the SRO for allowing communication between some of the RSCCs may be substituted by the created communication code.

Section-J

Example for Building CityGIS Application by Using Replaceable Components

Figure 18A:
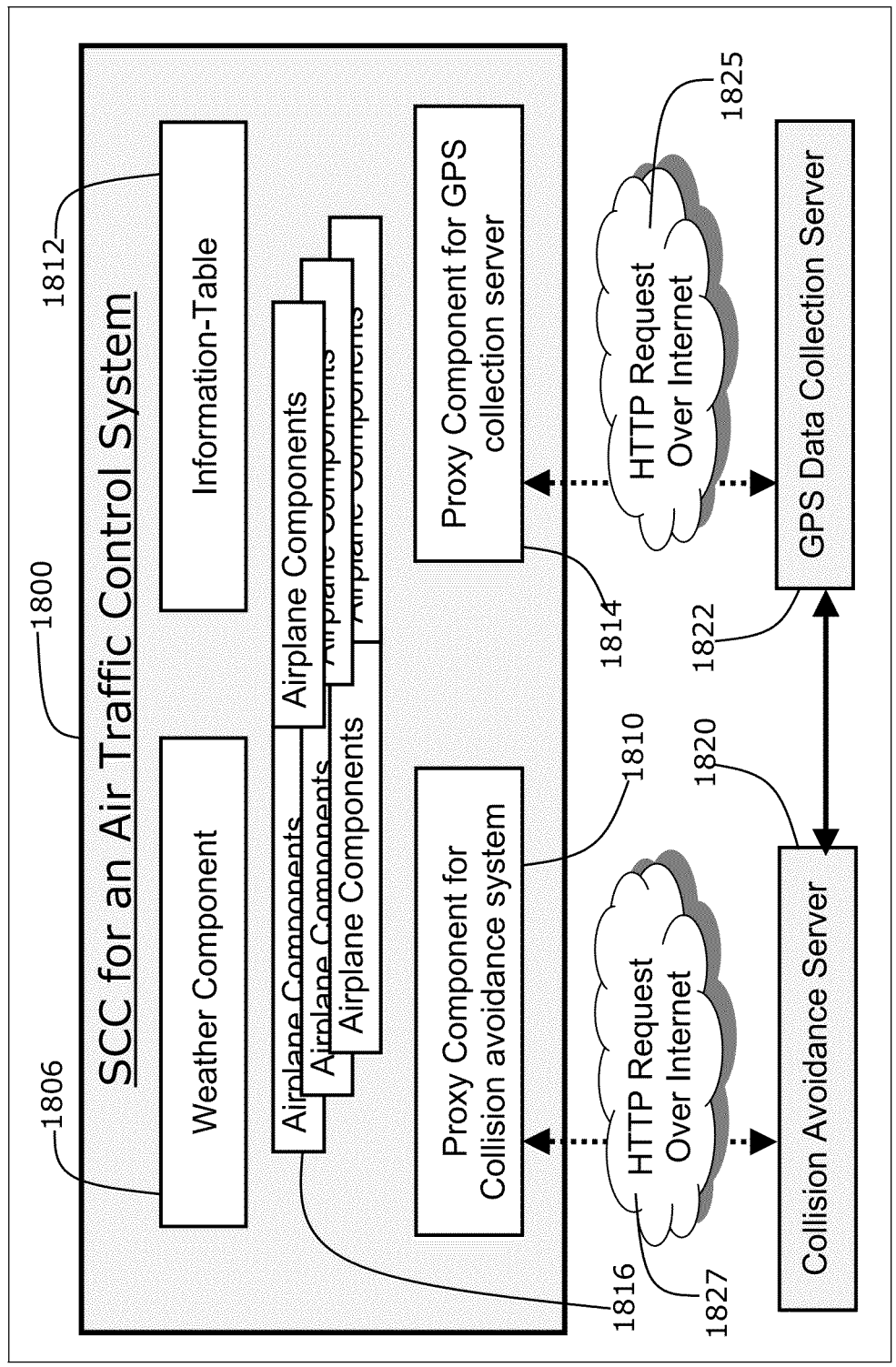
FIG. 18a shows various subcomponents in a simple air traffic control application, according to one embodiment.
Figure 18B:
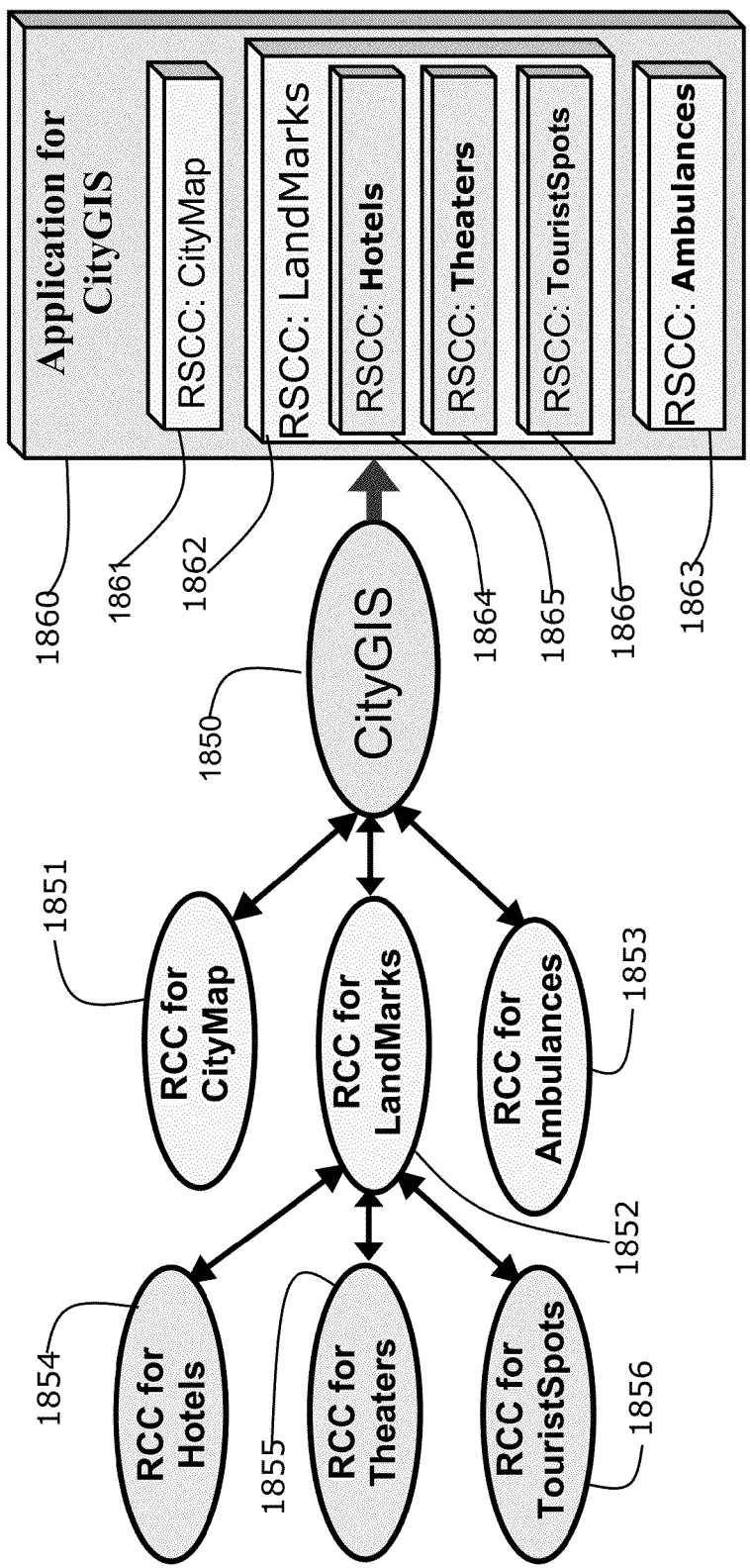
FIG. 18b shows building container-RCC that uses RCCs for including sub-SCCs for constructing container-SCC, according to one embodiment.

A Geographical Information System ('GIS') application 1860 for a city is built by assembling three replaceable components (as illustrated in FIG. 18b): (i) city map 1851 comprising vector drawings such as streets and canals, (ii) important landmarks 1852 of the city, and (iii) emergency services 1853. An RCC for each of the three components is designed, developed and tested independently.

Assuming that RCC for the city map 1851, city landmarks 1852, and emergency services 1853 are respectively known as CityMap_RCC, CityLandmarks_RCC, and Ambulances_RCC, which display current locations and movements of ambulances on the city map 1851. Then, construction code of the container RCC, CityGIS_RCC, assembles all three replaceable components as follows:

10. Void CGM(Out) {//Construction code for container CityGIS
20. Rep_SCC CityMap=new CityMap_RCC (aci,ZipCode);
30. this.canvas.AddChild (CityMap, 0, 0, null);
40. Rep_SCC LandMarks=new CityLandmarks_RCC(aci, ZipCode);
50. this.canvas.AddChild (LandMarks, 0, 0, null);
60. Rep_SCC Ambulances=new Ambulances_RCC(aci,ZipCode);
70. this.canvas.AddChild (Ambulances, 0 0,null);
80. this.canvas.CGM(Out);
90 }

All the above components overlap each other so each component (and its subcomponents, if any) must be drawn on a canvas with a transparent background except the component CityMap 1861. If there is need for adding new overlaying features, additional replaceable components are created and added to the application. Also, such replaceable components can be added by using if-then-else conditional statements, which may be based on user preferences or profiles. For example, following code are added to the code listing between the line numbers 70 and 80.

20, if (User_Preferes_City_Traffic) {
30. Rep_SCC TrafficCongestion=new BadTraffic_RCC (ACi,ZipCode);
40. this.canvas.AddChild (TrafficCongestion,0,0,null);
50. } else if (User_prefers_Air_traffic) {
60. Rep_SCC AirTraffic=new CityATC_RCC (ACi, AirportCode);
70. this.canvas.AddChild (AirTraffic, 0, 0, null);
80. }

The first condition statement causes the RCC to add a component for city traffic and the second conditional statement causes the RCC to add a component for air traffic. If any of the components is too big, it is further subdivided into replaceable subcomponents. For example, RCC for the city landmarks 1852 is divided into three replaceable subcomponents, respectively for, (1) hotels and hospitals 1854 (2) theaters and auditoriums 1855, and (3) tourist spots 1856. In one example embodiment, assuming RCC for the subcomponents is designed and developed by three different developers nearly autonomously, and is assembled by the CGM of CityLandmarks_RCC as follows:
10. Void CGM(Out) {//Construction code to assemble subSCCs
20. Rep_SCC Hotels=new CityHotels_RCC (aci, ZipCode);
30. this.canvas.AddChild (Hotels, 0, 0, null);
40. Rep_SCC Theatres=new Theatres_RCC (aci, ZipCode);
50. this.canvas.AddChild (Theatres, 0, 0, null);
60. Rep_SCC TouristSpots=new TouristSpots_RCC(aci, ZipCode);
70. this.canvas.AddChild (TouristSpots, 0, 0, null);
80. this.canvas.CGM(Out);
90. }

The code statements instantiate and initialize the component Hotels in lines 20, 30, the component Theatres in lines 40, 50, and the component TouristSpots in lines 60, 70. The code statement then generates the code for displaying city landmarks in line 80.

If an RSCC needs to communicate or exchange data with other components, the RSCC must be coupled. Component coupling methods such as "integration-logic" or "publish and subscribe" are used to implement necessary communication code. The design objective of each of the replaceable components is to satisfy unique needs of a single application. Also make it simpler to redesign each RCC for easily adaptable to changing needs.

The replaceable components Theaters 1855, Hotels 1854 or LandMarks are easily removed or disassembled from the application. Each replaceable component is disassembled and replaced by a newer or better component. It may also be reassembled after it is redesigned, updated, and tested to satisfy evolving business needs. Each of the replaceable components such as LandMarks or TouristSpots is custom designed to satisfy the unique needs of an intended single application. The design objective is to achieve a high degree of autonomy (or modularization) as much as possible in order to minimize the effort required to remove, update, and test the component during future maintenance periods, according to one embodiment.

The replaceable-SCC and their hierarchies are created using other technologies and GUI programming languages such as Adobe's ActionScript/Flex. The component is replaced by functionally equivalent new RCC and by properly redesigning the code lines that refer to old component variable. For example, each of the replaceable components such as tourist spots 1856 or it's container component Landmarks 1852 is assembled by using a variable TouristSpots 1866 or LandMarks 1862 respectively. Here each of the variables is an object instance of respective classes TouristSpots_RCC 1866 and CityLandmarks_RCC 1862. The landmarks component 1852 and its subcomponents can be removed by removing the two lines of the code that refers to the variable LandMarks from the construction code of CityGIS_RCC. A subcomponent of landmarks component 1862 such as tourist spots 1866 can be removed by removing two lines of code that refers to variable TouristSpots 1856 from the construction code of CityLandmarks_RCC 1852.

Figure 7:
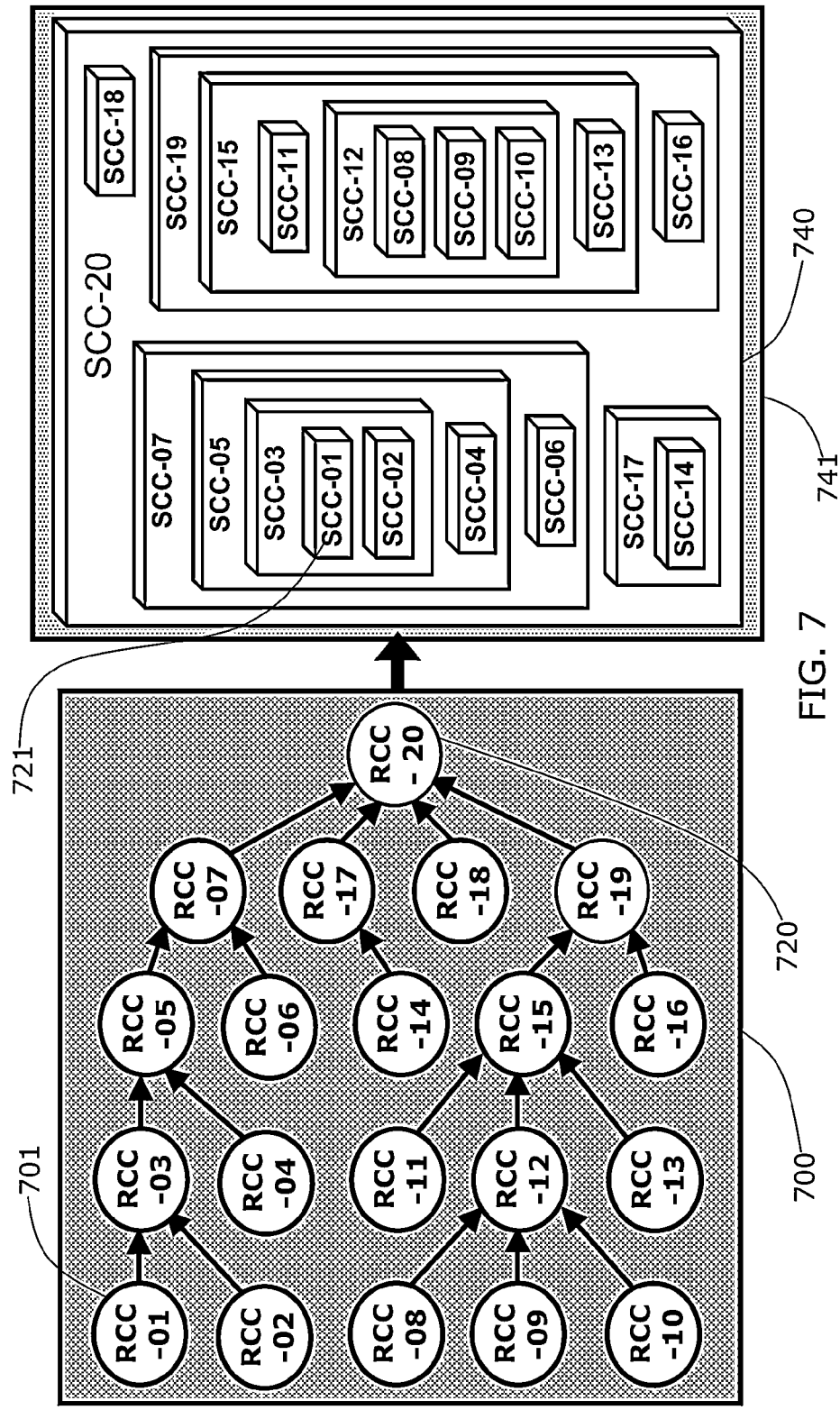
FIG. 7 Shows hierarchy of SCCs in a web GUI application, which is created by using many container-RCCs for creating container-SCCs, where each container-RCCs in turn use other RCC for creating its sub-SCCs, according to one embodiment.

FIG. 7 shows web application, where server application 700 runs on a web server and generates client GUI application 741. Server application 700 uses RCC-20 720 for generating application code for SCC-20 740, where RCC-20 uses RCC-07, RCC-17, RCC-18 and RCC-19 for generating sub-SCCs SCC-07, SCC-17, SCC-18 and SCC-19 for container SCC-20 740. Where RCC-19 in turn uses RCC-15 and RCC-16 for generating sub-SCCs SCC-15 and SCC-16 for container SCC-19. Where RCC-15 in turn uses RCC-11, RCC-12 and RCC-13 for generating sub-SCCs SCC-11, SCC-12 and SCC-13 for container SCC-15. It is to illustrate that it is possible to identify sub-SCCs (e.g. CityHotels, Theatres and TouristSpots) for a large SCC such as SCC-12 (e.g. CityLandmarks) for creating RCCs for each of the sub-SCC of the larger SCC-12/RCC-12.

In this example embodiment, design objectives of each RCC are: (i) to satisfy 100% unique needs of its application and requiring little or no configuration code, so that its RSCC can be included into the application by implementing no more than few lines (e.g. 2-5 lines) of code and (ii) Allow the RSCC to loosely couple for facilitating necessary collaboration between the RSCC and other parts/RSCCs of the application, using methods such as (a) implementing necessary communication code in the code of the RSCC for using SRO (e.g. see FIGS. 8a, 8b & 14a) and/or (b) implementing coupling interfaces in the RCC, where the coupling interfaces can be used for creating necessary communication code (e.g. see FIGS. 9a, 9b, 9c & 9d) for the RSCC.

The purpose of the reusable components is to eliminate writing custom code by using pre-built reusable components (e.g. libraries/API). In case of many new applications, it is impossible to avoid implementing custom application specific code for each of the new applications. For example, it is often not practical to find reusable components for custom RCCs for building most of the custom applications such as CityGIS 1850 discussed above. Also in case of many existing applications, each of the existing application contains large chucks of custom application specific code, where it is desirable to identify each custom SCC for building a RCC and replace the construction code for the SCC by a RSCC using the RCC.

The purpose of each replaceable component (e.g. RCC/RSCC) is to encapsulate application specific code of a large SCC into RCC that have high degree of autonomy and can be loosely coupled to be easily replaceable, for example, to replace (i) by a better component or (ii) by a new version at any time in the future during the lifetime of the application for satisfying any evolving needs. Here redesigning the source code of the existing version of the component/RCC may create the new version. It is desirable to use a method to track the exclusive files that contain the application code of the RCC, to easily find the application code to redesign the RCC. For example, one method is to create a folder for each RCC to place all the exclusive files of the RCC under the folder.

Section-K

An Air Traffic Control System Example

The air traffic control system (as illustrated in FIG. 18*a*) may include the following components:

1. An information-table 1812: A static utility component is used to display an information table 1812. It exports a service method (e.g. a JavaScript function), which can be called by passing data in an XML string containing name and value pairs; and the table displays the data in XML String in a table format. The table component registers its service in the service registration object, and any other components 1816 in the application 1800 can use this service for displaying data. An example of component code for a flight Information table is shown in info_table.jsp in Appendix-S3 file info_table_jsp.txt 2. Flight components: One or more airplane or flight components 1816 are used to show the Airplanes in the air space. Each component 1816 uses an XML string to store the information about the flight. The component 1816 also has a method for getting information about the flight and service method for setting/changing the colors, location, size and shape of the image of the flight and indicating the status of the flight (for example, refer to Appendix-P3). The component 1816 consists of XML data, SVG code for displaying the image and JavaScript code (e.g. Appendix-P1 and P2). Each flight component 1816 calls the JavaScript function in the information table component 1812 to display information about the flight whenever user clicks mouse on the image of the flight. The flight component 1816 calls a server application (e.g. get_info.jsp in appendix-S1) to get latest data, such as fuel status, latitude and longitude etc.

3. GPS data-collection server 1822: This component 1822, which is a non-GUI component preferably runs on a remote server, which receives data from Global Positioning Systems ("GPS") installed on each of the flights 1816. This component 1822 is implemented to run on a server (outside the code of application 1800), where the server may be located in an air traffic control center. The client computer may be located in any city as long as it can be connected to the server by a network connection. A small JavaScript proxy component 1814 is included in the SVG file, which communicates with the server component 1822 at regular intervals to get latest location information of all the flights 1816. It then calls the component for each flight 1816 to inform the location of the flight via the network (i.e., Internet 1825). This component 1822 can convert the GPS coordinates of each flight 1816 into X, Y and Z distances in kilometers with respect to a reference point on the earth.

4. Collision avoidance system: This system is also run background on a remote server (i.e., collision avoidance server 1820). The algorithms for the collision avoidance system 1820 might be complex and speed is critical. So, it is not advisable to implement this as application component in the client application (e.g. in SVG file in JavaScript language). A small proxy component 1810 could be included in the SVG file, which gets the information from the server frequently. For each flight 1816, the server finds the information of all the other flights, which are within a certain distance of, or approaching the flight 1816 at a critical speed. If such situation arises, the system sends an alarm to the proxy component 1810, which raises alarm, and sends a message to the components of all of the involved flights 1816, so that the flight components 1816 could set colors to indicate the danger. If different air traffic controllers are guiding different flights, this system may provide suggestions to the controllers so that they could guide the involved flights away from the collision courses.

5. A weather component 1806 for displaying weather conditions in the background of the screen: This SVG component fetches the up-to-date weather information from a server using XML data and displays the weather conditions (as illustrated in FIG. 18*b*) in a background view for various regions of the air-traffic monitoring area. Thus, the map looks like the weather broadcast maps commonly seen on TV. The weather component 1806 can update the weather conditions at specified time intervals using the external local source. When a user moves mouse over a flight image, the flight component 1816 gets wind speed and visibility information from the weather component 1806 and draws a circle around the flight 1816 to show the visibility. Additional information such as a numeric value of visibility may be indicated in the vicinity of the flight image. The weather information may, optionally, be stored in the XML data for each flight 1816. In this case, the portion of the data fields can be updated periodically with the current weather information.

The component for each of the flight 1816 may be custom-generated by an object instance of reusable GUI class for flight. This collision avoidance system 1820 could be replaced with appropriate business specific systems for other location-based applications. A transportation or shipping company may track its trucks using GPS; and the shipping company may use its business specific system to determine which truck is closest to the location where a customer has a package for delivery; and a taxi company may use its business specific system to identify a nearest taxi cab for a prospective passenger.

The GUI class for Airplane.java can be used for building Air Traffic monitoring applications. An example of Java Server Page (or JSP) program for an Air traffic monitoring system is shown in flight2_example.jsp in Appendix-Q2 file flight2_example.jsp. An example of replaceable component class for limited feature Air traffic monitoring system is shown in ATC_CF.java in Appendix-Q3 file ATC_CF.java. An example of JSP program that uses the replaceable ATC_CF.java class for presenting Air traffic monitoring system for three cities is shown in atc_example.jsp in Appendix-Q4.

Section-L

Difference Between Replaceable Components for Non-Web Applications and Web Applications The replaceable components can be implemented for desktop GUI applications. Implementation of each of a RCC (e.g.

FIG. 4b) encapsulates substantial portion of construction code and code for data (i.e. including code for accessing data from data sources such as RDBMS). So an object instance of the RCC requires just few lines of configuration code for example to input few pieces of data for including a RCC in an application and the SCC can be removed as a unit by removing or updating the few lines of code.

In case of web or online applications, server code (e.g. CGI or JSP) designed and implemented for generating application code, where the application code is sent to a client for executing on the client. But in case of desktop applications, the application code is directly implemented for executing on a desktop computer. The application code is either compiled for creating executable or interpreted for executing the application. For example, in case of web applications, the GUI RCC objects (e.g. 1031 and 1032 of FIG. 10b) of RCC classes are used to generate component code (e.g. 1035 and 1036) for respective GUI components; while in case of desktop applications, GUI objects of GUI classes are called for presenting respective GUI components. Likewise, in case of web application, integration logic is implemented in server code (e.g. 1033) for creating communication code (e.g. 1037) between the GUI components. But in case of desktop applications, communication code is directly implemented in the code of application for allowing communication or collaboration between the GUI components and other objects (e.g. ref to FIGS. 9a, 9b, 9c and 9d).

For example, line charts for stock quotes can be implemented as replaceable components.

10. ReplicableSCC RSCC1=new FullStockQuote_RCC (ACi, "IBM", parameters1);
20. ParentCanvas.AddChild (RSCC1, x_location, y_location, parameters2);

Where line 10 instantiates and initialize an object instance RSCC1 of replaceable component class (e.g. FullStockQuote_RCC in FIG. 5a). Each of the replaceable components (e.g. RSCC1) would become SCC once it is instantiated and properly initialized. Object instances of many RCCs may require more than one line of construction code for initializing. Line 20 adds the SCC to container component ParentCanvas at a location given by x_location and y_location. So in case of desktop GUI applications, the class definition for a SCC is RCC and a properly initialized object instance of the class is SCC (and also Replaceable-SCC, since the SCC can be replaced). Each of the RCCs substantially encapsulates construction code and/or data required for creating a self-contained component, while leaving a small portion of construction code for inputting data by container component for fine-tuning a self-contained component instance for its specific needs. In other words container component implements remaining few lines of construction code for turning the object instance of a replaceable component into self-contained component.

In case of web applications, the object instance of a replaceable GUI component generates code for presenting self-contained component. But in case of desktop GUI applications, the object instance of replaceable GUI component is called to draw and present its GUI component.

10. ReplicableSCC AC1=new AppComp1 (ACi,app_data1,config_data1);
20. ReplicableSCC AC2=new AppComp2 (ACi,app_data1,config_data1);
30. ContainerCanvas.AddChild (AC1, x_loc1, y_loc1, param1);
40. AC2.DisplayComp (ContainerCanvas, x_loc2, y_loc2, param2);

Two replaceable component instances AC1 and AC2 are instantiated and initialized at line number 10 and 20 respectively. At line 30 AC1 is passed as a subcomponent for a container component. At line 40 drawing method of AC2 is called to display its component.

For example communication between any two components in a desktop applications can be accomplished by implementing a callback method, so that, the callback method calls service method of first component and the callback method is registered with second component, so that, the callback method is invoked upon a given event such as mouse click or data input. For example, below shows a sample callback function.

10. void App_CallBack1 (comp_id1, event, data, version)
{
20. AC1.serviceMethod1 (event, data, version);
30. }

The above callback function calls service method of first component at line 20. To allow communication properly, callback function must be registered with second component, so that, the second component calls the callback function upon given event by passing proper data through its parameters.

10. AC2.setCallback2 (event, App_CallBack1);

So whenever a given event occurs, the second component calls service method of first component and passes data through callback function. Hence implementing communication code between any two self-contained components of two replaceable component instances is no different than creating communication code between any two reusable GUI component instances in an application.

The container GUI components in GUI API in prior-art such as Windows/VB are not designed for inputting larger RCC (containing many large GUI components). However it is possible to implement GUI API for modern platforms, such as, Adobe's Flash-player, HTML5 or SilverLight etc., for allowing RCCs. It is often not possible for inputting large replaceable GUI components, such as CityATC_RCC (a RCC for displaying Air traffic of a city) or LandMarks (a RCC for displaying Landmarks in a city), especially if the replaceable GUI components are again a container component. Furthermore it is often not possible to encapsulate construction code of a large self-contained component such as CityATC_RCC or LandMarks in a class-implementation, where the class-implementation is an RCC, where the class encapsulates substantial portion of construction code of a self-contained component. Although there is no limitation in newer underlying platforms and nearly same for both desktop and web-viewer/browser, the higher-level abstractions such as GUI API or reusable GUI classes in the prior art are not designed to allow encapsulation of such larger container components in replaceable component class. This invention is continuation-in-part of patents, which disclosed methods for building both (i) reusable GUI classes for container-GUI components that can accept large replaceable components as subcomponents and (ii) reusable GUI classes for GUI components such as charts, dials and maps, which can be assembled as subcomponents for building larger and larger replaceable components.

Figure 15A:
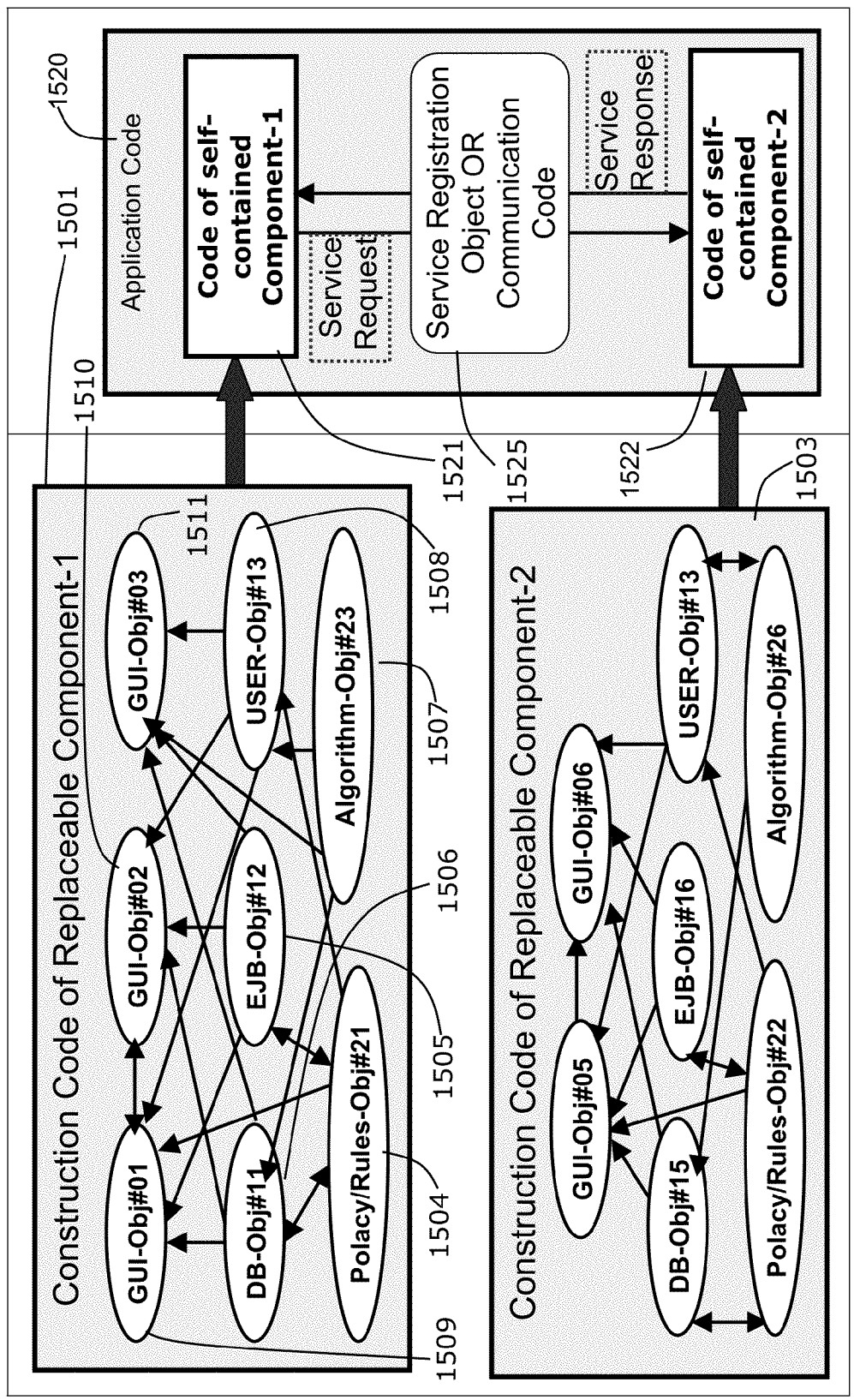
FIG. 15a shows internal construction code of two replaceable components and an application containing two self-contained components created by the replaceable components, according to one embodiment.
Figure 15B:
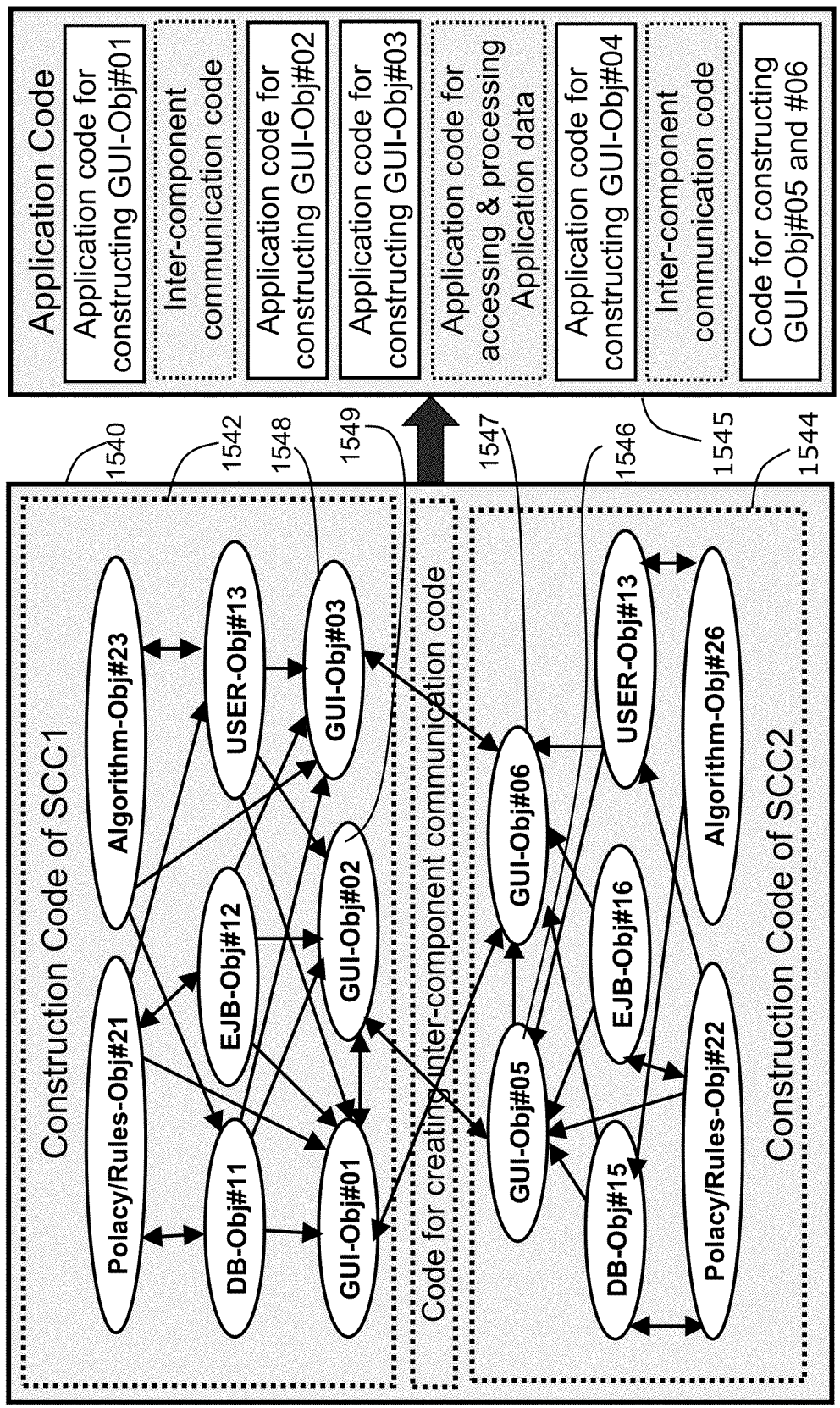
FIGS. 15b and 15c shows construction code for generating code for an application containing two self-contained components, where the application is generated without using replaceable components, according to one embodiment.

In prior-art most large components such as CityATC_RCC or Land Marks (in section-J) are not encapsulated or often cannot be encapsulated in a replaceable container such as class-definitions. It is desirable to build GUI API and tools for allowing encapsulation of each of the self-contained components in a replaceable container for disassembling and reassembling a self-contained component as a unit. If self-contained components are not encapsulated in replaceable-container, the code of even a small application having just two large self-contained components end up unstructured (e.g. FIGS. 15a, 15b and 15c illustrates the difference) making it hard to maintain each of the two components.

Figure 15C:
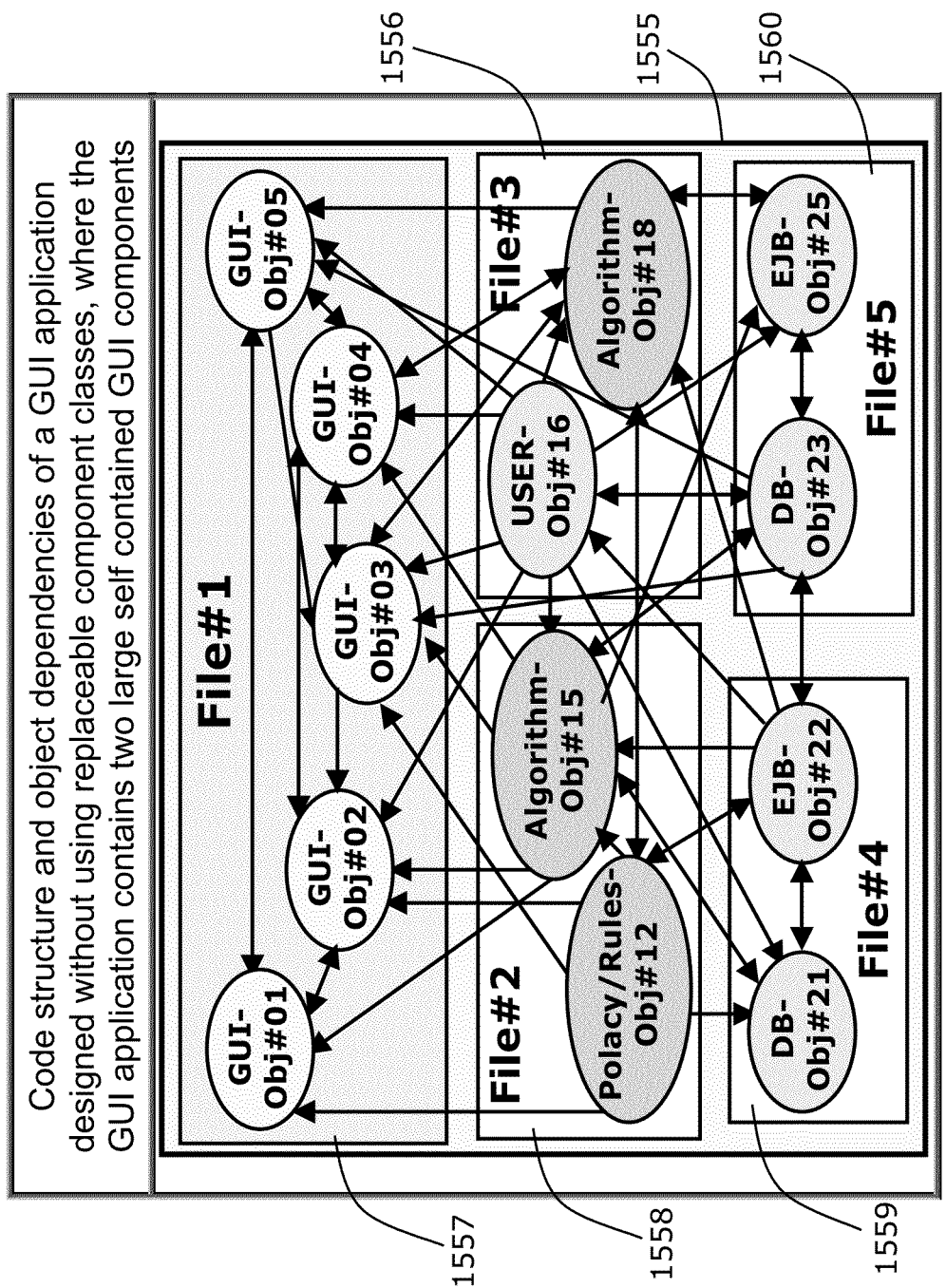

FIG. 15c shows server application code containing construction code for two self-contained components. But the construction code of the two components is intertwined, which means that one or more files comprise code chunks of construction code of both components with no physical demarcation or separation between various chunks of construction-code of each of the components. Hence if one of the self-contained components needs to be replaced/removed, it requires a lot of effort for locating and updating/removing construction code of the self-contained component.

This intertwining problem would only increase, if application contains more SCCs, component-hierarchies or as more SCCs are added to the application. This kind of wasted effort can be reduced if construction code of each of the self-contained component can be encapsulated in replaceable module such as a class definition and associated exclusive files.

Section-M

Implementing RCC for Non-GUI SCC

It is also possible to encapsulate construction code of a non-GUI component in a replaceable class definition, where the construction code is implemented to provide one or more related/similar services or functionality. These components do not present any GUI components and can be implemented for any kind of application such as either for web application or desktop application.

A class implementation of each of the replaceable components encapsulates construction code and implements interfaces for requesting services offered by the component. The communication code for such non-GUI SCC can be implemented either (a) In its container component, for example, by implementing communication code for the SCC by using coupling interfaces or methods of its RCC, or (b) including communication code within the construction code of the SCC, for example, by including code for registering its services with a predefined global service registration object (or SRO). Some examples for non-GUI SCCs:

Example. 1

Spell Checker Component

Services associated with spell checking can be implemented as a class definition. This class-definition supports a service functions, such as "check_spellings( )", "get_suggestion_word_list( )" or "get_synonyms( )". Where function "check_spellings( )" can be called by passing a sentence or a phrase and the function returns a list of words that are spelled wrong. The other function "get_suggestion_word_list( )" can be called by passing a miss-spelled word to get list of potential correct words. To assemble this spell checker component in an application one needs instantiate and initialize an object instance of its RCC. The object registers its services with SRO, so that any other parts in the application can look up the services using pre-defined service names for requesting the services.

The main design objective of replaceable component is to separate "design and implementation of construction code of a self-contained component" from "assembling and using the self-contained component" as a subcomponent in an application. The implementation steps for assembling include (i) properly including an instance of SCC in an application (e.g. by using the RCC of the SCC) and (ii) creating communication code so that the SCC can properly collaborate with other parts of the application for performing its operations and features, only if the SCC requires to collaborate with other parts (some SCCs don't need to collaborate with any other parts).

1. Rep_SCC SpellChecker=new RC_SpellChecker (ACi, Dictionary, null);

SpellChecker object registers its service (e.g. "check_spellings ( )") method with the SRO using a pre defined lookup name such as "Spell Checker", for other components to look up and access the service. Since it implements the code for registering its services with SRO internally in RSCC, no more communication code may be required in its container application, according to one embodiment.

Example 2

Mortgage Calculator

Services associated with calculating mortgage and monthly payments can be implemented as a RCC definition. This RCC definition supports service functions, such as "get_mothly_payments( )", which can be called by passing total mortgage amount, total period of mortgage in months or years, interest rate and other parameters for calculating lists of monthly payments and various parts in each monthly payment. Each monthly payment contains two parts (i) interest pert of total payment and (ii) principle part of total payment. When a lender pays a month's payment a portion it is applied to reduce the principle loan amount, where this part would be minimal in the beginning of the mortgage period and increases as the payments nearing the mortgage period. This mortgage calculation may require taking into consideration many factors such as banks-policies, tax implications, customer preferences/profile and government regulations or incentives. The object registers its services with SRO, so that any other part in the application can lookup the services using pre-defined service names (e.g. "Mortagage Caliculator") for requesting the services.

Example 3

A Replaceable Component Implemented for a Compiler

A compiler may implement a Replaceable Component class for processing arithmetic expressions and generate machine assembly code. When the compiler encounters an arithmetic expression or equation it calls appropriate service function of this object by passing the input stream of the file under compilation. This function processes the expression or equation for generating assembly code by using the compilation context such as variable name space and available math library.

Example 4

Collision Avoidance System for an Air Traffic Control (ATC)

Example CityGIS application in 'Section-J' above discussed ATC and collision avoidance system. Any service such as collision avoidance system required by an application can be implemented as a replaceable component class, where the collision avoidance system implements code for frequently accessing the positions and other information such as location, speed, direction and height about each flight in the airspace. It also uses this information for detecting any emerging threat of collision. The container component of the collision avoidance systems needs to create required communication code so that, when a potential threat is detected, the collision avoidance systems contacts appropriate SCC to warn about the potential threat or raises an alarm for air traffic controllers.

Example 5

Services Implemented in Embedded Applications or OS

A large and complex software system such as Operating System (OS) of a computer or embedded application of complex devices implements and uses many non-GUI services. Some of those services in turn may be very large requiring thousands of lines of construction code for implementing each of the services. It is desirable to implement each of such large service-modules as a RCC by encapsulating construction code in a class definition. Also, It is desirable to design the class definition so that its object instance to have loosely coupled interfaces (e.g. for using a SRO 810 in FIG. 8a) or simpler coupling interfaces for accessing its services or for providing services to it and easily replaceable as a unit.

Each of the SCCs may be created for performing a subset of functionalities belong to a set of wide range of possible functionalities such as (i) processing, analyzing or searching a large data sets/sources/files (ii) collecting data from user, other sources or other components in the application, for example, to process, analyze or archive in a non-volatile memory for future use. For example, a SCC for collision avoidance system for air traffic collects real time data from Airplanes and analyzes the data to detect potential collisions. Also the data may be archived to analyze air traffic patterns later for optimizing air traffic. For another example, an SCC for search engine processes many files and creates tables for key words. Another example is a data collection form, displays a form and accepts user inputs for storing the collected user data in a database. These are only a partial list of possible functionalities that can be performed by the SCCs.

In case of non-GUI applications it is desirable to manage dependencies of each SCC using utilities or tools (e.g. SRO in FIG. 14a), where each self-contained component object is created by instantiating and initializing an instance of replaceable component class (e.g. Appendix-U2). Where properly initialized object instance is a self-contained component. The self-contained component may (a) require one or more external services and/or (b) provide one or more services for external parts. Hence each of the self-contained components further needs to be properly coupled by creating necessary communication code, if it needs to collaborate with external parts.

In one of the preferred embodiments, each replaceable component class is a subclass of an abstract class (e.g. ReplaceableComponent in Appendix-U2), which comprising of two abstract functions, where the first abstract function is to register all the services provided by the self-contained component and the second abstract function is to lookup and save references of all the objects or functions that provide required services. Each of the class definition of a replaceable component implements this kind of functions for registering all its services and for getting references for functions for getting required services, and calls each function whenever it needs respective service. For example, Appendix-U2 has sample implementation code for these two functions (e.g. register_all_services_provided and lookup_all_services_required) at the bottom comments section.

Each of the objects of replaceable components (i.e., RSCC) in an application registers itself with a global component management object or CMO. The CMO can be same as SRO (see FIG. 14a) or it can be a different object. For example:

10. ReplaceableSCC RC1=new ServiceProvider1 (Rci, gso, sro, Data1);
20. CMO.Register_SelfContainedComponent(RC1);
30. ReplaceableSCC RC2=new ServiceProvider2 (Rci, gso, sro, Data2);
40. CMO.Register_SelfContainedComponent(RC2);

Where the class definition of ServiceProvider1 is subclass of abstract class ReplaceableSCC, hence it must implement the abstract functions of the abstract class. During initialization of the application, the CMO first calls the function of each of the objects (e.g. RC1 and RC2) to register services provided by its self-contained component. Once calling all the objects to register services, the CMO calls the function of each of the objects to lookup services required by its self-contained component. In this above simple example, self-component RC1 or RC2 can be removed by removing respective two lines or replaced by another component by properly updating the two lines.

Since code for each of the RSCC also comprise of code for creating required couplings between the RSCCs, such as finding required services, it minimizes required code for assembling its SCC into an application to just a few lines. Also the SCC may be removed from the application by removing the few lines. Container application doesn't require creating communication code for including such RSCCs, since the construction code for the RSCCs also comprises of necessary parts of communication code for finding and collaborating with each other.

Section-N

Summary for Self-Containing Component (SCC) and Replaceable Component Class (or RCC)

Any properly functioning large or small GUI component (e.g. FIG. 3a or 4b) in any application is a self-contained component. Any incompletely implemented component instance cannot function or operate properly in an application. For example, a functioning pie chart 304 (or object Pie1 at line 19 of 306) in an application cannot function, without properly implementing all the necessary construction code such as code for accessing required data and application logic that uses the data for initializing a GUI object of a reusable GUI class for a pie chart. But reusable GUI class for pie chart is not a self-contained component, since it requires lot of construction before it can be perform its operations (e.g. GUI features) in an application. Any instance of properly functioning pie chart is a SCC and all the application code implemented for presenting the properly functioning pie chart instance is construction code of the SCC. The code of a SCC also include code for proper operation of the SCC, such as processing events (e.g. mouse clicks), providing services for external parts and accessing services of external parts, for example for fulfilling its operations and proper functioning.

It is possible to encapsulate substantial portion of construction code required for properly presenting a large self-contained component (large SCC) in a definition of a RCC an associated files, then it is possible to include the SCC in an application as a unit or replace the SCC as a unit by using the RCC. In prior art, construction code of a large SCC is often not encapsulated in a class definition, especially if the construction code uses multiple GUI components and objects (e.g. GUI objects and other objects for building an SCC as shown in FIG. 4a or 4b). Few examples for large SCCs include Air Traffic Control, Landmarks or TouristSpots are discussed in the above City-GIS example.

A replaceable component (e.g., 435 of FIG. 4b) is a class or module designed to encapsulate substantial portion of the construction code of an SCC in order to offer a means for directly or indirectly allow both assembling and removing the SCC as a unit. A replaceable component or a RCC also exposes the services of the SCC through communication interfaces (e.g. coupling functions), which are used for creating communication code, where the communication code allow other parts of the application to communicate or collaborate with the SCC instance of the RCC.

Code for 'SCC' refers to code sections that include all the construction code for properly implementing a functional component in an application (FIG. 3c, 4a or 4b). In other words code for an SCC includes code implemented for providing functionality, features, associated data and code for accessing required data for properly running and operation of a component. Preferred embodiment encapsulates almost all of the code necessary for building an SCC in a class definition called replaceable component (or RCC), so that the SCC not only can be included into an application or web page as a unit but also may be removed as a unit (e.g. by using the object instance of the RCC).

According to one embodiment, once a RCC is implemented for a SCC (FIG. 3c or 4b) in the context of a target application, for using the SCC as a subcomponent the application required to concerned only about (a) its dependencies on external services for its proper functioning and (b) its communication interfaces for inter-component communications, if its services are required by the container component or another subcomponent. Implementation of a RCC encapsulates substantial portion of construction code of its SCC. Hence a container application of each replaceable component doesn't require understanding implementation details and internal operations.

Example-1 of Section-N

Building a Simple Self-Contained Pie Chart Component Using Just One Instance of Reusable GUI Class of Pie Chart To present a pie chart in an application using a reusable GUI class for pie chart, the application must implement construction code for accessing and processing the necessary application data from appropriate data sources for the pie chart and use the data to properly instantiate and initialize (e.g. construct and configure) an object instance of the pie chart class. If the pie char GUI component is just a GUI feature in the application and if it doesn't need to collaborate with any other parts/SCCs of the applications, then there is no need for implementing any communication code. (e.g. see FIG. 3a). This fully initialized object-instance of pie chart GUI component is a self-contained component or SCC, since it requires no additional construction work to perform its operations. But it requires removing all the above construction code to properly remove the SCC for the pie chart. So the SCC (e.g. SCC1) has low degree of replaceability (for example, to refine and test SCC1 autonomously).

It is possible to increase the degree of its autonomy, if all this application code is encapsulated in a class definition (referred to as RCC), so that, the comparable SCC can be included in the application by implementing just few (e.g. 347 in FIG. 3c) lines of code to instantiate and configure the object instance of the RCC class, where the fully initialized object instance is also a SCC (offering the same feature no different than SCC1). Since the new SCC can be removed by removing the few lines of code, it is also a replaceable-SCC (or RSCC).

Example-2 of Section-N

Building a SCC for Stock Movement and Volumes Traded Using Two Reusable GUI Classes for Line Chart and Bar Chart To present a line chart (e.g. 421) in an application using a reusable GUI class for line chart (e.g. 421), the application must implement application code for accessing and processing the necessary application data from appropriate data sources for the line chart (e.g. 421) and use the data to properly instantiate and initialize (e.g. construct and configure) an object instance of the line chart class (e.g. 421). Refer to FIG. 4a.

To present a bar chart (e.g. 422) in an application using a reusable GUI class for bar chart (e.g. 422), the application must implement application code for accessing and processing the necessary application data from appropriate data sources for the bar chart (e.g. 422) and use the data to properly instantiate and initialize (e.g. construct and configure) an object instance of the bar chart class (e.g. 422). If the two GUI components need to collaborate with each other, then more application code must be implemented to allow necessary communication between the two GUI components.

If the two GUI components are just a feature in the application and if don't need to collaborate with any other SCCs in the applications, then there is no need for implementing any other communication code of coupling interfaces. These two fully initialized object-instances of line chart and bar chart are two SCCs, since each requires no more construction or configuration to perform respective operations.

However, in another perspective, the two GUI components can be considered as two features of a larger-SCC. It is a design choice, weather to implement a RCC for each GUI component or not to implement too many small RCCs. Usually it is not useful to create a RCC for smaller SCCs, according to one embodiment. It requires removing all the above application code to properly remove the larger-SCC, so the lager-SCC has low degree of replaceability (or autonomy). It is possible to increase the degree of autonomy of the larger-SCC, if all this application code (e.g. 400 in FIG. 4a) is encapsulated in a RCC, so that, the larger-SCC can be included in the application by implementing just few (e.g. 2 to 3) lines to instantiate and configure the object instance of the RCC.

Example-3 of Section-N

Building a Larger-RSCC for CityATC Using Multiple Reusable GUI Classes and Multiple Object Instances of Reusable GUI Classes In an exemplary embodiment, assume an independent application for CityATC (i.e. Air traffic control of a city) is created using many reusable GUI classes to present many kinds of GUI components such as airplanes, information tables, message windows and charts etc. Also, the application needs to display many instances of airplanes, tables and massage windows etc. To accomplish all this, the independent application must implement application code in many files for performing many tasks such accessing near-real time data from various data sources. Also likely use other kinds of files, such as files for images, JavaScript, configuration or stylesheets.

Alternatively, if it is possible to implement a RCC and a set of exclusive files for comprising the SCC for CityATC and other assonated resources, then the CityATC can be include into an application by implementing just few lines for instantiating and initializing an object instance of the RCC. Also the CityATC can be removed from the application by removing the few lines. If the CityATC don't need to collaborate with other SCCs, then no communication code in required. The class definition (i.e. RCC for CityATC) may implement nearly similar set of files, since most of the files are not required to be much deferent from the files for the independent application for CityATC. The files created for RCC of CityATC constitute the autonomous code base of the SCC of CityATC.

If the SCC for CityATC is not encapsulated in a RCC and set of associated exclusive files, then the SCC requires lot more work for including in the larger application and also requires lot more work to remove from the larger application. This may be illustrated by comparing work required for implementing and including the SCC for CityATC between the two available options (i) implementing a RCC and (ii) without implementing a RCC.
1. Implementing a RCC: In this option, it is required to implement a RCC and associated exclusive files, which comprises substantial part of the construction code for SCC of CityATC. The exclusive files only contain resources required for the SCC. CityATC is included by instantiating and initializing an object instance of the RCC, where the instantiation and initialization implements any remaining construction code for the SCC. If the SCC needs to communicate with other parts of the larger application, it is possible to implement coupling interfaces in the RSCC and for the larger application to implement necessary communication code for the SCC. To properly remove the SCC from the larger application, it is required to remove code implemented for instantiating and initializing object instance of the RCC and any communication code implemented for the RSCC.
2. Without using a RCC: It is required to locate and properly remove/update all the code-sections implemented for constructing and coupling the SCC from all the non-exclusive files containing code sections for the SCC to remove the SCC, if the code-sections for constructing CityATC's SCC are included in non-exclusive files. If the SCC needs to communicate with other parts of the larger application, necessary communication code must be implemented in non-exclusive application files.

Exclusive and non-exclusive files of a SCC. If code-sections of construction code of a SCC (e.g. CityATC) are implemented in multiple non-exclusive files for the SCC, where a non-exclusive file of a SCC means the file contains construction code for other SCCs of the application. It requires redesigning the multiple non-exclusive files, if it is required to remove the SCC. A resource is considered a shared resource, if more than one SCC uses the resource. This SCC may use shared resources such as SRO or APP_xyz_services, but the files associated with implementing such a shared resource are treated in this context as shared files (but not considered as non-exclusive files). However, if parts of the construction code of the SCC also included in the shared files, then they are treated as non-exclusive files for the SCC.

It also requires more work to find code-section in many non-exclusive files to redesign the SCC, for example, for adapting to evolving needs in the future. If substantial portion of construction code of a SCC is implemented as a RCC and included in exclusive files, it requires less work to reuse the construction code for creating a new RCC for another new application by redesigning the code base of the RCC, if a new application requires similar SCC.

Section-O

Communication Between SCCs and Remote Data Sources

Figure 11A:
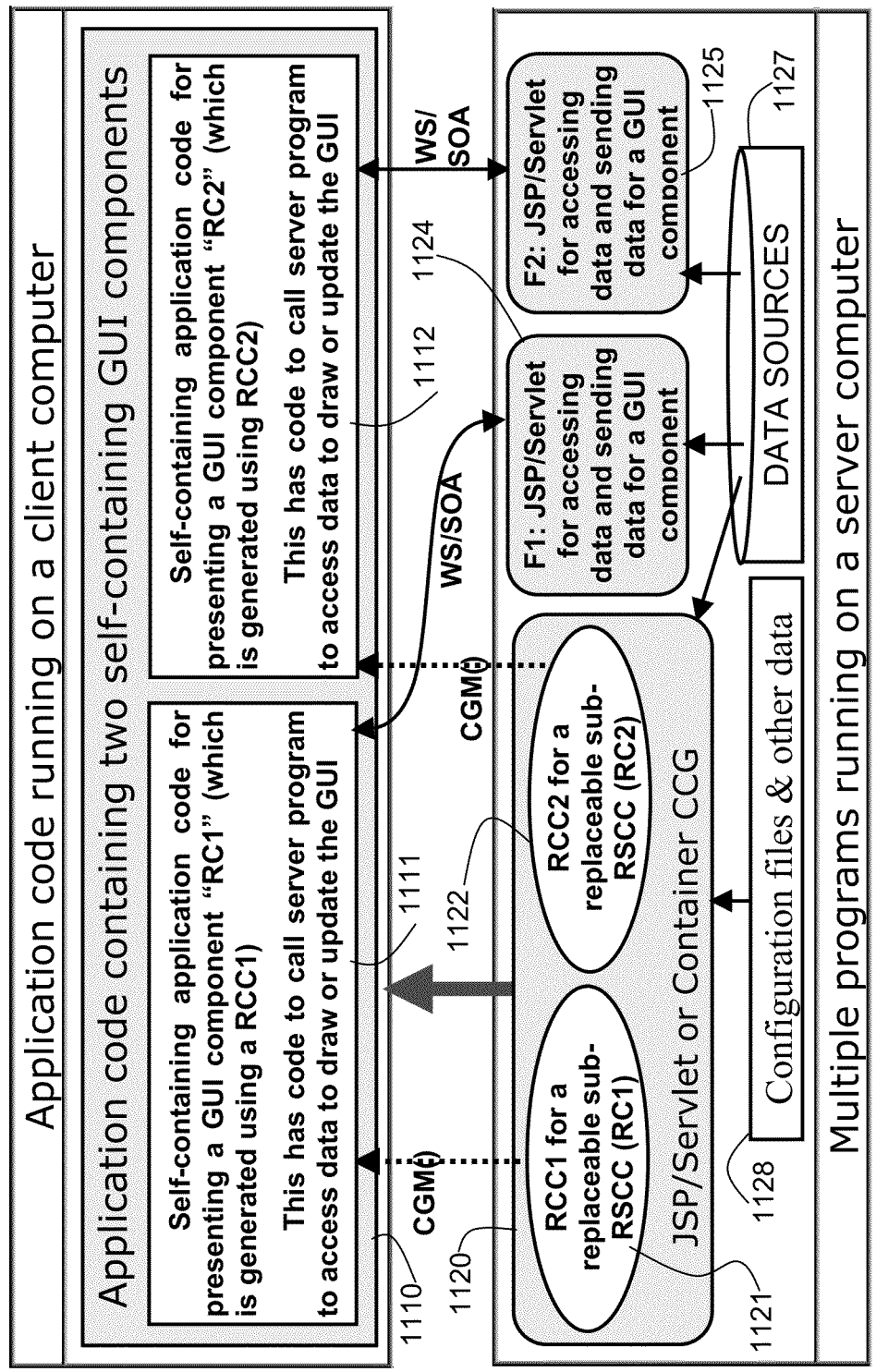
FIGS. 11a and 11b shows self-contained components in an application that communicate with server applications for getting data and using the data for updating the self-contained components, according to one embodiment.

FIG. 11a shows a container server application 1120 that creates application code for container component 1110, which is having two self-containing subcomponents 1111 and 1112. The server application 1120 instantiates and initializes objects RCC1 1121 and RCC2 1122 using two RCCs. The server application 1120 calls CGM of RCC1 1121 and RCC2 1122 for generating application code for RC1 1111 and RC2 1112 respectively. The server application 1120 accesses require data from data sources 1127 and configuration files 1128 and uses the data for initializing RCC1 1121 and RCC2 1122 objects. Furthermore RCC1 1121 and RCC2 1122 comprise construction code for accessing required construction data from data sources 1127 and configuration files 1128 and uses the data for constructing application GUI components RC1 1111 and RC2 1112 respectively.

A replaceable component class encapsulates almost all required construction code (e.g. code for data access, one or more GUI classes and application logic) for a self-contained component in a replaceable container such as class definition or module. In FIG. 11a RCC1 1121 is a replaceable component. Also in effect code module 1112 is also a replaceable component, since it can be removed or replaced indirectly as a unit. But in non-web or desktop GUI applications initialized replaceable object will be the self-contained component.

Self-contained components RC1 1111 and RC2 1112 comprise of code to communicate with server programs F1 1124 and F2 1125 respectively. For example, RC1 1111 can use an URL and passes 'post' parameters to execute server program 1124 for obtaining server data in XML format and use the XML data for updating itself. Where "WS/SOA" stands for "Web Services" or "Service Oriented Architecture". This method of components in a web page asynchronously communicating with server for obtaining XML data is popularly known as AJAX.

If F1 and the files associated with F1 are created to exclusively serve RSCC of RCC1 1121, the files are also considered to be part of exclusive code base for the RCC1 1121. This is a deviation from normal practice in the prior-art. In prior-art, the executable F1 is considered as a component that communicates with component, which is client application 1110. Since any changes made to F1 only affects RCC1 and vice versa. They are conceptually two complementary parts of a SCC, but are separated only because RC1 1111 cannot directly access data from data sources (e.g. 1128 and 1127) on the server. For example, conceptually F1 is created for overcoming the problem for accessing construction data for RC1 1111. In another perspective, if another application requires RCC2 1122, it needs all the files associated not only with class definition but also F2. So the files for F2 and RCC2 1122 are conceptually created for a RSCC.

For example, in RC1 1111 presents a Flight image in an ATC application (FIG. 18a), upon click on the Flight image, the component calls F1 on sever for obtaining latest data about flight (e.g. longitude, latitude and altitude etc.) and display the data in a table by calling a service method of an Info-table component. Appendix-Q3 has RCC (i.e. ATC_CF) for a simple Air Traffic Control SCC. The ATC_CF can be used to include a RSCC for ATC in an application, in an example embodiment. The RSCC calls a server application (e.g. get_loc.jsp in appendix-S2) every few seconds to get latest locations for moving moves the airplanes. Likewise, when user clicks on an airplane the server calls another server application (e.g. get_info.jsp in appendix-S2) for getting latest information about the airplane and displays the information in a table.

Since these files are used exclusively with RCC ATC_CF, such files are treated as exclusive files and belong to exclusive code base (e.g. Set-X, which is described in section-W) of the RCC of ATC_CF, according to one embodiment. If another application requires similar ATC_CF, it is desirable to take the all the exclusive files (including the files associated with server applications) for redesigning the ATC_CF to satisfy unique needs of the new application, according to one embodiment.

Likewise, if RC2 1112 presents a Dial image to set a new value for a device to control a PowerStation, the component calls a F2 1125 on a computer that can physically change setting of a device (such as temperature setting) and sends acknowledgement or actual updated value back to the component 1112 RC2. RC2 uses the updated value to display value in Dial component in webpage. In this setup F2 1125 communicates with a device driver that controls physical settings on an apparatus. When user changes settings in 1112 RC2, RC2 passes the new setting to F2 1125. The F2 1125 in turn calls the device driver to update the setting. The device driver updates setting and returns actual value set successfully to F2 1125, which then returns the value to RC2 1112 to update the display. It is possible to merge RC2 1112 and F2 1125 into a replaceable component class, if application is implemented as a desktop application. The F2 1125 and associated files conceptually treated as exclusive files and belong to exclusive code base (i.e. Set-X discussed in section-W) of RCC2 1122, according to one embodiment.

Figure 11B:
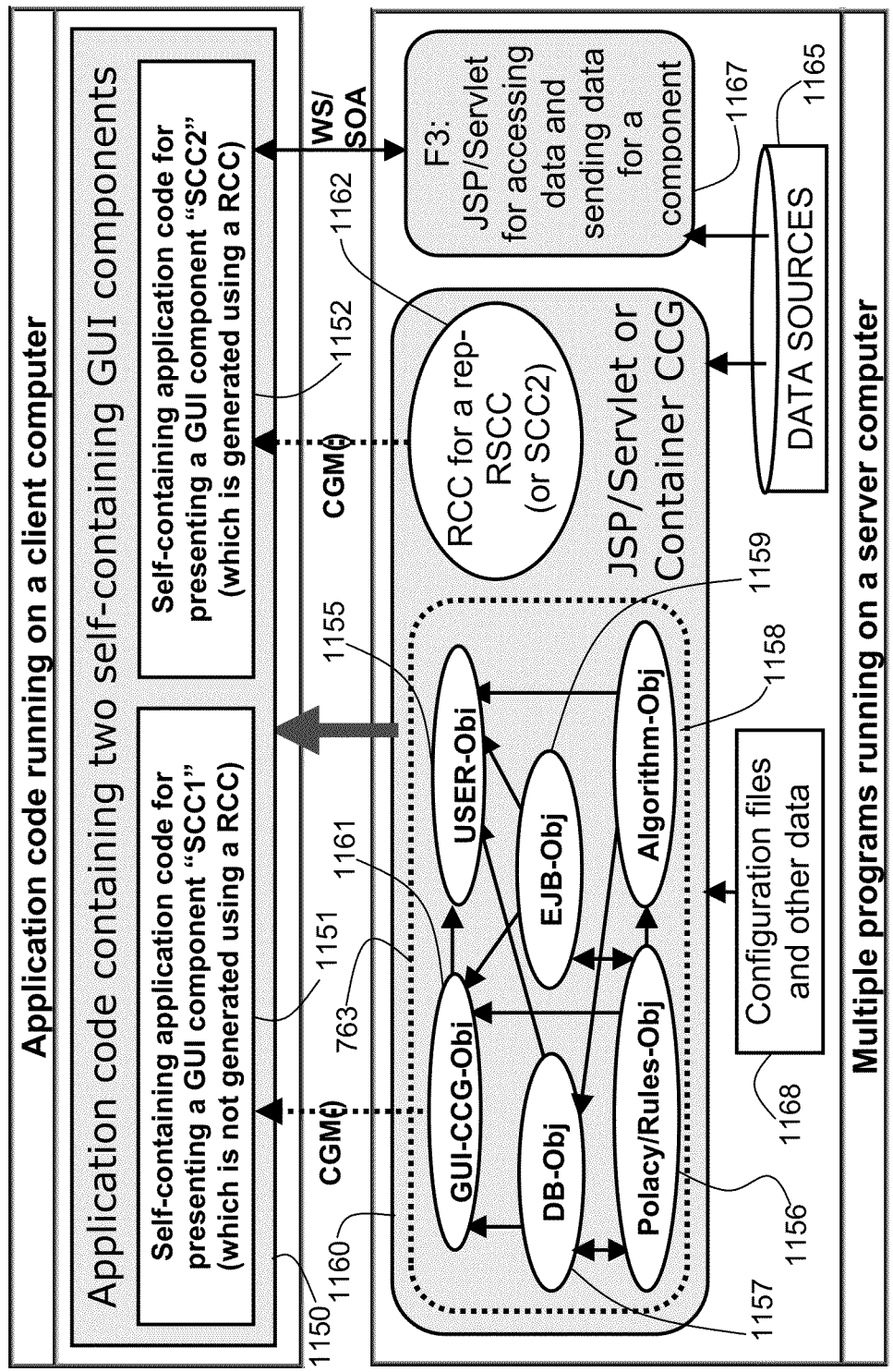

FIG. 11b shows a server application 1160 that creates an application code for a client application 1150, which contains two SCCs, which are SCC1 1151 and SCC2 1152. The server application 1160 instantiates a reusable GUI class 1161 object. It further contains construction code 1163 for accessing required data and configuration information from data sources 1165 and configuration files 1168 and application logic for processing the data to initialize the reusable GUI class 1161. Then server application 1160 calls CGM of GUI class 1161 for generating application code for SCC1 1151. The server application 1160 instantiates and initializes a RCC 1162 and calls it's CGM for generating application code for SCC2 1152.

Although reusable GUI class 1161 builds code for SCC1 1151, SCC1 is not a replaceable component since server application 1160 implements or contains many lines of construction code 1163 for building SCC1 1151, where construction code 1163 includes many objects (e.g. 1156 to 1159), code to access data from data sources 1165, configuration files 1168 and application logic to process the data and properly initialize the reusable GUI class 1161. This entire construction code 1163 comprising many lines or sections of code in the server application 1160 must be properly removed to remove SCC1 1151. Hence although 1151 is SCC, it is not replaceable because it needs removing many sections of construction code 1163 from server application 1160. To be replaceable component (i) it must encapsulate substantial portion of constriction code of a SCC in a class definition and (ii) it must directly or indirectly allow including/removing the SCC as a unit.

On the other hand, a RCC 1162 encapsulates almost all the construction code in a replaceable container such as class definition. Also in effect code module 1152 is also a replaceable SCC, since it can be removed indirectly. In non-web or desktop GUI applications instantiated and initialized object instance 1162 is SCC.

SCC2 1152 comprise of code to communicate with server program F3 1167. In this example embodiment, component 1152 uses an URL and sends post-parameters over Internet for invoking server program F3 1167 for getting data from sever in XML format and use the XML data for updating itself. Where "WS/SOA" stands for "Web Services" or "Service Oriented Architecture" respectively, which are popular methods in prior-art for accessing data from remote data sources.

In a special case, replaceable component RCC 1162 may not contain data access code for initializing its GUI components, but implement or include data access code in client code of SCC2 1152. In that case, when SCC2 1152 need to display its component or during initialization, SCC2 1152 calls F3 1167 for getting data and uses the data for updating its GUI component. F3 1167 implements data access code for getting, processing data and sending the data to SCC2 1152. SCC2 1152 contains code to use the data to initialize and display its component including its subcomponents. This method is preferable if the data for component of SCC2 1152 changes frequently during the period application is running on client and the change in data need to be reflected by redrawing the SCC and subcomponents. For example, this method of SCC2 requesting latest data from F3 1167 may be triggered upon an associated event such as data change event or at pre-set intervals.

In an exemplary embodiment, an RSCC (e.g. 1152) can be implemented to periodically (e.g. by setting a timer) access data from servers over the Internet and use the data for redrawing or updating the RSCC. The server contains a serve-application (e.g. 1167) for accessing required data for the SCC from data sources (e.g. 1165). SCC2 1152 uses appropriate URLs for calling server application F3 1167 for getting required data from data sources 1165 on server.

If F3 1167 and the files associated with F3 are created to exclusively serve SCC2 1152, the files are also considered to be part of exclusive code base for the RCC for object 1162. This is a deviation from normal practice in the prior-art. In prior-art, the executable F3 is considered as a component that communicates with another component, which is client application 1150. Since any changes made to F3 1167 only affects SCC2 and vice versa. They are conceptually two complementary parts of a SCC, but are separated only because SCC2 cannot directly access data from data sources (e.g. 1165) on the server. For example, conceptually F3 1167 is created for overcoming the problem for accessing construction data for SCC2.

In an exemplary embodiment assume that RCC 1162 don't access any data and SCC 1152 has code to call a server application F3 1167 to get data for redrawing itself periodically. In this special case, replaceable component 1162 does not contain data access code for getting construction data or initialization data. Instead it includes required code in the code of SCC 1152 for requesting service of an application F3 1167 running on a server, which accesses latest data and uses the data for constructing the SCC 1152. In other words, the SCC 1152 comprises of application code for using appropriate URL for calling F3 1167 for getting data and redrawing itself using the data.

The self-containing components can also comprise of application code for requesting services of JSP files for just updating the state of the component. For example, in air traffic control application each Airplane component calls a JSP file for getting latest location and updates the location of the location on the map. This JSP is not accessing initialization or construction data, but providing a run-time service for a self-containing component. In general a replaceable component for web application required to encapsulate all the construction code including the code for accessing all the required data for constructing its self-containing component, except in the special case where required functionality of the components is to redraw the component more than once by accessing construction data from an application (e.g. 1165) at run time. If one or more server applications are created exclusively to serve a RSCC of a RCC, then the files associated with the applications also belong to exclusive code base of the RCC (i.e. Set-X, which is described in section-W). For example, if another application needs to use the code base of RCC for creating a custom version, it requires files belong to the RCC and server applications serving the SCC of the RCC.

If data required for a RSCC (either in web or non-web cases) is only available on remote server and the RSCC must access the data to update itself, it is not practical to avoid using an external module such as JSP for accessing construction data. The RSCC comprise code for calling server application to get data and using the data appropriately. For example, implementing database access code such as embedded-SQL statements in the code of SCC (e.g. 1152) is not practical or desirable due issues such as security risks or performance. Hence this result in moving few sections of construction code such as application logic for processing data or authenticating user profile in to an external JSP file.

But in case of a replaceable component for desktop GUI applications, it is possible to encapsulate this data access code in the replaceable component. So implementing external module for data access can be eliminated in case of desktop applications, where self-contained component can access data sources directly. However, in certain cases even the non-web application need to get data from remote servers. So the remote application (e.g. a JSP) created for a RSCC and running on a remote server for serving exclusively a RSCC belong to exclusive code base of the RSCC, according to one embodiment.

Although application component (e.g. 1112) is self-containing, server side class (e.g. 1122) creating the application component is not self-containing but substantially self-containing. That is, the RCC class encapsulates substantial part of construction code for its self-contained component, and object instance of RCC still needs few pieces of data for completely initializing the RCC object. A container application 1120 implements few lines of construction code to supply few pieces of data to object instance of RCC before requesting the object to create a SCC.

10. Rep_SCC IBM_quote=new StockQuoteRC (ACi, "IBM", config_data);
20. IBM_quote.display_comp(ParentCanvas, x_loc, y_loc, config_data);

Where the newly created object IBM_quote at line 10 is used to draw the component on a parent canvas at line 20. At line 10, container component inputs construction data such as ticker symbol "IBM" and ACi object (see AC_Info class in Appendix-C), which comprise of few pieces of data such as DB-connection objects, browser/viewer type/version or profile of requesting user.

Likewise, each RCC for the desktop applications is substantially self-contained but not fully self-contained. Each of the RCC are often designed so that it's object instance needs just few lines of construction code for inputting few pieces of data. Once the object instance is initialized by supplying required data, the object will become self-contained component for the desktop application.

Section-P

Description of Replaceable Components or RCCs

The RCCs are different from any other known kind of software components, such as reusable components. The objective of a RCC is to replace many sections of construction code of a SCC that otherwise spread across many non-exclusive files of an application by instantiating and initializing an object instance of a RCC. Like the SCC it is replacing, the RCC is also designed in the context of the application and other SCCs that are collaborating with the SCC, according to one embodiment. Each RCC is custom designed to satisfy unique needs of an application and to allow for easy updates to meet often-unpredictable evolving future needs. The main design objective of the replaceable components is to increase degree of (1) autonomy of code base and (2) reducing code for including and coupling by making the interfaces simple and reducing the code needed for coupling of its SCC (e.g. by using SRO in section-F), for increasing degree of replaceability.

Each SCC is a component in an application, where the component is used for performing a set of desirable operations of the application, wherein the operations of the SCC include one or more of the following set (i) Provides one or more features or functionality of the application (ii) Provides one or more services for other components or parts of the application, or (iii) Also depends on services of other parts or components or collaborates with other parts or component in the application for performing its operations.

FIGS. 3a and 3c shows an example for a simple feature, where the object instance 306 of reusable GUI class of the pie chart or each of the other objects (e.g. EJB-Obj or USER-Obj) used in the construction code 340 is not features of the application, so they are not self-contained. The fully constructed Pie chart for a user portfolio 304 is a SCC, since it is a feature of an application. For another example of another feature of an application comprising two GUI components, FIG. 4b shows a SCC 440 having more than one GUI components, which are a line chart 432 and a bar chart 431. The GUI components in FIG. 4c are created using two object instances GUI-Obj#1 and GUI-Obj#2 respectively, where GUI-Obj#1 is an object instance of a reusable GUI class for line chart and GUI-Obj#2 is an object instance of a reusable GUI class for bar chart 431. The construction code 430 for RSCC 440 uses many other objects such as USER-Obj#5 or EJB-Obj#8, where each object is used for constructing a SCC but don't offer an autonomous feature of the application.

A feature (e.g. 440) can have sub-features (e.g. 431 and 432), where it is possible to implement a RCC for each sub-feature and container-feature (e.g. 440) can be built by assembling RSCCs of the sub-features, in an alternative embodiment, For example, large SCCs such as CityATC 1861 or CityHotels 1863 may have several dozen sub-features or sub-SCCs but these sub-SCCs are not designed as RSCCs, in one of the embodiments disclosed in section-J. In an alternative embodiment, it is possible to assemble some of the sub-SCCs as RSCCs by implementing and using RCCs. For example, some sub-SCCs in the RSCC 1862 for CityLandmarks are included as RSCCs (e.g. Theaters 1864, Hotels 1865 or TouristSpots 1866 in FIG. 18*b*) by implementing and using respective RCCs (e.g. 1854, 1855 and 1856).

An RSCC is considered self-containing even if it collaborates with or depends on external services in its operations or functioning as long as its collaboration is either providing services or consuming external services through communication or coupling interfaces. The main design objective of a RCC is not reuse of a SCC but to meet unique needs of an application, by being easily replaceable and having higher degree of autonomy in order to easily adaptable to evolving needs.

RCC are different from the reusable components such as GUI API or reusable GUI classes. A RCC in general requires redesigning its code to create a new version for use in a new application.

In contrast, the design objective of a reusable GUI class of a large GUI component is to make the GUI class reusable across multiple applications without the need for redesigning the component for each of the applications. Hence, a reusable GUI class is designed to offer many configurable features and interfaces for initializing and configuring its GUI component to meet unique needs of each of the applications.

For example, to build a large functional self-contained GUI component (e.g. Pie chart 304 in FIG. 3*a* or line chart 421 in FIG. 4*a*) for an application requires many lines of code for accessing data 510, application logic in addition to instantiate, initialize and configure the GUI object 408 instance of a reusable GUI class. To properly remove the GUI component 304 from the application requires removing or updating all those lines of code associated with the GUI component in addition to the code for instantiating and initializing the GUI object. Although line chart 421 is self-contained, the GUI object of the line chart alone is not a replaceable component because code of application logic and data access for line chart is not encapsulated within a component scope (e.g. an RCC class definition). For example, a reusable GUI class of a large GUI component in general can be neither self-contained nor replaceable.

A replaceable component is a smaller self-contained replaceable part of a larger application. For example, a container component can assemble a replaceable component (e.g. FullStockQuote in FIG. 6*a*) by (i) instantiating an object variable using the replaceable component's class definition, and (ii) implementing a few lines of code for initializing and coupling the replaceable component using the object. The replaceable component can be disassembled from the container component by changing or removing the code statements that refers to the variable. A SCC is replaceable if it can be implemented as either a module or a class abstract, where the abstract need to encapsulate most of the construction code of a SCC.

The dependency or coupling between any two SCCs implies that the components collaborate with each other by requesting each other's services. Two software SCC are said to be coupled in this disclosure, if the components exchange one or more services and their service interface is designed so that they are coupled by including a few lines of communication code and uncoupled by deleting or updating the communication code, according to one embodiment.

It is possible to test each replaceable component autonomously by implementing a small test application, according to one embodiment. This method is used when existing functions, features or services need to be improved or there is a need for overcoming any shortcomings in the current version. To redesign and test a replaceable component independently outside any application, a small test application is created, which comprises code for (i) including an instance of RSCC using the RCC, (ii) necessary code for requesting and testing any of the services provided by the RSCC, and (iii) necessary code for providing any of the services needed for the RSCC.

In contrast, although reusable classes such as GUI classes of a large GUI component is not self-contained because reusable GUI classes requires many lines of code and data for constructing a self-contained GUI component. Example CityGIS application in 'Section-J' shows few examples for the replaceable components. Each of the RCCs (e.g. LandMarks or TouristSpots) is a substantially constructed self-contained component of an application, which can properly function in the application to process user inputs such as mouse clicks or collaborate with other components by providing or requesting services. Each RSCC is designed to have service interfaces and the interfaces must be properly coupled, if its component needs to collaborate with other parts of the application, according to one embodiment.

The SCCs may depend on one or more global service objects, some of which are discussed below. If a RCC depends on one or more global service objects, its test application also can include the global service objects. One of the preferred embodiments, encapsulate construction code for each of such shared service objects in a class definition, so that each shared service object (e.g. SRO, ACI or APP_xyz_Services below) can be included in test application by writing few lines for instantiating and initializing an object instance.

In general, container component/application of a RSCC implements necessary communication for the RSCC. Alternatively, the coupling code can be included in the code of the RSCC if it uses predefined global services. Any component can be designed to contain code for requesting a predefined global registration object to look up necessary services (e.g. using SRO as shown in FIGS. 8*a* and 8*b*). An application can predefine and include global message window object (e.g., APP_xyz_Services), which may be used by any SCC in the application if it needs to display a message.

APP_xyz_Services.Display_message_window (message_type_code_num, message_string, config_info, call_back);

Where "APP_xyz_Services" is a shared services object comprising multiple service methods and "APP_xyz_Services.Display_message_window" is calling one of the service methods to display a message in a popup window. The following statements illustrate three service calls for displaying three massages:

APP_xyz_Services.Display_message_window (INFO_MSG, "CONGRATULATIONS! Your test score is: 99%", NULL, NULL);

APP_xyz_Services.Display_message_window (ERROR_MSG, "You entered a negative number for age, enter a number between 0 and 150", NULL, NULL);

APP_xyz_Services.Display_message_window (ERROR_GET_ANSWER, "There is an Error in calculation, do you wish to continue?", NULL, take_action); Function take_action (selection) {if (selection==YES) do_something( )}

Any RSCC in an application can use such predefined global service objects. Each global service object may provide more than one service method. For example:

APP_xyz_Services.Send_event_log_message (SECURITY_ERROR_LOG, "This user trying to access secure data area", user_id);

Removing an RSCC that depends on a shared service object won't cause errors in the shared objects, since such shared service object does not depend on RSCCs. Hence, RSCC still can be easily disassembled or reassembled. However, care must be taken when redesigning a shared or global service object. When new features are added to the global service object, backward compatibility must be maintained. If many components depend on the global service object, removing the global service object can cause errors in many components. Although class for a global service object can be designed as RCC, the object is not treated as a replaceable component, because countless parts depend on such extensively shared global object.

Each global service object can be designed as a class definition so that it needs fewer lines to include an object instance in any application. In the following example, code line 10 includes a file containing a class definition (e.g. APP_xyz_service_class) and line 20 instantiates a global service object (i.e. APP_xyz_services is an object instance of class APP_xyz_services_class).

10. <script xlink:href='Global_JavaScript_Classes/APP_xyz_services_class.js' language='text/ecmascript'/>"
20. var APP_xyz_services=new APP_xyz_service_class ( );

In summary, a replaceable component is a class-definition or module custom designed to substantially encapsulate construction code of a self-contained component (SCC) with the features that (a) it can be used to easily assemble or include its SCC in an application, (b) its SCC can be easily disassembled or removed from the application, and (c) it comprises methods, interfaces and code to allow for coupling of the SCC with other parts of the application if the SCC needs to communicate or collaborate with other parts of the application.

In an example embodiment of an application comprising multiple SCCs, a RCC is designed to substitute (or replace) the construction code and communication code necessary for each SCC by including a RSCC and creating necessary communication code for the RSCC. Each RSCC is included into the application by instantiating and initializing an object instance of respective RCC. Each RCC also designs and implements coupling interfaces not only to loosely couple its RSCC but also to minimize the necessary communication code for its RSCC. The coupling interfaces of each of the object instances of the RCCs are used for creating necessary communication code for allowing collaboration between the RSCCs. It is not necessary to create communication code for some of the RSCCs, if the RSCCs don't need to collaborate with any other components or already comprises of necessary coupling interfaces and communication code for using SRO/DoS for allowing collaboration between the RSCCs.

Section-Q

Using Innate Nature of the SCCs and Application Context for Building Replaceable Components The term 'self-constrained' has a very unique intended meaning, which is described in section-E above. The 'self-contained' is not a feature that can be implemented for any software part, but an intrinsic property of certain software parts in an application. That is, a software part must be innately 'self-contained' for designing the part as Replaceable-component (or replaceable-SCC). Each of the large software applications comprises multiple self-contained parts/modules, which are referred to as self-contained components (or 'SCC'). So it is possible to identify suitable SCC in the application and design a replaceable-component-class (or RCC) for each SCC. A replaceable component class (or RCC) can be created for each of the suitable self-contained component.

The 'replaceability' is a feature, which can be implemented for the self-contained components (or SCCs). It is possible to implement loosely coupled interfaces for each of the SCCs in an application, in the context of the application and other SCCs collaborating with the SCC. Any two SCCs collaborate with each other by depending on each other's services, where one SCC provides a service and another SCC consumes the service in an exemplary embodiment. Even a very large SCC often needs fewer and/or simpler couplings for exchanging services intrinsically, so it is possible to implement loosely coupled interfaces for coupling almost any large SCC (i.e. a software part that is innately self-contained), where each interface of a SCC is designed in the context of the application and other collaborating SCCs in an exemplary embodiment. To be replaceable (i.e. to easily disassemble or reassemble) each RCC implements (1) parts of communication code inside its SCC for using SRO or (2) communications interfaces for loosely coupling its SCC, for example, (i) for requesting services offered by the SCC and (ii) for providing services required by the SCC.

A RCC can be created not only for a new software application but also for SCCs in existing legacy applications. For example, a RCC may be implemented when new features are added and/or refactoring the software code of the legacy application, for example, replacing code-sections for construction code of a SCC by a RSCC. Reducing code and/or effort required for including a SCC-instance as a sub-SCC and to properly couple the service interfaces of the sub-SCC, increases the degree of replaceability of the sub-SCC, in an exemplary embodiment.

In an exemplary embodiment, assume it requires 10 lines to assemble a RSCC, where 2 lines are for instantiating and initializing an object-instance of RCC (i.e. for a SCC) and 8 lines to create communication code to couple service-interfaces of the SCC with other SCCs. If the services are coupled by implementing communication code in the container component or application, for example, without using tools such as SRO, the SRO can't provide any help in automation such as detecting broken or incompatible couplings etc. Alternatively, in the 10 lines to assemble a RSCC, 2 lines are for including an object-instance of a RCC (e.g. for a SCC) and 8 lines to configure the SCC. Any RCC requires external construction or configuration code, only when it is reused in more than one application. If no other application is reusing the RCC, it is possible to move the configuration or construction code from its container application (i.e. implemented outside of the RCC) into the implementation of the code of RCC (i.e. to inside of the RCC).

Hence, if a RSCC is custom designed in the context of an application and/or other RSCCs in the application, it is possible to minimize the external configuration data and code required for including its SCC (or RSCC) in the target application. Furthermore, it is possible to reduce external communication code for coupling a RSCC and also possible to automate tasks such as creating and managing couplings by using tools/utilities such as SRO (e.g. see sections-F and sections-I) and including necessary communication within the construction code of the RSCC.

Section-R

Example for Illustrating Difference Between Using and not Using RCCs

FIG. 15*a* shows an application 1520 containing 2 SCCs 1521 and 1522, which are created by 2 replaceable components 1501 and 1503 respectively. Where class definition for each replaceable component (e.g. 1501) is using many objects and encapsulates construction code for building its SCC (e.g. 1521). FIG. 15*b* shows an application 1545 containing the same two SCCs 1521 and 1522 shown in FIG. 15*a*, but in FIG. 15*b* they are created by an application 1540 without using any RCCs. The application 1540 uses all the similar objects and comparable construction code used for constructing both the SCCs (i.e. 1521, 1522) for creating exactly the same application (i.e. in the perspective of features and functionality), so that applications 1545 looks and functions exactly like application 1520. That is, both applications achieves exactly the same result, but with or without using the RCCs (1501 and 1503).

Since construction code for each of the two SCCs 1541 and 1544 is not encapsulated in a RCC respectively, application 1540 places all the construction code sections of both SCCs 1541 and 1544 in multiple non-exclusive application files, where many files likely contain construction code for both SCCs. In an example embodiment, assume each of the two SCCs 1541 and 1544 is implemented directly in separate independent application and tested by two developers or by same developer but independently from each other. If the construction code for each SCC is not encapsulated in a RCC for including in each independent application and required to include both SCC in an application, then it requires more effort for merging the code bases of the two independent applications in application 1540. Although FIG. 15*b* is showing construction code in separate dotted boxes 1542 and 1544, physical structure of the merged code of the two large SCCs unlikely so well demarcated for each SCC (e.g., by exclusive set of files consisting of construction code of each of the SCCs). Although FIG. 15*a* and FIG. 15*b* results in same application and each SCC have comparable construction code, the code of each SCC is organized quite differently. In other words, files containing source code for each of the two applications are modularized/structured quite differently.

FIG. 15*c* presents object level tightly coupled dependencies in an application containing two medium or large SCCs (e.g. 1542 and 1544), where construction code of each SCC is not encapsulated in a RCC. As shown in FIG. 15*a* construction of each SCC requires many objects and implementation of many lines of code for exchanging data between the objects. For example, (i) if RCCs are used, each RCC have some exclusive files comprising construction code for respective SCC and (ii) if SCCs are unknown and RCCs are not implemented, one or more application files end up containing construction code for both SCCs (e.g. see FIG. 15*c* 1555 to 1560), in an example embodiment. Furthermore in this example the SCC need to collaborate with each other, so application also contains communication code for the SCC. As shown in FIG. 15*b*, it is required (i) to implement code for exchanging data or for communication between objects within a SCC (e.g. 1504 to 1508) and (ii) to implement code for communication or for exchanging data between objects belong to different SCCs (e.g. between 1547 and 1548 or between 1549 and 1546).

Both SCC and RCC are new type of components introduced in this invention. In an example embodiment, in prior art such as an object-oriented programming (OOP), if a SCC requires communicating with another SCC, usually one of the objects (e.g. a GUI object upon mouse click) in first SCC communicates with an object in the second SCC. Hence in OOP, no distinction is made between (i) Construction code of a SCC, which comprises of code for allowing data exchange between objects (e.g. 1510, 1508, 1504 and 1505) used for construction and performing internal operation of a SCC and (ii) communication code 1525 allowing exchange of services or collaboration between two SCCs. In the prior-art there is no difference between (i) communications or data exchange between two objects (e.g. 1511 and 1507) within a SCC (e.g. 1501) and (ii) communication or data exchange between two objects (e.g. 1547 and 1548), where each object belong to two different SCCs (e.g. 1542 and 1544).

In general, large SCCs comprise of multiple reusable classes and each large reusable class such as a GUI component (e.g. 1509 or 1511) requires lot of construction data and configuration code. Such GUI object end up tightly coupled, when all the construction code is implemented, so it requires removing many tightly coupled objects (e.g. 1504 to 1511) to remove a SCC (e.g. 1501 or 1542), if the SCC is included without using a RCC. On the other hand, it is possible to design loosely coupling interfaces even for a large SCC, according to an embodiment. In this example embodiment, a loosely coupled object instance of RCC is replacing many tightly coupled objects (e.g. 1504 to 1511), where otherwise requires removing many tightly coupled objects to remove or replace the SCC of the RCC.

FIG. 15*c* shows an example of how the code sections of two SCCs likely spread across many files, if an application containing two large SCCs is created without knowing about SCC/RCC, so not made any conscious effort for identifying construction code of each of the SCCs. In this sample implementation of FIG. 15*c*, assuming there is no effort is made to distinguish between communication code between SCCs and code for exchanging data between objects within construction code of each of the SCCs. FIG. 15*c* depicts an example of how typical OOP applications are implemented, since SCC is not yet discovered and RCC is a new kind of software component unknown in the prior-art, especially in case of large SCCs having dozens of GUI objects and data intensive application logic.

In case of a large application containing many large SCCs created without using any RCC as shown FIG. 15*b* or 15*c*, it requires more work for removing or replacing each SCC. To make any large modifications to just one SCC, it requires more effort to find all the code sections constitute the construction code of the SCC. There is no clear physical demarcation for many construction code sections implemented for each SCC, such as, a set of exclusive files, which include substantial part of construction code for the SCC. Some of the source code files (e.g. see files in FIG. 15*c*) of program also comprise construction code of more than one SCC. So changes to construction code of a SCC have a risk of inadvertently impacting code or functionality of other SCCs. Hence such wasted effort can be avoided by using RCCs, according to an example embodiment, to locate most of the construction code sections of each SCC, if all the construction code sections of the SCC are encapsulated in autonomously maintainable class and exclusive set of assonated files.

In one preferred embodiment, each RSCC can be custom designed not only in the context of a specific application but also in the context of other RSCCs in the application. In an exemplary embodiment, each of the coupling interfaces of a RSCC is custom designed to precisely complement respective coupling interface of other RSCCs, if the RSCC need to communicate with the other RSCCs. For example, the RSCC for CityATC (i.e., Example CityGIS application in 'Section-J') is created to fit the component for city map (i.e. City-Map_RCC), for example, by using proper coordinate system and size. Also, if an RSCC needs to communicate with other RSCCs, each of the communication interfaces in the RSCC is designed to properly communicate with other RSCCs. For example, if two RSCCs are communicating using "Service Registration Object" (e.g., as illustrated in FIG. 8b and FIG. 14a), then both RSCCs are designed to use a lookup-key and a service function format (e.g., number of parameters, return object of the service function and their types) for each communication interface. If an application or container-component includes two RSCCs and needs to create a coupling between the two RSCCs for allowing communication between the two RSCCs, each of the coupling interfaces in each RSCC is designed to be compatible with the other RSCC in order to reduce code required for creating the coupling to allow collaboration between the RSCCs, according to one embodiment.

In a preferred embodiment, the objective of encapsulating construction code-sections of a SCC in a RCC (e.g. in a set of exclusive files for the RCC) is to substantially reduce mixing of construction code-sections of multiple SCCs in multiple non-exclusive application files. The SCCs in an application need to share many objects (e.g. SRO, ACI or APP_xyz_services), so the SCCs use non-exclusive files or classes of the application. Increasing the percentage of construction code in the exclusive files increases autonomy of the SCC, for example, to redesign the SCC for satisfying evolving requirements.

For example, mixing construction code in multiple non-exclusive files makes it harder to find construction code of an SCC, for example, to redesign, to reuse code or to remove the SCC. Also reduces the perceived complexity and dependencies between the SCCs within an application, for example, by (i) differentiating communication code of a SCC from the communication code for allowing exchanging data or collaboration between the objects within the SCC, where many of the objects in the SCC might need many lines of communication code for tightly coupling with other objects within the SCC, (ii) implementing more intuitive loosely coupled interfaces and/or (iii) documenting interfaces of the SCCs or using tools such as SRO to manage the couplings, according to one embodiment.

Any communication code implemented within a RCC (e.g. 1501) for allowing collaboration or data exchange between its internal objects (e.g. 1504 to 1511) is construction code of its RSCC (e.g. 1521), but not communication with respect to the RSCC. For example, if one or more objects (e.g. 1509 or 1510) are sub-RSCCs 1521 of container-SCC 1529, then the communication code implemented to allow collaboration between the sub-RSCCs is communication for the sub-RSCCs (i.e. only with respect to the sub-RSCCs), but still the communication code for the sub-RSCCs 1521 is construction code of the container-SCC 1520. That is, communication code for sub-RSCCs of a container-RSCC is construction code for the container-RSCC.

In another perspective, one of the objectives of the RCC are (i) making simpler to find the code-sections of its SCC, for example, to redesign the SCC or to reuse its code for creating similar SCC for another application, and (ii) making it simpler to either include or remove its SCC as a unit. For example, if code-sections of an SCC are not encapsulated in an RCC, removing the SCC from its application requires error-prone work to remove code-sections of the SCC, which are mixed with other code-sections of the application in non-exclusive files.

If a large application (e.g. see City GIS application) is created without using RCC, physical code structure of the application unlikely reflects the natural autonomy or separation between construction code sections of each of the SCCs in the application. Also such application design does not make any distinction between construction code of a SCC and communication code between two SCCs. Even if the construction and communication code sections were structured to maintain some kind of logical separation between hypothetical SCCs, any initial structure would erode as changes are made to each of the imaginary SCCs and communication code between and within the SCCs.

In an exemplary embodiment, assume the SCCs in the CtyGIS application (See section-J and FIG. 18b) don't need to communicate with each other and also assume only share three global objects (i) SRO, for allowing communication (ii) APP_xyz_services to display messages and (iii) ACi to get application context. In this case, each SCC of the application has very high degree of autonomy. All the new code created (e.g. except the class files three global objects) for each RCC can be placed in an exclusive set of files, hence the structure of the code reflects the natural autonomy of the SCCs in the application. On the other hand, the code structure of the SCCs fails to reflect the natural autonomy of the SCCs, if new construction code implemented for any two SCCs (e.g. CityATC or CityHotels) end up in non-exclusive files (see FIG. 15c).

In the exemplary embodiment of CityGIS 1850 above, assume all the application code and shared classes are implemented in non-exclusive files of the application. Once all the shared sources are implemented, then each RCC is implemented in set of new exclusive files for constructing each SCC, where the RCC uses the shared resources such as SRO and APP_xyz_services. The set of new exclusive files created for each RCC reflects the logical autonomy of the SCC. If the SCC need to collaborate with other SCCs, then the coupling interfaces and communication code reflects its logical dependencies. If RCCs are not used, the construction code for multiple SCCs likely end up in non-exclusive files, so can no longer reflect perceptible autonomy.

If the construction code of each of the SCCs is not encapsulated to physically maintain separation between construction code sections of multiple SCC, it is harder to preserve the initial design structure, especially if new developers (i.e. who are not the original developers of the earlier versions of the SCCs) need to make the changes, according to one embodiment. In case of using the RCCs, it is possible to preserve higher degree of autonomy of each of the SCC's construction code. For adding new features or functionality to a SCC, it is required to change either construction code or communication code (e.g. communication interfaces), or both. The class definition of a replaceable component is updated to make changes to construction code. The RCC's coupling-methods and its interfaces may also need to be changed to support new features, where the coupling-methods and interfaces are part of the construction code. If the communication interfaces are changed, then either the communication code implemented in its container application or other SCCs that are using the interfaces for collaborating with the SCC are also changed accordingly, according to one embodiment. It is desirable to use tools for detecting any broken interfaces, if one of the SCC is inadvertently updated, according to one embodiment.

Whenever a SCC is updated or refined, it is simpler to assure quality and performance of the SCC by testing the SCC and its interfaces independently. For example, a RSCC can be tested outside of its application by implementing a simpler test application to run the RSCC alone, where the test application provides (a) any required service by the RSCC and/or (b) consumes any services provided by the SCC. Encapsulating each of the SCCs (e.g. Landmarks_RC or each of its subcomponents such as TouristSpots) allow testing the SCC independently. If a large SCC (e.g. Landmarks_RC or City_ATC_RC) is not encapsulated in an RCC, often whole-system must be tested to assure quality after making a large change to the SCC.

Literally speaking a SCC may not be referred to as a component: If a large SCC is not recognized it is not implemented as a RCC, and if code sections of the SCC are sprinkled across multiple non-exclusive files of the application. For example, CityGIS 1850 application contains many SCCs, such as CityATC or CityLandmarks containing 3 sub-SCCs. If such a large SCC is not recognized as a component (e.g. a useful kind of modules), and not implemented as a RCC, its code likely end up having very low degree of autonomy, making it much harder to either replace or redesign the SCC. Of course, it is possible to recognize the existence of SCCs in an application, when unique intended meaning of the term 'self-contained' is known.

For example, it is possible to conceptually recognize CityATC as a SCC when using CityGIS application, even if the code of CityATC is sprinkled across many non-exclusive files. Likewise, it is possible to conceptually recognize 3 SCCs 631, 632 and 633 respectively in container application 630 in FIG. 6a, even the SCCs are included without using RCCs and their construction code sprinkled across many non-exclusive files, for example, as shown in FIG. 15c, where all reusable GUI classes for all the SCCs are grouped in to one non-exclusive file 1557, and so on.

Section-S

Example for SCCs, RCCs and Description for Construction Code

For larger application containing many large SCCs and sub-SCCs for SCCs, the design that uses RCC increases degree of division of labor, allow higher degree of specialization, modularization and reduces work needed to refine and test each of the SCC and sub-SCC, according to one embodiment. If each of the SCC of an application is encapsulated in a RCC, the SCC can be refined and tested more autonomously, for example, for satisfying evolving business needs or to overcome any shortcomings in the initial implementation, according to one example embodiment.

FIG. 6b shows how each of the RCC (i.e. 621 to 623) encapsulates construction code for creating each RSCC (i.e. 631, 632 or 633), where the construction code comprising code such as code for accessing data, code for using objects and code for exchanging data between the objects. Here the objective for the RCC is not only division of labor by allowing building and testing each component independently but also preserving autonomy for allowing refining its code base and allow testing autonomously (e.g., away from its application) during future maintenance cycles, according to one embodiment. FIGS. 15b and 15c shows dependencies between objects and non-exclusive files of an application that containing just two SCCs, if the construction code of each SCC is not encapsulated in a RCC, according to an example embodiment.

A RCC not only encapsulates code for accessing substantial portion of data required by its SCC but also encapsulates substantial portion of application logic for using the data for initializing or constructing various parts of its SCC, in an embodiment. Construction code includes configuration and customization for satisfying unique needs of the application such as security or user preferences. Hence almost all of the reusable GUI components (e.g. reusable GUI class for presenting a line chart) cannot be replaceable self-contained components, because they depend on their container component for substantial portion or all the application data. Often container component of a reusable GUI object provides all the application data and application logic for presenting a GUI component (e.g. FIG. 3a). To get required data, the container component uses application specific data sources (e.g. RDBMS), db-schema and implement data access code for getting the required data from the data sources, according to one embodiment. Furthermore the container component implements application logic to process the data for building a component.

According to one embodiment, the main intent is to build and test each RCC as an independent application as much as practically possible, for example, by implementing a test application for the SCC. Also main intent especially is to preserve that kind of autonomy of the RCC throughout the life of the application maintenance cycles such as updating and testing the RSCC to satisfy evolving application needs. In practice most SCCs need to collaborate or communicate with external parts and/or depend on external services for proper operation. So the design intent of a RCC is to make it simpler for creating a test application for testing the RCC independently, where test application provides required services for its SCC and also to test services provided by the SCC.

In one of the embodiments, another design intent of each RCC is to reduce the code required for properly coupling its SCC, if the SCC needs to collaborate or communicate with external parts/RSCCs. This does not necessarily mean minimizing the data pieces required by the SCC for the collaboration. The design intent is just to minimize the number of communication interfaces by passing as much data as practically possible through each interface, without sacrificing its functionality, features or operation for satisfying unique needs of the application. In another embodiment, implement the communication interfaces simpler or loosely coupled (e.g. by using a SRO 810 in FIG. 8a), in order to reduce the code and effort required for implementing communication code.

In an example embodiment, if a shopping-cart/invoice-table requires many pieces of data for adding each purchased shopping-item, it is desirable to pass all the data pieces through one interface (i.e. The service function for adding a shopping-item must be designed to pass all the data pieces in its parameters). Wherever possible using one interface is preferable over using multiple interfaces, where each of the multiple interfaces passes a subset of total data pieces required by the shopping cart. One of the main design intent of a RCC is to reduce number of interfaces and communication code required to couple and uncouple its RSCC, according to one embodiment.

Designing a component class to be more configurable and customizable might not only turn more reusable by multiple applications, but also increases code or data required for incorporating or assembling the component. Hence making a component more reusable often requires some configuration data, so it increases the construction code/data required to assemble the component, according to one embodiment. For example:

10. ReplicableComp RC1=new FullStockQuote (ACi, "IBM", Config_StyleObj);
20. ReplicableComp RC1=new FullStockQuote (ACi, "HPQ", Config_StyleObj);

Where the input data is a ticker symbol of a company and a style object, where style object determines styling such as fonts of text or color-coding of graphic elements. It is certainly more desirable inputting a ticker symbol over implementing a component for each company (e.g. instead of IBM_FullStockQuote for IBM alone and HPQ_FullStock- Quote for HPQ alone). Allowing more and more configurable by container component might reduce degree of replaceability or autonomy, but such construction or configuration data is more useful than replaceability, according to one embodiment.

Also, in certain embodiments, inputting certain configuration data is desirable, such as a style object. This forces container component to create configuration-object and input to each of the instances of replaceable component objects, reducing replaceability. Allowing more and more configuration by container component might reduce degree of replaceability or autonomy. In an example embodiment, if it is required that all the GUI components in a container component need to use consistent style, where the style can be defined in style-sheets for the application. Alternative method is, creating configuration files and implementing shared class for reading the configuration files. Then construction code in each RCC can instantiate an object of the shared class for reading configuration files.

A container application or a component required to implement few lines of code to instantiate and initialize a replaceable component by inputting few pieces of data for construction and configuration of its self-contained component. For example, the following inputs application data such as airport code, scaling parameters (e.g. to fit in container component) and other configuration data.
ReplicableComp RC1=new CityATC_RCC (ACi, "JFK", Config_Obj, Scale_Obj);

Although increasing reuse or configurability is useful, the replaceable components do not sacrifice replaceability for reuse or configurability, according to one of the preferred embodiments. But in many cases, the designers must make a trade off, if they get substantially large benefit, for each construction method they support for reuse or for allowing configuration of its SCC. In such case the replaceable components can support a few construction methods to enhance its reuse or configurability, while preserving the replaceable property or may be sacrificing a little bit of replaceability. That is, although replaceability-factor is slightly diluted by allowing few more lines of configuration code, the SCC still can have high replaceability-factor even it requires few more pieces of data.

Reuse may be categorized in to two types (i) Reuse of class definition to create multiple replaceable components in a single application, and (ii) Reusing across multiple products, where the class definition is used to include one or more replaceable components in multiple applications. Both have different dynamics, such as, if reused across multiple software products, the business needs of each product likely diverge in future upgrades. So it is required to update and test multiple products or applications, whenever a RCC is redesigned for any one of the applications. If a RCC is updated (e.g. its interfaces) for an application, it forces updating and testing all the other applications using the same class definition of the SCC, according to one embodiment. This kind of overhead might conflict with one of the requirements of the RCCs, which is to make its SCC easily adoptable to changing business needs of its application, according one embodiment. For example, to add additional capabilities, sometimes require updating database schema (e.g. 410 in FIG. 4a) to accommodate additional data and the RCC must be redesigned to access the new data. This forces other applications to make substantial changes to their database, if they like to preserve reusability of the RCC.

According to one embodiment, certain components can be designed to be both replaceable and reusable. In an example embodiment, a vendor for city maps can build comprehensive database of information for creating maps and offer multiple versions of RCCs to choose for city maps for multiple applications. This is not that much different from a maker of Toothpastes (e.g. Colgate) offer wide range of flavors, sizes and kinds (e.g. Total, Sensitive or Salted) etc. In this case, most of the overhead cost of redesign, maintaining backward compatibility and/or testing the reusable classes is bear by the mapmaker (e.g. vendor of RCCs for maps). The applications may need to compromise on certain unique requirements (e.g. if a desired feature is not supported by such $3^{rd}$ party reusable RCC). In an example embodiment, if this kind of classes still requires more than few lines (e.g. over 25 lines) of configuration/construction code, in order to increase degree of replaceability for its RCC, yet another wrapper-RCC can be implemented that encapsulate this code for instantiating an object instance along with the code for configuration or construction for initializing the object instance of the class from the third party vendor.

In an exemplary embodiment, if a container component needs to supply a lot of application or configuration data and/or needs to implement lot of application logic for a reusable component (e.g. GUI API provided by a vendor or third party) for constructing its SCC (or a service-object, in case of non-GUI-component), then the SCC is not a replaceable component. It is possible to encapsulate this kind of reusable component and associated construction code (e.g. code for accessing, processing application data and using the data for building a SCC) in a wrapper-RCC to make it a replaceable component.

A simple method for reducing communication code between two SCCs: In an example embodiment, if two SCCs need to collaborate or communicate with each other, respective coupling interfaces are predefined, so that, each SCC is implemented with compatible coupling interfaces. For example, if first-SCC is providing a service and second-SCC is requesting the service, then service interface in first-SCC is predefined and shared with the designers of second-SCC. The second-SCC that depends on the service of first-SCC is implemented with compatible coupling-interface for properly requesting the service. For example, if RSCCs are coupled using SRO (e.g. FIG. 8a or 8b), then first-SCC implements code to register its service-function with SRO and the second-SCC implements code to lookup the service-function in SRO and to request the service. The designer of second-SCC also knows the interface of the service function (e.g. number of parameters, type of the parameters and order of the parameters etc.) for properly requesting the service of first-SCC. Alternatively container component implements required communication code (e.g. 1033 and 1037 in FIG. 10b) for allowing collaboration between the components by using interfaces of the components, which can handle certain kinds of simple interface mismatches (e.g. by using a callback in 902 of FIG. 9a. Line 8 in FIG. 9b shows communication code, if there is no mismatch).

In one of the embodiments, one of the main objectives of a RSCC is to be adoptable to changing unique needs and easily replaceable. To accomplish this, it is desirable to make the interfaces of the RSCC are also easily adoptable to unique changing needs. FIG. 14a and section-I above illustrates a mechanism to automate tasks to detect broken or incompatible interfaces.

Subsection-1S

Examples for Illustrating Construction Code of a RSCC And Communication Code of a RSCC The 'construction code' of a RSCC or "Component construction code" is: All the code that is implemented for constructing the RSCC and performing its internal operations. Examples for construction code might include, but not limited to, code for accessing data from data sources, code for accessing configuration information, code for storing data, code for application logic for processing the data, code for proper functioning of the component, instantiate and initializing other RCCs for including sub-RSCCs. If the sub-RSCCs need to communicate with each other, the code to couple the sub-RSCCs is also a part of the construction code of the container RSCC. FIG. 4*b* shows a SCC that contains two charts (i.e. a line chart and a bar chart). The construction code uses many objects and implements construction code such as code for accessing data from some objects and code for inputs data into some objects. Furthermore uses few objects for processing business logic such as rules/policies, user-profile and security or preferences.

"Component communication code" or "communication code" of a SCC is the code implemented for allowing data exchange or collaboration (a) between the SCC and other SCCs or (b) between the SCC and an external part such as part of its container component or container application. Any code implemented or created outside for allowing communication or collaboration between a RSCC and external parts (e.g. parts of the application and another component) is not construction code of the RSCC. For example, any external communication code created (e.g. 933 in FIG. 9*d*) in a container component is communication code for the RSCCs (e.g. 931 and 932) and any code implemented within RSCC, including internal service couplings (e.g. service-function) is construction code for the RSCC. For example, the code 933 implemented to allow communication between two RSCCs is communication code for the RSCC1 931 and RRCC2 932, but construction code of container component 930.

In case of the web-applications, the term RSCC conceptually refers to the pair (i) initialized object instance of a RCC and (ii) the SCC module created by the initialized object instance. In case of web-applications, both RCC and SCC contain parts of construction code, where RCC (runs on web-server) for generating construction code of SCC (runs at web-client). For example, (i) a RCC for a SCC contains construction code for accessing/processing application data and using the data and (ii) the SCC comprises construction code for performing its operations such as using data for providing GUI features and services of the SCCs etc. Also both RCC and SCC implements internal communication code such as code for coupling-interfaces or code for using SRO (e.g. FIG. 8*a*, 8*b*). So conceptually a RCC/SCC pair is treated and referred to as a RSCC.

FIG. 10*b* shows two RCCs 1031 and 1032 for creating two SCCs 1035 and 1036 and integration logic 1033 for creating communication code 1037 for the RCCs. FIG. 10*c* shows two RCCs 1051 and 1053 for creating two SCCs 1056 and 1058 and integration logic 1052 for creating communication code for the RCCs 1057. Any code implementer within a RCC 1031 and its SCC 1035 is construction code for the RSCC. Any code created for integration logic 1033 and communication code 1037 is communication code for each of the RSCCs 1035 and 1036. So the pair (i) object instance of a RCC 1031 and (ii) SCC 1035 created by the object instance are conceptually treated to as a RSCC. Likewise, integration logic 1033 and communication code 1037 are conceptually considered as communication code.

In other words, construction code comprises of communication points (e.g. service functions to provide services, or methods for registering external service functions for getting services) for creating communication code. The container application uses communication points (i.e. service functions or methods for registering service functions) of the RCCs for creating communication code. So connection points are part of construction code and external communication code created for allowing communications is not part of construction code of self-contained component. For example, communication point for a SP-RSCC that provides a service is a service-function implemented in the RSCC. For example, communication point for a SC-RSCC that requires a service is a method for registering a service-function that offers the service. Once a service-function is registered, SC-RSCC can call the service-function, whenever it requires the service.

Also code implemented for allowing data exchange between objects used in building and for proper operation of a RSCC is construction code (but not communication code). FIG. 4*a* shows construction code 400 for a SCC 420. For example, code implemented for allowing data exchange between GUI-Obj 402 and DB-Obj 405 for initializing a GUI class is not component communication code for SCC 420. But the code is part of construction code for container SCC 420. Likewise, code implemented for allowing data exchange or collaboration between GUI-Obj 402 and Algorithm-Obj 404, for example, in response to an event (e.g. mouse or timer) or for processing an external service request is also construction code. That is, code implemented for all the internal operations of a RSCC is construction code. For example, in FIG. 11*b* SCC2 1152 can't access data, so it implements code for (i) calling an application F3 1167 running on a remote server having data and (i) when data is received from F3 1167, uses the data to build parts of SCC2 1152. All this code implemented within RSCC for getting data from remote server 1167/1165 and use data is construction code for the RSCC 1152.

All the interfaces and code implemented behind the interfaces such as functions implemented for providing services for external parts or components are also part of construction code of the RSCCs. All code implemented such as interfaces, code for initiating and requesting external services required by the component is part of its construction code. Of course, since external code provides services requested by a SCC, the external code is not part of the construction code of the SCC. Any code implemented for performing any internal operations of a SCC is construction code.

Any code implemented to allow collaboration or data exchange between objects or sub-SCCs in a SCC is construction code of the SCC. For example, if a user event such as mouse click on a bar in bar chart 431 requires a visual response from line chart 432, the code implemented for this kind of collaboration or communication between subcomponents 431 and 432 is construction code of component RSCC 430/440. Likewise, code implemented in an Air Traffic control component (See FIG. 18*a*) that allows communication between an Airplane component 1816 and Info-table 1812 is construction code for the container Air Traffic control RSCC 1800.

A RCC can implement communication code at design time to collaborate with pre-defined global service objects or external components. In case of a RSCC using external service objects, such as, registration object (SRO), the code implemented inside the RSCC to register services or lookup and get services is either communication code or construction code depending on the context. But for the context of RSCC, if this code is within RSCC, then it is considered as construction code. For example, if the following code comprises with in a RSCC to register its services, such communication code is also considered as construction code of the RSCC:

String ServiceName="Service of RSCC1";
SRO.registerService(ServiceName, service_object);

Likewise for example, if a code of a RSCC comprises the following code to request a service of an external pre-defined shared service-object, which is construction code of the RSCC. For example, an application may pre-define a global service-object for providing generic services for many components.

String Message="Some Message";
APP_xyz_services.DisplayMessage(msg_type_ID, Message);

If this code is implemented within RSCC, then this code is construction code for the RSCC. However the class definition for object APP_xyz_services is implemented outside, so the code implemented in the class is external code, which is also logically construction code implemented in non-exclusive files of the RSCC. The design and implementation of a SCC in each application may depend of shared objects, and can assume that those external objects (e.g. APP_xyz_services or SRO) are present in the application.

In summary any code implemented for performing internal operations of a SCC is construction code of the RSCC. Some indicative internal operations of a SCC include functionality and features implemented such as (i) responding to mouse, keyboard or timer events, (ii) finding and/or requesting and getting external services or (iii) responding to service requests of external parts.

Likewise, all the code implemented inside of a RSCC for lookup and getting external services is construction code of a RSCC. The external service is provided by either another component or module in the application. So this external code module is not part of the construction code of the self-contained component. Also code implemented inside a RSCC for providing services to external parts such as (a) code implemented for fulfilling the service requests and (b) service interfaces such as service functions to be called for requesting the services is construction code.

Any code implemented inside a RSCC for registering services of the RSCC with a global service registration object (See FIG. 8a, 8b) is part of construction code, where the registration allows other components to lookup for finding and requesting the services. Alternatively a container component or application can get the service method name of a SCC and register the service with service registration object. In that case the code implemented by container component is communication code and not construction code of the RSCC.

Each RSCC comprises of necessary construction code for accessing application data from data sources either (a) local source such as from RDBMS by implementing JDBC/ODBC code for accessing data or (b) remote data sources such as from remote data servers by implementing AJAX, SoA or Web-services methods (Ref FIG. 11a). In case of non-web applications, both RCC and SCC are combined into one class-definition and its object-instance, so RCC implements the necessary construction code for accessing data and for constructing various parts or subcomponents of the component. In case of non-web applications, RSCC refers to an initialized object instance of RCC. That is, any fully initialized object instance of a RCC is a SCC.

In case of the web-applications, each RCC runs on server and creates application code for its SCC, where either (a) RCC may implement construction code for accessing necessary data and for constructing various parts of SCC (e.g. by initializing reusable GUI classes for sub-components just one time on server before generating application code for its SCC) or (b) the generated application code of SCC may comprise of construction code for accessing necessary data from given remote data sources periodically and for updating or constructing various parts of the SCC (e.g. by updating or inputting data and redrawing GUI sub-components periodically as shown in FIG. 11a). In an exemplary embodiment, if an SCC needs to be updated whenever data or state is changed, then generated code of SCC comprises of construction code to not only get data (e.g. periodically or on certain event) but also use the data to reconstruct parts or subcomponents of the SCC. Alternatively a SCC can be constructed only once (i.e. SCC don't reread data from server to periodically reconstruct itself), so its RCC implements necessary construction code for accessing data and for using the data for initializing and constructing various parts or subcomponents of the SCC.

If an SCC requires/provides services, then the construction code of RSCC also implements and comprises coupling interfaces (e.g. coupling methods). The container component or application uses them for creating coupling code for the SCC so that the SCC can collaborate with other parts of the application. Alternatively construction code of each SCC may comprise of part of communication code to look-up/register services (e.g. FIG. 8b).

Section-T

Building Applications Using RCCs and RSCCs

A replaceable self-contained component (i.e. RSCC) or replaceable component is a module that is designed to have loosely coupled interfaces in order to be easily assembled into a container component and disassembled or removed from the container component as a unit.

The RSCC comprises the code of presentation logic and/or code of application logic. The presentation logic is implemented in reusable GUI classes for GUI components while the code of application logic uses application data to initialize GUI objects for the GUI components. Also, the RSCC comprises special methods for creating necessary communication code if the component needs to communicate with any of the other components in the application. The following code illustrates replaceable property of a RSCC, where the component is included by the following lines and removed by removing the lines:

10. RCC RSCC1=new FullStockQuote ("IBM", parameters1);
20. ParentCanvas.AddChild(RSCC1, x_location, y_location, parameters2); Alternatively, in case of online or web application:
10. RCC RSCC1=new FullStockQuote ("IBM", parameters1);
20. RSCC1.CGM (Out, x_location, y_location, parameters2);

If the component needs to communicate with other components in the application, the RSCC is designed to support coupling methods as previously described for coupling the SCC with other components or parts in the application.

In a preferred embodiment, each of the RCCs is designed for making it easy for including or removal of an SCC from an application. This is achieved by, for example, by making the communication code of the RSCC simpler or reducing the communication code required for the coupling with each of the other components/parts. A RSCC instance may be removed for example either to (i) assemble a better RSCC during maintenance time or (ii) to update and test the RSCC with a higher degree of autonomy from the application. For example, a subcomponent such as IntraDayChart in FullStockQuote can be refined and tested with higher degree of autonomy outside of the application that comprises one or more subcomponents (See FIG. 6a, and Section-H).

One or more RSCC can be assembled as sub-components to build another container-SCC. The container-SCC can be designed to be a replaceable component. This process can be repeated to build larger and larger RSCC. Appendices T, U contain code, which shows an implementation for building a component hierarchy for online-applications. The flowcharts in FIG. 12a and FIG. 12b, shows steps of an example embodiment for creating container-RCC using RCCs for sub-SCCs.

Figure 13A:
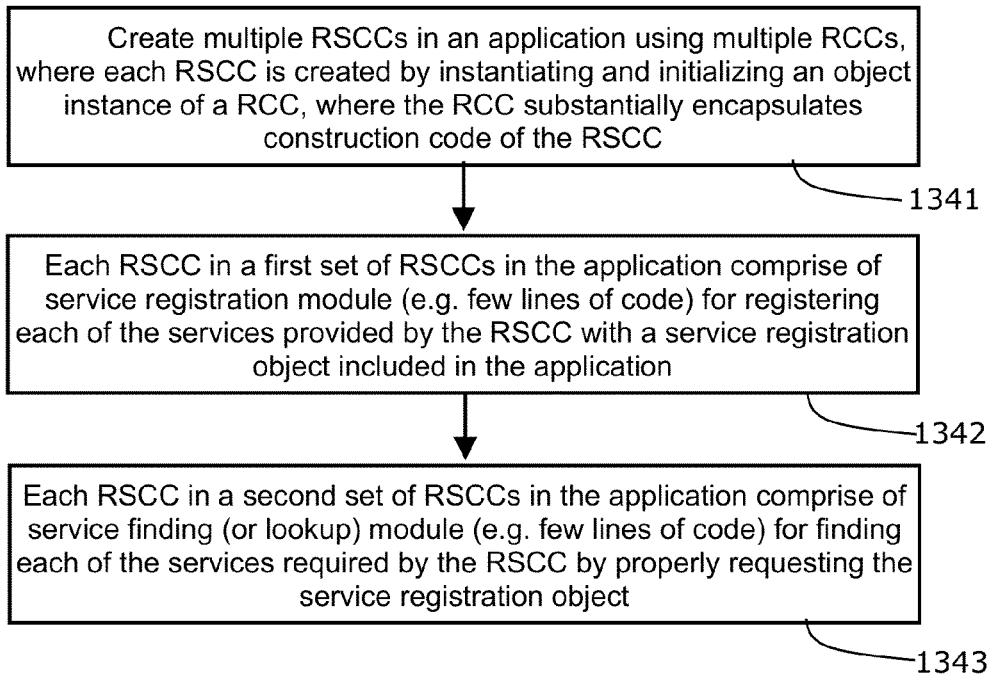
FIG. 13a illustrates a flowchart for creating a software application code including multiple RSCCs, and facilitating communication between RSCCs, according to one embodiment.

In yet another embodiment (as illustrated in FIG. 8a and FIG. 13a), a method of executing a software application code including multiple RSCCs on a computing platform, wherein the software application code facilitates communication between the multiple replaceable self-contained components (RSCCs) using a service registration object (SRO), wherein each RSCC is created by instantiating and initializing an object instance of a replaceable component class (RCC) that substantially encapsulates construction code of a self-contained component (SCC) and wherein RSCCs comprise a first set of RSCCs that provide services and a second set of RSCCs that consumes the services provided by the first set of RCCSs, includes registering each of the services provided by each of the first set of RSCCs with the service registration object by using RSCC registration module residing in each of the first set of RSCCs, and obtaining the service registration object for the services provided by each of the first set of RSCCs by the second set of RSCCs for facilitating communication between the RSCCs in the software application code by RSCC service finding module residing in each of the second set of RSCCs upon an event selected from the group consisting of user event, sensor event, timer event and data/state change event. The 'construction code' is described in more detail in the sections below.

Figure 13B:
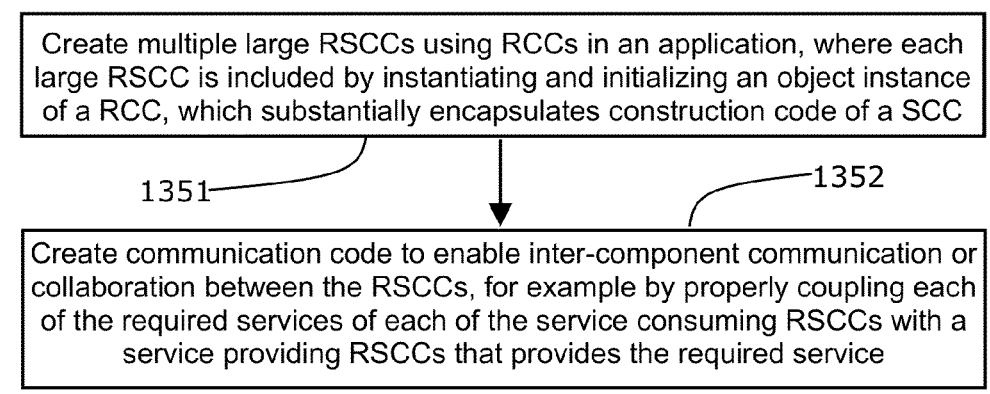
FIG. 13b illustrates a flowchart for creating a software application code including multiple large RSCCs, according to one embodiment.

FIG. 13b illustrates a flowchart for creating a software application code by including multiple RSCCs using appropriate RCCs, and facilitating communication between RSCCs, according to one embodiment. In one example embodiment, one of the multiple RSCCs includes one or more graphical user interface (GUI) subcomponents and the GUI subcomponents are included using reusable GUI classes. In another example embodiment, at least one of the RSCCs includes one or more instances of reusable components, application specific logic and code for accessing data from application specific data sources. In one example embodiment, at least one of the multiple RSCCs includes one or more sub RSCCs as subcomponents.

In step 1341, multiple RSCCs are created using multiple RCCs in an application, where each RSCC is created by instantiating and initializing an object instance of a replaceable component class (RCC) that substantially encapsulates construction code of the RSCC. In one embodiment, RSCCs comprise a first set of RSCCs (801, 802, and 803 as shown in FIG. 8A and SP 1410 as shown in FIG. 14a) that provide services and a second set of RSCCs (805, 806, and 807 as shown in FIG. 8A and SC 1420 as shown in FIG. 14a) that consume the services provided by the first set of RCCSs (as illustrated in FIG. 8a and FIG. 14a).

In step 1342, an RSCC service registration module (e.g., RSCC registration code or module 812, 813, and 814 of FIG. 8a) which resides in each of the first set of RSCCs is created for registering each of the services provided by each of the first set of RSCCs with a service registration object (e.g., SRO 810 of FIG. 8a and SRO 1400 of FIG. 14a). In these embodiments, each of the services is registered by the RSCC registration module using a pre-defined lookup-key of the service function, or service object. Further, the service function or service object is called to obtain the service. In another embodiment the SRO builds lists of available services and requires services (e.g. see FIG. 14a and section-I), the service registration object outputs a list of communication interfaces of an RSCC.

For example, the RSCC registration modules in each of the first set of RSCCs include code for registering the services associated with the first set of RSSCs. In step 1343, an RSCC service finding module (e.g., RSCC service finding module 815, 816, and 817 of FIG. 8a) which resides in each of the second set of RSCCs is created for finding each of the required services and consuming each of the services provided by one of the first set of RSCCs for facilitating communication between the RSCCs in the software application code upon an event selected from the group consisting of user event, sensor event, timer event, event or call from another RSCCs or external module in the application and data/state change event. In these embodiments, obtaining each of the services is obtained by the RSCC finding module using a pre-defined lookup-key of the service function, or service object and by calling the service function or service object. For example, the RSCC service finding modules include code for getting the services provided by the first set of RSSCs.

Furthermore, unavailability of a service required by one of the second set of RSSCs is detected by the service registration object, in one of the embodiments (see FIG. 14a and section-I). Also, unused one or more services registered by the first set of RSSCs is detected by the service registration object. In addition, incompatible communication interfaces between service providing and service consuming RSCCs is also detected. These features are explained in detail with respect to FIG. 14a.

FIG. 13a illustrates a flowchart for creating a software application code for including multiple large RSCCs, according to one embodiment. In one example embodiment, one of the multiple large RSCCs includes multiple graphical user interface (GUI) subcomponents and the GUI subcomponents are included using reusable GUI classes. For example, one or more multiple large RSCCs include one or more sub RSCCs as subcomponents.

In step 1351 of FIG. 13b, multiple large RSCCs are created using RCCs in an application, where each large RSCC is created by instantiating and initializing an object instance of a large replaceable component class (RCC) that substantially encapsulates construction code of a self-contained component (SCC). In one embodiment, each large RSCC includes about few hundred lines of application specific code, code for accessing application specific data, or code for processing the application specific data. In another embodiment, the multiple large RSCCs include approximately about 50% of the total application specific code in the software application code. The 'application specific code' is described in more detail below in "Section-X: Application specific code of an application or RSCC". Each of the multiple large RSCCs provides services, consumes the services or provides and consumes services. In addition, at least one of the large RSCCs includes one or more instances of reusable components, application specific logic and code for accessing data from application specific data sources.

In step 1352, communication code is created to enable inter-component communication or collaboration between large RSCCs to enable providing services and consuming services as illustrated with respect to FIGS. 9a, 9b and 9d, according to one embodiment. In one embodiment, the coupling code is created to enable communication between the large RSCCs to enable providing services and consume services by creating an RSCC registration module which resides in each large RSCC for registering each of the services provided by each of a first set of large RSCCs with a service registration object, and by creating an RSCC service finding module residing in each of a second set of large RSCCs for obtaining required services provide by one of the first set of large RSCCs for facilitating communication between the large RSCCs in the software application code upon an event selected from the group consisting of user event, sensor event, timer event and data/state change event.

In one embodiment, creating the communication code to enable communication between the large RSCCs includes creating a required communication code between a first large RSCC and second large RSCC of the large RSCCs (e.g., as illustrated with respect to FIGS. 10c and 15a). In one embodiment one or more coupling-methods implemented of RCCs for the RSCCs are used for creating communication code. In one example embodiment, creating the required communication code between the first large RSCC and second large RSCC includes creating a callback function in the software application code to call service associated with the first large RSCC and registering the callback function with the second large RSCC for requesting the service. In another example embodiment, creating the required communication code between the first large RSCC and second large RSCC includes creating the software application code for getting a service method of the first large RSCC from its RCC instance and inputting the service method into an RCC instance of the second large RSCC (e.g., by using appropriate coupling-methods of the RCC instances). In this case, the second large RSCC access a service associated with the first large RSCC by calling the service method.

In the example embodiment illustrated in FIG. 13b, a large application can be created by including multiple RSCCs as subcomponents, where each RSCC is included by using an RCC. The application also creates necessary coupling code between any two RSCCs, if the two RSCCs need to communicate or collaborate with each other. FIGS. 9a, 9b and 9d illustrates an example embodiment of an application (or container-RCC of a container RSCC) comprising two RSCCs and coupling code for facilitating communication between the two RSCCs. FIG. 9c depicts steps for creating the application (i.e., container RCC of a container-RSCC) including just two RSCCs as subcomponents. The step 920 creates miscellaneous initial code for the container-RCC. The step 921 instantiates and initializes an RCC object for a first RSCC (e.g. RSCC1 931 of FIG. 9d) and assembles the first RSCC as a subcomponent. The step 922 instantiates and initializes an RCC object for a second RSCC (e.g. RSCC2 932 of FIG. 9d) and assembles the second RSCC as another subcomponent. The step 923 creates coupling code (e.g. 933 of FIG. 9d) for facilitating communication between the first RSCC and the second RSCC. FIG. 9d depicts conceptual block diagram for code structure 930 of an application (or container RCC of a container-RSCC) including code sections for including two RSCCs (i.e. RSCC1 931 and RSCC2 932) and coupling code 933 for facilitating communication between the two RSCCs.

Section-U

Summary about RCC and SCC

In brief, a SCC is a fully constructed module or object, which requires no more construction for performing its designated operations. A RCC is a class definition or a module implemented to encapsulate substantial portion of construction code of a SCC in order to be used for assembling an instance of SCC in an application as a unit. A RCC requires few more lines of initialization (e.g. remaining construction code) and communication code for creating an instance of self-contained component.

An instance of an SCC can be included in an application by instantiating an object instance of its RCC and properly initializing the object by implementing remaining few lines of construction code. The properly initialized RCC's object functions as SCC in case of non-web application. But in case of the web applications, an initialized object instance of a RCC (runs at server) is used for creating a SCC (runs at client).

In an example embodiment, if many GIS applications require Air traffic system discussed in above example, but the RCC of City_ATC_RCC might not be reusable because another new application for another country likely having different kind of data source, rules, regulations or database schema. However it is possible to take a copy of City_ATC_RCC source code and redesign the class to properly access data from the data sources of new application. Hence, an RCC might not be readily reusable, but most of the code base created and knowledge gained can be reused for creating similar RCC for any another application. For example, many applications built for a given business domain or vertical such as GIS, insurance or banking requires many similar SCCs, where the difference in functionality, features or operation between any two SCCs likely be no more than 20%. Hence, construction code of a SCC encapsulated in an RCC can be more easily reused than the construction code of a SCC that is not encapsulated in an RCC, because collecting all the source code spread across many files (e.g. as illustrated in FIG. 15b or 15c) requires more effort.

In an exemplary embodiment, if an application is created by assembling multiple RSCCs, it is easier to assure the quality of the application by autonomously testing quality of each RSCC and compatibility of its interfaces. If a large SCC, such as Landmarks or City_ATC, in an application is not encapsulated in an RCC, then it is not practically possible to test it autonomously for assuring quality of the SCC outside of the application, for example, by implementing a test application to use and test the RCC alone. So to assure overall quality the whole application needs to be tested whenever any of the SCC is redesigned to fix a bug or to add a feature.

Although reusability is not the design intent of the replaceable component classes (or RCC), a small percent of the RCC of large self-contained components (or SCC) such as (a) spell-checker or (a) RCC that takes a zip code and creates a city street map, may be readily reusable in more than one application. Very few such large replaceable component classes are also readily reusable across multiple applications and application domains because they only require generic implementation and often don't require both data and code specific to any application, domain or context.

Furthermore such a replaceable and reusable component rarely requires application specific modifications for satisfying evolving business needs. For example any changes or improvements made to such RCC for one application, likely to be needed by the other applications that are also using the RCC. If that is not the case, in one of the preferred embodiments, make a separate copy of the class code and redesign the class implementation for satisfying the unique needs of each new application, according to one embodiment. Henceforth each copy of the RCC could evolve to satisfy unique evolving needs of respective application.

It is desirable to encapsulate construction code of each large SCC (e.g. CityATC of container component CityLandmarks_RCC having subcomponents in section-J) in an RCC because if construction code of an SCC is not encapsulated in an RCC and the code sections of the SCC ends up mixed with code sections of other SCCs and spread across many files (e.g. FIGS. 15b and 15c). Then for example, (a) it is very hard to redesign the SCC independently for example to satisfy evolving business needs or to independently test for assuring its quality after a redesign of the RSCC and (b) it is very hard to extract various code sections from many files to get whole construction code of a SCC, for example, for reusing the SCC in a new application.

Subsection-1

An Example System for Running Applications Comprising RSCCs

Figure 2:
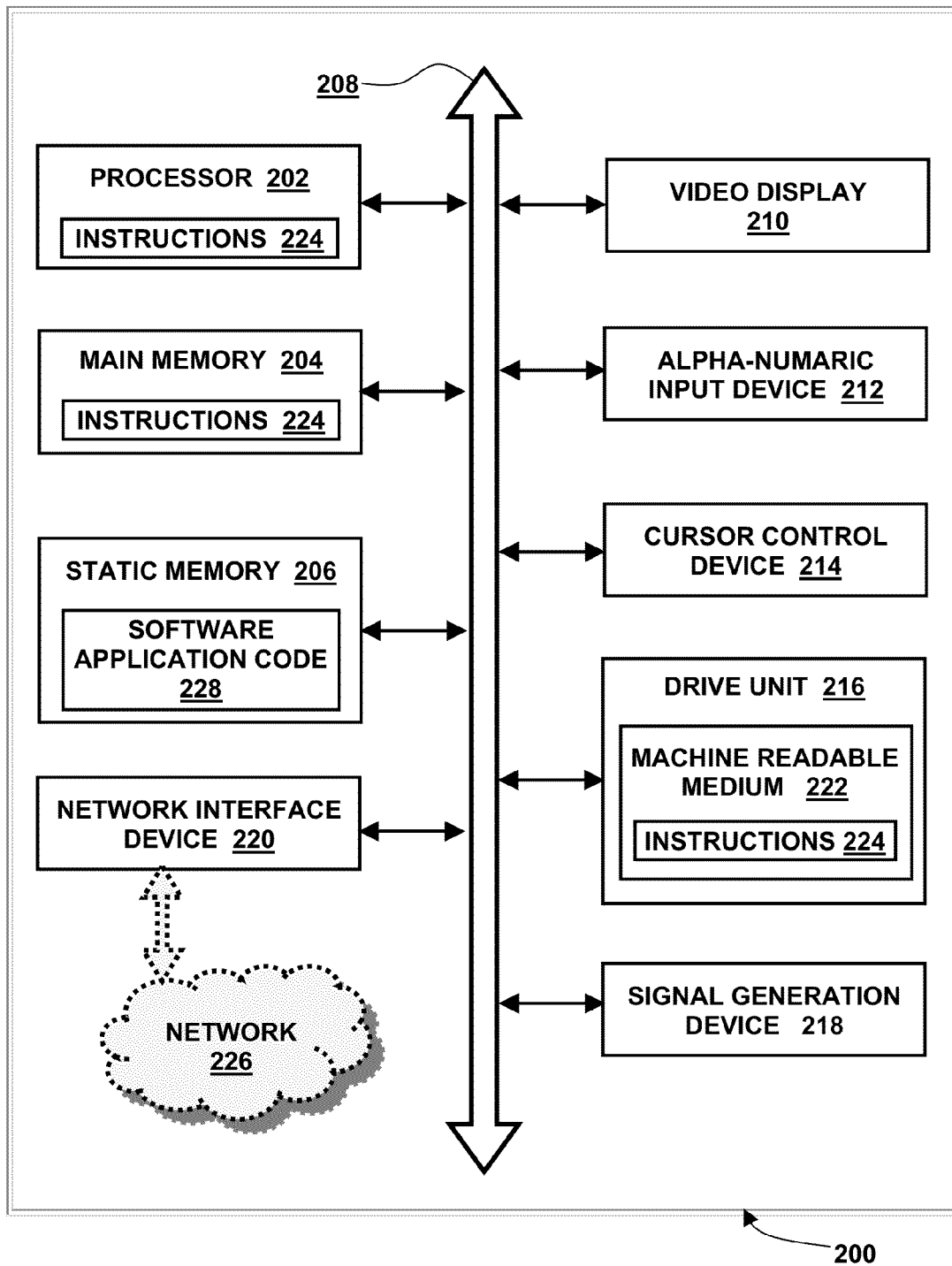
FIG. 2 shows an exemplary system for exciting an application containing new kind of components created and included in to the application by using the method of the software development disclosed herein, according to one embodiment.

FIG. 2 is a diagrammatic system view 200 of a data processing system in which any of the embodiments disclosed herein may be performed, according to one embodiment. Particularly, the diagrammatic system view of FIG. 2 illustrates a processor 202, a main memory 204, a static memory 206, a bus 208, a video display 210, an alpha-numeric input device 212, a cursor control device 214, a drive unit 216, a signal generation device 218, a network interface device 220, a machine readable medium 222, instructions 224 and a network 226.

The diagrammatic system view 200 may indicate a personal computer and/or a data processing system in which one or more operations disclosed herein are performed. The processor 202 may be a microprocessor, a state machine, an application specific integrated circuit, a field programmable gate array, etc. The main memory 204 may be a dynamic random access memory and/or a primary memory of a computer system. Further, the main memory 204 also includes a software application code 228 including multiple large RSCCs. The static memory 206 may be a hard drive, a flash drive, and/or other memory information associated with the data processing system. Also an application comprising RSCCs can be stored on a computer readable medium connected to computer using appropriate protocols such as NFS (Network File Server) or SAN (Storage Area Networks).

The bus 208 may be an interconnection between various circuits and/or structures of the data processing system. The video display 210 may provide graphical representation of information on the data processing system. The alpha-numeric input device 212 may be a keypad, keyboard and/or any other input device of text (e.g., a special device to aid the physically handicapped). The cursor control device 214 may be a pointing device such as a mouse or touchpad. The drive unit 216 may be a hard drive, a storage system, and/or other longer term storage subsystem.

The signal generation device 218 may be a BIOS and/or a functional operating system of the data processing system. The network interface device 220 may perform interface functions (e.g., code conversion, protocol conversion, and/or buffering) required for communications to and from the network 226 between a number of independent devices (e.g., of varying protocols). The machine readable medium 222 may provide instructions on which any of the methods disclosed herein may be performed. The instructions 224 may provide source code and/or data code to the processor 202 to enable any one or more operations disclosed herein.

In accordance with the above described embodiments with respect to FIG. 2, the system includes a processor 202, and memory 204 operatively coupled to the processor 202, wherein the memory includes a software application code 228 including multiple large RSCCs having instructions capable of: creating each large RSCC by instantiating and initializing an object instance of a large replaceable component class (RCC) that substantially encapsulates construction code of a self-contained component (SCC), wherein each large RSCC comprises about few hundred lines of application specific code, code for accessing application specific data, or code for processing the application specific data, and wherein the multiple large RSCCs comprises approximately about 50% of the total application specific code in the software application code, and wherein each of the multiple large RSCCs provide services, consume the services or provide and consume services, and creating coupling code to enable communication between large RSCCs to enable providing services and consuming services. However it is possible that few of the large RSCCs neither provide nor consume services.

An article comprising a computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

Section-V

Reusable Components Verses Replaceable Components

The replaceable self-contained components are new kind of software components. For example, the RCCs are designed to satisfy certain unique objectives and characteristics to increase the degree of autonomy for its RSCC. The RCCs are different from other known kinds of software components, such as reusable software components. The unique aspects, requirements, objectives and differences of the RCCs (with other kind of software components or parts) can be comprehended by comparing with each of the other kinds of software components. The following compares RCCs with reusable software components to illustrate the unique characteristics and requirements of the RCCs.

The reusable components (e.g. reusable GUI Classes or API) must be designed to be non-context-sensitive, highly flexible & configurable so that they can be used in many applications without redesigning the code of the reusable component class. The often-stated desirable characteristics for reusable components include non-context-specific, generic or standardized etc., which could enhance the reusability of the components. Each large reusable class (e.g. a GUI class for a line chart or a pie chart) often require implementing many lines of construction code in the application to input application data and to configure the component instance to meet unique needs of the application.

Since class-definition (or class) for each reusable component is designed to be generic or non-context-specific, the object instance of the class needs application specific logic, data to initialize (e.g. by inputting data) and to configure. It is often not possible or practical for a reusable class such as Pie chart (e.g. 304) or Line-chart to implement such application specific construction code within the implementation of the class-definition (and still be generic to be reusable across multiple applications). So application must implement many lines of application specific construction code (e.g. 306), such as code to access, process data from application specific data sources/format and use the data. So all this associated construction code in the application must be removed to effectively remove the resultant component. On the other hand, large RSCC such as CityLandmarks or CityHotels comprise not only application specific code/data but also contains dozens of large components such as Pie chart, Tables etc.

According to one preferred embodiment, the main design objective of each RCC is custom built to satisfy unique custom needs of just one target application. Hence can be designed to encapsulate almost all the necessary construction and/or configuration code, such as, application specific logic for accessing specific data (from application specific data sources and data format), processing the data, instantiating and configuring many reusable components. Each RCC is designed for a specific application, so highly context-specific. It is possible for the RCC to implement custom coupling interfaces to minimize the communication code to couple its component to collaborate with other parts of the application, in an exemplary embodiment. The coupling interfaces can be implemented in the context of its application knowing the interfaces of other collaborating parts in the application. The objective of each RCC is: Modularization of self-contained modules (i.e. SCC) of an application into replaceable self-contained modules (i.e. RSCC) by encapsulating most of the construction code of the SCC in a RCC and in exclusive set of files.

In an exemplary embodiment, the design objective of the RCC is to minimize the application code needed to construct and/or configure its object instance to few lines, for including its RSCC in an application. If an application requires to implement more than few lines of construction and/or configuration code assemble an object instance of an RCC, it is possible to move many parts of the construction and/or configuration code into the class definition of the RCC, if no other application is using the RCC (e.g. if the RCC is custom designed for just one application).

In an exemplary embodiment, since each RSCC is designed to address a specific problem of a given application, it is possible to create (i) large RSCC comprising of dozens to hundreds of generic reusable components (E.g. CityATC may use reusable GUI Classes for Airplanes, Helicopters and GUI controls like Pop-up windows, Charts, Buttons, Text or Infotables etc.) and (ii) container RSCC (e.g. CityLandMarksRCC) comprising many large sub-RSCC (e.g. TouristSpots etc). The RCC for the CityGIS may use hundreds or even thousands of reusable classes, and a RCC using the CityGIS as subcomponent may use several thousand reusable classes, and so on.

In one of the preferred embodiment, the objective of each RCC is to have a code-base having high degree of autonomy (i.e. exclusive set of source code files containing all necessary application specific code for its SCC). Where container RCC (e.g. CityLandMarksRCC) must have autonomous code-base, which may use one or more sub-RCCs, wherein each of the sub-RCCs (e.g. CityHotelsRCC) must have autonomous code-base, and so on.

The difference between the replaceable-components (or RCC) and reusable components can be clearly illustrated in another perspective using a borderline component that can be both replaceable component and reusable component. For example a replaceable component (e.g. City Air traffic control RCC CityATC1) is custom designed for a GIS application for City-A. If requirements for a CityATC2 matched nearly 98% of what CityATC1 already has, where the CityATC2 is needed for another GIS application for another City-B. In an example embodiment, takes a copy of the source code of the CityATC1 and redesigns the copy of the source code to create CityATC2 for satisfy unique needs of City-B, then CityATC1 is not a reusable component (even though 98% of the source code is reused, it is just a code reuse and not component reuse).

In an example embodiment, if the RCC for CityATC is redesigned so that it can be configurable to the application for city-A and to the application for city-B. Then each application must implement more configuration code, so CityATC1 class will become harder to replace (i.e. becomes replaceable by lesser degree and also deceases the degree of autonomy), where the configuration/construction code also includes any code for accessing/processing the configuration-data from application specific data sources.

It is harder to maintain a configurable RCC for CityATC1 in future releases, if two different applications use the configurable RCC for including CityATC1 and if the requirements for CityATC1 in each application diverge in the future releases of the applications. If it is desirable to avoid this problem due to diverging requirements, it is possible to create separate custom RCC for each application. In that case, each RCC not only can satisfy current unique needs but also reduces effort required to satisfy often-unpredictable future needs. Of course, RCC for CityATC may be designed to be configurable for reuse in more than one application, if it is determined that such configurable RCC for CityATC1 could offer more net benefits than building separate versions for each of the applications that require slightly different versions of the CityATC.

To make a RCC reusable one must consider many issues such as (i) it is impossible to predict future requirements of each of the applications or (ii) each application likely will have custom data sources for each of its components (e.g. CityATC or CityAmbulances), so not practical to create reusable component-classes for many such components. For example, two applications for two companies require identical SCCs, but historically each company may be using different databases (e.g. Oracle or DB2) and data schemas for storing their data.

Even it is theoretically possible to design such reusable class, it requires many lines of configuration code and code to access/process the configuration data makes such component harder and harder to replace (by removing all associated construction code and data for configuring the SCC). Likewise generic non-context-sensitive classes often require many lines of communication code making them tightly coupled, while RCCs can be custom designed for just one application, so designed to be loosely coupled. Also it is many times more complex to redesign such reusable class, without breaking one of the many applications using the reusable-class.

In one of the exemplary embodiments, it is desirable to increase the degree of autonomy for the code base of each SCC. If a large SCC is not encapsulated in a RCC and it's associated exclusive files and doesn't have exclusive code base, then:

A. It is harder to reuse source code of a large SCC: In an example embodiment, if a new application needs similar SCC, it would cost more to extract all the code sections of the SCC from many application files for reuse in the new application. Furthermore, the application code of the must be redesigned, if the new application have slightly different unique requirements. If these redesigned new code sections of new SCC aren't encapsulated in a RCC again, the code-sections for constructing the new SCC are spread across many non-exclusive files of the new application, making more expensive to include the new SCC.

B. Harder to leverage knowledge, expertise and wisdom: In an example embodiment, if a developer of a large SCC needs to add more features or functionality to the SCC, he needs to redesign many non-exclusive application files, where the application files contain code sections for other SCC. Hence it will become harder to leverage knowledge, new ideas, expertise, for example, gained from previous releases, emerging technologies, market innovation or end-user feedbacks for improving the SCC. If construction code of a SCC is spread across many files, it is harder and error-prone task to distinguish from code-section of other SCCs and test the whole application, whenever even a small change is made to the SCC (e.g. for experimentation or get user reactions).

Increasing the degree of autonomy of the code base of a SCC by encapsulating its application specific construction code is a RCC, increases the degree of division-of-labor and specialization. In an exemplary embodiment, if another application (or next release of old application) requires a similar component having 90% common features, 10% variances in features and 10% new features, then assume it requires changing the source code by about 20%. In an exemplary embodiment, the development team must have already spent long time to gain domain and engineering expertise in designing and building each SCC (e.g. CityATC or Ambulances) from scratch first time, so they become more specialists by acquired domain skills. For example, once all this domain expertise is gained, it might require about 10% effort to make the 20% changes to an autonomous code base of the SCC. These numbers in these example embodiments are given just for illustration purpose, so may be different for different SCCs.

Example-1 of Section-V

An Example for Illustrating Issues Related to Reusing a Configurable RCC in Applications of an Application-Family In an exemplary embodiment, assume a software consulting company is specialized in building CityGIS applications and created many CityGIS applications for many client cities. Furthermore, assume many (e.g. 5 to 7) applications in the application family (or product line) of CityGIS are using similar self-contained component (e.g. SCC for CityATC), where variances in features or functionality between any two instances is no more than 10%. Also assume it is possible to create a configurable RCC for each of the SCCs, so that, each of the applications can instantiate an object instance of the RCC and implement configuration code to satisfy its unique needs. Often each product needs to implement many lines of construction code, such as code for accessing and processing necessary application specific data and to use the data for configuring the RCC instance. All this construction code for including a RSCC instance makes it harder to remove the component (i.e. resulting in decreasing degree of replaceability).

It is generally possible for the software consulting company initially to standardize items such as same data format (e.g. same Database schema) across the family of applications for creating each RCC (e.g. CityATC, CityHotels or SCC for City-emergency response) that requires lot of applications data. But the software consulting company often can't have control over certain unique needs of each customer and future evolution of the each of the applications. For example, the schema of an application must be updated to store new pieces of data for a new feature.

Such reuse of configurable RCC have hidden costs and indirectly reduces autonomy of the SCC for adopting to changing needs, even if it requires no more than 7 lines of construction code to include an SCC instance. If multiple applications are reusing a configurable RCC, the configurable RCC increases complexity for redesigning the RCC to create a new version to satisfy changing needs of any one of the applications, since such changes will have implications for the other applications reusing the RCC.

For example, various issues need to be addressed for each of the other applications, such as should another application continue to use the older version of RCC or which version should another application modify to satisfy its evolving needs? Such issues and considerations decrease the degree of autonomy for a configurable RCC, in the perspective of each of the application reusing the configurable RCC.

It is possible to increase the degree of replaceability for such a configurable RCC, by creating a wrapper-RCC for each given application. Here each application creates its own wrapper-RCC and the wrapper-RCC implements code for accessing and processing configuration data and construction code for instantiating and fully configuring the configurable RCC to satisfy the unique needs of the application. But such wrapper-RCCs can only increase replaceability, but can't change the hidden indirect costs such as loss of autonomy or increased complexity resulting from multiple applications depending on the configurable RCC.

The main goals of the replaceable-components (i.e. RCCs) are different from the goals of the reusable-components. The main objective of the RCC is to increase the degree of autonomy for its SCC, where increasing the autonomy could decrease cost of adapting the SCC to evolving needs of its application. It is more complex and requires more work to redesign RCC of a large SCC (e.g. CityATC) to satisfy new unique needs of each application (e.g. of a city), while preserving the backward compatibility for other applications of rest of the customers (e.g. for other cities). So there arises a tradeoff between reuse of a configurable RCC and degree of autonomy of the RCC.

For example, to preserve the reuse of the new RCC, it is required that the other applications that depends on the configurable RCC must be tested to assure that the changes not effected each of them. Alternatively, if the other applications stick with old version of the RCC, when another application needs different features in the future and the application changes the code base of old RCC, then the code base of the RCC end up in diverging evolutionary paths for each of the applications.

If it is decided to preserve reusability of a configurable RCC across multiple applications, the code base of the configurable RCC becomes increasingly sub-optimal for each application, since it accumulates redundant/unused features or services implemented for other applications over time. When making changes to satisfy unique evolving needs of one of the applications, it is possible to maintain backward compatibility for other applications, but it increases risks, complexity or costs. For example, methods for maintaining backward compatibility include: A new service or variation of existing service can be implemented by adding a new service function. Likewise, a new feature or variation of existing feature can be implemented by adding a configurable option and configuring the option can turn on the new feature.

Things and factors to be considered when reusing any large RCC in multiple applications include (i) How to handle, if future requirements for various applications that are using the RCC diverge and/or (ii) Potential complexity for preserving backward compatibility of the RCC for other applications, whenever changes must be made to satisfy unique needs of one of the application. Other things to consider are, a mature RCC that are used for few years tends to change less than early versions of a RCC. Also experience gained from the matured RCC can be leveraged to make educated choices, such as, to redesign a RCC as a configurable RCC.

Alternatively, it is possible to increase reuse by identifying multiple generic features or services of the RCC and create one or more smaller highly configurable generic non-context specific reusable-classes. Then a RCC for each of the application selects appropriate set of reusable-classes and configure them based on application context and application specific data for satisfying unique needs of each target application. For example, it is desirable to identify generic reusable components such as, tables GUI classes for Airplane, Helicopter or Table needed in RCC for CityATC. Where the smaller generic reusable-classes can be more configurable and less likely to change in future, for example, they are designed to be more context-specific to a domain (e.g. CityATC) but less context-specific for any application within the domain.

Section-W

Overall Dependencies of Each RCC and Various Factors Affect its Degree of Autonomy Today there exists a large and diverse eco-system for software development, where the eco-system comprising of Operating Systems (OSs) such as Linux Microsoft's Windows, platforms (e.g. Java virtual machine, HTML Browsers, Adobe's Flash player or SVG Viewer etc.), programming languages, libraries, APIs (e.g. GUI-APIs, system-calls, math or other kinds of libraries from $3^{rd}$ party vendors etc.) for reusable components and database management systems (e.g. Oracle's RDBM or IBM's DB2 etc.) and others. The eco-system for software development has been evolving for many decades and will continue to evolve in the future.

Figure 16A:
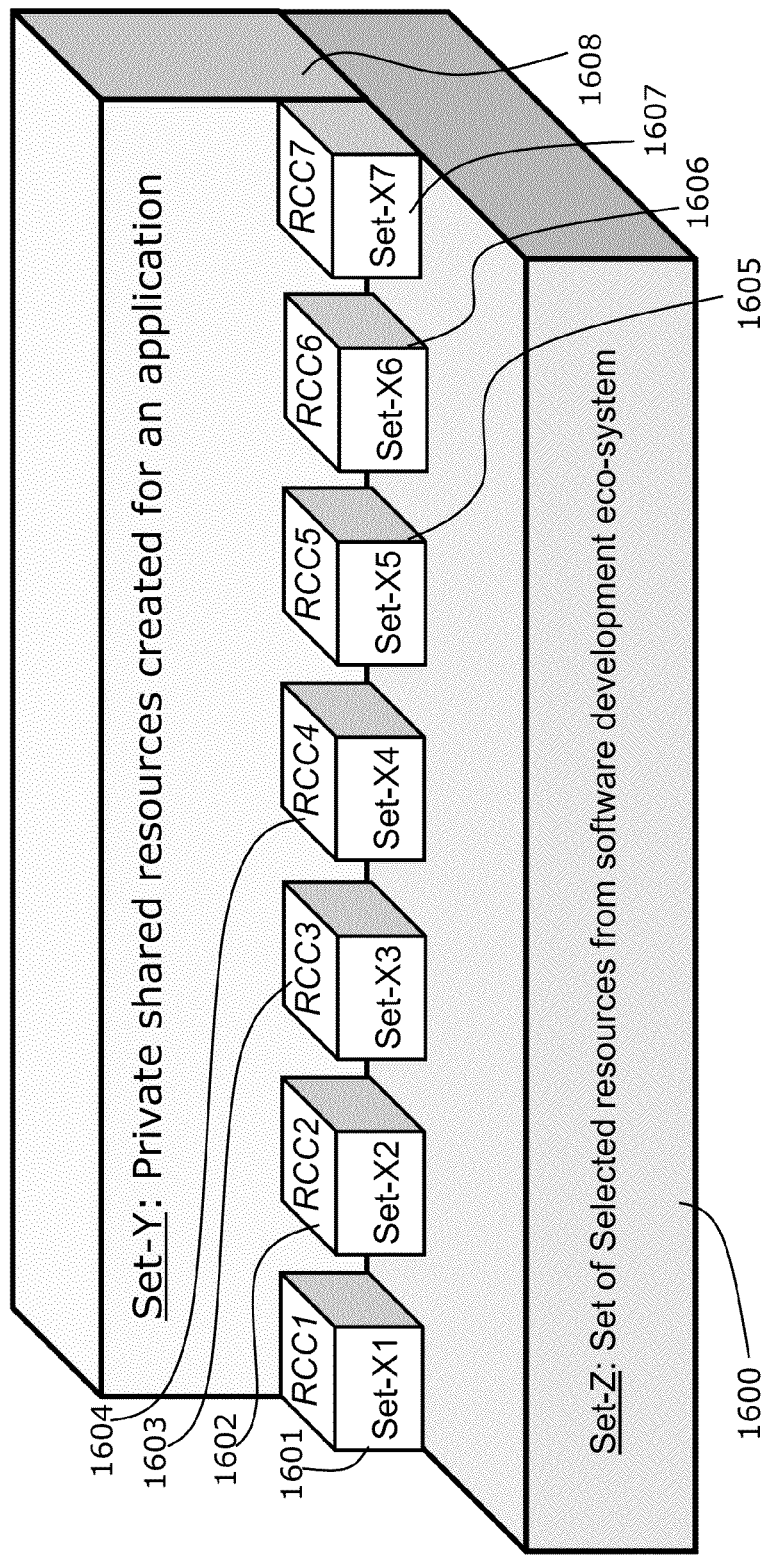
FIG. 16a shows set of exclusive files (or exclusive code base) for each RCC in an application, a hypothetical set for files created for the application and a hypothetical set for resources used from eco system for software development, according to one embodiment.

FIG. 16a shows logical partitioning of resources used and created for building an application, where (i) any resource or file that is not specially created for an application but used from the eco system for software development belongs to set-Z 1600 for the application and (ii) any file created in the process of developing the application belong to either set-Y 1608 or one of the set-Xs (i.e. 1601 to 1607). Where the set-Y 1608 comprises files containing various resources for the application (or for RSCCs in the application) such as source code, class definitions, images, configurations, style sheets, headers for including or scripts etc.

The sets set-Y 1608 and set-Z 1600 are only hypothetical sets for illustrating (i) degree of autonomy of a RCC and its set-X (e.g. RCC1 and its set-X1) and (ii) dependencies of the RCC and its set-X on resources in set-Y 1608 and set-Z 1600.

Set-Z 1600 of an application is a hypothetical set that includes all the pre-existing, third party software resources and platforms such as target OS (e.g. system calls, Input/Output-library etc.), Java-virtual machine, RDBMS (e.g. Oracle's RDBMS or IBM's DB2) compilers or programming languages used for building the application. Also, Set-Z 1600 also includes any selected third-party libraries such as GUI-API, Tools, utilities, and math-libraries etc. Furthermore, selected infrastructure of an application includes any other resources not created for the application but used in building the application such as IDEs (Integrated Development Environment) such as Microsoft Visual Studio and Eclipse IDE. The designers of an application select and use appropriate resources from existing eco system for software development.

In an example embodiment, assume an application is created using resources from software eco system such as: (i) Languages such as Java, HTML, XML, JavaSript, Flash and SVG etc., (ii) Platforms such as Linux-OS, Apache web server and Eclipse-IDE etc., (iii) Other resources such as Oracle RDBMS and Oracle's reusable libraries or tools etc., and (iv) Various third party reusable libraries both from component vendors and open source etc. Then all these resources hypothetically belong to set-Z (or selected infrastructure) of the application.

All the sets (i.e. set-Z 1600, set-Xs from 1601 to 1607 and set-Y 1608) are mutually exclusive. That is, a file or resource used for building the application belongs to no more than one on the sets in set-Z 1600, set-Xs from 1601 to 1607, and set-Y 1608. If a file created exclusively for a RCC (e.g. RCC1 1601) of the application and not used by any other RCCs (i.e. 1602 to 1607) or other parts of the application, the file belongs to set-X of the RCC (e.g. set-X1 of RCC1 1601). That is, for example, if a file (or set of files containing implementation of a class) F1 is created for the application and F1 is exclusively used by RCC1, then F1 belongs to set-X1 1601. If F1 is reused later by other RCCs (e.g. RCC7 1607) or other parts of the application, F1 logically belongs to set-Y 1608 of the application from the time of reuse. Since F1 is no longer exclusive for RCC1, hence F1 can no longer belong to Set-X1 1601.

Any file created for an application and exclusively used by just one RCC (e.g. RCC1) logically belongs to a set-X (e.g. set-X1 1601), which is set of exclusive code base of the RCC (e.g. RCC1). A file created for an application belongs to hypothetical set-Y 1608, only if the file doesn't belong to none of the set-Xs (e.g. 1601 to 1607). A file or resource belongs to set-Z 1600, if the file or resource not created for the application but used from the eco-system for the software development, where the resource is used by either parts of the application or RCCs of the application (i.e. used for creating files in set-Y 1608 or set-Xs (e.g., 1601 to 1607)).

For example, when a new version of a platform (e.g. OS or Browser) or API is released, various parts of the application that are depending on the changed parts in the new platform or API must be redesigned, if the application need to be ported to the new platform or API. For example, when it is required to port an application to a new platform or need to use new libraries etc., then it is required to address dependences on the eco-system for software development.

In an example embodiment, assume it is required to redesign a RCC for satisfying new requirements. Sometimes it is possible to satisfy the new requirements without changing its selected infrastructure (i.e. set-Z 1600). Sometimes it is required to change parts of selected infrastructure, such as finding a better or more suitable reusable GUI class or API to implement new features or to satisfy certain unique requirements. For example, if reusable GUI class for the line chart is improved in next GUI API release or a better line chart is available from another vendor, and RCC is redesigned to use the new line chart, then set-Z hypothetically updated to include the new line chart.

Figure 16B:
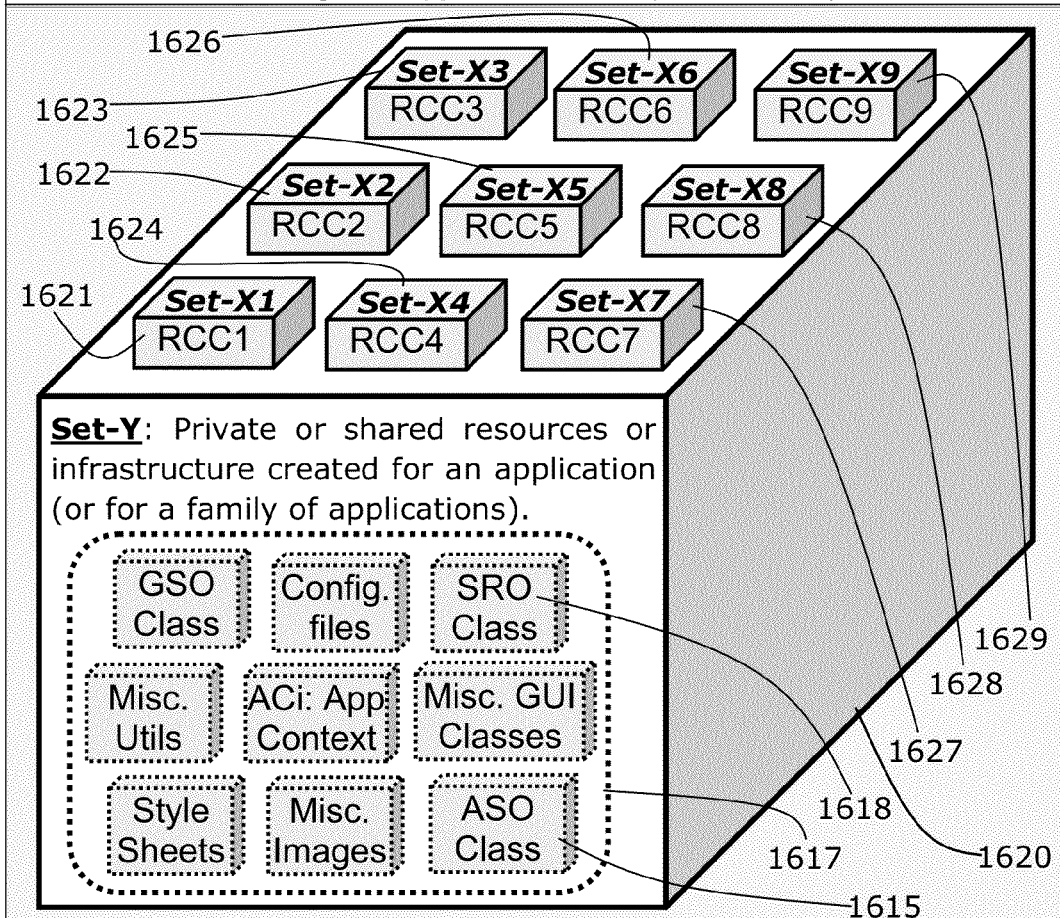
FIG. 16b shows set of exclusive files (or exclusive code base) for each RCC in an application, and an hypothetical set for files created for the application, according to one embodiment.

FIG. 16b shows hypothetical set-Y 1620 of an application having 9 RCCs 1621 to 1629, where exclusive code base (i.e. exclusive files) created for each of the RCCs (i.e. 1621 to 1629) logically belongs to respective set-Xs (i.e. 1621 to 1629). Set-Y comprises of shared resources 1617 such as SRO 1618 and ASO 1615 etc. Set-Y 1620 hypothetically includes all the files created for the application, except the files belong to one of the set-Xs (i.e., 1621 to 1629). If a file (or set of files containing implementation of a class) F1 is created for the application and is shared by more than one RCC, then the file belongs to set-Y 1620. For example, if F1 is used by RCC1 1621 and RCC2 1622, then F1 belongs to set-Y 1620. But if F1 is used by RCC1 1621 alone, then F1 belongs to set-X1 1621.

Set-Y 1620 for an application or an application family: An application or family of applications in a domain (e.g. banking, semiconductors or insurance) may create a domain or application specific private shared infrastructure (e.g. private files). A shared infrastructure created for an application includes general utilities (e.g. SRO or App_xyz_services), tools, set of reusable functions or classes (e.g. Airplane for CityATC, Wafer-map for semiconductor manufacturing application, Fail-Bit-Map to show failed bits in a memory-chip or mortgage calculator for house loans etc.) for a given application domain (e.g. banking, semiconductors or GIS).

In certain cases, it is required to create a set of applications to address nearly similar requirements. For example, Nokia creates many nearly similar Operating systems for using in wide range of Cell-phones Nokia sells. For another example, a software service provider specialized in EMR (Electronic Medical Records) may need to create nearly similar EMR applications for many hospitals, if each of the hospitals requires certain unique variation in features of its EMR application. This disclosure considers such nearly similar applications belong to an application family (an application family is also referred to as a product line).

Any updates made to a shared utility-class (e.g. of 1617) in set-Y of an application can affect each of the RCCs that are using the utility-class. For example, assume a utility-class UC1 in the shared infrastructure set-Y 1617 is used by more than one RCC. If UC1 is changed to accommodate unique needs of just one of the RCCs (e.g. RCC1 1621), such changes might affect the other RCCs (e.g. if the other RCCs don't need the changes). If other RCCs (e.g. RCC2 1622 and RCC3 1623) are using UC1 and if it is desirable to avoid affecting the other RCCs, then is it possible to create a private copy UC2 for the RCC1 and update the UC2. The modified UC2 belongs to set-X1 of the RCC1, and unmodified UC1 continues to belong to set-Y 1617, since UC1 and UC2 are two different utility-classes.

Alternatively, in an embodiment, it is possible to maintain backward compatibility for UC1. For example, if one of the feature or service of UC1 (in set-Y 1608) must function differently in just one RCC such as RCC1 1621, then one solution is to redesign UC1 with a selectable option to offer the new feature or add a new function to request the new service. When the option is explicitly turned on for the object instance of UC1 in RCC1 1621, the object provides the new feature otherwise the object of UC1 in other RCCs functions the old way. So source code of only RCC1 1621 (that needs the new feature or service) is updated to turn on the option to enable new feature or call the new service function of the object.

In an exemplary embodiment, assume it is required add a new RCC (e.g. CityATC) to an application. Then it is required to implement many new files for the RCC. The resource from set-Z 1600 and files (e.g. shared classes or resources) from set-Z 1600 are used for implementing the new files for set-X of the new RCC. If none of the new files are reused by any other RCCs later, then the new files belong to set-X of the new RCC. It is possible to change some files in set-Y to satisfy unique needs of the new RCC. Likewise, it is possible to add resources from the software eco-system to set-Z 1600, if RCC need to use new resources that are not already belong to hypothetical set-Z 1600.

In an exemplary embodiment, assume development of a new RCC8 1618 (e.g. CityLandmarks in CityGIS) results in creating files for its set-X8 by using resources from set-Z 1600 and set-Y 1608. For example, if RCC8 1618 requires a new third party library or tool, which can be hypothetically added to set-Z 1600 for implementing RCC8 1618. If a reusable class (e.g. reusable GUI class for presenting each of the Theater) is created and used by just RCC8 1618, then the reusable GUI class is belongs to exclusive code base of the RCC8 1618 (i.e. set-X8, since any changes are made to the reusable class can affect no other RCC).

Multiple RCCs can use a shared utility class in set-Y 1620 by instantiating and initializing an object instance of the utility class for internal use of respective RSCCs. Such classes are referred to as shared classes. Alternatively, for example, an application instantiates and initializes an object instance of a utility class (e.g. ACi or SRO) and passes the object instance to multiple RCCs in the application. Such objects are r referred to as shared objects. For example, a message window class is implemented for an application and the application instantiates a global object instance (e.g., APP_xyz_Services) for message window and any RCC/SCC can use the global object instance. The global shared message window object can be made available as a global resource for multiple RCCs in the application. For example, each RCC can get a reference to the message window object and use it for displaying messages:

1. APP_xyz_Services=ACi.getSharedObject("Massage Service Object");
2. APP_xyz_Services.Display_message_window (message_type_code_num, message_string, config_info, call_back);

Where 'ACi' is an application context object created once by the application and passed to each of the object instances of the RCCs, which contains references to many global shared service objects such as SRO 1618 and APP_xyz_Services 1615. Section-P shows many more services of the shared object APP_xyz_Services. The files implemented for both shared classes and shared objects are non-exclusive files for each RCC that used the shared class or object, since redesign of the non-exclusive files in set-Y could affect the RCC.

Removing a RCC that depends on such shared objects won't cause errors in the shared objects, since such shared objects don't depend on the RCC, according to one embodiment. So although each RCC depends on both set-Y and set-Z, the RCC still can be easily disassembled or reassembled. For example, if RSCC for CityATC in CityGIS is using the APP_xyz_Services, RSCC still can be removed by removing the 2-5 lines of application code implemented for including the RSCC. If many RCCs of an application depend on a shared object, removing the shared object from the application or redesigning the class of shared object can cause errors in many RCCs. Although even if such a shared object (e.g. ACi, APP_xyz_Services or SRO) is self-contained, replaceable and have exclusive code base, the shared object is not considered as a replaceable component.

For example, it is possible to employ methods and processes invented for Aspect-Oriented Programming (or AoP) for identifying and creating such shared services or utilities (e.g. APP_xyz_Services). Each of the RCCs and other parts of the application can be implemented to contain code to use such shared resources in set-Y.

If an RCC is created for including its RSCC as a sub-component, (i) the RCC is used by the application for including the RSCC, or (ii) the RCC is used by another RCC of a container-RSCC for including the its RSCC. So application files created for set-Y might depend on resources created in set-Xs for including respective RSCCs as sub-components. Likewise application files created for a set-X might depend on resources created in other set-Xs, for including respective RSCCs as sub-components. This kind of dependency between set-Xs and set-Y is not shown in FIGS. 16a and 16b. According to one embodiment, such dependencies are treated separately and managed using tools such as SRO (see section-I and FIG. 14a).

Exclusive code base of a RCC (e.g. RCC1 in FIG. 16a) belongs to a set-X (e.g. set-X1 1601). The degree of autonomy of a RCC1 depends on set-X1 1601, since any changes made to files in set-X1 1601 to satisfy new requirements of RCC1 have trivial effect on other parts of the application. For example, trivial effect includes, if RCC1 provides a service and a service-interface, changes to the service or the service interface affect other RCCs depending on the service. But such changes to excuse files of a RCC cannot add a new bug in the code of another RCC.

Each of the set-Xs (e.g. 1601 to 1607) in FIG. 16a comprises an exclusive code base (e.g. a set of files for source code or other resources) for a RCC (e.g. RCC1 to RCC7 respectively) of an application. Each of the RCCs (e.g. 1601 to 1607) of an application depends on both set-Y 1608 and set-Z 1600. That is, the source code and other resources in a set-X (e.g. set-X1) of a RCC (e.g. RCC1) are implemented by using resources in set-Y 1608 and set-Z 1600. Also set-Y 1608 of an application depends on set-Z 1600. That is, the resources (e.g. source code and other resources) in set-Y 1608 are implemented by using resources in set-Z 1600.

In an example embodiment, to implement a RCC of an application, if it is required to create new set of files, then the new set of files belong to set-X of the RCC. Where set-X of the RCC (e.g. CityATC or CityHotels) comprises all the new files created and used for implementing the RCC. In general, it is necessary to create each new resource for implementing the RCC, only if the resource is not already available in set-Y 1608 or set-Z 1600.

It is not necessary to implement a new resource (e.g. source code such as a class, a service, a reusable GUI class or style sheets etc.) for implementing the RCC, if that resource is already available in set-Y or set-Z, according to one embodiment. Each set-X logically comprises of exclusive set of files created for a RCC. For example, if two new RCCs (RCC8 and RCC9) are added to an application in FIG. 9c, all the new files created for RCC8 1038 belongs to set-X8 and all the new files created for RCC9 1639 belongs to set-X9.

It is possible for each RCC (e.g. for CityATC) to have exclusive set of files (e.g. exclusive code base) by avoiding unnecessary overlap with the exclusive files (e.g. exclusive code base) of each of the other RCCs (e.g. CityHotels), while sharing many other infrastructure resources (i.e. from set-Y and set-Z) with other RCCs. If it is possible to have exclusive files for RCC8 and exclusive files for RCC9, but if code-sections of SCC8 and code-sections of SCC9 are included in a file, such non-exclusive files unnecessarily decreases the degree of autonomy of both RCC8 and RCC9, Any suitable methods may be employed for maintaining list of files and/or resources in the exclusive code base of each RCC. One exemplary embodiment includes all the files constituting the exclusive code base of a RCC under a main-folder and sub-folders of the main-folder, and so on. That is, folders and sub-folders under one main-folder contains exclusive code base of each RCC. The compiled class libraries and other resources (e.g. images, JavaScript or include files etc.) can be moved to appropriate directories when deploying the application that is using the RCC for including a RSCC.

Figure 16C:
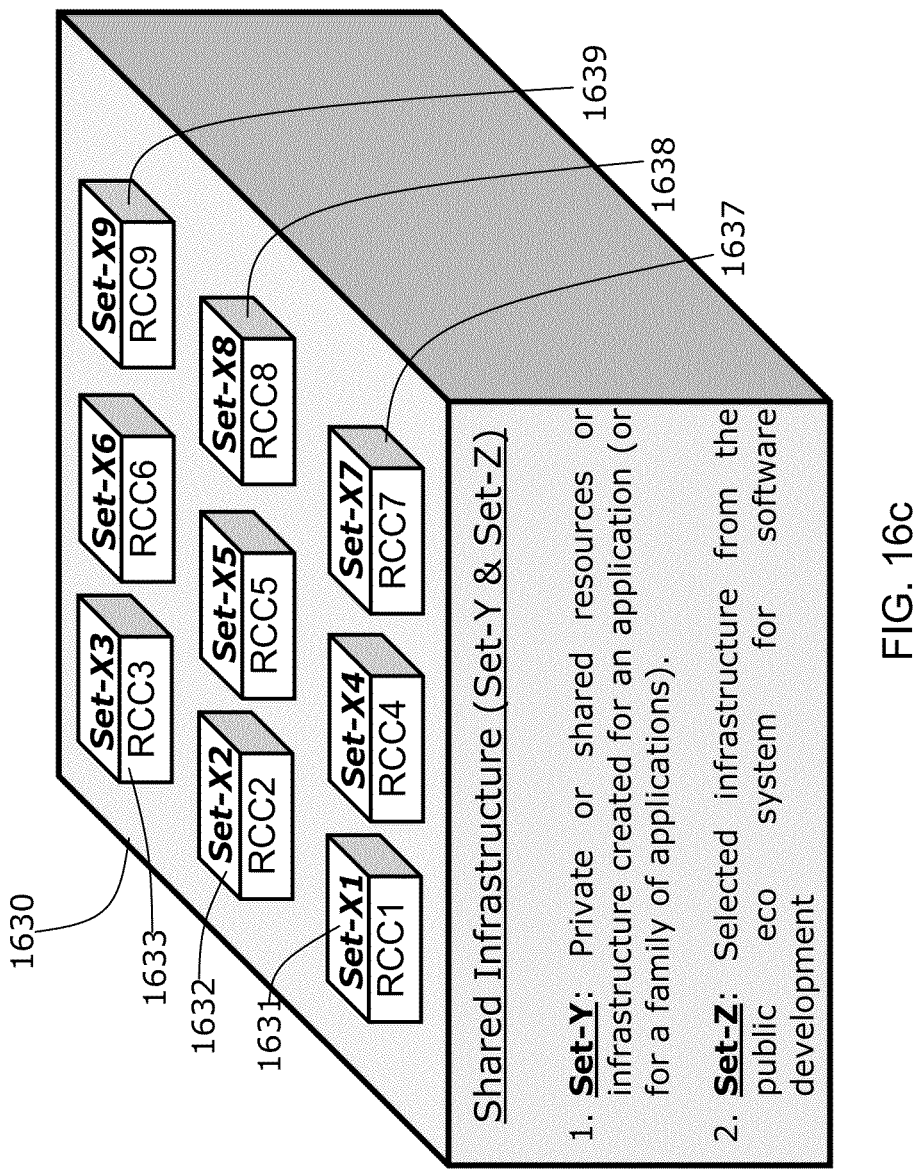
FIG. 16c shows set of exclusive files (or exclusive code base) for each RCC in an application, and an hypothetical set comprising both files created for the application and for resources used from eco system for software development, according to one embodiment.

FIG. 16c shows set of RCCs (e.g. 1631 to 1639) of an application, where each of the RCCs is created using (or depends on) the resources from shared infrastructure 1630 set-Z and set-Y. A set of new files (e.g. set-X8 1638) are designed and developed by using resources from shared infrastructure 1630 for creating each RCC (e.g. RCC8 1638). For example, if it is required to add a new RCC such as RCC9 1639 to the application, a set of new files in set-X9 of RCC9 1639 are designed and developed by using the resources from shared infrastructure 1630 set-Z and set-Y. In the process of designing and developing set-X9, it is possible to add or change one or more files in set-Y. But any changes to files in set-Y could affect other RCCs in the applications, if the other RCCs depend on the changed files. Likewise, more resources (e.g. reusable components from $3^{rd}$ party) can be included in the hypothetical set-Z, if RCC9 requires new resources from the eco system for the software development.

In an exemplary embodiment, a RCC for CityATC is designed and developed using the resources available in both in set-Y and set-Z. All the new files implemented for CityATC's RCC is placed under city_atc folder and its sub-folders, where the new files contain new resources created for the RCC such as, source code, scripts, configuration-files, and images etc.

The dependencies to be considered to change a RCC of an application for satisfying new requirements: As long as no changes are made to files in set-Y and changes are limited to files in set-X of the RCC or including required new resources to hypothetical set-Z, such changes cannot effect features or services of other RCCs or other parts of the application. As shown in the FIG. 16a, any of the RCCs such as RCC1 1601 can depend on wide range of resources in set-Z 1600 or set-Y 1608. When a shared resource belong to set-Y such as class for APP_xyz_services 1615 is redesigned, it could affect the RCCs, which are using an object instance of the class.

For example, if it is required to redesign RCC7 for satisfying new requirements and if the new requirements for RCC7 can be satisfied by making changes to set-X7 and set-Z (e.g. by using a reusable GUI class from a new source), then such changes don't alter features or functionality of any other RCC/part of the application. But if it is required changing a shared resource in set-Y for satisfying the new requirements, changes made to the shared resource in set-Y might alter functionality of other RCCs or parts of the application (which are also depending on the shared resource in set-Y).

It is possible to move files between any two sets (e.g. such as set-X1 of RCC1 and set-Y). For example, if it is desirable to reuse a utility-class UC1 in set-X1 of RCC1 by a new RCC (e.g. RCC9), then the files for UC1 can be removed from exclusive code base (i.e. set-X1) of RCC1 and moved to set-Y. Likewise, if a utility-class UC2 in set-Y is end up used by just one RCC (e.g. RCC1), the files associated with UC2 may be mover to exclusive code base of the RCC (e.g. set-X1, where set-X1 comprises exclusive code base of RCC1). Likewise, for example, if a utility class (e.g. SRO 1618) is implemented for set-Y and later found a better class is available from 'open source community', then the utility class may be deprecated from the hypothetical set-Y.

For example (in FIG. 16b), it is possible to move an exclusive resource, such as R1, created for RCC1 (so belongs to set-X1) 1621 into set-Y 1620, if R1 is required by other RCCs (e.g. 1622-1625). Moving R1 into set-Y 1620 increases reuse of R1 in multiple RCCs (e.g. 1622-1625). But reuse of R1 reduces the degree of autonomy of RCC1, especially if R1 often needs to be updated to satisfy unique evolving needs of RCC1. If R1 not shared, then any changes made to R1 can't alter features or services of other RCCs, because R1 can be changed without understanding or accidentally altering any other RCC (except RCC1). If multiple RCCs (e.g. 1621 to 1625) are depending on a shared resource such as R1, changing the shared resource R1 for a RCC (e.g. 1621) could require understanding implications in other RCCs (e.g. 1622 to 1625).

An example for comparing relative degree of autonomy of two RCCs: Assume RCC4 depends on many shared resources in set-Y and it often required changing the shared resources to satisfy evolving unique requirements of RCC4. On the other hand, assume RCC5 depends on fewer shared resources in set-Y and it rarely required changing the shared resources to satisfy evolving unique requirements of RCC5. In an example embodiment, if this is the experience in maintaining and evolving an application containing RCC4 and RCC5, then RCC5 considered to have higher degree of autonomy then RCC4.

According to one embodiment, preferable time for moving resources between set-X and set-Y is when the application undergoing planned "code-refactoring" and/or redesign for release of next version. Code refactoring is a useful process employed in prior-art for improving structure of source code of an application. The term 'code refactoring' is generally described as, 'a disciplined way to restructure code', undertaken in order to improve some of the nonfunctional attributes of the software. Typically, this is done by applying series of "refactorings", each of which is a (usually) smaller change in a computer program's source code that does not modify its functional requirements. Advantages include improved code readability and reduced complexity to improve the maintainability of the source code, as well as a more expressive internal architecture or object model to improve extensibility. Also "refactorings" can also be performed at any time such as when one or more files in set-Y 1620 or RCC are being redesigned, for example, to satisfy new requirements.

Scenarios and their tradeoffs to be considered when moving resources (e.g. a utility class) between set-X and set-Y or when refactoring code of an application: FIG. 16b shows set-Y 1620 of an application and RCCs (i.e. 1621 to 1629) created for the application. For example, if an exclusive utility-class UC1 belongs to set-X1 of RCC1 1621 is moved from set-X1 to set-Y 1620 for reuse in other RCCs (e.g. 1622 & 1623): this could increase degree of reuse for UC1 while making it harder to change UC1 for satisfying future unique needs of RCC1 1621. Any changes made to UC1 for satisfying unique needs of RCC1 1621 could affect the other RCCs (e.g. 1622 & 1623) using UC1. That is, if such move of a resource from set-X of a RCC to set-Y 1620 could increase reuse of the resource, while making it harder to redesign the resource for satisfying unique needs of the RCC 1621, so it could result in decreasing the degree of autonomy of the RCC.

Other scenarios, options and their tradeoffs to be considered include: For example, it is possible make a copy R2 of a shared resource R1 for including the copy R2 in set-X1 of RCC1 (e.g. 1631 in FIG. 16c). Making such private copy R2 for set-X1 of a resource R1 in set-Y could make it simpler to redesign R2 for satisfying unique needs of RCC1, so it increases the degree of autonomy of RCC1. But this copy R2 reduces degree of reuse of the original resource R1, so for example, if any bug is fixed in R1, additional work is required for fixing the bug in R2 as well. Likewise, R2 cannot automatically leverage any generic or non-context specific improvements made to R1 such as improving performance of R1.

Increasing the degree of autonomy of the files containing application code and other resources implemented (e.g. set-X) or used (e.g. from set-Y) for building an RCC of an application can reduce complexity/effort required for adapting its SCC to changing requirements in future. A file (a set of files created for a resource such as a utility class or style-sheets) is considered exclusive to a RCC, if no other RCC or software-module of the application uses or depends on the file (or the set of files of a resource). So increasing exclusive files of a RCC, for example, by moving a copy of a resource from set-Y to set-X increases degree of autonomy (but could reduce reuse of the resource).

Example-1 of Section-W

Example for Showing all the Dependencies of a RCC of a RSCC

Figure 17A:
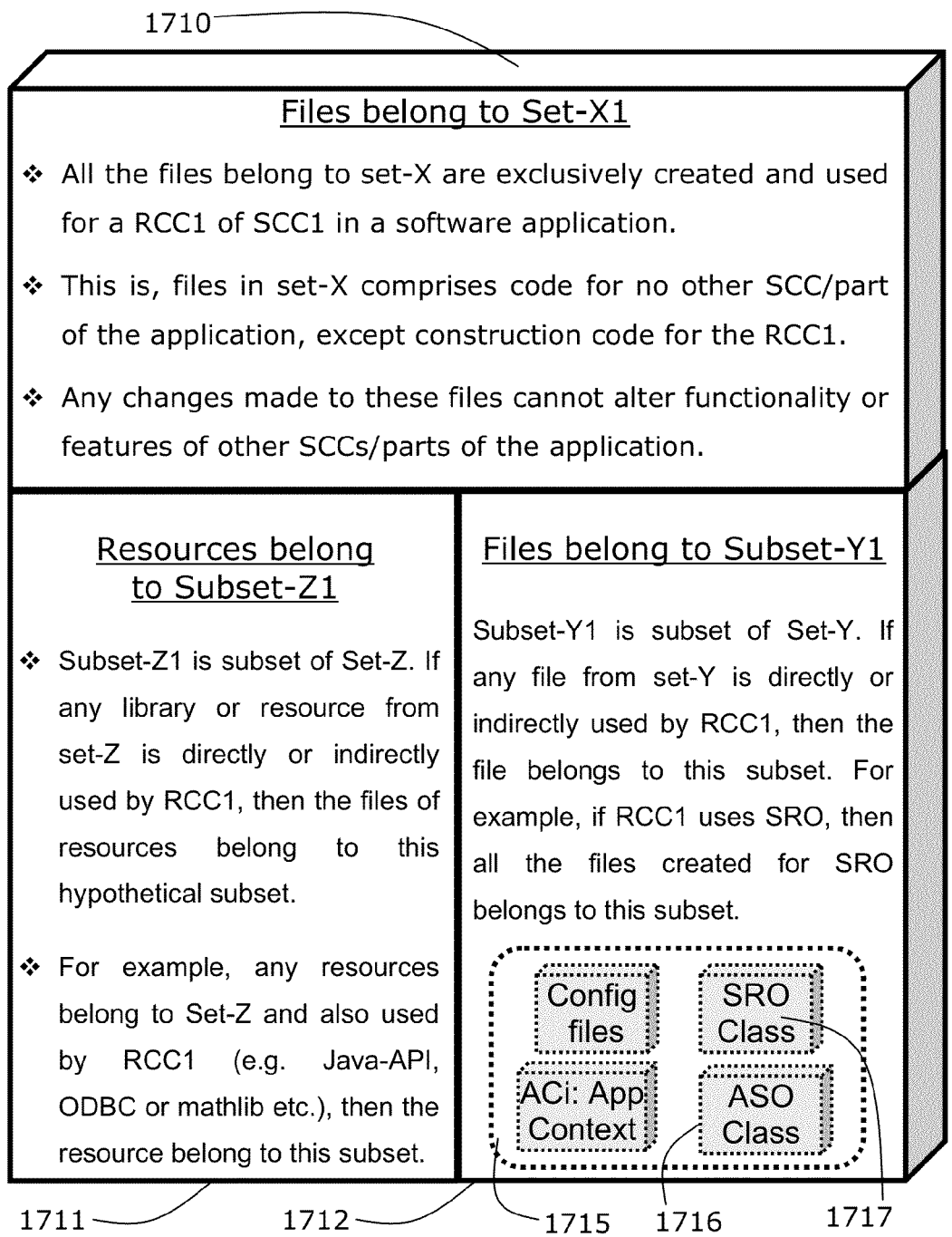
FIG. 17a shows all the files and resourced used for building a RCC that can be partitioned into 3 sets (i) exclusive files for the RCC, (ii) non-exclusive files for the RCC and (ii) public resources used from the eco system for software development, according to one embodiment.

FIG. 17a shows total dependencies and/or files and resourced used for building RCC1 of RSCC1, where the files and resources are partitioned into three sets (i) Set-X1 1710: exclusive files for the RCC1, (ii) Set-Y1 1711: non-exclusive files for the RCC1 and (ii) Set-Z1 1712: public resources used from the eco system for software development. All the exclusive files created for RCC1 belong to set-X1 1710. So any changes made to files in set-X1 1710 only could affect features, operations or services of the RSCC1. Also any changes made to files in set-X1 1710 cannot affect features, operations or services of other RSCCs in the application. Of course, if a change made to one of these exclusive files inadvertently introduces an error in a service provided by the RSCC1, the error in the service could cause problems in other RSCCs that depend on the service. But any changes cannot introduce a new bug in other RSCCs. Likewise any changes made to any file in set-X1 1710 cannot affect features, operations or services of other any other part in the application. The files in set-X1 contribute for increasing the degree of autonomy of RSCC1.

The RCC1 uses many files from set-Y. All the files implemented for each shared class/object belongs to set-Y. If a shared class belongs to set-Y, then all the files implemented for developing the shared class belongs to set-Y. If RCC1 uses a subset of shared classes 1715 and other files from set-Y, all the files directly or indirectly used by RCC1 belong to hypothetical Subset-Y1 1712. The set-Y may have many shared classes (e.g. 1617 in FIG. 16b), but assume RCC1 is only using subset of the shared classes 1715. Any changes made to a file belong to Subset-Y1 1712 could affect features, operations or services of not only RSCC1 but also all the other RCCs depending on the file. The files in subset-X1 1710 contribute for decreasing the degree of autonomy of RSCC1.

The RCC1 uses many resources from set-Z. All the resources from the eco system for the software development and used by all the RCCs (e.g. 1621 to 1619) and application code belongs to set-Z (e.g. 1620 in FIG. 16b) of the application. Only the resources used by RCC1 belong to hypothetical subset-Z1 1711. In general, changes in subset-Z1 such as choosing new resources for satisfying new requirements of RSCC1, cannot affect features, operations or services of other RSCCs in the application. In general, any changes made to resources in subset-Z1 1711 only could affect features, operations or services of the RSCC1. In general, an application can only choose appropriate resources from the eco system, but rarely can redesign the resource.

In one example embodiment, if most of the new requirements for RSCC1 can be implemented by just modifying files in set-X1 1710 or set-Z, then RSCC1 considered to be having very high degree of autonomy. If it is required to frequently and substantially change files in set-Y for implementing new features for RSCC1, then RSCC1 perceived to be having low degree of autonomy. It is possible to reduce changes to files in set-Y, for example (i) by better planning and design of the shared classes or resources and (ii) also by including classes and files that are less likely to be changed in set-Y. In general, most cases only require changing files in set-X1 1710 or set-Z1 for satisfying new requirements and no change to files in set-Y is required.

In another perspective, technically the code implemented either in a shared class or in the class of a shared object (in set-Y) is also construction code for a RCC, if the RCC depends on the class, as shown in FIG. 17*b*. The FIG. 17*b* partitions total application files in to exclusive and non-exclusive files of a RCC. Likewise, if a RCC uses $3^{rd}$ part libraries (e.g. reusable classes in set-Z), they are also technically part of the construction code for a RCC. The factors for increasing the degree of autonomy: Increasing the percent of exclusive construction code of a RCC increases degree of autonomy. In an exemplary embodiment, assuming two RCCs (RCC1 and RCC2) are redesigned several times in the past two years, if redesign of RCC1 required less changes to files in set-Y than redesign of RCC2, then RCC1 is considered to have higher degree of autonomy then RCC2.

FIG. 17*b* depicts total application files either used by or created for RCC1 of SCC1. The set 1740 is a hypothetical union set of files belonging to set-X1 1741 and hypothetical set-Y1 1742. Where files in Set-X1 1741 are exclusive files for the RCC1 and files in set-Y1 1742 are 'non-exclusive files' used by RCC1. Any changes to these application files in set-X1 and set-Y1 1742 could affect RCC1. All these application files are either depend on or created by using the resources from the eco systems for software development. An exemplary embodiment assumes that new requirement for a RCC1 doesn't include changing the resources used from set-Z, for example, to port to a new platform (e.g. OS, languages, party libraries or browser/viewer etc.) or port to substantially redesigned new version of the platform used. If RCC1 is only redesigned to satisfy new feature or service requirements, then only files in set-Y or set-X1 1741 are redesigned along with may be using new reusable library from $3^{rd}$ party vendors (so expands hypothetical set-Z to include the new reusable library).

For example, in an exemplary embodiment, for creating a test application to test RCC1 autonomously, the test application implements code for instantiating and initializing the shared objects (e.g. for classes of SRO, ASO and ACI in 1745) required by the RCC1 and makes the global objects available to the object instance of RCC1. The class implementation of RCC1 may also comprise of code to use one or more reusable utility classes from set-Y for create private object instances for internal use. If this exemplary embodiment designs and implements each of the classes for shared objects (e.g. for classes of SRO, ASO and ACI in 1745) as a RCC by encapsulating whole construction code, then for including each shared object requires implementing about 3 lines of code in the code of the test application.

In another example embodiment, code for a simple template application is created, where the template application implements code for including all the shared objects such as SRO, ACi and ASO or APP_services etc. This skeleton template application also links with compiled library of the RCCs of the application. A separate copy of the template application is created for using as the test application for testing each of the RCCs autonomously outside of the main applications containing all the other SCCs, while each RCC is being designed and developed. Then each of the RCCs is implemented and respective RSCC is assembled into the application, for example, by implementing few lines code to include and create necessary communication code.

In an example embodiment, the application template (e.g. for CityGIS in section-J) comprises no application specific feature or operation except the shared objects. Each and every operation (e.g. feature or functionality) of the application is implemented either in one of the RSCCs or accomplished by two or more collaborating RSCCs. So the code base for the application template is reusable for any other GUI application.

A SCC is a fully constructed module or object, which requires no more construction for performing its designated operations. A RCC is a class definition implemented to encapsulate substantial construction or application code of a SCC in order to be used for assembling an instance of SCC in an application as a replaceable unit (i.e. replaceable-SCC). A RCC said to have substantially encapsulated construction or application code of a SCC, (i) if the replaceability factor of the SCC is over 10 or (ii) if the RCC encapsulates at least 80% of the total exclusive construction or application code of the SCC The total exclusive construction code of either a SCC or its RCC does not include non-exclusive code such as code for non-exclusive shared or reusable modules, classes, objects or resources (i.e. belong to set-Y or set-Z). Also the total exclusive construction or application code encapsulated by the RCC only includes code from its set-X files, which constitutes exclusive code base of the RCC. A RCC requires one or more lines of code for instantiating and initializing an instance of the RCC for including an instance of a replaceable-SCC and also requires implementing necessary communication code for assembling the replaceable-SCC, where the code for instantiating or initializing the RCC instance implements any remaining necessary code for creating a fully constructed replaceable-SCC.

In case of a container-RCC of a SCC that uses sub-RCCs for including sub-RSCCs, the total construction code encapsulated by the RCC includes the union of the construction code of the container-RCC and all the sub-RCCs. For example, the construction code for the RCC of CityLandmarks (in section-J) comprises only few lines to assemble sub-RSCCs using sub-RCCs such as RCCs for CityHotels and CityTheaters. The total construction code for SCC or RCC of CityLandmarks includes union of the construction code of the RCC and all the sub-RCCs, since removing the object instance of RCC of CityLandmarks removes all its sub-RSCCs from its container component or application CityGIS. The total exclusive construction code encapsulated by a RCC of a SCC includes the union of code for all the classes, modules, objects and resources used exclusively by the RCC.

Section-X

Total Application Specific Code of an Application and Total of the Exclusive Application Specific Code for all the RCC of the Application It is desirable to track exclusive files created for each RCC. The exclusive file contains application code for just the RCC and must not contain code for any other RCC of the application, where the application code includes markup or programming languages instructions or other kinds of instructions such as configuration or resource files etc. Any suitable method may be used for tracking the exclusive files. For example, one method is putting all the exclusive files created for a RCC under an exclusive folder for the RCC. An RCC can use both exclusive files from its set-X and non-exclusive files from set-Y. This method only tracks all or substantial portion of the exclusive files of the RCC from its set-X.

For example, it requires compiling both exclusive files and non-exclusive files for creating an entry for each RCC in a library (e.g. Jar files in case of Java application) of RCCs for the application. Many of the changes required for satisfying evolving needs of a RSCC in an application often require modifying just the exclusive files for the RCC of the RSCC. However, sometimes it requires modifying non-exclusive files used by the RCC to satisfy certain needs. To reduce need for changing non-exclusive files requires reducing the dependencies on (or using) the non-exclusive files from set-Y. Also creating a private copy of a non-exclusive file (or class/resource) that needs frequent changes for a RCC, by copying from set-Y to set-X of the RCC can reduce changing non-exclusive files.

A RCC is a large RCC, if it implements more than few hundred lines of application code in the exclusive files. A container-RCC is also a large RCC, if the container-RCC uses one or more RCCs for including sub-RSCCs and total application code implemented in the exclusive files for the all the RCCs and container-RCC is more than few hundred lines of code. It is also desirable to track the exclusive (e.g. set-X1) files for each of the RCCs (e.g. RCC1) of the sub-RSCCs. Tracking substantial portion of exclusive files of a container-RCC includes tracking substantial portion of exclusive files of the RCCs for including the sub-RSCCs. Where exclusive files for each RCC may be kept in a separate folder and track the folders for the RCCs of the sub-RSCCs.

In the process of building a software application, it is required to create (e.g. design and implement) many lines of code specifically for the application. Here all the code created in the process of building an application is 'application specific code' for the application. In general, any software programming languages code and other kinds of instructions such as files containing scripts, configuration data that are created in the process of creating an application is application specific code (e.g. union of Set-Y 1620 and all set-Xs 1621 to 1629 in FIG. 16*b*).

For example, any changes to such code or contents of files can effect on functionality (e.g. can alter behavior or features) of the application. But code created for other purposes, such as, code (e.g. scripts, data files) created for testing an application is not application specific code, since such code is used only to test the application, but changing the code does not alter the application's features or functionality.

However code associated with API, modules, platforms or components that are not created specifically for an application, but are used in the application are not application specific code for the application (e.g. Set-Z in FIG. 16*a*). Examples for non-application specific code includes (i) the applications use many pre-built components or resources such as reusable modules, API (e.g. GUI-API or math library) and platforms (e.g. OS or RDBMS), or (ii) an application likely able to use many available modules or resources such as modules created by third parties or code created for using in other software applications, where each module is not specifically created for the application or redesigned specifically for satisfying unique need of the application.

Application specific code of an application includes the union of any kind of code instruction (e.g. programming language code or instructions in configuration or data files that could have any effect on behavior or features of the application) created for the application such as code-sections, modules, files, functions or classes. Where the union of the code instruction is set-theory union, in order to avoid counting same code instruction of files (e.g. files for images) twice.

1. Any code for application logic or business logic implemented as a part of designing and developing an application (or RSCC) is the application specific code (e.g. FIG. 5*a*) for the application (or RSCC). An example for application specific code includes code for accessing application data from application specific data sources, processing data and using the data in the application.
2. Code implemented to instantiate and initialize instances of reusable classes or modules, and also code implemented for using the instances. But the application specific code does not include the implementation code of the reusable class or module, if the class or module is not specifically implemented for the application (e.g. libraries or API used from third parties). The reusable classes or modules are implemented often by third parties (e.g. from set-Z) and/or independently from the application to be generic and reused in many applications/domains. Examples for reusable classes or modules include reusable GUI classes for the GUI components, math libraries or system libraries etc.
3. Code implemented to use shared objects or general-purpose utilities of the application such as service registration object (e.g. SRO), Request-obj, Session-obj (e.g. see FIG. 16*b*) and global message service object (e.g. APP_x-yz_Services) is application specific code. If the shared classes or modules are not specifically created for the application, then the implementation code of the shared classes or modules of the shared objects or general-purpose utility modules (e.g. functions or classes) is not application specific code.
4. Any code implemented in functions, modules or classes (e.g. EJB, Algorithm and Configuration etc. see FIGS. 4*a* and 4*c*), which are implemented specifically for an application is application specific code for the application. Also if a set of files comprising source code of an RSCC or module is obtained from an old application and redesigned the source code in few files for a new application, the code in the files that are modified is counted as application specific code for the new application.
5. All the other miscellaneous code implemented specifically for an application such as code for exchanging data between various parts, event processing or communication code between various components or modules, is application specific code for the application. Another example for miscellaneous code includes, code implemented for customizing various parts of application/RSCC based on user profile and/or preferences is application specific code.

In general, any code (e.g. modules, files or classes) that is designed and implemented in the process of creating a software application is the application specific code for the software application (e.g. set-Y 1620 and all set-Xs 1621 to 1629 in 16*b*).

The total application specific code is union of all the application specific code in all the source files (e.g. code implemented in any programming language, scripts, XML-statements and configuration files etc.) for the application. The union operator is used for determining the total application specific code or files, so that no code (e.g. lines of code of files) is counted twice. The total of all the application specific code for all the RCCs included in an application is union of all the application specific code of all the RCCs. (e.g. All set-Xs 1621 to 1629 of FIG. 16*b*).

What percentage of the total application code belongs to exclusive code base of all the RCCs? This may be obtained for an application (e.g. FIG. 16*b*) by finding the ratio of (i) total code belongs to exclusive code base of all the RCCs (e.g. union of all set-Xs 1621 to 1619) in the application and (ii)

total application code implemented for the application (e.g. union of set-Y 1620 and all set-Xs 1621 to 1619).

In one of the embodiments, the code implemented for application specific shared resources may be excluded from counting of both (a) total application specific code created for an application and (i) total application code implemented for all the RCCs in the application. The shared objects such as service registration object (e.g. FIG. 8a or 14a), Request-obj, Session-obj (e.g. see FIG. 4b) and global message service object (e.g. refer to APP_xyz_Services above) are used within RCCs and also by other SCCs (not implemented as a RCC) within the applications. In one embodiment, their implementation code is excluded from counting of both (i) total application code of the application and (ii) exclusive code for all the RCCs in the application (for calculating the above ratio or percentage).

In another embodiment, an approximate break-up for the global shared objects is required for calculating the above ratio/percentage. Assume that the exclusive application code implemented for the global shared sources is set-S. Also assume application specific code for all the RCCs (e.g. union of all set-Xs 1621 to 1629) comprise of P1% (e.g. 55%) of the total application specific code without code for the global shared classes/resources (e.g. code belongs to set-Y 1620 minus code belongs to set-S of 1617). Then the ratio is calculated as (i) total code belongs to all set-Xs plus P1% (e.g. 55%) of the code belongs to set-S and (ii) total code belongs to set-Y including set-S and all set-Xs. Where adding code of any two any sets, implies taking a union of code implemented for both sets, and subtraction means removing the intersection of subtracting set.

Hence, total application specific code for an application is union of all the above listed applications specific code (e.g. Set-Y 1620 and all set-Xs 1621 to 1629 in FIG. 16b). A large application is defined as an application that requires implementing about 8,000 lines or more of application specific code. Total application specific code for all the RSCCs in an application is union of all the applications specific code within each of the RSCCs in the application. A large RSCC is defined as a RCC class that comprising few hundred lines of application specific code. If an application or container-RSCC (e.g. 710 in FIG. 7a) is created by including one or more sub-RSCC by using sub-RCCs, then the total application specific code for the application (or container-RSCC) includes union of all the application specific code of all the sub-RCCs (e.g. used in code-sections 1601 to 1607 in FIG. 16a) and any application specific code implemented in the application (or RCC of the container-RSCC). Likewise, total application specific code for a container RCC includes all the application specific code implemented for the RCCs used for including sub-SCCs. For example, if a RCC (e.g. in FIG. 6a, RCC 600) of container-RSCC (e.g. presents RSCC 610 or 630 in FIG. 6b) implements just 10 to 15 lines of code for include sub-RSCCs still can be large RSCC, if the union of total application specific code of all of its sub-RCCs (e.g. 621, 622 and 623 in FIG. 6b) exceed few hundred lines of application specific code.

If union of exclusive application specific code of all the RSCCs of an application exceeds 50% of total application specific code of the application, then majority-share (or major-part) of the application is said to be designed and implemented as RSCCs or RCCs. Many older applications contain unused code, for example, due to replacing obsolete features by implementing new code, but if old code is not completely removed. Any unused code in an application must not be counted as application specific code for the application, when determining total percent of application specific code encapsulated in all of the RSCCs in the application.

If a set of software applications or systems are created from a common source code base (e.g. files, modules or classes) and furthermore the features and functionality of many components in each of the applications varies slightly from similar component in another application in the set of applications, then such set of applications are referred to as application-family or product-line. Building such family of software applications from a common source code base is called product-family of product-line engineering, where each application in the family is created by configuring and/or redesigning various modules/components from the common source code base. For example, Nokia using such product-family engineering method for building OS and applications for various models of cell-phones it designs each year.

It is possible to build such product families by using RSCCs. It is possible to use product line engineering methods for RSCCs, if multiple applications are using nearly similar SCC-instances of a component, where functionality or features of the SCC-instances differs or varies not significantly between the applications in the application-family. In case of certain components, it is possible to encapsulate construction code of both commonalities and variances of the SCC in a configurable RCC. For example, it is possible to create such a reusable configurable RCC, if data source for the SCC-instances is fixed or standardized (e.g. City street map), or the component needs little or no application specific data.

In an exemplary embodiment, to implement such a reusable class for a SCC, it requires documenting both commonalities, and variances of each of the SCC-instances of each application. The configurable-RCC for the SCC is implemented so that it can include a SCC-instance that supports all the common features and also allow configuration of each SCC-instance to satisfy feature variances required by each application. Then each application instantiates an object instance of the configurable RCC and implements remaining construction code for configuring the object to satisfy its unique needs (i.e. feature-variances).

In one of the embodiments, reusable configurable RCCs are designed for an application family. Since the code implemented for such a reusable class specifically designed just for one product-family, where applications in the family are created from a common code base, the reusable class code need to be counted as application specific code in each of the application and in the RSCC in the application. This is an exception, where code for such a reusable class is counted as application specific code of each application or RSCC in an application family.

Also if a reusable component class is designed and implemented specifically for an application or RSCC, then the code implemented for the reusable class is application specific code for the application or RSCC. For example, if no suitable reusable GUI class for Airplane is available for an Air Traffic control application and a reusable GUI class for Airplane is created, then the class code is application specific code for the Air Traffic control application.

In one of the embodiments, it is desirable to modularize large portion of the total code designed and developed for an application (i.e. total application specific code, including code for all its SCCs) in to modules that possess higher degree of autonomy. Hence one of the preferred embodiments encapsulates large portion of application specific code required for the SCCs in RCCs. In an example embodiment, if sample CityGIS application presented in 'Section-J' is designed to modularize nearly 80% of the application specific code into multiple RCCs (e.g. into set-Xs), then only about 20% of the total application specific code is left un-modularized (e.g. in set-Y). Each RCC may be refined and tested with higher degree of autonomy. If one of the SCCs is not encapsulated in a RCC, the application specific construction code of the SCC likely mixed with other un-modularized code of the application (i.e. in Set-Y), which requires more effort to find construction code of the SCC for refining (e.g. to add a feature or fix a bug) and testing the SCC after refining its code.

In one of the embodiments, RCCs are designed for better modularization of the total application code, as explained. In this embodiment, each RCC is custom designed for a specific application keeping in mind unique needs and context of the application. For example, each RCC for an application can use any of the shared utilities and objects (e.g. Global service objects such as 'SRO' or APP_xyz_Services discussed above), which are part of the application context. The RCC is designed to have autonomous code base, which is a set of exclusive files comprising most of the application specific code of its RSCC. In more than one RSCC or application is using certain files (e.g. configuration or images) or files associated with modules (e.g. utilities such as SRO APP_xyz_Services), those files cannot be part of the exclusive code base for any one of the RSCC. In one of the embodiments, the RCC is designed to minimize number of lines of code a container component or application required to implement for including and creating communication code for its RSCC.

In an exemplary embodiment, if code-sections for constructing each large SCC (e.g. RCCs presented in Section-J) of an application are not encapsulated in a RCC, it requires lot more work to create and test a new version of SCC by using the exiting code-sections spread across multiple non-exclusive files. For example, it needs more error prone work to find the code-sections created for constructing a SCC (e.g. City-Landmarks and/or each of its sub-SCCs), if the code-sections are mixed with other application code and spread across many files, where each file likely contains other application specific code of the application or other RSCCs.

Section-Y

Use of the Method and System of the Present Invention

An overview of the main methods of the RSCCs and the CBSE disclosed in this invention: Today any existing large software application comprises many SCCs. But neither unique characteristics/properties for identifying the SCCs nor useful benefits of the SCCs are known, so the SCCs are not explicitly identified for extracting hidden benefits offered by the SCCs. An RCC is created for each suitable SCC in an application and the SCC is included in to the application (a) by including an initialized object instance of the RCC, in case of a new application or (b) construction code of an excising SCC in an old application can be replaced by an initialized object instance of the RCC, where the initialized object instance is referred to as a RSCC. Then it is required to implement necessary communication code for the RSCC. Each larger RCC, especially used for a large SCC, increases the degree of (i) division-of-labor and (ii) specialization, not only during the initial development of the RSCC but also for long-term maintenance and evolution of each RSCC in the future. Furthermore the RSCCs are conducive to indirectly or directly increasing the degree of automation, for example, by using tools or utilities (e.g. SRO) for help creating and managing coupling or communication links between the RSCCs and components in the application.

For example, assume an application comprises just 2 large SCCs (e.g. CityATC and CityAmbulances in section-J), where the SCCs are assembled into to the application without using RCCs. If many code-sections of construction code of each SCC spread across many non-exclusive files (e.g. see FIGS. 15b and 15c), it is harder to remove or replace each SCC. Also it requires more error prone work to locate construction code of a SCC, for example, to redesign the SCC for satisfying new requirements and testing. This complexity only grows as more and more SCCs are added to an application without using a RCC. Any typical large application comprises multiple SCCs. So, if the construction code sections of each of the SCCs in an application are spread across many non-exclusive files of the application, the complexity only grows for locating construction code sections of each SCC to replace or redesign the SCC in the application having more and more such large SCCs.

This invention discloses a new kind of software components called RSCC and also discloses methods for creating and using the RSCCs for building software applications. This methods and processes disclosed are useful for identifying multiple large SCCs in an application and for implementing a RCC for each of the SCC. Alternatively when redesigning an existing application for building a new version, for example, (i) RCCs may be implemented for some of the new features or services or (ii) construction code sections of an old SCC in the application may be replaced by an object instance of RCC, for example, when redesigning the old SCC for satisfying new requirements. Also this invention discloses useful tools such as SRO for creating and managing communication or collaboration dependencies between RSCCs.

In a preferred embodiment of the present invention for building non-web applications, any object-oriented programming such as C++, Java or C#, for implementing the application code for the RCCs of an application and rest of the application code for the application. Also object-based languages such as Basic, Adobe's ActionScript or JavaScript can also be used, where the applications can also run on a viewer or virtual machine on local computer for non-web applications.

In another preferred embodiment of the present invention for building web-applications, Java is used on the server side, and W3C's SVG and JavaScript, which is an XML-based presentation language, is used on the client side. Any programming language such as .NET/C# on the server side, and any XML based presentation languages such as Adobe's MXML/Flex or XAML implemented in the Avalon subsystem of Vista Windows Operating Systems can be used on the client side to achieve the same goal. The code generated for the application component may include any of the technologies to present the component on any platform running a browser, a viewer or other equivalents. The invention may be practiced with any of the commercial browsers, which support at least one of the XML-graphical formats or namespaces.

Understanding the specifications of programming languages/technologies used on a platform, any person skilled in the programming art can design RCC to achieve the same results for the platform according to the teaching of this disclosure. Once intended meaning of the term 'self contained' is comprehended, any person skilled in the programming art can identify SCCs in an application and create a RCC for each SCC. While most of the RCCs in the examples are presented in the Java language or JavaScript, it is not limited to any one language. In case of a non-web GUI application, the RCCs for an application can be created using any object-oriented or object-based programming language such as Java, C# or C++ and so on. If an application is built in a programming language (e.g. C++), the RCC for each of the identified SCC can also be created in the same language (e.g. C++) and include the SCC by including an object instance of the RCC, according to one embodiment.

In case of non-web GUI application, each RCC for a GUI-SCC uses reusable classes for GUI components for presenting GUI sub-components in the SCC. Although many modern underlying platforms (e.g. Adobe's Flash/AIR or Microsoft's SilverLight) have no inherent limitations, most of the other higher-level GUI APIs are not capable of encapsulate large SCCs such as CityLandmarks or CityATC in a class definition for creating RCCs, where a GUI API is a library of software modules and comprising a set of reusable classes for GUI components and/or other utilities. Modern platforms such Microsoft's Avalon or Adobe's AIR/Apollo allow building desktop applications by using scripts compatible with ECMAScript (e.g. JavaScript or ActionScript) and/or XML based GUI languages (e.g. XAML or MXML), The RCCs/RSCCs address a problem that is addressed by no other known kind of software components. For example, the reusable components and replaceable-SCC address two different aspects of software development: The objective of the reusable components and resources (e.g. from set-Z discussed in section-W) is to reduce the custom code required for building a large application, by using pre-built reusable components. On the other hand, the objective of the replaceable-SCCs is to reduce the complexity of software development and maintenance/evolution of the custom or application specific code (e.g. from set-Y and set-Xs of all the RSCCs) that must be developed for any large applications. Most of the large software applications/systems not only use many reusable components but also implement tens or hundreds of thousands of lines of custom application specific code.

The objective of a RCC is to replace many sections of construction code of a SCC by just few lines of code for assembling an object instance of a RCC, where the construction code of the SCC otherwise spread across one or more non-exclusive files of an application. Where assembling includes code for instantiating and initializing an object instance of RCC (i.e. RSCC), attaching the RSCC to parent component and creating necessary communication code for the RSCC. Like the SCC it is replacing, the RCC is also designed in the context of the application and other SCCs that are collaborating with the SCC, according to one embodiment. But the RCC can be redesigned to be configurable, if it is practical to reuse in more than one application, so RCCs could increase reuse. Also the RCCs make it simpler for code reuse. For example, if a new application requires a custom RCC2 for SCC2, where the SCC2 is similar to SCC1 of an existing RCC1 but requires some redesign to satisfy unique needs of the new application, then a copy of the RCC1 can be used to create RCC2.

In this context, the code base of the RCC1 conceptually can be treated as an equivalent to an engineering blueprint of a physical component (e.g. engine of an existing model of Toyota Camry) and the blueprint (e.g. a CAD-drawing) is altered for designing a new component not only to satisfy unique needs but also to incorporate latest innovations for a new product-model (e.g. engine under design for a future model of Toyota Corolla).

According to one embodiment, the source code or code base for each large RCC is logically equivalent to the blueprint of a large physical component. The blueprint of each large physical component of a physical product can be redesigned (a) to evolve each physical component for satisfying evolving needs of the future physical product models or (b) for creating another custom physical component for another product model that needs similar component, but with some custom modifications. If a large custom SCC such as CityATC or CityLandmarks is not encapsulated in a RCC, it is many times more complex to find the source code spread across many non-exclusive files for redesigning the custom SCC. Also it is not possible to test the SCC outside its application, to assure its quality with high degree of autonomy.

Encapsulation of each large SCC of an application in a RCC and employing a method for tracking associated exclusive files increases the degree of (i) division-of-labor, (ii) specialization and (iii) automation using tools such as the SRO discussed in section-F and section-I. Any file containing source code of any class or module used exclusively by a SCC also belongs to the set of exclusive files of the SCC, according to one embodiment. Also any file containing source code of applications (e.g. 1125 in FIG-11*a*) to run on a remote server to exclusively collaborate with a SCC (e.g. 1212) also belongs to the set of exclusive files of the SCC, according to one embodiment. For example, in ATC-SCC example (FIG. 18*a*) in section-K, exclusive files for applications (e.g. 1820 or 1822) run on server to provide information exclusively for the ATC-SCC such as latest location and other information also belong to the set of exclusive files of the ATC-SCC, according to one embodiment.

The preferred embodiment identifies SCCs in an application for partitioning application specific code of the application in to easily replaceable modules, referred to as RSCCs, having high degree of autonomy. It is possible to develop and test each RCC/RSCC with high degree of autonomy from other RCCs. So each RCC offers higher degree of division-of-labor and/or specialization, for example, during initial development and/or for long term maintenance of the RCC/RSCC. Furthermore, the RSCC allow using tools (e.g. SRO discussed in section-I and F) to automate tasks such as creating communication code between RSCCs and managing the compatibility of coupling interfaces used for allowing communication between the SCCs. The RSCCs are more conducive for such automation. For example, such tools are not useful or practical in OOP (i.e. Object-oriented Programming of prior-art) for managing dependencies between the objects of OOP, since most of the objects are tightly coupled with each other. (E.g. most of the objects 1504 to 1511 in FIG. 15*a*, or objects used for constructing an application 1540 in FIG. 15*b* are tightly coupled).

The processes and methods disclosed in this invention are not limited to any programming language, technology or platform. Any person skilled in the programming art can practice the invention by using any object-oriented or object-based programming language(s) and on any platform(s) (e.g. Computers, VM/Viewers, Cell-phones, PDAs, Tablets or platforms/devices embedded in systems such as airplanes or network-routers etc). Once unique intended meaning of the term 'self contained' is comprehended, any person skilled in the programming art can identify SCCs in a large application to create RCCs/RSCCs and use the RSCCs for building and running the application.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A computer implemented method for implementing a software application code for building an application by using multiple Replaceable Component Classes (RCCs) for creating multiple Replaceable Self-Contained Components (RSCCs) for executing on a computing device, the computer implemented method comprising:

creating each RSCC in the application by instantiating and initializing an object instance of an RCC that substantially encapsulates construction code of a Self-Contained Component (SCC), wherein each RCC comprises application specific code implemented exclusively for the SCC, and the application specific code comprises application logic, parts of coupling code or coupling interfaces for facilitating communication, code for using shared modules or resources, code for using non-exclusive reusable modules or resources, code for accessing application data, or code for processing application data, wherein at least one or more RSCCs of the multiple RSCCs provide services, consume services, or provide and consume services; and creating coupling code to allow communication between one or more RSCCs of the multiple RSCCs that provide services and one or more RSCCs of the multiple RSCCs that require or consume services, wherein each RSCC of the multiple RSCCs is a component in the application for performing one or more operations selected from the following set of operations:

(a) providing one or more features or functionalities of the application, (b) providing one or more services for other components or parts of the application, and (c) depending on the one or more services, collaborating with other modules or components in the application to perform operations of the RSCC, and wherein total application code of all RCCs used for creating the multiple RSCCs comprises at least 50% of total application code of the application that includes application code implemented for the application and the total application code of all the RCCs, wherein the total application code of the application is at least 7000 lines of application code and the total application code of all the RCCs is a union of application code of all RCCs.

2. The computer implemented method of claim 1, further comprising tracking a set of exclusive files for each large RCC selected from a set of large RCCs, wherein the large RCC comprises at least two hundred lines of application code in the set of exclusive files of the large RCC, wherein the set of exclusive files comprises application code created exclusively for the large RCC and created for modules or resources used exclusively by the large RCC or its RSCC, and wherein the set of large RCCs is a subset of all RCCs used in the application.

3. The computer implemented method of claim 1, wherein creating the coupling code to allow communication between one or more RSCCs of the multiple RSCCs comprises:

creating required communication code in the software application code for allowing collaboration between a first RSCC that provides a service and a second RSCC that consumes the service.

4. The computer implemented method of claim 3, wherein creating the required communication code between the first RSCC and the second RSCC, comprising at least one of:

(a) creating a callback function in the software application code to access a service from an RCC object instance of the first RSCC and registering the callback function with the RCC object instance of the second RSCC for consuming the service; and (b) creating the software application code for getting a service method or a service object of the first RSCC from its RCC object instance and inputting the service method or the service object into an RCC object instance of the second RSCC, wherein the second RSCC accesses a service associated with the first RSCC by calling the service method or using the service object.

5. The computer implemented method of claim 1, wherein a set of RSCCs comprises two or more RSCCs of the multiple RSCCs that satisfy one or more criteria that include:

(a) the set of RSCCs comprising one or more sub-RSCCs as subcomponents;

(b) the set of RSCCs comprising multiple graphical user interface (GUI) subcomponents, wherein the multiple GUI subcomponents are created using reusable classes for respective GUI components and using application data for initializing or configuring the multiple GUI subcomponents; and (c) the set of RSCCs comprising one or more instances of reusable components, application logic, and code for accessing application data from application specific data sources for initializing or configuring the one or more instances of reusable components.

6. The computer implemented method of claim 1, wherein the application or one or more RSCCs of the multiple RSCCs comprise code to communicate or exchange data between one or more RSCCs of the multiple RSCCs and at least one other application.

7. The computer implemented method of claim 1, further comprising creating a Service Registration Object (SRO) in the application for facilitating communication between a first set of RSCCs of the multiple RSCCs having coupling code for registering services with the SRO and a second set of RSCCs of the multiple RSCCs having coupling code for using the SRO for finding and consuming services that includes:

(a) each RSCC of the first set of RSCCs comprises coupling code for registering, with the SRO, at least a service by using a pre-defined lookup-key and associated service function or associated service object of the RSCC; and (b) each RSCC of the second set of RSCCs comprises coupling code for consuming at least a service by using a pre-defined lookup-key to get, from the SRO, a service function or a service object associated with the pre-defined lookup-key for consuming the service using the associated service function or the associated service object.

8. The computer implemented method of claim 1, wherein the application uses at least 12 large RCCs or any combination of at least 24 large and medium RCCs, wherein each large RCC comprises at least two hundred lines of exclusive application code and each medium RCC comprises at least a hundred lines of exclusive application code, wherein the exclusive application code of an RCC does not contain sub-RSCCs, wherein the exclusive application code is application code implemented exclusively for the RCC, and wherein the exclusive application code of each RCC, of a container-RSCC comprising sub-RSCCs, comprises exclusive application code of all RCCs used for creating the sub-RSCCs.

9. A non-transitory computer-readable storage medium storing a software application code comprising instructions for using multiple Replaceable Component Classes (RCCs) for creating multiple Replaceable Self-Contained Components (RSCCs) and comprising necessary coupling code for one or more RSCCs of the multiple RSCCs that, when executed by a computing device, cause the computing device to perform a method comprising:

creating each RSCC in an application by instantiating and initializing an object instance of an RCC that substantially encapsulates construction code of a Self-Contained Component (SCC), wherein each RCC comprises application specific code implemented exclusively for the SCC, and the application specific code comprises application logic, parts of coupling code or coupling interfaces for facilitating communication, code for using shared modules or resources, code for using non-exclusive reusable modules or resources, code for accessing application data, or code for processing application data, wherein at least one or more RSCCs of the multiple RSCCs provide services, consume services, or provide and consume services; and executing coupling code to allow communication between one or more RSCCs of the multiple RSCCs that provide services and one or more RSCCs of the multiple RSCCs that require or consume services, wherein each RSCC of the multiple RSCCs is a component in the application for performing one or more operations selected from the following set of operations:

(a) providing one or more features or functionalities of the application, (b) providing one or more services for other components or parts of the application, and (c) depending on the one or more services, collaborating with other modules or components in the application to perform operations of the RSCC, and wherein total application code of all RCCs used for creating the multiple RSCCs comprises at least 50% of total application code of the application that includes application code implemented for the application and the total application code of all the RCCs, wherein the total application code of the application is at least 7000 lines of application code and the total application code of all the RCCs is a union of application code of all RCCs.

10. The non-transitory computer-readable storage medium of claim 9, wherein the application uses at least 12 large RCCs or any combination of at least 24 large and medium RCCs, wherein each large RCC comprises at least two hundred lines of exclusive application code and each medium RCC comprises at least a hundred lines of exclusive application code, wherein the exclusive application code of an RCC does not contain sub-RSCCs, wherein the exclusive application code is application code implemented exclusively for the RCC, and wherein the exclusive application code of each RCC, of a container-RCC comprising sub-RSCCs, comprises exclusive application code of all RCCs used for creating the sub-RSCCs.

11. The non-transitory computer-readable storage medium of claim 9, wherein executing the coupling code to allow communication between one or more RSCCs of the multiple RSCCs comprises:

executing required communication code in the software application code for allowing collaboration between a first RSCC that provides a service and a second RSCC that consumes the service.

12. The non-transitory computer-readable storage medium of claim 11, wherein executing the required communication code between the first RSCC and the second RSCC, comprising at least one of:

(a) registering a callback function with an RCC object instance of the second RSCC for consuming a service, wherein the callback function in the software application code accesses the service associated with the first RSCC; and (b) executing the software application code for getting a service method or a service object of the first RSCC from its RCC object instance and inputting the service method or the service object into an RCC object instance of the second RSCC, wherein the second RSCC accesses a service associated with the first RSCC by calling the service method or using the service object.

13. The non-transitory computer-readable storage medium of claim 9, wherein a set of RSCCs comprises two or more RSCCs of the multiple RSCCs that satisfy one or more criteria that include:

(a) the set of RSCCs comprising one or more sub-RSCCs as subcomponents;

(b) the set of RSCCs comprising multiple graphical user interface (GUI) subcomponents, wherein the multiple GUI subcomponents are created using reusable classes for respective GUI components and using application data for initializing or configuring the multiple GUI subcomponents; and (c) the set of RSCCs comprising one or more instances of reusable components, application logic, and code for accessing application data from application specific data sources for initializing or configuring the one or more instances of reusable components.

14. A computer implemented method for implementing a software application code for building an application by using multiple Replaceable Component Classes (RCCs) for creating multiple Replaceable Self-Contained Components (RSCCs) for executing on a computing device, the computer implemented method comprising:

creating each RSCC in the application by instantiating and initializing an object instance of an RCC that substantially encapsulates construction code of a Self-Contained Component (SCC), wherein each RCC comprises application specific code implemented exclusively for the SCC, and the application specific code comprises application logic, parts of coupling code or coupling interfaces for facilitating communication, code for using shared modules or resources, code for using non-exclusive reusable modules or resources, code for accessing application data, or code for processing application data, wherein at least one or more RSCCs of the multiple RSCCs provide services, consume services, or provide and consume services; and creating coupling code to allow communication between one or more RSCCs of the multiple RSCCs that provide services and one or more RSCCs of the multiple RSCCs that require or consume services, wherein each RSCC of the multiple RSCCs is a component in the application for performing one or more operations selected from the following set of operations:

(a) providing one or more features or functionalities of the application, (b) providing one or more services for other components or parts of the application, and (c) depending on the one or more services, collaborating with other modules or components in the application to perform operations of the RSCC, and wherein a set of RCCs that are used for creating the multiple RSCCs comprises at least one of the criteria that include:

(i) total application code of the set of RCCs used for creating the multiple RSCCs comprises at least 40% of total application code of the application that includes application code implemented for the application and the total application code of the set of RCCs, wherein the total application code of the application is at least 9000 lines of application code and the total application code of the set of RCCs is a union of application code of each RCC of the set of RCCs, (ii) the set of RCCs comprise at least 12 large RCCs, and (iii) the set of RCCs comprise any combination of at least 24 large and medium RCCs, and wherein each large RCC includes at least two hundred lines of exclusive application code and each medium RCC includes at least a hundred lines of exclusive application code, and wherein the exclusive application code of an RCC does not contain sub-RSCCs, wherein the exclusive application code is application code implemented exclusively for the RCC, and wherein the exclusive application code of each RCC, of a container-RSCC comprising sub-RSCCs, includes a union of exclusive application code of the RCC and exclusive application code of all RCCs used for creating the sub-RSCCs.

15. The computer implemented method of claim 14, further comprising tracking a set of exclusive files for each large RCC selected from a set of large RCCs, wherein the large RCC comprises at least two hundred lines of application code in the set of exclusive files of the large RCC, wherein the set of exclusive files comprises application code created exclusively for the large RCC and created for modules or resources used exclusively by the large RCC or its RSCC, and wherein the set of large RCCs is a subset of all RCCs used in the application.

16. The computer implemented method of claim 14, wherein creating the coupling code to allow communication between one or more RSCCs of the multiple RSCCs comprises:

creating required communication code in the software application code for allowing collaboration between a first RSCC that provides a service and a second RSCC that consumes the service.

17. The computer implemented method of claim 16, wherein creating the required communication code between the first RSCC and the second RSCC, comprises at least one of:

(a) creating a callback function in the software application code to access a service from an RCC object instance of the first RSCC and registering the callback function with the RCC object instance of the second RSCC for consuming the service; and (b) creating the software application code for getting a service method or a service object of the first RSCC from its RCC object instance and inputting the service method or the service object into an RCC object instance of the second RSCC, wherein the second RSCC accesses a service associated with the first RSCC by calling the service method or using the service object.

18. The computer implemented method of claim 14, wherein a set of RSCCs comprises two or more RSCCs of the multiple RSCCs that satisfy one or more criteria that include:

(a) the set of RSCCs comprising one or more sub-RSCCs as subcomponents;

(b) the set of RSCCs comprising multiple graphical user interface (GUI) subcomponents, wherein the multiple GUI subcomponents are created using reusable classes for respective GUI components and using application data for initializing or configuring the multiple GUI subcomponents; and (c) the set of RSCCs comprising one or more instances of reusable components, application logic, and code for accessing application data from application specific data sources for initializing or configuring the one or more instances of reusable components.

19. A system for executing a software application code comprising instructions for using multiple Replaceable Component Classes (RCCs) for creating multiple Replaceable Self-Contained Components (RSCCs), the system comprising:

a processor;

a data bus;

an accessible storage medium; and a memory operatively coupled to the processor, wherein the memory stores the software application code comprising instructions for creating the multiple RSCCs and comprising necessary coupling code for one or more RSCCs of the multiple RSCCs for executing the steps of:

creating each RSCC in an application by instantiating and initializing an object instance of an RCC that substantially encapsulates construction code of a Self-Contained Component (SCC), wherein each RCC comprises application specific code implemented exclusively for the SCC, and the application specific code comprises application logic, parts of coupling code or coupling interfaces for facilitating communication, code for using shared modules or resources, code for using non-exclusive reusable modules or resources, code for accessing application data, or code for processing application data, wherein at least one or more RSCCs of the multiple RSCCs provide services, consume services, or provide and consume services; and executing coupling code to allow communication between one or more RSCCs of the multiple RSCCs that provide services and one or more RSCCs of the multiple RSCCs that require or consume services, wherein each RSCC of the multiple RSCCs is a component in the application for performing one or more operations selected from the following set of operations:

(a) providing one or more features or functionalities of the application, (b) providing one or more services for other components or parts of the application, and (c) depending on the one or more services, collaborating with other modules or components in the application to perform operations of the RSCC, and wherein a set of RCCs that are used for creating the multiple RSCCs comprises at least one of the criteria that include:

(i) total application code of the set of RCCs used for creating the multiple RSCCs comprises at least 40% of total application code of the application that includes application code implemented for the application and the total application code of the set of RCCs, wherein the total application code of the application is at least 9000 lines of application code and the total application code of the set of RCCs is a union of application code of each RCC of the set of RCCs, (ii) the set of RCCs comprise at least 12 large RCCs, and (iii) the set of RCCs comprise any combination of at least 24 large and medium RCCs, and wherein each large RCC includes at least two hundred lines of exclusive application code and each medium RCC includes at least a hundred lines of exclusive application code, and wherein the exclusive application code of a RCC does not contain sub-RSCCs, wherein the exclusive application code is application code implemented exclusively for the RCC, and wherein the exclusive application code of each RCC, of a container-RSCC comprising sub-RSCCs, includes a union of exclusive application code of the RCC and exclusive application code of all RCCs used for creating the sub-RSCCs.

20. The system of claim 19, wherein a set of RSCCs comprises two or more RSCCs of the multiple RSCCs that satisfy one or more criteria that include:
   (a) the set of RSCCs comprising one or more sub-RSCCs as subcomponents;
   (b) the set of RSCCs comprising multiple graphical user interface (GUI) subcomponents, wherein the multiple GUI subcomponents are created using reusable classes for respective GUI components and using application data for initializing or configuring the multiple GUI subcomponents; and
   (c) the set of RSCCs comprising one or more instances of reusable components, application logic, and code for accessing application data from application specific data sources for initializing or configuring the one or more instances of reusable components.

21. The system of claim 19, wherein executing the coupling code to allow communication between one or more RSCCs of the multiple RSCCs comprises:
   executing required communication code in the software application code for allowing collaboration between a first RSCC that provides a service and a second RSCC that consumes the service.

22. The system of claim 21, wherein executing the required communication code between the first RSCC and the second RSCC, comprising at least one of:
   (a) registering a callback function with an RCC object instance of the second RSCC for consuming a service, wherein the callback function in the software application code accesses the service associated with the first RSCC; and
   (b) executing the software application code for getting a service method or a service object of the first RSCC from its RCC object instance and inputting the service method or the service object into an RCC object instance of the second RSCC, wherein the second RSCC accesses a service associated with the first RSCC by calling the service method or using the service object.

23. The system of claim 21, wherein the software application code further comprising instructions and necessary coupling code for executing the step of creating a Service Registration Object (SRO) in the application and executing communication code that uses the SRO for allowing communication between a first set of RSCCs of the multiple RSCCs that execute coupling code to register services using the SRO and a second set of RSCCs of the multiple RSCCs that execute coupling code for using the SRO to find and consume services that includes:
   (a) each RSCC of the first set of RSCCs comprises coupling code for registering, with the SRO, at least a service by using a pre-defined lookup-key and associated service function or associated service object of the RSCC; and
   (b) each RSCC of the second set of RSCCs comprises coupling code for consuming at least a service by using a pre-defined lookup-key to get, from the SRO, a service function or a service object associated with the pre-defined lookup-key for consuming the service using the associated service function or the associated service object.

24. The system of claim 19, wherein a set of RSCCs comprises two or more RSCCs of the multiple RSCCs that satisfy one or more criteria that include:
   (a) the set of RSCCs comprises one or more sub-RSCCs as subcomponents;
   (b) the set of RSCCs comprises multiple graphical user interface (GUI) subcomponents, wherein the multiple GUI subcomponents are created using reusable classes for respective GUI components and using application data for initializing or configuring the multiple GUI subcomponents; and
   (c) the set of RSCCs comprises one or more instances of reusable components, application logic, and code for accessing application data from application specific data sources for initializing or configuring the one or more instances of reusable components.

25. The system of claim 19, wherein the application or one or more RSCCs of the multiple RSCCs comprise code to communicate or exchange data between one or more RSCCs of the multiple RSCCs and at least one other application.

26. A computer implemented method for implementing a software application code for building an application by using multiple Replaceable Component Classes (RCCs) for creating multiple Replaceable Self-Contained Components (RSCCs) for executing on a computing device, the computer implemented method comprising:
   creating each RSCC in the application by instantiating and initializing an object instance of an RCC that substantially encapsulates construction code of a Self-Contained Component (SCC), wherein each RCC comprises application specific code implemented exclusively for the SCC, and the application specific code comprises application logic, parts of coupling code or coupling interfaces for facilitating communication, code for using shared modules or resources, code for using non-exclusive reusable modules or resources, code for accessing application data, or code for processing application data, wherein at least one or more RSCCs of the multiple RSCCs provide services, consume services, or provide and consume services,
   wherein each RSCC of the multiple RSCCs is a component in the application for performing one or more operations selected from the following set of operations:
   (a) providing one or more features or functionalities of the application,
   (b) providing one or more services for other components or parts of the application, and
   (c) depending on the one or more services, collaborating with other modules or components in the application to perform operations of the RSCC,
   wherein the multiple RSCCs comprise a first set of RSCCs and a second set of RSCCs, wherein each RSCC of the first set of RSCCs provides one or more services and each RSCC of the second set of RSCCs consumes one or more services; and
   creating a Service Registration Object (SRO) in the application for allowing communication between one or more RSCCs of the first set of RSCCs and one or more RSCCs of the second set of RSCCs by using the SRO.

27. The computer implemented method of claim 26, further comprising tracking a set of exclusive files for each large RCC selected from a set of large RCCs, wherein the large RCC comprises at least two hundred lines of application code in the set of exclusive files of the large RCC, wherein the set of exclusive files comprises application code created exclusively for the large RCC and created for modules or resources used exclusively by the large RCC or its RSCC, and wherein the set of large RCCs is a subset of all RCCs used in the application.

28. The computer implemented method of claim 26, wherein each RSCC of the first set of RSCCs comprises coupling code for registering at least a service with the SRO; and wherein each RSCC of the second set of RSCCs comprises coupling code for consuming at least a service by using the SRO for finding or getting the service to facilitate necessary communication between one or more RSCCs of the multiple RSCCs in the application.

29. The computer implemented method of claim 26, further comprising creating coupling code to allow communication between one or more RSCCs of the multiple RSCCs, wherein creating the coupling code to allow communication between one or more RSCCs of the multiple RSCCs comprises creating required communication code in the software application code for allowing collaboration between a first RSCC that provides a service and a second RSCC that consumes the service.

30. The computer implemented method of claim 26, wherein communication between one or more RSCCs of the multiple RSCCs using the SRO comprises:
    (a) each RSCC of the first set of RSCCs comprises coupling code for registering, with the SRO, at least a service of the RSCC by using a pre-defined lookup-key and associated service function or associated service object of the RSCC, wherein the pre-defined lookup-key is used for finding the associated service function or the associated service object for getting the service; and
    (b) each RSCC of the second set of RSCCs comprises coupling code for getting at least a required service of an RSCC from the SRO by using a pre-defined lookup-key associated with the required service, wherein the coupling code uses the pre-defined lookup-key associated with the required service to find, from the SRO, a service function or a service object that provides the required service for getting the required service.

31. The computer implemented method of claim 26, wherein the SRO or another object for managing coupling dependencies in the application further comprising performing at least one of the following:
    (a) detecting unavailability of a service required by one RSSC of the second set of RSSCs;
    (b) detecting unused one or more services registered by the first set of RSSCs; and
    (c) detecting incompatible communication interfaces between service-providing RSCCs and service-consuming RSCCs.

32. The computer implemented method of claim 26, wherein a set of RSCCs comprises two or more RSCCs of the multiple RSCCs that satisfy one or more criteria that include:
    (a) the set of RSCCs comprising one or more sub-RSCCs as subcomponents;
    (b) the set of RSCCs comprising multiple graphical user interface (GUI) subcomponents, wherein the multiple GUI subcomponents are created using reusable classes for respective GUI components and using application data for initializing or configuring the multiple GUI subcomponents; and
    (c) the set of RSCCs comprising one or more instances of reusable components, application logic, and code for accessing application data from application specific data sources for initializing or configuring the one or more instances of reusable components.

33. The computer implemented method of claim 26, further comprising creating coupling code between at least one RSCC of the multiple RSCCs and at least one other component or module in the application, wherein creating the coupling code to allow communication between the at least one RSCC of the multiple RSCCs and the at least one other component or module in the application comprises creating necessary communication code in the application for properly using interfaces of the at least one other component or module and creating code for interacting with an RCC object instance of the at least one RSCC of the multiple RSCCs for getting or providing a service.

34. A system for executing a software application code comprising instructions for using multiple Replaceable Component Classes (RCCs) for creating multiple Replaceable Self-Contained Components (RSCCs) and a Service Registration Object (SRO), the system comprising:
    a processor;
    a data bus;
    an accessible storage medium; and
    a memory operatively coupled to the processor, wherein the memory stores the software application code comprising instructions for creating the multiple RSCCs and comprising necessary coupling code for one or more RSCCs of the multiple RSCCs to use the SRO, for executing the steps of:
    creating each RSCC in an application by instantiating and initializing an object instance of an RCC that substantially encapsulates construction code of a Self-Contained Component (SCC), wherein each RCC comprises application specific code implemented exclusively for the SCC, and the application specific code comprises application logic, parts of coupling code or coupling interfaces for facilitating communication, code for using shared modules or resources, code for using non-exclusive reusable modules or resources, code for accessing application data, or code for processing application data, wherein at least one or more RSCCs of the multiple RSCCs provide services, consume services, or provide and consume services,
    wherein each RSCC of the multiple RSCCs is a component in the application for performing one or more operations selected from the following set of operations:
    (a) providing one or more features or functionalities of the application,
    (b) providing one or more services for other components or parts of the application, and
    (c) depending on the one or more services, collaborating with other modules or components in the application to perform operations of the RSCC,
    wherein the multiple RSCCs comprise a first set of RSCCs and a second set of RSCCs, wherein each RSCC of the first set of RSCCs provides one or more services and each RSCC of the second set of RSCCs consumes one or more services; and
    executing necessary communication or coupling code to allow collaboration between the first set of RSCCs and the second set of RSCCs by allowing one or more RSCCs of the second set of RSCCs to access services of one or more RSCCs of the first set of RSCCs using the SRO.

35. The system of claim 34, wherein each RSCC of the first set of RSCCs executes coupling code for registering at least a service with the SRO; and wherein each RSCC of the second set of RSCCs executes coupling code for consuming at least a service using the SRO to facilitate necessary collaboration between one or more RSCCs of the multiple RSCCs in the application.

36. The system of claim 34, wherein the software application code further comprising instructions and necessary coupling code for executing the step of executing communication code in the software application code to allow collaboration between one or more RSCCs of the multiple RSCCs, wherein executing the communication code in the software application code to allow collaboration between one or more RSCCs of the multiple RSCCs comprises interacting with an RCC object instance of a first RSCC that provides a service and an RCC object instance of a second RSCC that consumes the service for allowing the second RSCC to request or consume the service of the first RSCC.

37. The system of claim 34, wherein executing the necessary communication or coupling code to allow collaboration between the first set of RSCCs and the second set of RSCCs using the SRO comprises:
   (a) each RSCC of the first set of RSCCs executes coupling code for registering with the SRO at least a service of the RSCC by using a pre-defined lookup-key and associated service function or associated service object of the RSCC, wherein the pre-defined lookup-key is used for finding the associated service function or the associated service object for getting the service; and
   (b) each RSCC of the second set of RSCCs executes coupling code for getting at least a required service of an RSCC from the SRO by using a pre-defined lookup-key associated with the required service, wherein the coupling code uses the pre-defined lookup-key associated with the required service to find, from the SRO, a service function or a service object that provides the required service for getting the required service.

38. The system of claim 34, wherein the SRO or another object for managing coupling dependencies in the application further performs at least one of the following:
   (a) detecting unavailability of a service required by one RSSC of the second set of RSSCs;
   (b) detecting unused one or more services registered by the first set of RSSCs; and
   (c) detecting incompatible communication interfaces between service-providing RSCCs and service-consuming RSCCs.

39. The system of claim 34, wherein a set of RSCCs comprises two or more RSCCs of the multiple RSCCs that satisfy one or more criteria that include:
   (a) the set of RSCCs comprising one or more sub-RSCCs as subcomponents;
   (b) the set of RSCCs comprising multiple graphical user interface (GUI) subcomponents, wherein the multiple GUI subcomponents are created using reusable classes for respective GUI components and using application data for initializing or configuring the multiple GUI subcomponents; and
   (c) the set of RSCCs comprising one or more instances of reusable components, application logic, and code for accessing application data from application specific data sources for initializing or configuring the one or more instances of reusable components.

40. The system of claim 34, wherein the software application code further comprising instructions and necessary coupling code for executing the step of executing communication code in the software application code to allow collaboration between at least one RSCC of the multiple RSCCs and at least one other component or module in the application, wherein executing the communication code in the software application code to allow collaboration between at least one RSCC of the multiple RSCCs and at least one other component or module in the application comprises executing necessary communication code in the application for properly using interfaces of the at least one other component or module and executing code for interacting with an RCC object instance of the at least one RSCC for getting or providing a service.

* * * * *